United States Patent
Ohkubo et al.

(10) Patent No.: US 10,696,457 B2
(45) Date of Patent: Jun. 30, 2020

(54) SPOUT-EQUIPPED CONTAINER AND METHOD FOR MANUFACTURING SAME

(71) Applicant: Melodian Co., Ltd., Yao-shi, Osaka (JP)

(72) Inventors: Yoshinori Ohkubo, Tokyo (JP); Takayuki Monden, Yao (JP)

(73) Assignee: MELODIAN CO., LTD., Yao-Shi, Osaka (JP)

( * ) Notice: Subject to any disclaimer, the term of this patent is extended or adjusted under 35 U.S.C. 154(b) by 0 days.

(21) Appl. No.: 15/788,274

(22) Filed: Oct. 19, 2017

(65) Prior Publication Data

US 2018/0105332 A1    Apr. 19, 2018

Related U.S. Application Data

(63) Continuation of application No. PCT/JP2016/066806, filed on Jun. 6, 2016.

(30) Foreign Application Priority Data

Jun. 8, 2015 (JP) ................................ 2015-115552
Mar. 11, 2016 (JP) ................................ 2016-048856

(51) Int. Cl.
*B65D 47/10* (2006.01)
*B65D 51/22* (2006.01)
(Continued)

(52) U.S. Cl.
CPC ........... *B65D 47/103* (2013.01); *B65D 5/748* (2013.01); *B65D 51/22* (2013.01); *B65D 75/58* (2013.01); *B65D 81/24* (2013.01); *B65D 85/72* (2013.01)

(58) Field of Classification Search
CPC ...... B65D 47/103; B65D 5/748; B65D 51/22; B65D 75/58; B65D 81/24; B65D 85/72
(Continued)

(56) References Cited

U.S. PATENT DOCUMENTS 4,378,069 A * 3/1983 Franco ................. B65D 75/52
                                                                 156/261
4,658,434 A * 4/1987 Murray ................. B32B 15/08
                                                                 383/66

(Continued)

FOREIGN PATENT DOCUMENTS

JP     S60-163253 U    10/1985
JP     S64-9128 U      1/1989
(Continued)

*Primary Examiner* — Paul R Durand
*Assistant Examiner* — Andrew P Bainbridge
(74) *Attorney, Agent, or Firm* — Rabin & Berdo, P.C.

(57) ABSTRACT

To provide a spout-equipped container that is excellent in hermetical-sealing performance. The spout-equipped container includes a container and a spout. The spout includes a spout base, an opening element accommodated in a cylinder of the spout base, an activating body which moves the opening element, and a heat sealed sheet which covers an inner opening which fronts an accommodating part in the spout base. The opening element is formed so as not to be get out of the spout base, is formed so as to move toward the heat sealed sheet, and has its center where a spout through hole is formed. The heat sealed sheet is formed so as to be partially torn by the opening element to make the accommodating part of the container and an outer opening of the spout base communicate with outside via the spout through hole of the opening element, and is formed so that an accommodated substance is poured outside.

15 Claims, 83 Drawing Sheets

(51) Int. Cl.
*B65D 81/24* (2006.01)
*B65D 85/72* (2006.01)
*B65D 5/74* (2006.01)
*B65D 75/58* (2006.01)

(58) Field of Classification Search
USPC ............... 222/81, 82, 83.5, 541.1–541.9
See application file for complete search history.

(56) References Cited

U.S. PATENT DOCUMENTS

| | | | | |
|---|---|---|---|---|
| 5,960,992 | A * | 10/1999 | Bernstein | B65D 5/748 222/541.2 |
| 6,241,132 | B1 * | 6/2001 | Morrison | B65D 47/103 222/541.6 |
| 6,398,075 | B1 | 6/2002 | Laciacera et al. | |
| 6,722,531 | B2 * | 4/2004 | Matsuo | B65D 35/12 215/42 |
| 7,261,226 | B2 * | 8/2007 | Adams | B65D 47/244 206/221 |
| 8,020,729 | B2 * | 9/2011 | Dubach | B65D 5/748 220/278 |
| 8,733,600 | B2 * | 5/2014 | Pritchard | B65D 47/103 222/494 |
| 8,906,187 | B2 * | 12/2014 | Miller | B29C 69/005 156/211 |
| 9,415,908 | B2 * | 8/2016 | Barron | B65D 5/748 |
| 2016/0046427 | A1 * | 2/2016 | Bellmore | B65D 75/5877 383/42 |
| 2016/0068316 | A1 * | 3/2016 | Wolff | B65D 75/5883 222/81 |
| 2017/0008207 | A1 * | 1/2017 | Tamarindo | B29C 45/14073 |
| 2017/0280748 | A1 * | 10/2017 | Igarashi | B65B 61/205 |
| 2018/0105332 | A1 * | 4/2018 | Ohkubo | B65D 85/72 |

FOREIGN PATENT DOCUMENTS

| | | |
|---|---|---|
| JP | H02-34455 U | 3/1990 |
| JP | H03-129227 U | 12/1991 |
| JP | 2001-106249 A | 4/2001 |
| JP | 2004-315067 A | 11/2004 |
| JP | 2006-82826 A | 3/2006 |
| JP | 2007-161254 A | 6/2007 |
| JP | 2009-1288 A | 1/2009 |
| JP | 2013-252900 A | 12/2013 |

* cited by examiner

FIG. 4A(1)
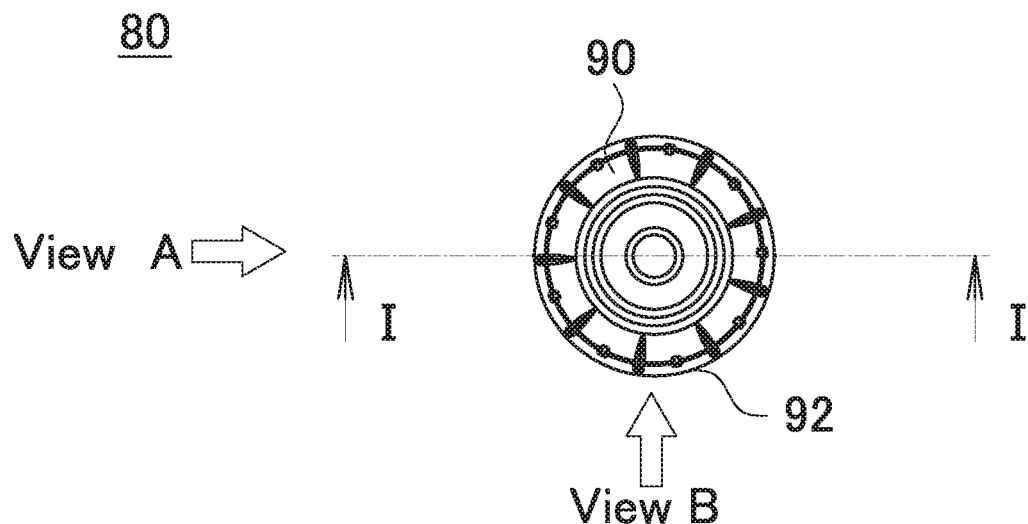
FIG. 4A(2)
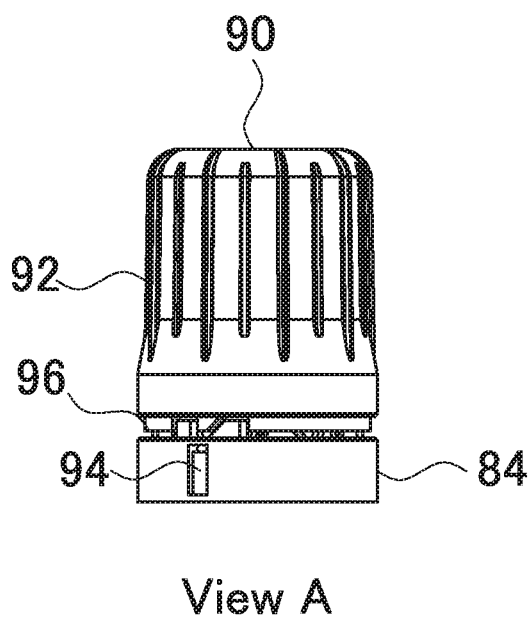
View A
FIG. 4A(3)
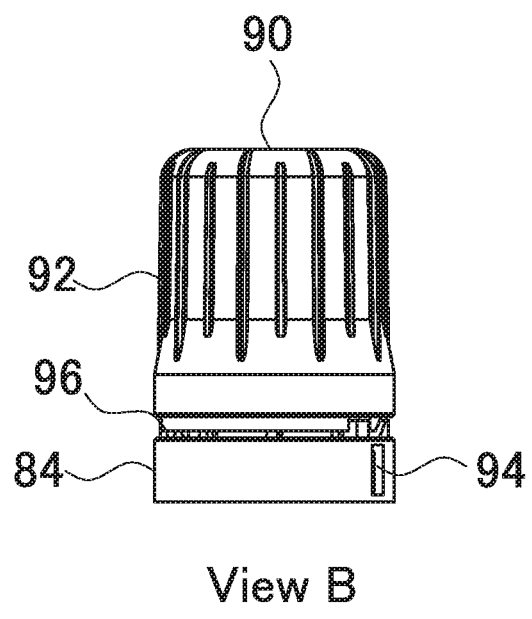
View B

FIG. 4B(1)
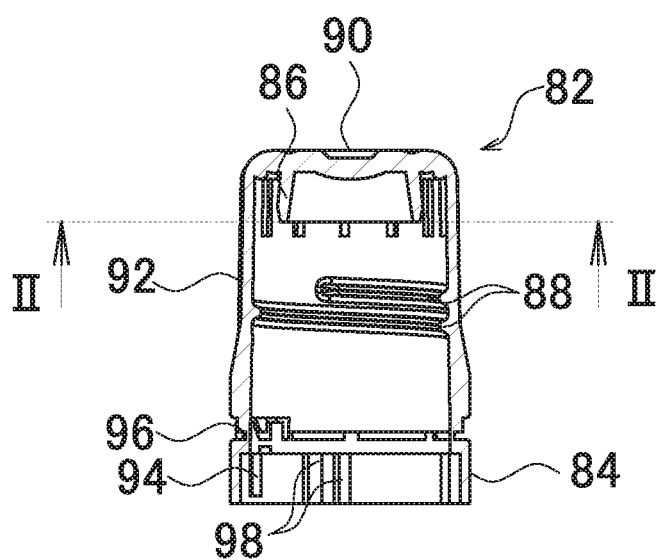
Sectional View I-I
FIG. 4B(2)
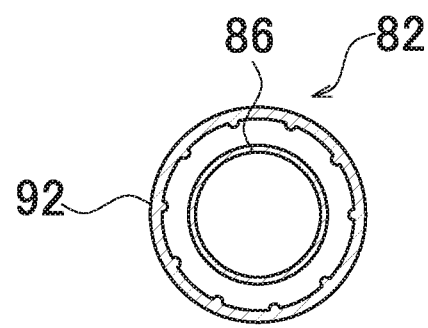
End Sectional View II-II
FIG. 4B(3)
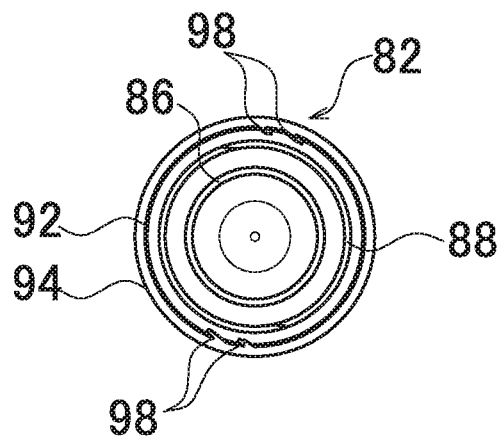

FIG. 5A(1)
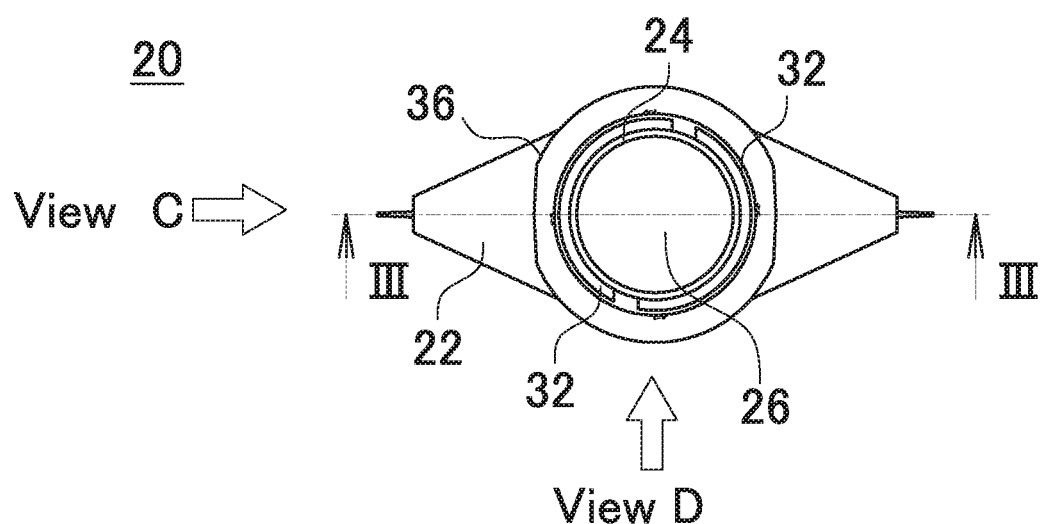
FIG. 5A(2)
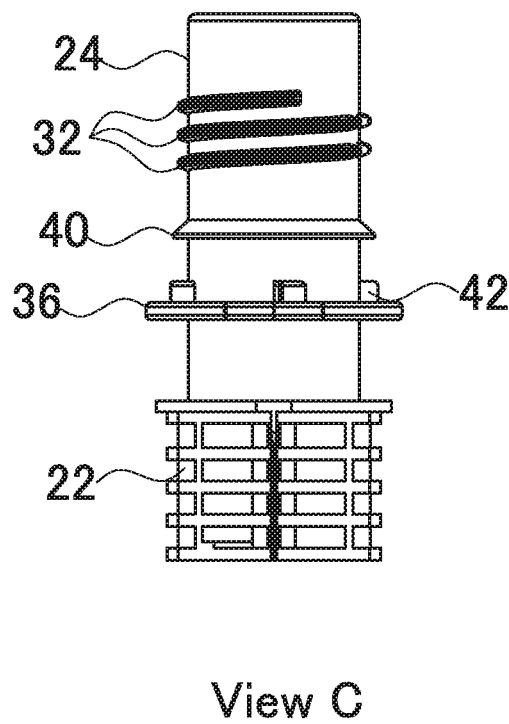
View C
FIG. 5A(3)
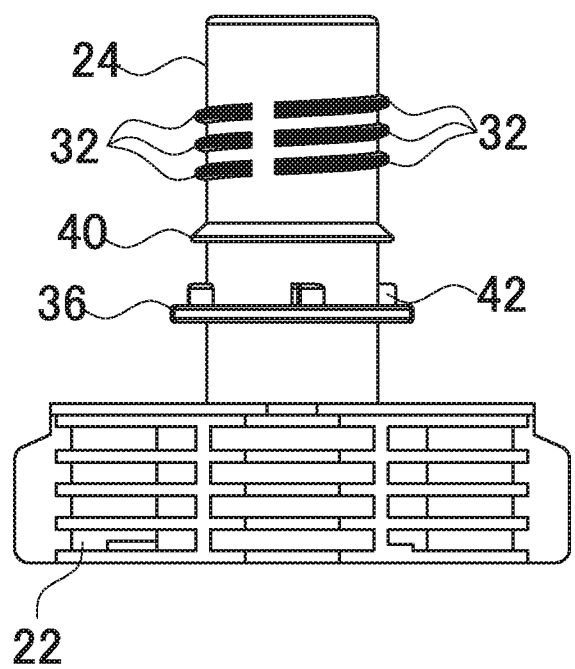
View D

FIG. 5B(1)
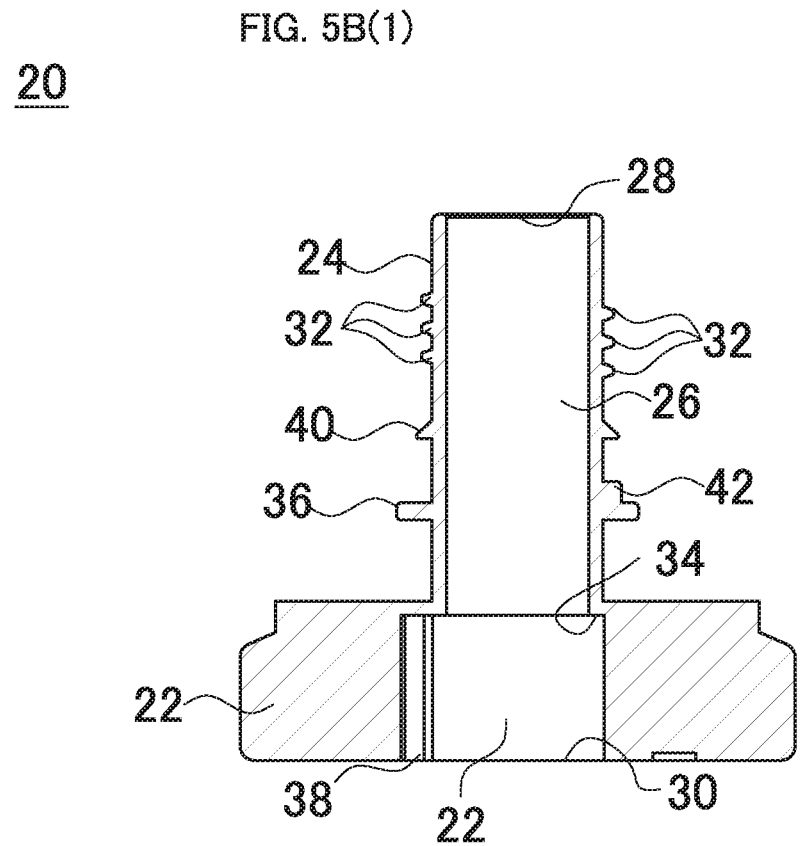
Sectional View III-III
FIG. 5B(2)
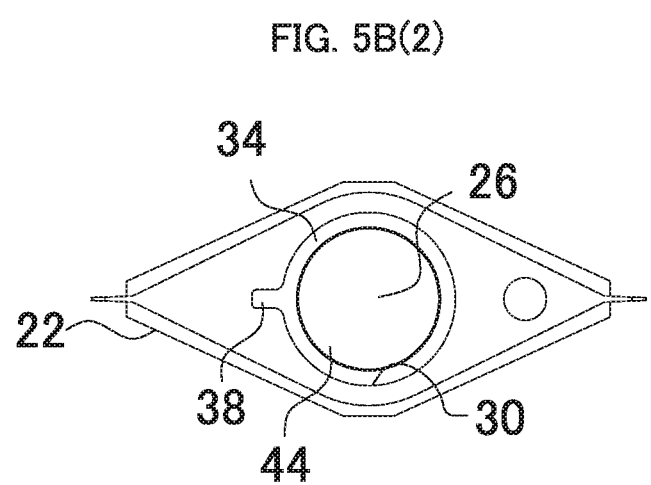

FIG. 6A(1)
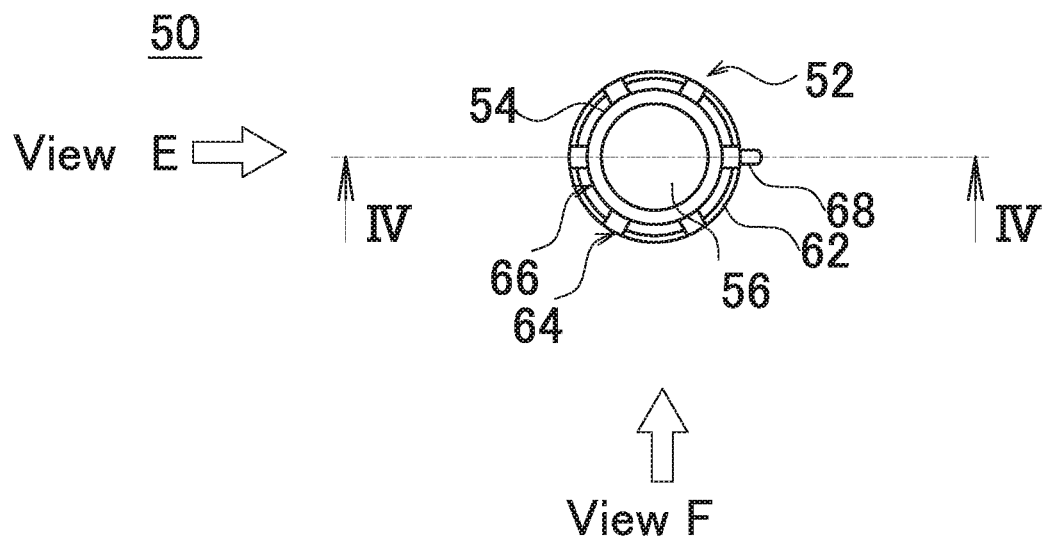
FIG. 6A(2)
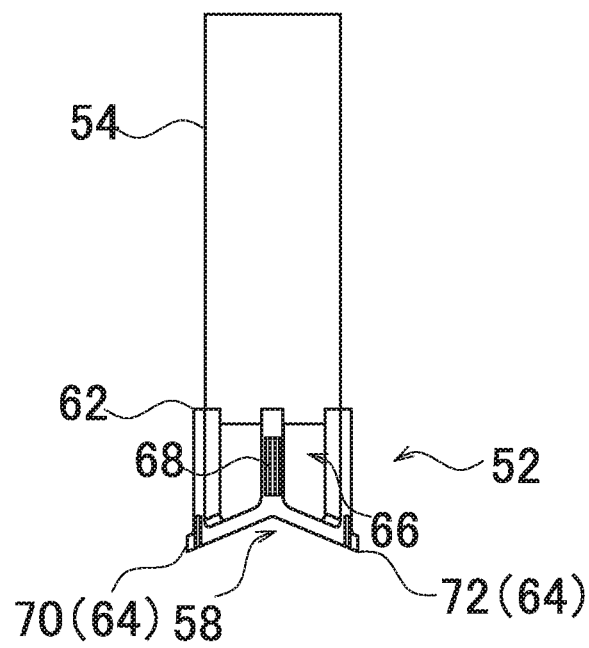
View E
FIG. 6A(3)
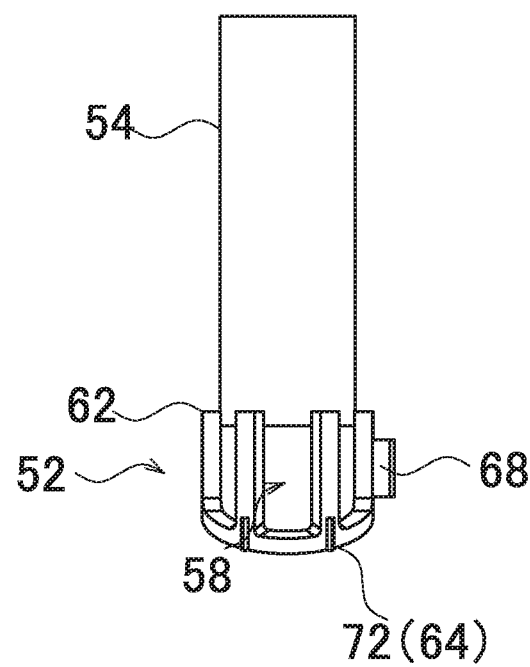
View F

FIG. 6B(1)
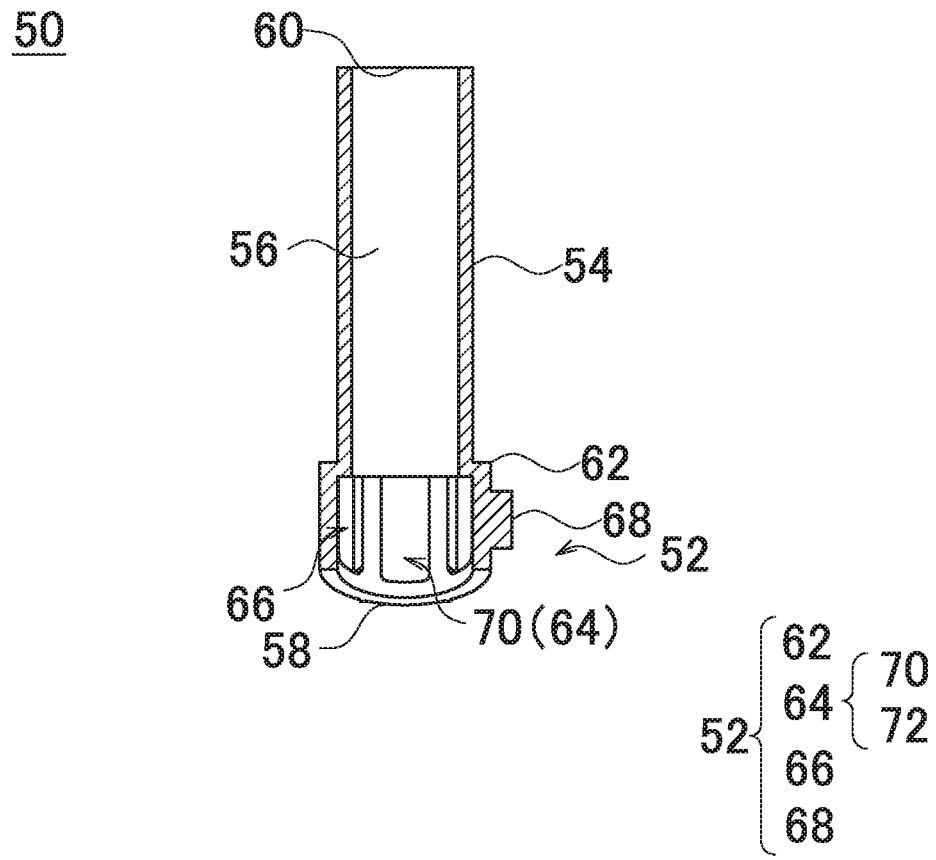
Sectional View IV-IV
FIG. 6B(2)
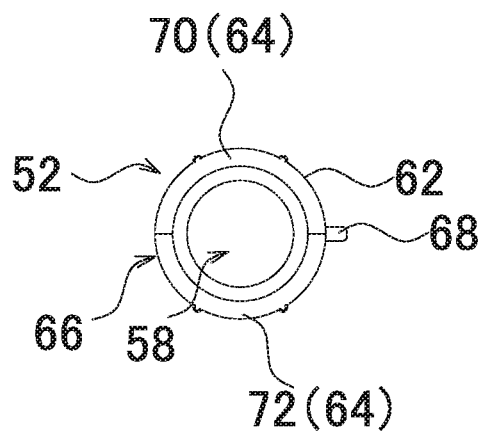

Enlarged View G

Detail of H Portion

Detail of I Portion

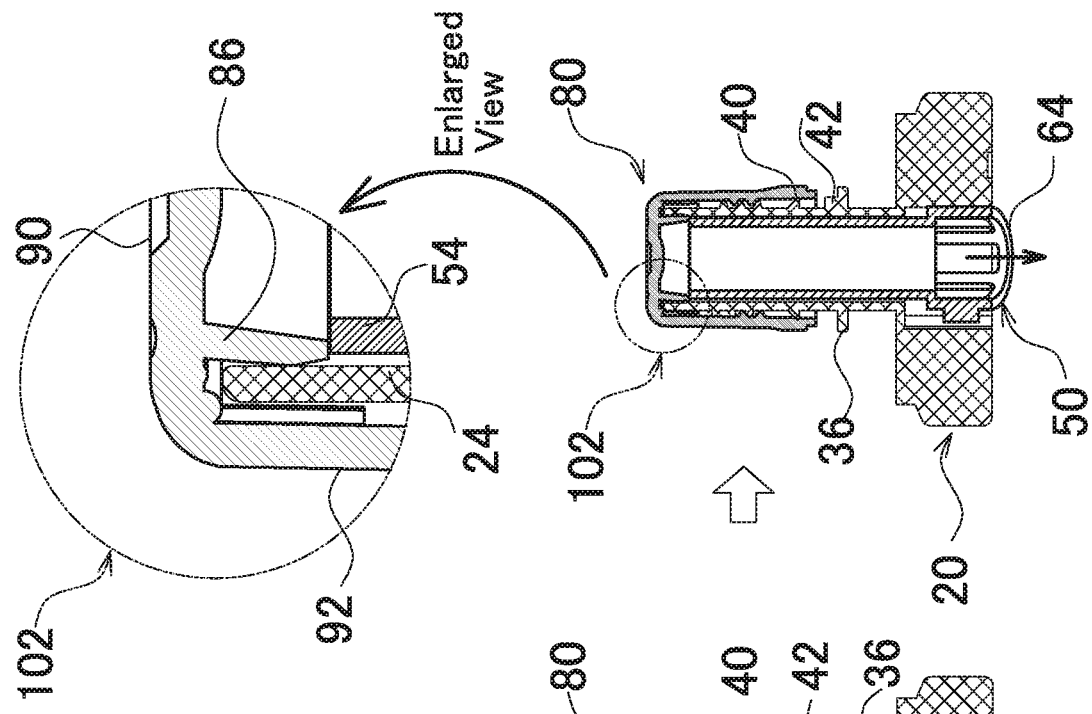
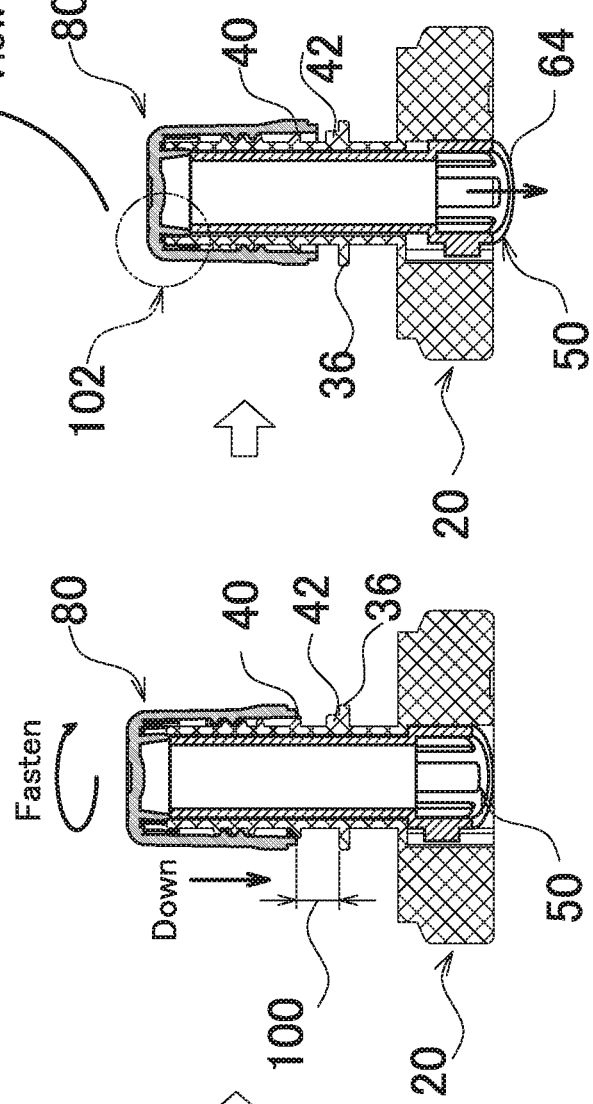
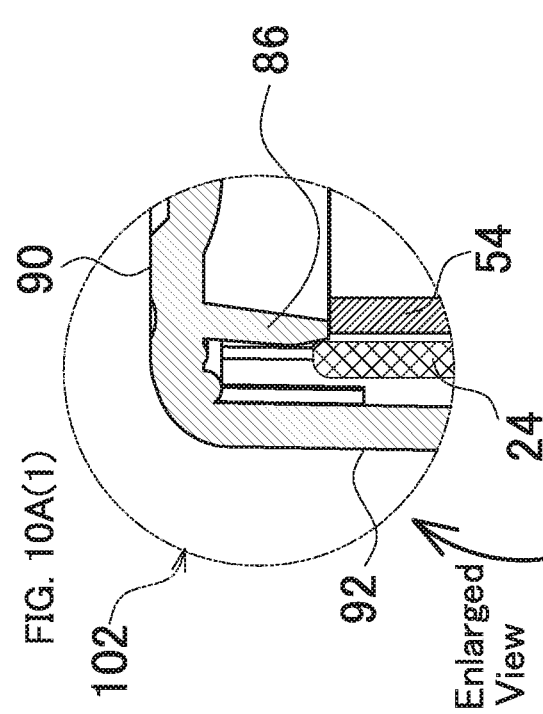

FIG. 10B(1)
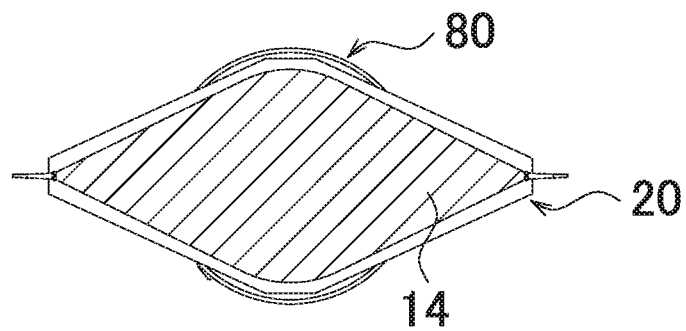
FIG. 10B(2)
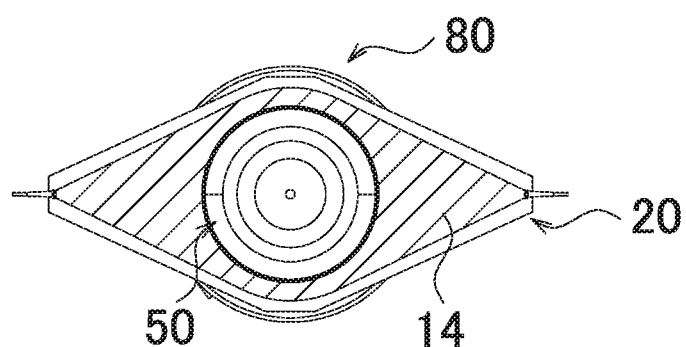
FIG. 10B(3)
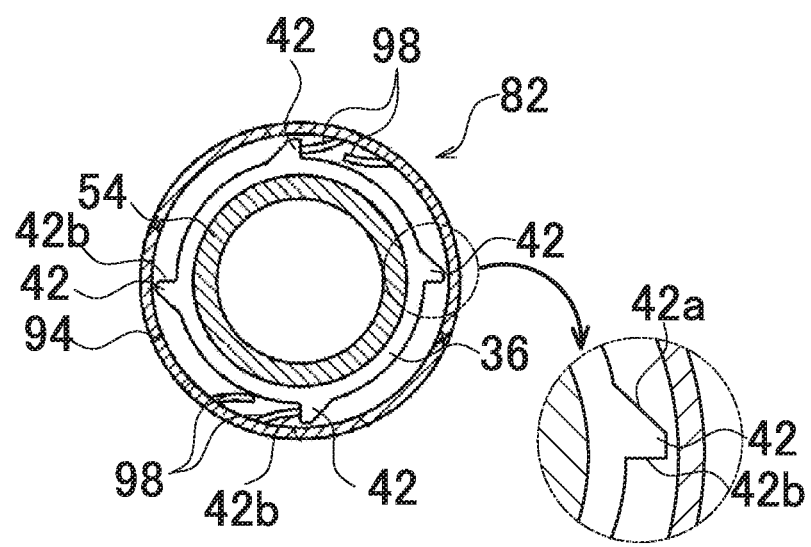
Enlarged View FIG. 11A(1)
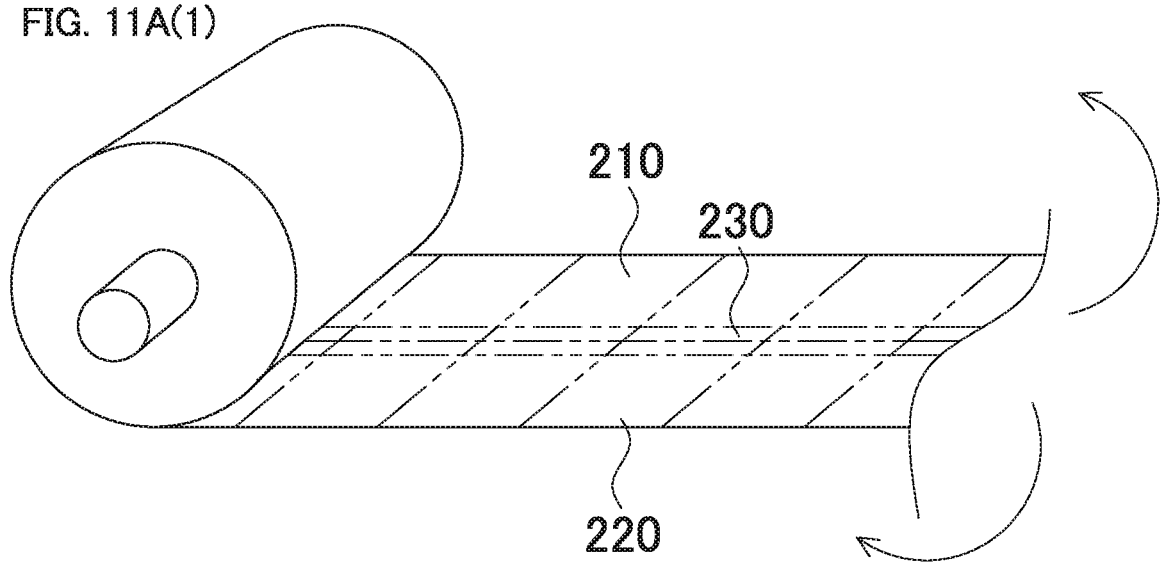
FIG. 11A(2)
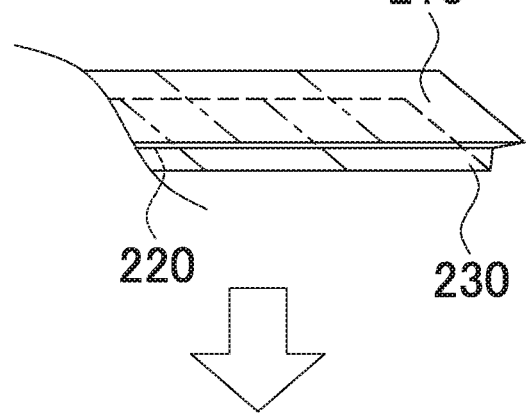
FIG. 11A(3)
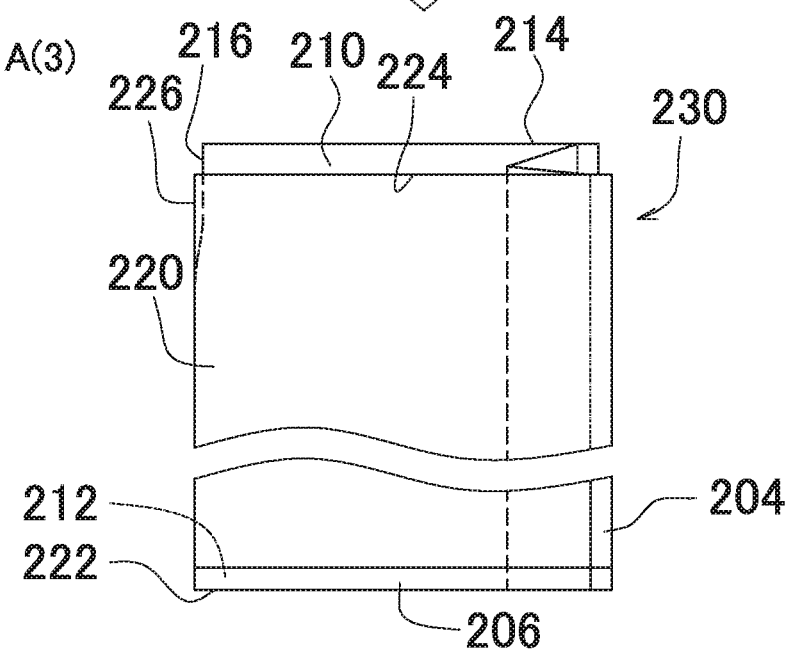

FIG. 11B(1)
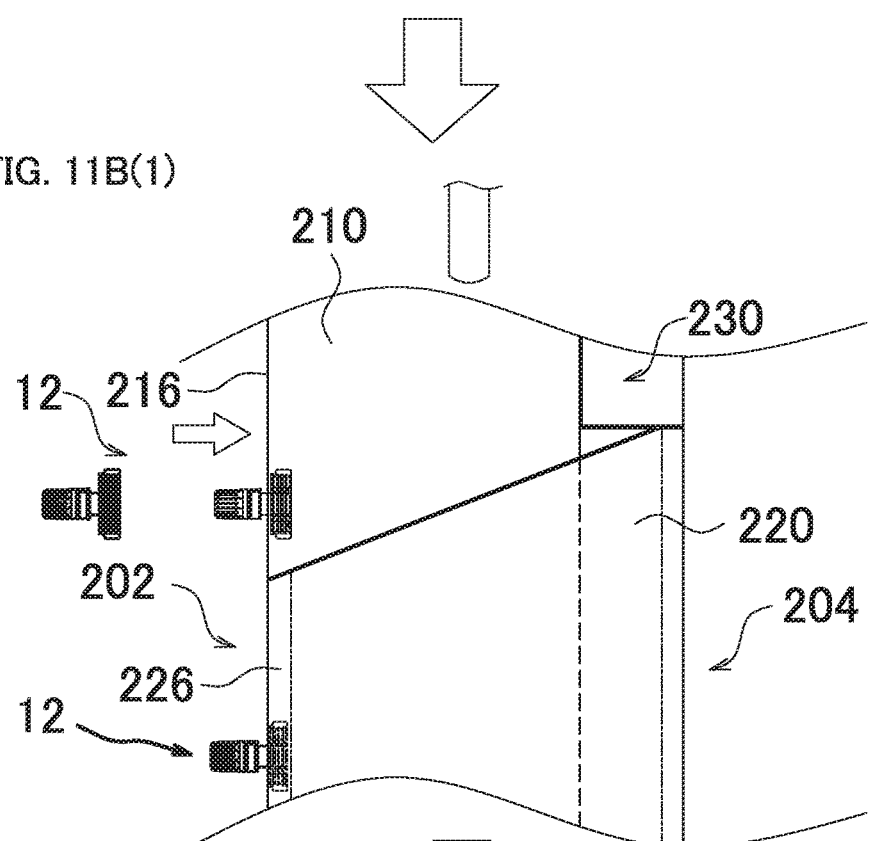
FIG. 11B(2)
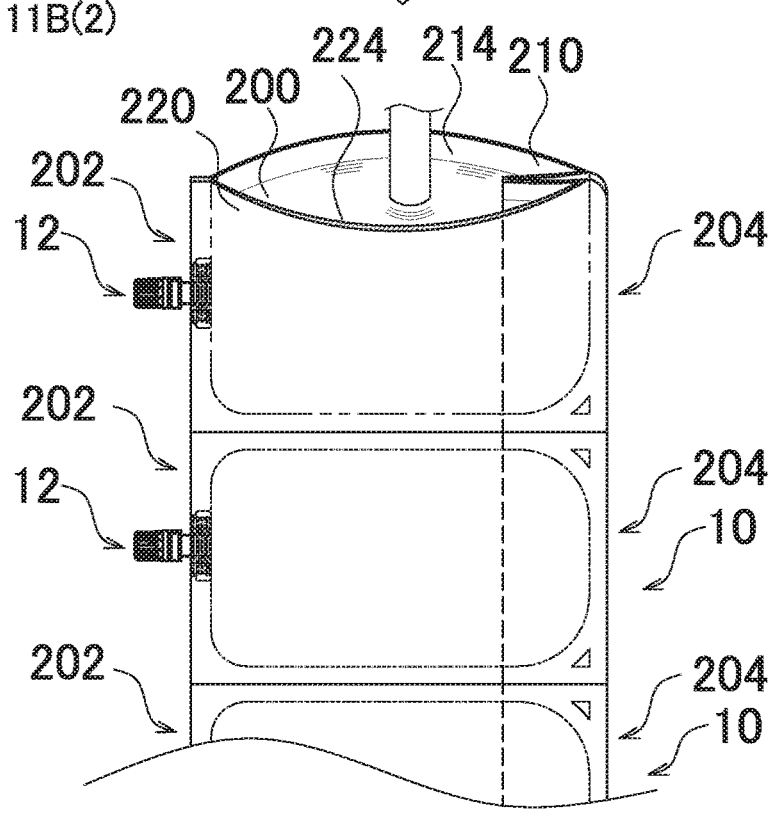

FIG. 11C(1)
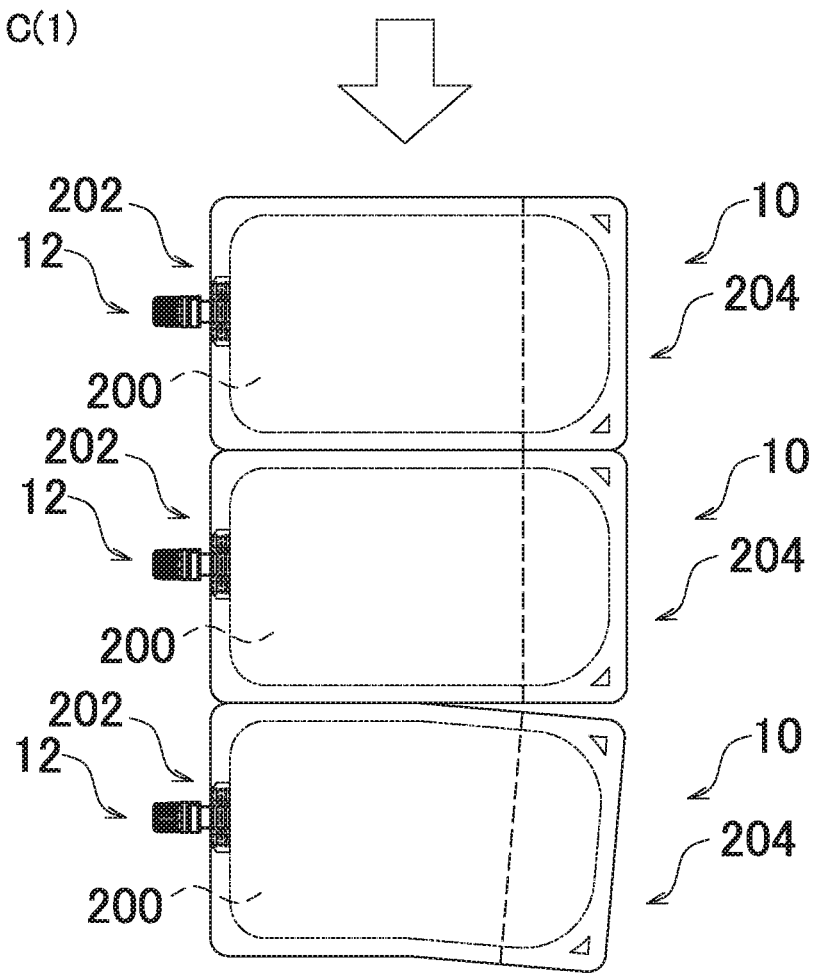
FIG. 11C(2)
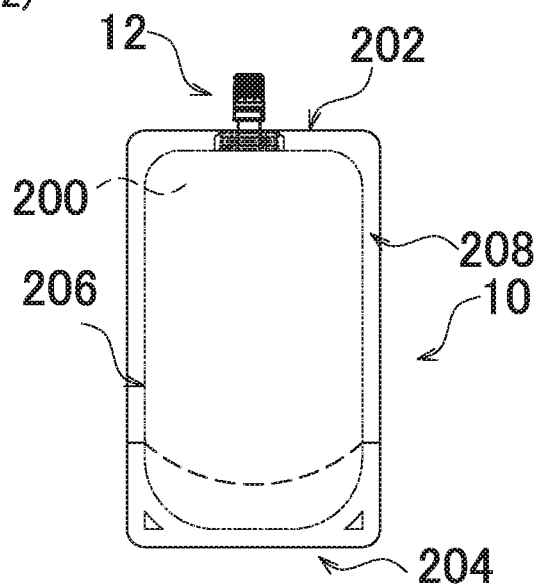

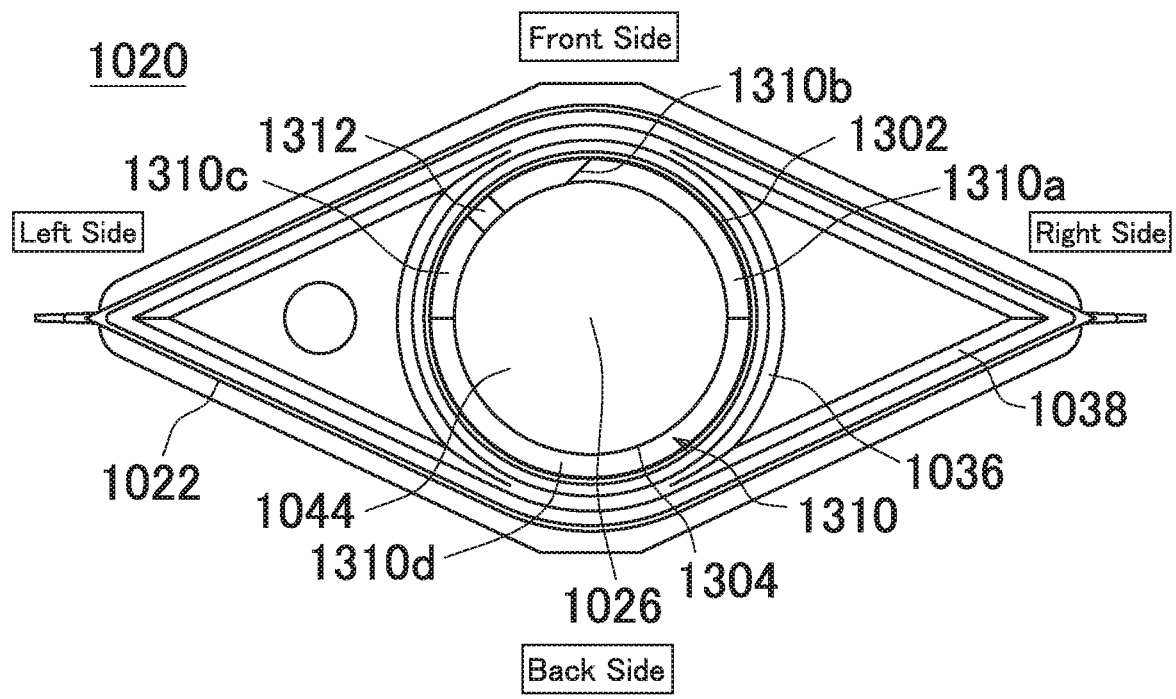
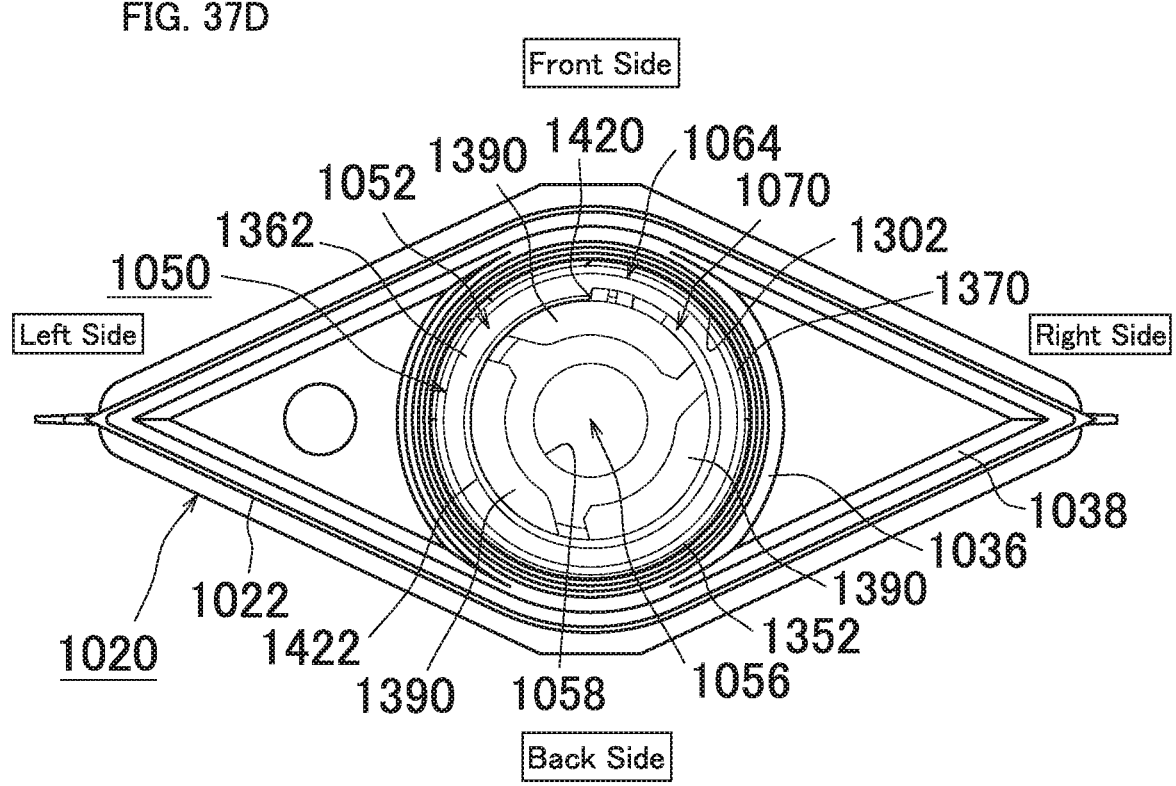

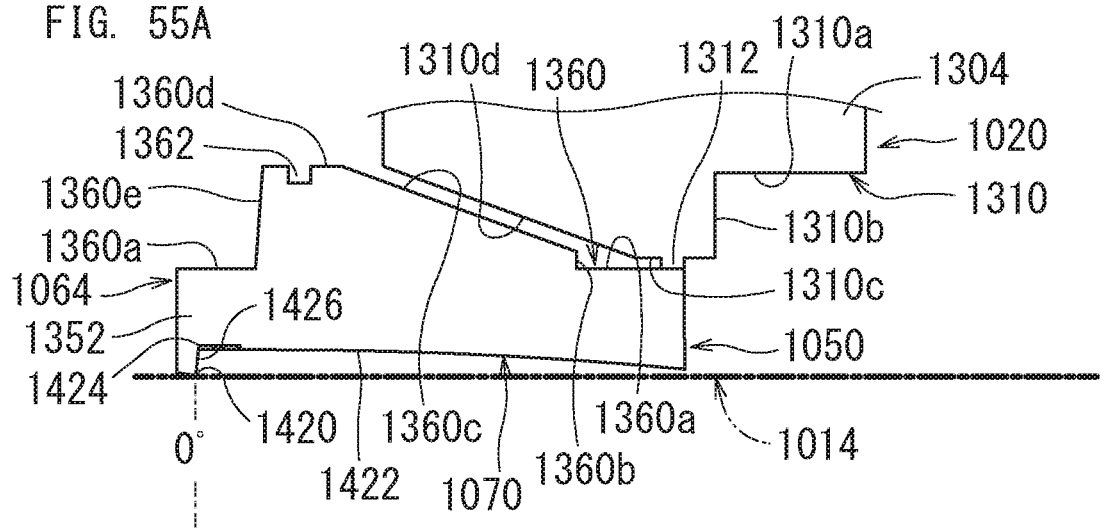
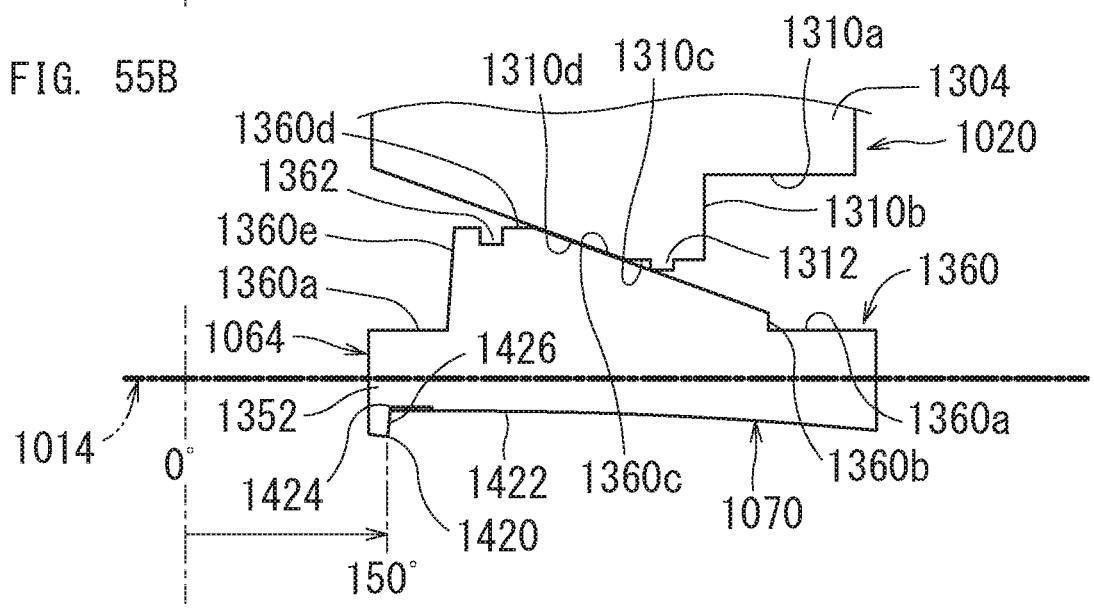
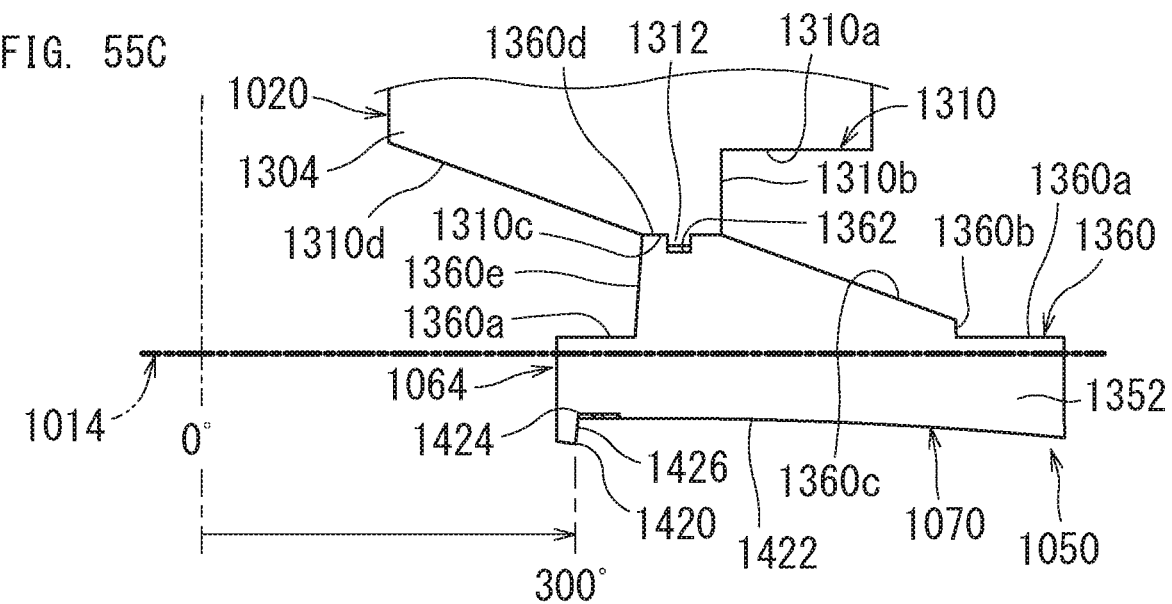

FIG. 57A
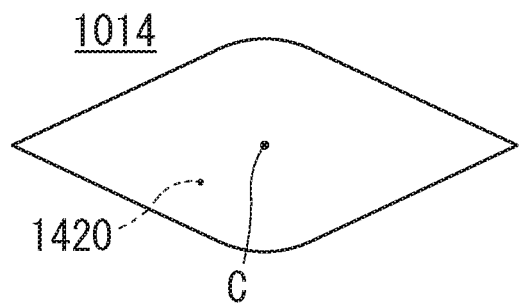
FIG. 57B
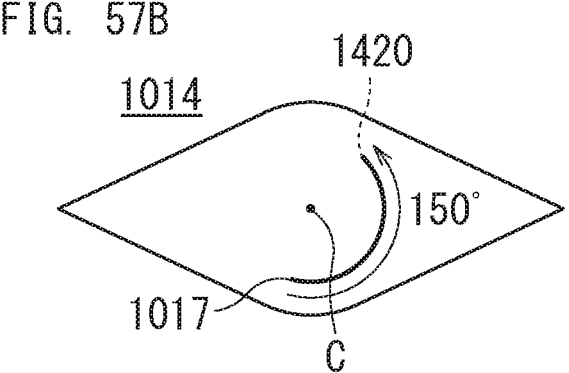
FIG. 57C
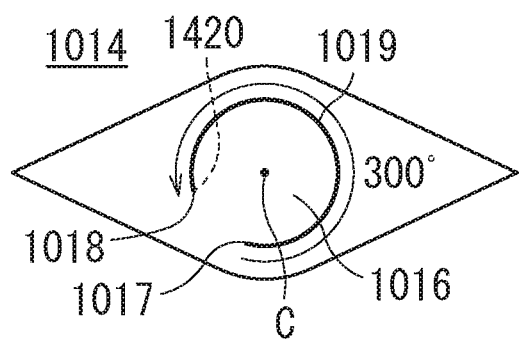
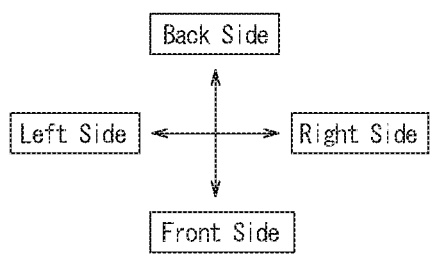

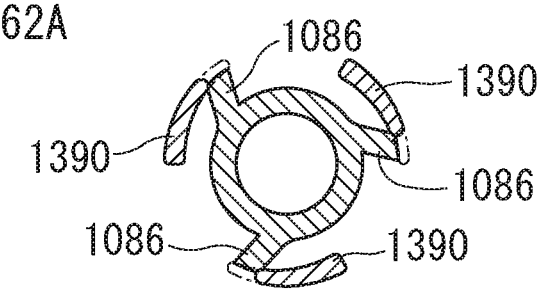
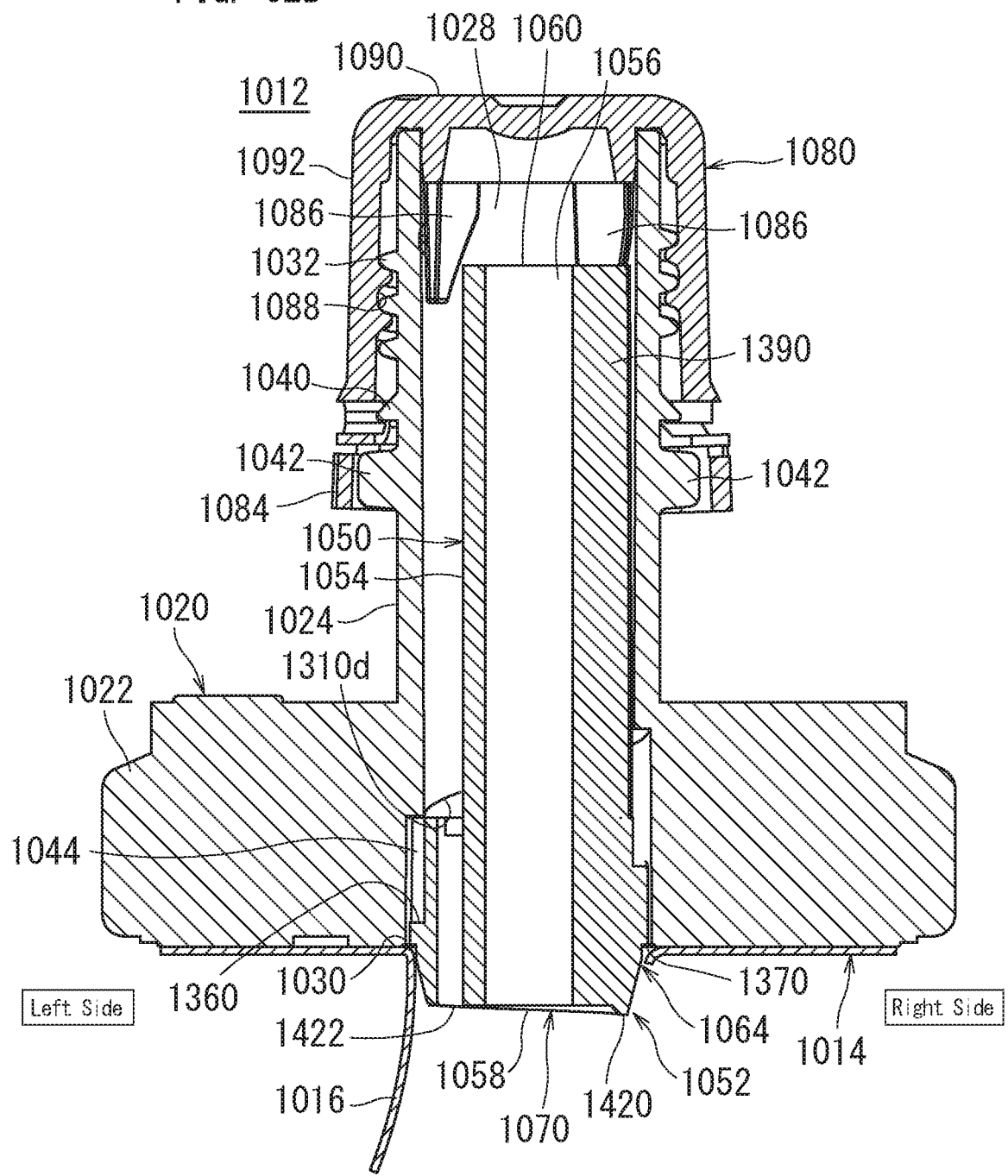

Detail of H Portion

Detail of I Portion

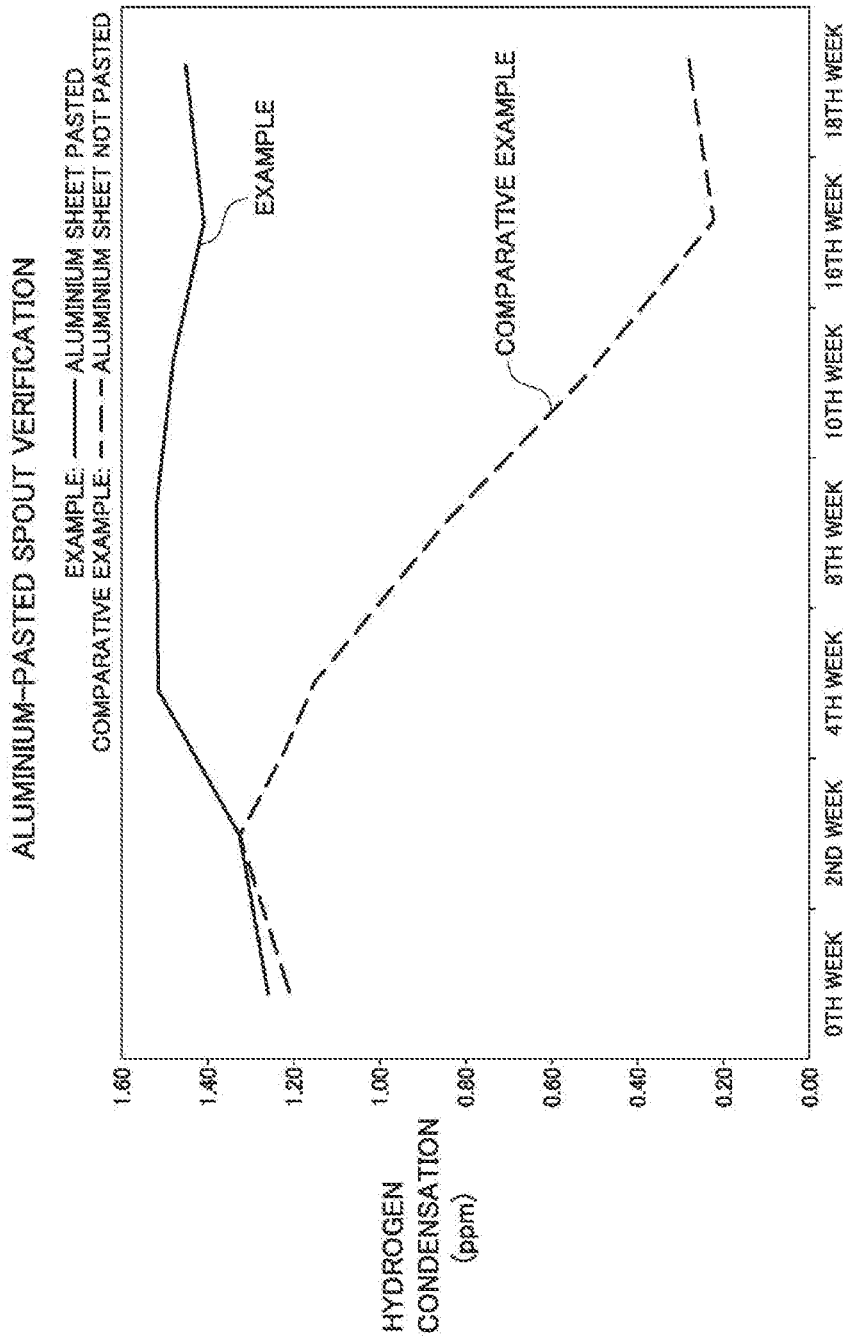

SPOUT-EQUIPPED CONTAINER AND METHOD FOR MANUFACTURING SAME

CROSS REFERENCE TO RELATED APPLICATIONS

This is a continuation application of International Application PCT/JP2016/066806 filed on Jun. 6, 2016, which claims priority from Japanese Patent Applications No. 2015-115552 filed on Jun. 8, 2015, and No. 2016-048856 filed on Mar. 11, 2016, the contents of which are incorporated herein by reference.

TECHNICAL FIELD

The present invention relates to a spout-equipped container and method of manufacturing the same and, in particular, relates to a spout-equipped pouch for containing, for example, hydrogen water, the pouch formed of a laminated film or the like having a spout attached thereto.

In more detail, the present invention relates to a spout-equipped pouch having accommodated and hermetically sealed therein hydrogen water, from which hydrogen is less prone to flow out.

BACKGROUND ART

Conventionally, various pouches formed of laminated films have been widely used to accommodate hydrogen water, and a pouch equipped with a spout has also been known.

This known spout-equipped pouch is manufactured by first laminating films and heat-sealing peripheral edge portions on three sides to form a pouch with an opening on one side, then inserting a spout into the opening, and then heat-sealing the films together and the films and the spout from outside the films positioned on both sides of the opening.

In this spout-equipped pouch formed of films, liquid contents of foods and so forth such as hydrogen water, juice, soup, stew, and jelly are accommodated, and a user can take out the contents from the spout.

A basic pouch material structure has been known in which a base layer, an intermediate layer formed of a film with gas barrier property and light-shielding property or the like, and a sealant layer are sequentially laminated via adhesive layers formed of an adhesive agent, anchor coat agent, heat bonding resin, or the like.

Also, a spout material structure made of polyethylene resin and polypropylene resin has been widely used.

(For example, refer to Patent Document 1.).

PRIOR ART DOCUMENTS

Patent Document

[Patent Document 1] Japanese Patent Application Laid-Open No. 2004-315067 [Patent Document 2] Japanese Patent Application Laid-Open No. 2007-161254

SUMMARY OF INVENTION

Problem to be Solved by the Invention

However, a normally-used spout made of polyethylene resin has a drawback in which hydrogen gets out of the container having hydrogen water accommodated therein.

Therefore, a main object of the present invention is to provide a spout-equipped container that is excellent in hermetical sealing performance.

Solution to Problem

A spout-equipped container of the present invention described in claim 1 is a spout-equipped container comprising a container for accommodating hydrogen water and a heat sealed sheet covering an inner opening which fronts an accommodating part in a spout base attached to the container, wherein an aluminum region of the heat sealed sheet and an aluminum region of the accommodating part of the container are in close contact with each other, so that hydrogen contained in the hydrogen water is less prone to get out of the container and the spout base.

A spout-equipped container of the present invention described in claim 2 is the spout-equipped container according to claim 1, comprising the spout base; an opening element accommodated in a cylindrical portion of the spout base; an activating body which moves the opening element; and the heat sealed sheet covering the inner opening which fronts the accommodating part in the spout base, wherein the opening element is formed so as not to get out of the spout base, formed so as to move toward the heat sealed sheet, and formed with a spout through hole at a center thereof, the activating body is attached to an outer opening side of the spout base and formed so as to move the opening element positioned on a heat sealed sheet side toward the heat sealed sheet, the heat sealed sheet includes aluminum, is formed so as to be at least partially torn by the opening element so that the accommodating part of the container and an outer opening of the spout base connect with outside via the spout through hole of the opening element, and the heat sealed sheet is formed such that an accommodated substance in the accommodating part of the container is poured outside from the outer opening.

A spout-equipped container of the present invention described in claim 3 is the spout-equipped container according to claim 1, comprising the container including the accommodating part for accommodating the hydrogen water and a spout fronting the accommodating part and attached to an end edge of the container, wherein the spout includes the spout base having formed therein a through hole in an axial direction, an activating body to be screwed in one end of the spout base in the axial direction, and an opening element inserted in the through hole of the spout base, the through hole of the spout base, the activating body, and the opening element are each formed in a substantially cylindrical shape and made concentric with each other in a planar view, the heat sealed sheet sealing the accommodating part of the container by being fixed to a bottom surface positioned at the other end of the spout base in the axial direction so as to shield the accommodating part of the container and the through hole of the spout base is further provided, the spout base has a first internal threads formed on an outer surface near the one end in the axial direction and configuring a male unit of a screw for the activating unit to move in a first direction away from the heat sealed sheet on the axial direction by being loosen by being rotated in a connection rotating direction along a circumferential direction for making the accommodating part of the container and the through hole of the spout base connect with each other, and a second external threads formed in an inner wall of the through hole at the other end in the axial direction and configuring a female unit of a screw for the opening element to move in a second direction approaching the heat sealed sheet on the axial direction by being screwed by being rotated in the connection rotating direction, in the activating body, the activating body is formed so as to be removably screwed on the one end in the axial direction of the spout base and so as to move the opening element in the second direction inside the through hole of the spout base, a top portion and a skirt hanging down from an end edge of the top portion to form a side wall are provided, an operating part hanging down in an identical direction to the handing-down portion is provided to project on an inner surface of the top portion and, a first female screw unit configuring a female unit of a screw screwed with the first internal threads is formed on an inner surface of the handing-down portion, in the opening element, the opening element is formed so as to move in the second direction inside the through hole of the spout base without getting out of the spout base, a piercer element formed at the other end in the axial direction and a passive shaft unit provided to protrude so as to extend in the axial direction substantially at a center of a top portion of the piercer element are provided, and a spout through hole is provided in the piercer element and the passive shaft unit to connect in the axial direction to penetrate therethrough, on an outer surface of the piercer element, a second male screw unit configuring a male unit of a screw screwed with the second external threads is formed, and on an outer surface of the passive shaft unit, a passive unit is provided to protrude, the passive unit being rotated by being pressed by the operating part when the activating body is rotated in the connection rotating direction, the activating body is rotated in the connection rotating direction, thereby causing the operating part of the activating body to press the passive unit of the opening element in the connection rotating direction to proceed, and the activating body is loosened so as to be removed from the spout base and moves in the first direction, with the operating part pressing the passive unit in the connection rotating direction to proceed, the opening element is rotated in the connection rotating direction, by being rotated in the connection rotating direction, the opening element is screwed while rotating inside the through hole of the spout base to move in the second direction, and the piercer element projects from a bottom surface side of the through hole formed in the spout base while rotating, and with the piercer element projecting from the bottom surface side of the through hole formed in the spout base while rotating, part of the heat sealed sheet is torn so that the accommodating part of the container and the through hole of the spout base connect with each other.

A spout-equipped container of the present invention described in claim 4 is the spout-equipped container according to claim 3, wherein the first internal threads and the first female screw unit are right screws formed so as to be loosened by being rotated in the connection rotating direction, and the second male screw unit and the second external threads are left screws formed to as to be screwed by being rotated in the connection rotating direction.

A spout-equipped container of the present invention described in claim 5 is the spout-equipped container according to claim 3 or 4, wherein in an initial state, the activating body is screwed on the spout base such that the inner surface of the top portion of the activating body is in contact with or substantially in contact with an upper end of the spout base, and the opening element is inserted in the though hole of the spout base such that the other end in the axial direction thereof is positioned at a height equal to the other end of the spout base, the activating body is rotated from the initial state by an angle less than 360.degree. in the connection rotating direction, thereby causing the opening element to move in the second direction while rotating by an angle less than 360.degree. inside the through hole of the spout base, causing the piercer element to project from the other end in the axial direction of the through hole while rotating by an angle less than 360.degree., and with the piercer element projecting from the other end in the axial direction of the through hole while rotating by an angle less than 360.degree., a part of heat sealed sheet is torn so as to remain linked to another part thereof, so that the accommodating part of the container and the through hole of the spout base connect with each other.

A spout-equipped container of the present invention described in claim 9 is the spout-equipped container according to any of claims 1, 2, 6 to 8, wherein the opening element has a piercer element which tears the heat sealed sheet and a sliding shaft unit provided to an upper portion of the piercer element to protrude, the piercer element and the sliding shaft unit continuously provided to the upper portion of the piercer element are in a columnar and/or pole shape, the piercer element and the sliding shaft unit have a spout through hole provided to penetrate therethrough, the spout through hole has an outlet facing the outer opening of the spout base and an inlet facing the accommodating part of the container, and the sliding shaft unit is formed so as to slidably fit in the through hole of the cylindrical portion of the spout base and be pressed by the activating body to move downward.

A spout-equipped container of the present invention described in claim 10 is the spout-equipped container according to any of claims 1, 2, 6 to 9, wherein the opening element has a piercer element which tears the heat sealed sheet and a sliding shaft unit provided to an upper portion of the piercer element to protrude, the piercer element and/or the sliding shaft unit has a rotation stop unit formed therein, the spout base has an attachment portion to be attached to the container and a cylindrical portion provided to an upper portion of the attachment portion to protrude, and in the attachment portion and/or the cylindrical portion, a rotation stop unit is formed for stopping rotation of the opening element for engaging or inserting the rotation stop unit of the opening element.

A method of manufacturing a spout-equipped container of the present invention described in claim 11 is a method of manufacturing a spout-equipped container, wherein a method of attaching a spout to a spout unit of a container comprises, when the spout including a cylindrical spout base, an opening element accommodated in a cylinder of the spout base, and an activating body which moves the opening element is manufactured, inserting the opening element in the cylinder of the spout base and, with the opening element prevented from getting outside from the spout base, adhering a heat sealed sheet which covers an inner opening which fronts an accommodating part in the spout base to periphery of the inner opening in a region which fronts a container-accommodating part of the spout base to form the spout, and welding a first container sheet and a second container sheet configuring the container on periphery of an attachment portion of the spout.

Advantageous Effects of Invention

According to the invention, a spout-equipped container comprises a container for accommodating hydrogen water and a heat sealed sheet covering an inner opening which fronts an accommodating part in a spout base attached to the container, wherein an aluminum region of the heat sealed sheet and an aluminum region of the accommodating part of the container are in close contact with each other, so that hydrogen contained in the hydrogen water is less prone to get out of the container and the spout base. Thereby, a spout-equipped container that is excellent in hermetical sealing performance can be provided.

According to the invention described in claim 2, since the spout-equipped container comprises the spout base; an opening element accommodated in a cylindrical portion of the spout base; an activating body which moves the opening element; and the heat sealed sheet covering the inner opening which fronts the accommodating part in the spout base, wherein the opening element is formed so as not to get out of the spout base, formed so as to move toward the heat sealed sheet, and formed with a spout through hole at a center thereof, the activating body is attached to an outer opening side of the spout base and formed so as to move the opening element positioned on a heat sealed sheet side toward the heat sealed sheet, the heat sealed sheet includes aluminum, is formed so as to be at least partially torn by the opening element so that the accommodating part of the container and an outer opening of the spout base connect with outside via the spout through hole of the opening element, and the heat sealed sheet is formed such that an accommodated substance in the accommodating part of the container is poured outside from the outer opening, it is possible to provide a spout-equipped container that is excellent hermetical sealing performance before use and, when in use, allows the contents to be taken out from a suction opening by boring a hole in the heat sealed sheet.

According to the invention described in claim 3, it is possible to provide a spout-equipped container comprising the container including the accommodating part for accommodating the hydrogen water and a spout fronting the accommodating part and attached to an end edge of the container, wherein the spout includes the spout base having formed therein a through hole in an axial direction, an activating body to be screwed in one end of the spout base in the axial direction, and an opening element inserted in the through hole of the spout base, the through hole of the spout base, the activating body, and the opening element are each formed in a substantially cylindrical shape and made concentric with each other in a planar view, the heat sealed sheet sealing the accommodating part of the container by being fixed to a bottom surface positioned at the other end of the spout base in the axial direction so as to shield the accommodating part of the container and the through hole of the spout base is further provided, the spout base has a first internal threads formed on an outer surface near the one end in the axial direction and configuring a male unit of a screw for the activating unit to move in a first direction away from the heat sealed sheet on the axial direction by being loosen by being rotated in a connection rotating direction along a circumferential direction for making the accommodating part of the container and the through hole of the spout base connect with each other, and a second external threads formed in an inner wall of the through hole at the other end in the axial direction and configuring a female unit of a screw for the opening element to move in a second direction approaching the heat sealed sheet in the axial direction by being screwed by being rotated in the connection rotating direction, in the activating body, the activating body is formed so as to be removably screwed on the one end in the axial direction of the spout base and so as to move the opening element in the second direction inside the through hole of the spout base, a top portion and a skirt hanging down from an end edge of the top portion to form a side wall are provided, an operating part hanging down in an identical direction to the handing-down portion is provided to project on an inner surface of the top portion and, a first female screw unit configuring a female unit of a screw screwed with the first internal threads is formed on an inner surface of the handing-down portion, in the opening element, the opening element is formed so as to move in the second direction inside the through hole of the spout base without getting out of the spout base, a piercer element formed at the other end in the axial direction and a passive shaft unit provided to protrude so as to extend in the axial direction substantially at a center on a top portion of the piercer element are provided, and a spout through hole is provided in the piercer element and the passive shaft unit to connect in the axial direction to penetrate therethrough, on an outer surface of the piercer element, a second male screw unit configuring a male unit of a screw screwed with the second external threads is formed, and on an outer surface of the passive shaft unit, a passive unit is provided to protrude, the passive unit being rotated by being pressed by the operating part when the activating body is rotated in the connection rotating direction, the activating body is rotated in the connection rotating direction, thereby causing the operating part of the activating body to press the passive unit of the opening element in the connection rotating direction, and the activating body is loosened so as to be removed from the spout base and moves in the first direction, with the operating part pressing the passive unit in the connection rotating direction to proceed, the opening element is rotated in the connection rotating direction, by being rotated in the connection rotating direction, the opening element is screwed while rotating inside the through hole of the spout base to move in the second direction, and the piercer element projects from a bottom surface side of the through hole formed in the spout base while rotating, and with the piercer element projecting from the bottom surface side of the through hole formed in the spout base while rotating, part of the heat sealed sheet is torn so that the accommodating part of the container and the through hole of the spout base connect with each other.

According to the invention described in claim 4, since the first internal threads and the first female screw unit are right screws formed so as to be loosened by being rotated in the connection rotating direction, and the second male screw unit and the second external threads are left screws formed to as to be screwed by being rotated in the connection rotating direction, a spout-equipped container with favorable operability can be provided.

According to the invention described in claim 5, it is possible to provide a spout-equipped container wherein in an initial state, the activating body is screwed on the spout base such that the inner surface of the top portion of the activating body is in contact with or substantially in contact with an upper end of the spout base, and the opening element is inserted in the though hole of the spout base such that the other end in the axial direction thereof is positioned at a height equal to the other end of the spout base, the activating body is rotated from the initial state by an angle less than 360.degree. in the connection rotating direction, thereby the opening element to move in the second direction while rotating by an angle less than 360.degree. inside the through hole of the spout base, causing the piercer element to project from the other end in the axial direction of the through hole while rotating by an angle less than 360. degree., and with the piercer element projecting from the other end in the axial direction of the through hole while rotating by an angle less than 360. degree., a part of the heat sealed sheet is torn so as to remain linked to another part thereof, so that the accommodating part of the container and the through hole of the spout base connect with each other.

According to the invention described in claim 7, the spout base includes a ship-shaped attachment portion to be attached to a container sheet configuring the container and a cylindrical portion continuously connected to an upper portion of the attachment portion, the attachment portion and the cylindrical portion have a through hole penetrating therethrough, the through hole has an outer opening in an upper portion of the attachment portion and an inner opening in a lower portion of the attachment portion, and the outer opening opens outside the container, and the inner opening opens toward the accommodating part of the container. Thereby, a spout-equipped container has excellent hermetical sealing performance before use and, when in use, allows the contents to be taken out easily.

According to the invention described in claim 8, the spout base has a male screw unit circumferentially provided on an outer peripheral surface of a cylindrical portion and has an activating-body stopping unit for stopping a activating body circumferentially provided on the outer peripheral surface of the cylindrical portion below the male screw unit, the activating body includes a cap to be screwably attached to the cylindrical portion of the spout base and a tamper evident ring removably coupled to a lower portion of the cap, and a movement regulating unit is formed so that the cap of the activating body moves downward in a height range of a movement gap portion formed when the tamper evident ring is removed to stop at a predetermined position. Thereby, it is possible to reliably open at ease.

According to the invention described in claim 9, the opening element has a piercer element which tears the heat sealed sheet and a sliding shaft unit provided to an upper portion of the piercer element to protrude, the piercer element and the sliding shaft unit continuously provided to the upper portion of the piercer element are in a columnar and/or pole shape, the piercer element and the sliding shaft unit have a spout through hole provided to penetrate therethrough, the spout through hole has an outlet facing the outer opening of the spout base and an inlet facing the accommodating part of the container, and the sliding shaft unit is formed so as to slidably fit in the through hole of the cylindrical portion of the spout base and be pressed by the activating body to move downward. Thereby, it is possible reliably open at ease.

According to the invention described in claim 10, the opening element has a piercer element which tears the heat sealed sheet and a sliding shaft unit provided to an upper portion of the piercer element to protrude, the piercer element and/or the sliding shaft unit has a rotation stop unit formed therein, the spout base has an attachment portion to be attached to the container and a cylindrical portion provided to an upper portion of the attachment portion to protrude, and in the attachment portion and/or the cylindrical portion, a rotation stop unit is formed for stopping rotation of the opening element for engaging or inserting the rotation stop unit of the opening element. Thereby, it is possible to reliably open at ease.

According to the invention described in claim 11, a method of attaching a spout to a spout unit of a container comprises, when the spout including a cylindrical spout base, an opening element accommodated in a cylinder of the spout base, and an activating body which moves the opening element is manufactured, inserting the opening element in the cylinder of the spout base and, with the opening element prevented from getting outside from the spout base, adhering a heat sealed sheet which covers an inner opening which fronts an accommodating part in the spout base to periphery of the inner opening in a region which fronts a container accommodating part of the spout base to form the spout, and welding a first container sheet and a second container sheet configuring the container on periphery of an attachment portion of the spout. Thereby, a spout-equipped container that is excellent in hermetical sealing performance can be provided.

BRIEF DESCRIPTION OF DRAWINGS

FIG. 4A (1) depicts an illustrative plan view of a cap.

FIGS. 4A (2) and 4A (3) depict illustrative side views of a cap.

FIG. 4B (1) depicts an illustrative longitudinal sectional view of a cap.

FIG. 4B (2) depicts an illustrative view of a cap, being an end face view near a top portion.

FIG. 4B (3) depicts an illustrative bottom view of a cap.

FIG. 5A (1) depicts an illustrative plan view of a spout base.

FIG. 5A (2) depicts an illustrative front view of a spout base.

FIG. 5A (3) depicts an illustrative side view of a spout base.

FIG. 5B (1) depicts an illustrative longitudinal sectional view of the spout base.

FIG. 5B (2) depicts an illustrative bottom view of the spout base.

FIG. 6A (1) depicts an illustrative plan view of an opening element.

FIG. 6A (2) depicts an illustrative front view of an opening element.

FIG. 6A (3) depicts an illustrative side view of an opening element.

FIG. 6B (1) depicts an illustrative longitudinal sectional view of the opening element.

FIG. 6B (2) depicts an illustrative bottom view of the opening element.

FIG. 10A (1) depicts an illustrative partially-enlarged sectional views depicting a method of using the spout-equipped container according to the first embodiment of the present invention, being an illustrative view in which a tamper evident ring is removed.

FIG. 10A (2) depicts illustrative partially-enlarged sectional view depicting a method of using the spout-equipped container according to the first embodiment of the present invention, being an illustrative view depicting a state in which the cap is fastened.

FIG. 10A (3) depicts illustrative partially-enlarged sectional view depicting a method of using the spout-equipped container according to the first embodiment of the present invention, being an illustrative view depicting a state in which the heat sealed sheet is torn.

FIG. 10B (1) is an illustrative bottom view of the heat sealed sheet, FIG. 10B (2) is an illustrative bottom view depicting a state in which the heat sealed sheet is torn, and FIG. 10B (3) is an illustrative cross-sectional view of the tamper evident ring and the spout base.

FIG. 11A (1) depicts an illustrative view depicting a method of manufacturing the spout-equipped container according to the first embodiment of the present invention, being an illustrative view depicting a first step.

FIG. 11A (2) depicts an illustrative view depicting a method of manufacturing the spout-equipped container according to the first embodiment of the present invention, being an illustrative view depicting a second step.

FIG. 11A (3) depicts an illustrative view depicting a method of manufacturing the spout-equipped container according to the first embodiment of the present invention, being an illustrative view depicting a third step.

FIG. 11B (1) depicts an illustrative view depicting the method of manufacturing the spout-equipped container according to the first embodiment of the present invention, being an illustrative view depicting a fourth step.

FIG. 11B (2) depicts an illustrative view depicting the method of manufacturing the spout-equipped container according to the first embodiment of the present invention, being an illustrative view depicting a fifth step.

FIG. 11C (1) depicts an illustrative view depicting the method of manufacturing the spout-equipped container according to the first embodiment of the present invention, being an illustrative view depicting a sixth step.

FIG. 11C (2) depicts an illustrative view depicting the method of manufacturing the spout-equipped container according to the first embodiment of the present invention, being an illustrative view depicting a seventh step.

FIG. 37C is a bottom view depicting the spout base included in the spout-equipped container according to the third embodiment of this invention.

FIG. 37D is a bottom view depicting a state in which the spout base and an opening element included in the spout-equipped container according to the third embodiment of this invention are assembled.

FIGS. 55A, 55B, and 55C depict schematic development views depicting a state in which a left female screw unit of the spout base and a left male screw unit of the opening element included in the spout-equipped container according to the third embodiment of this invention are screwed together, FIG. 55A being a diagram with a rotation angle of 0.degree. of the opening element, FIG. 55B being a diagram with a rotation angle of 150.degree. of the opening element, and FIG. 55C being a diagram with a rotation angle of 300.degree. of the opening element.

FIGS. 57A, 57B, and 57C depict schematic plan views depicting a state in which part of the heat sealed sheet included in the spout-equipped container according to the third embodiment of this invention is torn, FIG. 57A being a diagram with a rotation angle of 0.degree. of the opening element, FIG. 57B being a diagram with a rotation angle of 150.degree. of the opening element, and FIG. 57C being a diagram with a rotation angle of 300.degree. of the opening element.

FIGS. 62A and 62B depict diagrams when the activating body included in the spout-equipped container according to the third embodiment of this invention is removed from the spout base and then attached thereto again, FIG. 62A being a schematic view depicting a relation between the wing pressing units and the wing portions and FIG. 62B being a sectional view along the height direction.

FIG. 80 is a table of aluminum-pasted spout verification.

DESCRIPTION OF EMBODIMENTS

Figure 1:
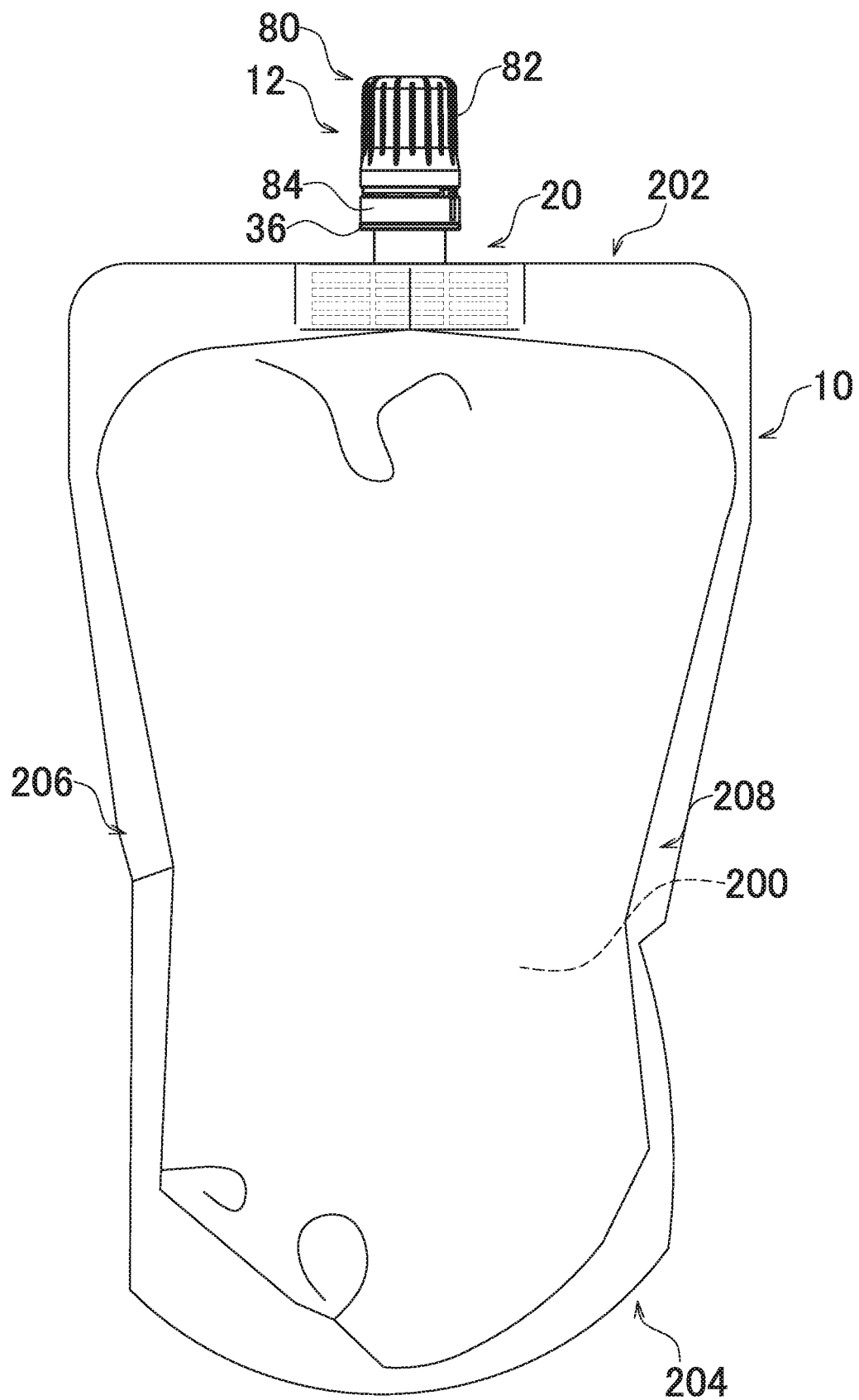
FIG. 1 is a schematic front view depicting a spout-equipped container according to a first embodiment of the present invention.
Figure 2:
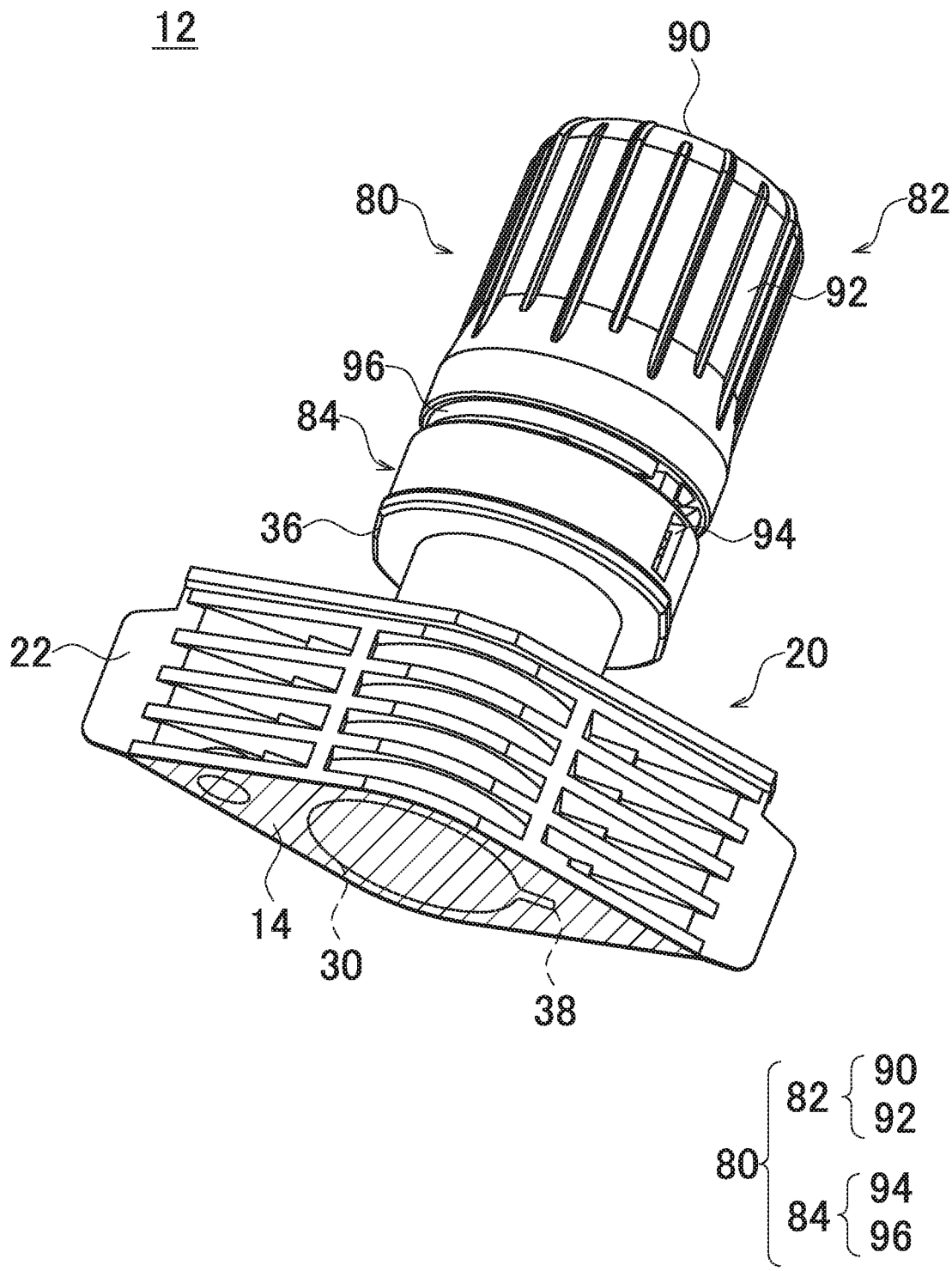
FIG. 2 is a schematic illustrative perspective view of a spout according to the first embodiment of the present invention.
Figure 3:
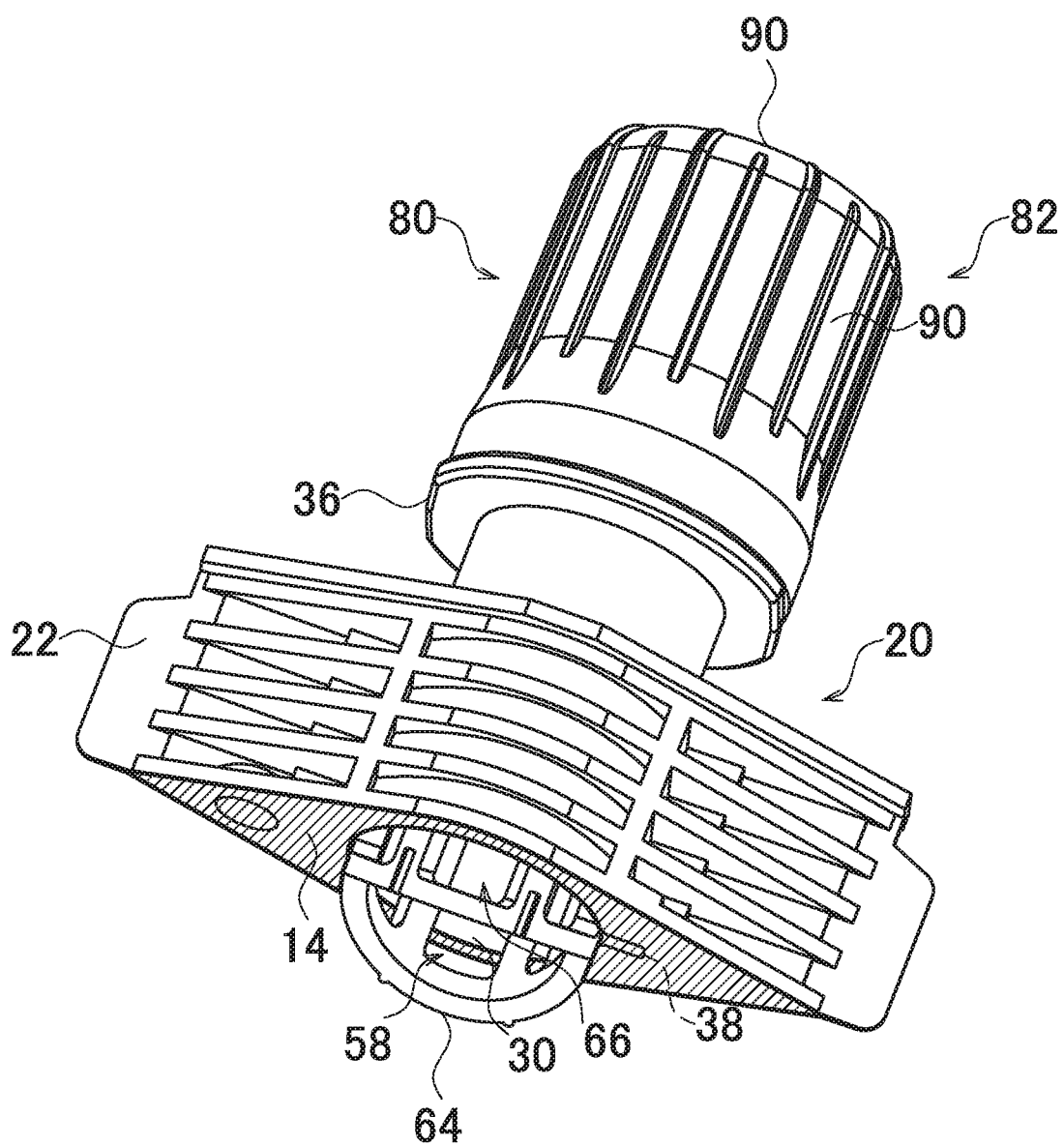
FIG. 3 is a schematic illustrative perspective view of the spout according to the first embodiment of the present invention.

A standing-pouch-type spout-equipped container of the first embodiment of the present invention is described further in detail with reference to the drawings and so forth.

As a result of diligent studies, the inventors have found that the above object can be achieved by contrivance so that an aluminum region of a heat sealed sheet which covers a peripheral region of an inner opening of a spout inserted into an accommodating part of a container and an aluminum region inside the accommodating part are in close contact with each other, and have completed the present invention.

A spout-equipped container 10 is to accommodate hydrogen water with hydrogen mixed into water, includes the container 10 which accommodates hydrogen water and a spout 12 attached to the container 10, and includes a heat sealed sheet 14 which covers an inner opening 30 which fronts an accommodating part 200 in a spout base 20 of the spout 12.

An aluminum region of the heat sealed sheet 14 and an aluminum region of an inner surface of the accommodating part 200 of the container 10 are in close contact with each other so that hydrogen in hydrogen water is less prone to get out of the container 10 and the spout base 20.

The spout 12 includes the spout base 20 in a cylindrical shape, an opening element 50 accommodated in the cylinder of the spout base 20, an activating body 80 which moves the opening element 50, and the heat sealed sheet 14 which covers the inner opening 30 which fronts the accommodating part 200 in the spout base 20.

The opening element 50 is formed so as not to get out of the spout base 20 and so as to move toward the heat sealed sheet 14, and has formed at its center a spout through-hole 56.

The activating body 80 is attached to an outer opening 28 side of the spout base 20, and is formed so as to move the opening element 50 on a heat sealed sheet 14 side toward the heat sealed sheet 14.

The heat sealed sheet 14 is formed so as to be partially torn by the opening element 50 so that the accommodating part 200 of the container 10 and an outer opening 28 of the spout base 20 connect outside via the spout through hole 56 of the opening element 50, and is formed so that an accommodated substance in the accommodating part 200 of the container 10 is poured outside from the outer opening 28.

The spout base 20 in a cylindrical shape includes a cylindrical portion 24 having a through hole 26 which connects outside, an attachment portion 22 interposed between an end edge of a first container sheet 210 and an end edge of a second container sheet 220 configuring the container 10, and a male screw unit 32 for screwably attaching the activating body an movable body which moves the opening element 50 movably disposed in the through hole 26 of the cylindrical portion 24.

The attachment body 22 provided to the cylindrical portion 24 on an accommodating part 200 side of the container 10 has an inlet 58 which connects with the spout through hole 56 of the opening element 50.

The activating body 80 has a cap 82 and a tamper evident ring 84, and is formed so as to form a movement gap portion 100 by separating and removing the tamper evident ring 84 from the cap 82 and press the opening element 50 in order to move the opening element 50 toward the heat sealed sheet 14.

The activating body 80 is attached to a suction opening of the cylindrical portion 24 of the spout base 20 by being rotated clockwise (tap-closing direction) and screwed.

The activating body 80 has a pressing unit 86 for pressing the opening element 50 projected inside the cap 82, and is provided with a female screw unit 88 inside the cap 82. By a coupling unit 96 intermittently provided at a lower end of the cap 82, the tamper evident ring 84 is coupled.

The activating body 80 is formed so that the cap 82 is rotated in a circumferential direction and in an opening direction (counterclockwise) to cause the tamper evident ring 84 to be removed from the cap 82 to form the movement gap portion 100 and the cap 82 is moved toward the movement gap portion 100 that is open in the circumferential direction of the cylindrical portion 24 of the spout base 20 to cause the pressing unit 86 to press the opening element 50.

The opening element 50 has a piercer element 52 for tearing the heat sealed sheet 14 to a heat sealed sheet 14 side, and that piercer element 52 has the spout through hole 56.

The opening element 50 has a cylindrical sliding shaft unit 54 and the piercer element 52 for tearing the heat sealed sheet 14.

The piercer element 52 is consecutively connected to the sliding shaft unit 54 so as to project in a flange shape at an end of the sliding shaft unit 54.

The piercer element 52 is formed so as to be in contact with a step portion 34 or an engaging portion provided on the periphery of the through hole 26 of the spout base 20 so that the opening element 50 does not move to the through hole 26 side.

The heat sealed sheet 14 is pasted on a surface of the attachment portion 22 on an accommodating part 200 side of the container 10 so as to cover the opening of the attachment portion 22 and is in close contact with the accommodating part 200 of the container 10, and is formed so as to be torn by the opening element 50 to make the through hole 26 of the spout base 20 and the accommodating part 200 of the container 10 connect with each other.

The spout base 20 includes the ship-shaped attachment portion 22 attached to the container sheets configuring the container 10, and the cylindrical portion 24 consecutively connected to an upper portion of the attachment portion 22.

The attachment portion 22 and the cylindrical portion 24 are provided with the through hole 26 penetrating therethrough.

The through hole 26 has the outer opening 28 at an upper portion of the attachment portion 22 and the inner opening 30 at a lower portion of the attachment portion 22.

The outer opening 28 opens outside the container 10. The inner opening 30 opens toward the accommodating part 200 of the container 10.

The spout base 20 has the male screw unit 32 circumferentially provided on an outer peripheral surface of the cylindrical portion 24, and has an activating-body stopping unit 36 for stopping the activating body 80 circumferentially provided on the outer peripheral surface of the cylindrical portion 24 below the male screw unit 32.

The activating-body stopping unit 36 of the spout base 20 has a circumferential flange shape projecting in order to engage, when the cap 82 and the tamper evident ring 84 of the activating body 80 are attached to the suction opening of the attachment portion 22 of the spout base 20 and rotated in the tap-closing direction (clockwise), a lower end of the tamper evident ring 84 of the activating body 80 descending as being screwed for stopping, the flange shape having a diameter slightly longer than the cap 82 of the activating body 80.

The activating body 80 includes the cap 82 screwably attached to the cylindrical portion 24 of the spout base 20 and the tamper evident ring 84 removably coupled to a lower portion of the cap 82.

When the activating body 80 is placed on an outer opening 28 side of the spout base 20 and rotated and screwed in the tap-closing direction to descend, the lower end of the tamper evident ring 84 abuts on an upper surface of the activating-body stopping unit 36 and stops.

The spout base 20 has a movement regulating unit 102 formed so that the cap 82 of the activating body 80 moves downward to stop at a predetermined position in a range of the height of the movement gap portion 100 formed when the tamper evident ring 84 is removed.

The cap 82 includes a top portion 90 in a circular shape in a planar view and the skirt 92 hanging down from a peripheral edge of the top portion 90 to form a side wall.

The cap 82 includes the pressing unit 86 hanging down from an inner side surface of the top portion 90 in parallel with the skirt 92 with a space from the skirt 92.

On the inner peripheral surface of the skirt 92, the female screw unit 88 screwed into the screw unit 32 formed on the outer peripheral surface of the cylindrical portion 24 of the spout base 20 is formed.

The pressing unit 86 has a length shorter than the height of the movement gap portion 100 formed by removing the tamper evident ring 84, and is formed so as to press down the sliding shaft unit 54 of the opening element 50 by the length shorter than the height of the movement space portion 100 to stop the movement.

The cap 82 configures the movement regulating unit 102, which is formed so that, when the cap 82 is pressed down to tear the heat sealed sheet 14 with the tamper evident ring 84 removed, the inner surface (lower surface) of the top portion 90 abuts on the upper portion of the cylindrical portion 24 of the spout base 20 to stop the activating body 80 at an optimal position to tear the heat sealed sheet 14.

The movement regulating unit 102 is configured of the pressing unit 86 of the activating body 80 and the top portion 90, and is configured so as to press the opening element 50 by the length of the pressing unit 86 of the cap 82 and so that the lower surface (inner surface) of the top portion 90 of the cap 82 abuts on the upper portion (on an outer opening 28 side) of the cylindrical portion 24 of the spout base 20 to regulate the amount of movement of the opening element 50.

The tamper evident ring 84 is to regulate a screw-down width of the cap 82 and, by being removed, the cap 82 can be screwed downward to a predetermined position.

In the depicted example, the tamper evident ring 84 has an upper end coupled to the lower surface of the peripheral wall of the cap 82 via the coupling unit 96 that is easy to be cut out, thereby forming an annular band shape.

The cap 82 is screwed to the outer perimeter of the cylindrical portion 24, with the screw-down width regulated by the tamper evident ring 84. In the depicted example, the cap 82 is configured to have a top-covered cylindrical shape having the top portion 90 extended from an upper end edge of the skirt 92, with an opening at a lower end and to screw the female screw unit 88 circumferentially provided to the inner perimeter of the skirt 92 into the screw unit 32. Also, the pressing unit 86 for moving the opening element 50 from the periphery of the inner surface of the top portion 90 toward the heat sealed sheet 14 is provided to hang down.

The length (height) of the tamper evident ring 84 in a vertical direction (width direction) is substantially equal to or slightly longer than the length (height) of the pressing unit 86 in a vertical direction (longitudinal direction).

The length (height) of the tamper evident ring 84 in the vertical direction (width direction) is substantially equal to or slightly longer than a movement interval of the piercer element 52 when descending to tear the heat sealed sheet 14 by the piercer element 52 of the opening element 50.

The length (height) of the pressing unit 86 in the vertical direction (longitudinal direction) is substantially equal to or slightly longer than a movement interval of the piercer element 52 when descending to tear the heat sealed sheet 14 by the piercer element 52 of the opening element 50.

The opening element 50 has the piercer element 52 which tears the heat sealed sheet 14 and the sliding shaft unit 54 provided to protrude from an upper portion of the piercer element 52.

The piercer element 52 and the sliding shaft unit 54 consecutively connected to the upper portion of the piercer element 52 have a columnar shape.

The piercer element 52 and the sliding shaft unit 54 have the spout through hole 56 penetrating therethrough.

The spout through hole 56 have an outlet 60 which fronts the outer opening 28 of the spout base 20 and the inlet 58 which fronts the accommodating part 200 of the container 10.

The sliding shaft unit 54 is formed so as to slidably fit into the through hole 26 of the cylindrical portion 24 of the spout base 20 and be pressed by the activating body 80 to move downward.

The sliding shaft unit 54 has a cylindrical shape having a diameter slightly shorter than the diameter of the cylindrical portion 24 of the spout base 20. The sliding shaft unit 54 has a circular cross section, and has the same shape from the outlet 60 to the upper end of the piercer element 52 in the longitudinal direction of the sliding shaft unit 54.

The sliding shaft unit 54 of the opening element 50 concentrically overlaps the cylindrical portion 24 of the spout base 20 in a double cylindrical shape and is slidably disposed in the cylinder of the cylindrical portion 24 so as to be vertically slidable.

The hanging-dawn portion 92 of the cap 82 of the activating body 80 is provided in a double cylindrical shape and is screwably disposed out of the cylinder of the cylindrical portion 24 of the spout base 20 so as to be vertically screwable.

The piercer element 52 includes columnar base units 62, cutting edge units 64 projecting from the base units 62 downward, inflow ports 66 each provided to among the cutting edge units 64 and a rotation stop unit 68 provided on the periphery of the base units 62.

In the piercer element 52, the sum of the height of the base units 62 and the height of the cutting edge unit 64 is equal to or slightly shorter than the length between the step portion 34 and the inner opening 30 of the spout base 20.

The cutting edge unit 64 is divided forward and backward, including a forward first cutting-edge unit 70 and a backward second cutting-edge unit 72.

The first cutting-edge unit 70 is in an arc shape in a bottom view, and the second cutting-edge unit 72 is in an arc shape in a bottom view. The first cutting-edge unit 70 and the second cutting-edge unit 72 face each other.

The first cutting-edge unit 70 and the second cutting-edge unit 72 are formed so that part of the left and right blades from a center portion first in contact with the heat sealed sheet 14 when the heat sealed sheet 14 is cut has a height gradually decreasing as laterally moving to cut the heat sealed sheet 14.

Thus, a region cut by the first cutting-edge unit 70 and a region cut by the second cutting-edge unit 70 are linked together such that a hole is bored in the heat sealed sheet 14 cut.

However, between the region cut by the first cutting-edge unit 70 and the region cut by the second cutting-edge unit 72, an uncut residual region may remain, and the heat sealed sheet 14 cut by the piercer element 52 may be configured so that a portion on the periphery of the cut portion becomes a movable region to fluidize its contents.

On the cylindrical portion 24 of the spout base 20, a protrusion 40 is circumferentially provided above the activating-body stopping unit 36 to regulate and protect the movement of the cap 82 and the tamper evident ring 84 of the activating body 80.

On the cylindrical portion 24 of the spout base 20, rotation stopping units 42 are provided to protrude slightly above the activating-body stopping unit 36 for rotating only the cap 82 and stopping the rotation of the tamper evident ring 84 when the coupling unit 96 which couples the cap 82 and the tamper evident ring 84 of the activating body 80 together is separated.

The rotation stopping units 42 are configured to abut to stop the rotation of the tamper evident ring 84 when rotated in the tap-closing direction (clockwise) to close the cap 82.

The tamper evident ring 84 of the activating body 80 is in a cylindrical shape, and has rotation stopping units 98 provided to protrude on an inner peripheral surface for rotating only the cap 82 and stopping the rotation of the tamper evident ring 84 when the coupling unit 96 which couples the cap 82 and the tamper evident ring 84 of the activating body 80 together is separated.

The rotation stopping units 98 of the activating body 80 are configured to abut on the rotation stopping units 42 of the spout base 20 to stop the rotation of the tamper evident ring 84 when rotated in the opening direction (counterclockwise) to loosen the cap 82.

The attachment portion 22 of the spout base 20 is in a columnar shape with a ship-shaped cross section, and has an opening-element accommodating unit 44 for accommodating the piercer element 52 of the opening element 50 provided to be bored at the center.

The opening-element accommodating unit 44 is a cylindrical hole concentric with the inner opening 30 and the through hole 26. The opening-element accommodating unit 44 has the step portion 34 formed near a boundary portion with the cylindrical portion 24 above.

The opening-element accommodating unit 44 has a capacity for accommodating the piercer element 52 of the opening element 50 as a whole, and has a depth length equal to or slightly longer than the sum of the height of the base units 62 and the height of the cutting edge unit 64.

The opening-element accommodating unit 44 has a diameter slightly longer than the diameter of the through hole 26 of the cylindrical portion 24.

In the opening-element accommodating unit 44, the piercer element 52 of the opening element 50 is disposed so as to be vertically movable.

In the attachment portion 22 and/or the cylindrical portion 24, a rotation stop unit insertion hole 38 is formed, wherein the rotation stop unit 68 of the opening element 50 is engaged with or inserted into to stop the rotation of the opening element 50.

The rotation stop unit insertion hole 38 of the spout base 20 configures to accommodate the rotation stop unit 68 which stops the rotation of the opening element 50, and is a slit-shaped long groove continuously provided to the opening-element accommodating unit 44 of the attachment portion 22.

In the rotation stop unit insertion hole 38 of the spout base 20, the rotation stop unit 68 of the opening element 50 is inserted when the opening element 50 is inserted to fit in the spout base 20 and the piercer element 52 of the opening element 50 is inserted to fit in the opening-element accommodating unit 44 of the spout base 20.

In the rotation stopping unit 42, as depicted in FIG. 10B(C), with respect to the rotating direction (counterclockwise) when the cap 82 is opened, a guide surface 42a is formed on a front side of the rotation stopping unit 42 and a tamper evident ring surface 42b is formed on a rear side of the rotation stopping unit 42. The guide surface 42a has a tilted shape so that, when the cap 82 is rotated in the tap-closing direction, the cap 82 can move in the tap-closing direction while a rotation stopping unit 98, which will be described below, slides on the guide surface 42a.

The tamper evident ring surface 42b of the rotation stopping unit 42 has a shape standing in a radial direction of the cylindrical portion 24 of the spout 12. As for the tamper evident ring surface 42b, when the cap 82 is rotated in the opening direction, a tip of the rotation stopping unit 98, which will be described below, abuts on the tamper evident ring surface 42b.

The tamper evident ring 84 has flexibility capable of being warped to some extent when an external force is applied.

The cap 82 and the tamper evident ring 84 are integrally molded with synthetic resin such as, for example, polyethylene or polypropylene.

The tamper evident ring 84 is connected to the lower end of the cap 82 via the bridge-shaped coupling unit 96.

The tamper evident ring 84 is annularly connected via a narrow-width fracture-expected portion which is fractured at the time of tap opening.

As will be described below, the fracture-expected portion is not fractured before the cap 82 is opened. The fracture-expected portion is fractured when the cap 82 is opened.

The tamper evident ring 84 may be configured of a plurality of band elements dividable in a circumferential direction of the cap 82, and therefore may be configured of, for example, three or more band elements.

As depicted in FIG. 10B(C), on the inner surface of the tamper evident ring 84, the paired rotation stopping units 98 are formed at portions facing at an angle of 180.degree. in the circumferential direction. When the cap 82 is rotated in the tap-closing direction, these rotation stopping units 98 can move in the tap-closing direction while sliding on the outer surfaces of the rotation stopping units 42

Conversely, when the cap 82 is rotated in the opening direction, the rotation stopping units 98 each have a shape diagonally standing so that the tip of the rotation stopping unit 98 abuts on the tamper evident ring surface 42b of the rotation stopping unit 42.

As depicted in FIG. 4, a hook unit 94 is formed on the tamper evident ring 84. The periphery of the hook unit 94 has a function of not being fractured at the time of tap-closing of the cap 82 and being fractured at the time of opening. The periphery of the hook unit 94 configures a fracture-expected portion.

With an accommodated substance accommodated in the accommodating part 200 of the container 10 and the cap 82 inserted into the male screw unit 32 of the cylindrical portion 24 of the spout 12, an opening end of the spout 12 (the outer opening 28 of the spout base 20 and the outlet 60 of the opening element 50) is closed.

When the cap 82 is rotated in the tap-closing direction, the rotation stopping unit 98 of the tamper evident ring 84 gets over the rotating stopping unit 42 while sliding on the guide surface 42a of the rotating stopping unit 42 of the spout base 20, thereby allowing the cap 82 to rotate in the tap-closing direction.

For this reason, at the time of tap closing, the fracture-expected portion is not fractured and, with the cap 82 and the tamper evident ring 84 integrated together, the cap 82 can be screwed into a predetermined tap-closing position.

When the cap 82 is removed from the tamper evident ring 84, the cap 82 is rotated in the opening direction. As depicted in FIG. 10B(C), when the cap 82 is rotated in the opening direction (counterclockwise), the tip of each rotating stopping unit 98 abuts on the tamper evident ring surface 42b of the rotation stopping unit 42, thereby stopping the rotation of the tamper evident ring 84.

In this state, when the tamper evident ring 84 is further rotated in the opening direction, the cap 82 relatively rotates in the opening direction with respect to the stopped tamper evident ring 84.

When the cap 82 is rotated in the opening direction with the tip of the rotation stopping unit 98 abutting on the tamper evident ring surface 42b, the coupling unit 96 is separated.

Next, a finger (nail) is hooked on the hook unit 94 to fracture the fracture-expected portion on the periphery of the hook portion 94, the annular hook unit 94 is separated and removed from the cylindrical operation 24 of the spout base 20.

After pressing and fracturing a thin fracture line, the opening element 50 has the fractured heat sealed sheet 14 fixed to the periphery of the inner opening 30 of the attachment portion 22. Therefore, inconvenience of the torn heat sealed sheet 14 hanging to obstruct suction of the accommodated substance or the like can be prevented. Also, taking the trouble to discard the heat sealed sheet 14 can be omitted. Since the cap 82 is screwed with the screw-down width regulated by the removable tamper evident ring 84, it is impossible to open as long as the tamper evident ring 84 is removed, thereby reliably preventing inadvertent opening.

Figure 7A:
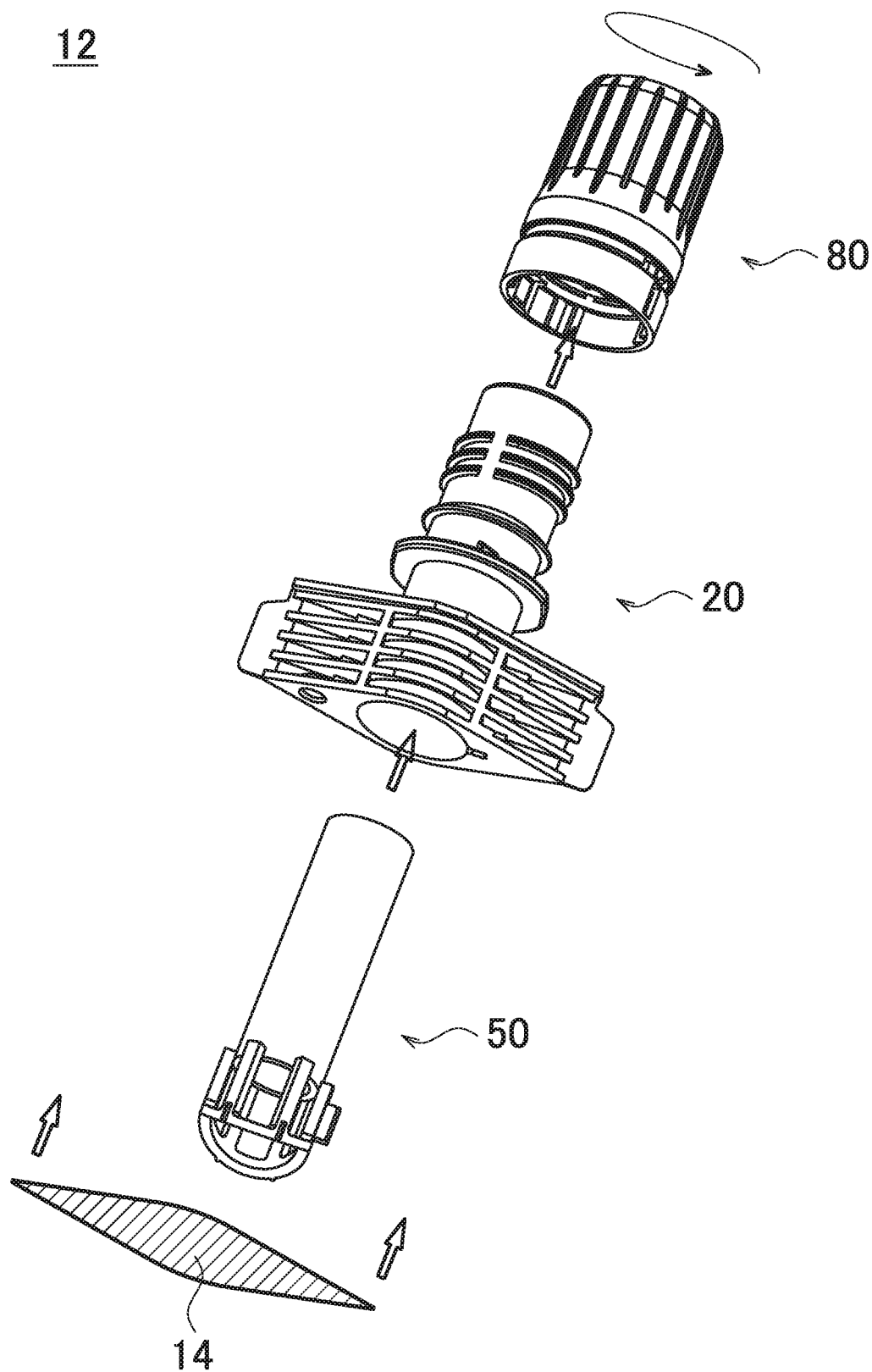
FIG. 7A is an illustrative perspective view depicting how to assemble the spout according to the first embodiment of the present invention.
Figure 7B:
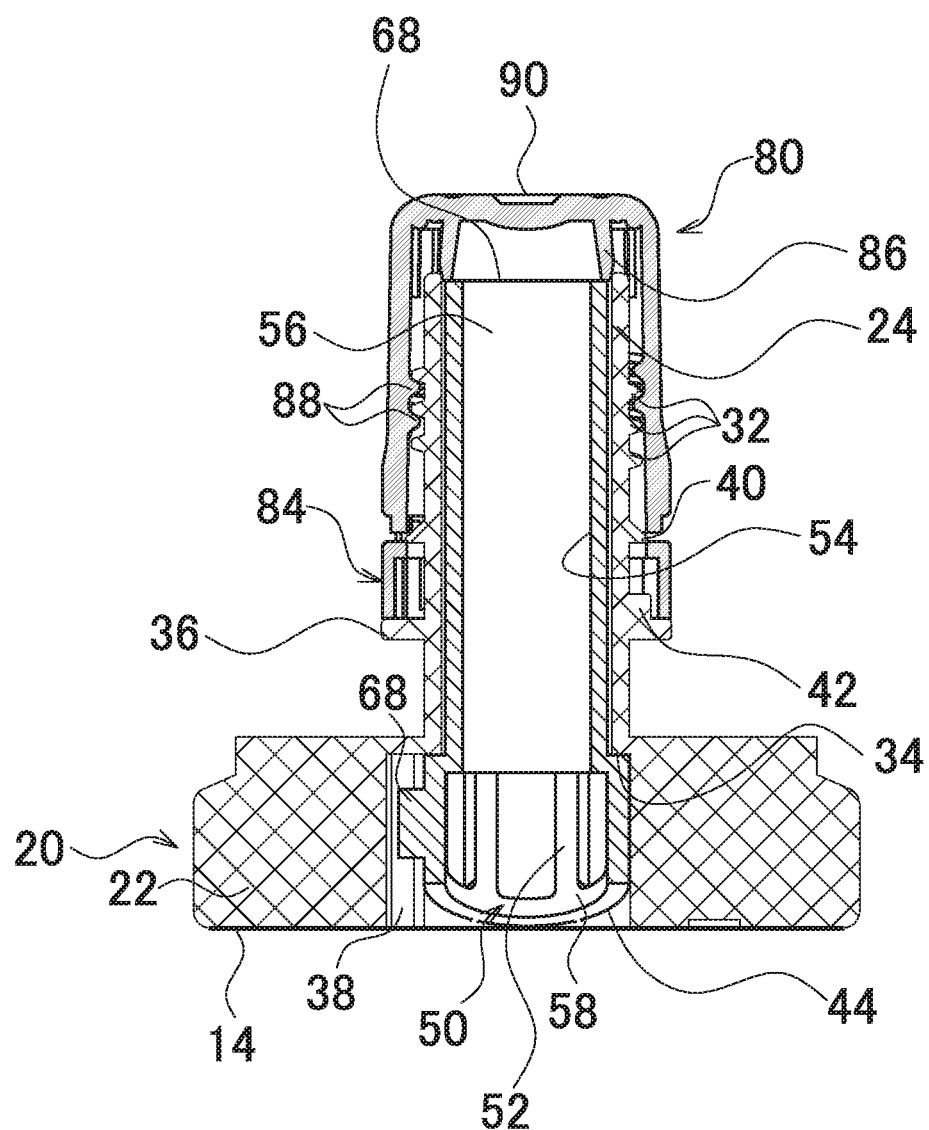
FIG. 7B is an illustrative longitudinal sectional view depicting how to assemble the spout according to the first embodiment of the present invention.
Figure 8A:
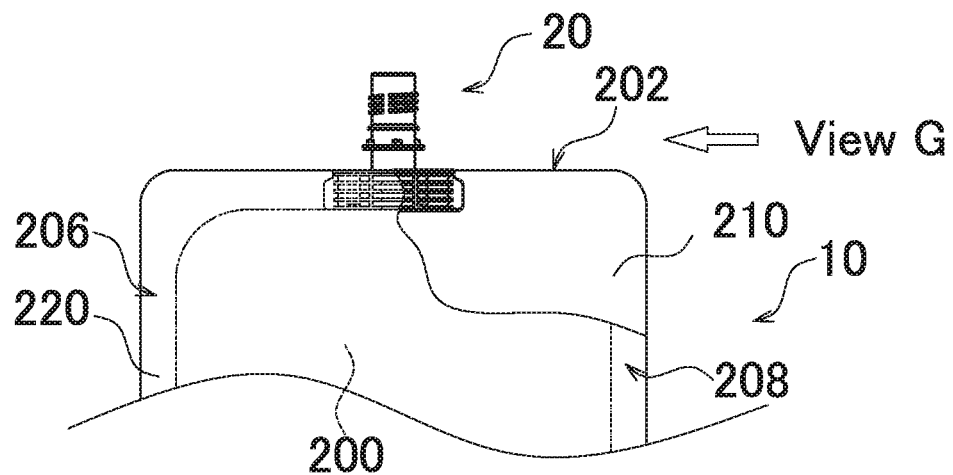
FIGS. 8A and 8B depict illustrative views after the spout is attached to the container according to the first embodiment of the present invention, FIG. 8A being an illustrative front view and FIG. 8B being an illustrative enlarged side view.
Figure 8B:
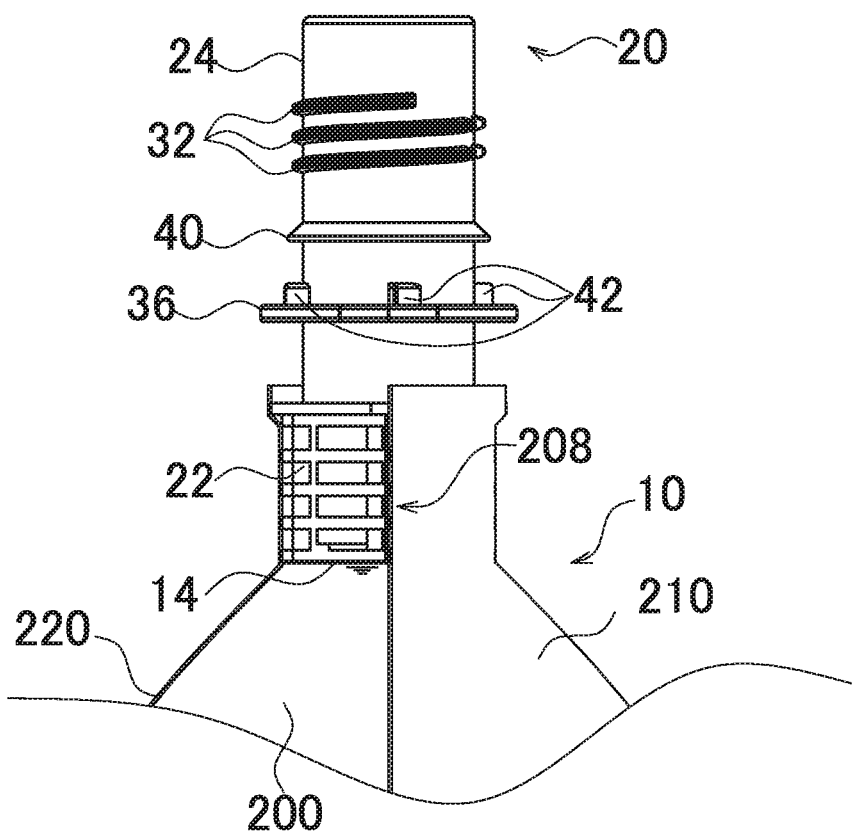

Next, how to assemble the spout is described based mainly on FIG. 7.

With the rotation stop unit 68 matched to the rotation stop unit insertion hole 38 of the attachment portion 22 of the spout base 20, the opening element 50 is inserted inside the through hole 26 of the attachment portion 22 and the cylindrical portion 24 from an inner opening 30 side of the attachment portion 22.

The opening element 50 inserted inside the through hole 26 of the spout base 20 is in a state in which the cutting edge unit 64 at its lowermost portion does not protrude outside from the inner opening 30 of the attachment portion 22.

Then, the heat sealed sheet 14 is bonded to the periphery of the inner opening 30 of the attachment portion 22.

Next, the cap 82 of the activating body 80 is rotated clockwise to be screwed in the suction opening of the cylindrical potion 24 of the spout base 20 for attachment.

The tamper evident ring 84 of the activating body 80 abuts on the activating-body stopping unit 36 to cause the activating body 80 to stop at the predetermined position of the spout base 20.

Subsequently, a method of attaching the spout 12 to the container 10 is described based mainly on FIG. 11.

An original stuff (sheet-like stuff) having the first container sheet 210, the second container sheet 220, and a bottom sheet 230 continuously connected between the first container sheet 210 and the second container sheet 220 configuring the container 10 is prepared.

The original stuff (sheet-like stuff) is wound into a roll shape.

This roll-shaped original stuff (sheet-like stuff) is drawn, and the bottom sheet 230 is folded and molded to form a bottom portion 204 of a standing pouch, thereby causing the first container sheet 210 and the second container sheet 220 to face each other.

Next, a left side edge 212 of the first container sheet 210 and a left side edge 222 of the second container sheet 220 facing each other are thermally welded to form a left side portion 206.

The first container sheet 210 and the second container sheet 220 have one side portion (left side portion 206) and the bottom portion 204 connected together.

The attachment portion 22 of the spout 12 is inserted between an upper side edge 216 of the first container sheet 210 and an upper side edge 226 of the second container sheet 220 on an upper portion opposite to the bottom portion 204.

Next, the attachment portion 22 is interposed between an inner side surface of the upper side edge 216 of the first container sheet 210 and an inner side surface of the upper side edge 226 of the second container sheet 220.

Then, the inner side surface of the upper side edge 216 of the first container sheet 210 and the inner side surface of the upper side edge 226 of the second container sheet 220 are welded together in their peripheral region, and are also welded to an outer peripheral surface of the attachment portion 22 interposed between the inner side surface of the upper side edge 216 of the first container sheet 210 and the inner side surface of the upper side edge 226 of the second container sheet 220.

Next, with one welded side portion (the left side portion 206 of the container 10) placed below and a right side edge 214 of the first container sheet 210 and a right side edge 224 of the second container sheet 220 configuring an unwelded side (a right side portion 208 of the container 10) placed above, a nozzle of an injection machine which injects an accommodated substance (hydrogen water) is inserted between the first container sheet 210 and the second container sheet 220 to fill a spout unit 202 of the container 10 with the accommodate substance (hydrogen water).

Next, an inner side surface of the right side edge 214 configuring the other side portion of the first container sheet 210 and an inner side surface of the right side edge 224 configuring the other side portion of the second container sheet 220 are welded together on their periphery to form the right side portion 208.

Hydrogen water is enclosed in the accommodating part 200 ringed by the spout unit 202 as an upper portion, the left side portion 206, the right side portion 208, and the bottom portion 204.

Thus, the accommodated substance fills the container 10, and is hermetically closed.

In a coupled body of the containers 10 manufactured by arranging the plurality of containers 10 in parallel, the left side portion 206 of an upper container 10 and the right side portion 208 of a lower container 10 adjacent thereto are linked together.

To separate these respective containers 10 arranged in parallel, a cut is made as appropriate between the left side portion 206 of the upper container 10 and the right side portion 208 of the lower container 10, thereby manufacturing individual containers 10.

As a material configuring the spout 12 of the present invention, a plastic film configuring the container 10 and a thermoplastic resin with heat-sealing property are used.

As this thermoplastic resin, for example, thermoplastic resins can be listed as follows: polyolefins such as polypropylene, propylene-ethylene copolymer, crystalline polybutene-1, crystalline poly 4-methylpentene-1, low-, medium- or high-density polyethylene, linear low-density polyethylene, ethylene-vinyl acetate copolymer (EVA), ethylene-acrylic acid copolymer (EAA), ethylene-acrylic acid ethyl copolymer (EEA), and ion-crosslinking olefin copolymer (ionomer); aromatic vinyl copolymers such as polystyrene and styrene-butadiene copolymer; vinyl halide polymers such as polyvinyl chloride and vinylidene chloride resin; nitrile polymers such as acrylonitrile-styrene copolymer and acrylonitrile-styrene-butadiene copolymer; polyamides such as nylon 6, nylon 66, and para- or meta-xylylene adipamide; polyesters such as polyethylene terephthalate, polybutylene terephthalate, poly tetra methylene terephthalate, poly-1,4-cyclohexane dimethylene terephthalate, and polyethylene naphthalate; various polycarbonates; and thermoplastic resins such as polyacetals such as polyoxymethylene.

As a particularly favorable material, for example, polyolefin resins can be listed, such as low-density polyethylene, linear low-density polyethylene, medium-density polyethylene, high-density polyethylene, polypropylene, and propylene-ethylene copolymer.

The spout base 20, the opening element 50, and the activating body 80 can be molded by a known method, for example, injection molding or compression molding.

A gas barrier layer formed in the spout base 20, the opening element 50, and the activating body 80 is configured of a gas-barrier-property resin layer of polyvinylidene chloride resin, EVA saponified product, nylon or cyclic olefin copolymer or the like; a resin layer having a metal oxide evaporated film of aluminum, silicon oxide, or the like; a resin layer containing a clay mineral; a metal foil of aluminum or the like, etc.

The gas barrier layer can be formed by a known method such as, for example, co-injection molding, multilayer compression molding, multicolor molding, or vapor deposition.

As a plastic film configuring the container 10 to which the spout 12 is fixed, it is possible to use a single layer film formed of a thermoplastic resin with heat-sealing property or a laminated film having a layer structure of two or more layers with a thermoplastic resin film with heat-sealing property being taken as a bag inner layer and other films being laminated.

As a thermoplastic resin film with heat-sealing property, for example, thermoplastic resins can be listed as follows: polyolefins such as polypropylene, propylene-ethylene copolymer, crystalline polybutene-1, crystalline poly 4-methylpentene-1, low-, medium- or high-density polyethylene, linear low-density polyethylene, ethylene-vinyl acetate copolymer (EVA), ethylene-acrylic acid copolymer (EAA), ethylene-acrylic acid ethyl copolymer (EEA), and ion-crosslinking olefin copolymer (ionomer); aromatic vinyl copolymers such as polystyrene and styrene-butadiene copolymer; vinyl halide polymers such as polyvinyl chloride and vinylidene chloride resin; nitrile polymers such as acrylonitrile-styrene copolymer and acrylonitrile-styrene-butadiene copolymer; polyamides such as nylon 6, nylon 66, and para- or meta-xylylene adipamide; polyesters such as polyethylene terephthalate, polybutylene terephthalate, poly tetra methylene terephthalate, poly-1,4-cyclohexane dimethylene terephthalate, and polyethylene naphthalate; various polycarbonates; and thermoplastic resins such as polyacetals such as polyoxymethylene.

As a particularly favorable material, for example, any of olefin-based resins such as low-density polyethylene, linear low-density polyethylene, medium-density polyethylene, high-density polyethylene, polypropylene, propylene-ethylene copolymer, ethylene-vinyl acetate copolymer, and olefin-based resin graft-degenerated with ethylene-based unsaturated carboxylic acid or its anhydride; ionomer resin; relatively low melting-point or low softening-point polyamide or copolyamide resin; or polyester or copolyester resin is used.

When a laminated film is used as a plastic film configuring the container 10, a laminated film is used formed by taking the above-described thermoplastic resin film with heat-sealing property as an inner layer of the container 10 and laminating other films, via an adhesive-agent layer as required.

As a material forming the adhesive-agent layer, an adhesive resin selected from polyethylene imine resin, alkyltitanate resin, polyester-isocyanate-based resin, urethane resin, epoxy resin, polyether-based resin, olefin-based resin with a polar base introduced thereto, and so forth is used.

A film to be laminated with the heat-sealing resin is not particularly restrictive, and any for use as a normal package bag can be used. As a material suitable for this film, any material described above for use as a heat-sealing resin can be used. However, a resin with a melting point higher than that of the resin for use for the inner layer is preferably selected.

Also, as a film configuring a region of the accommodating part 200 of the container 10, a film formed by laminating a metal foil such as aluminum and one or two or more types of the above-described plastic films is used. In particular, in the case of hydrogen water, a laminated film including a metal foil such as aluminum is preferably used. In addition, a resin layer of polyvinylidene chloride resin, EVA saponified product, nylon or cyclic olefin copolymer, or the like; a resin layer having a metal oxide evaporated film of aluminum, silicon oxide, or the like; and a resin layer containing a clay mineral are also possible.

Figure 12:
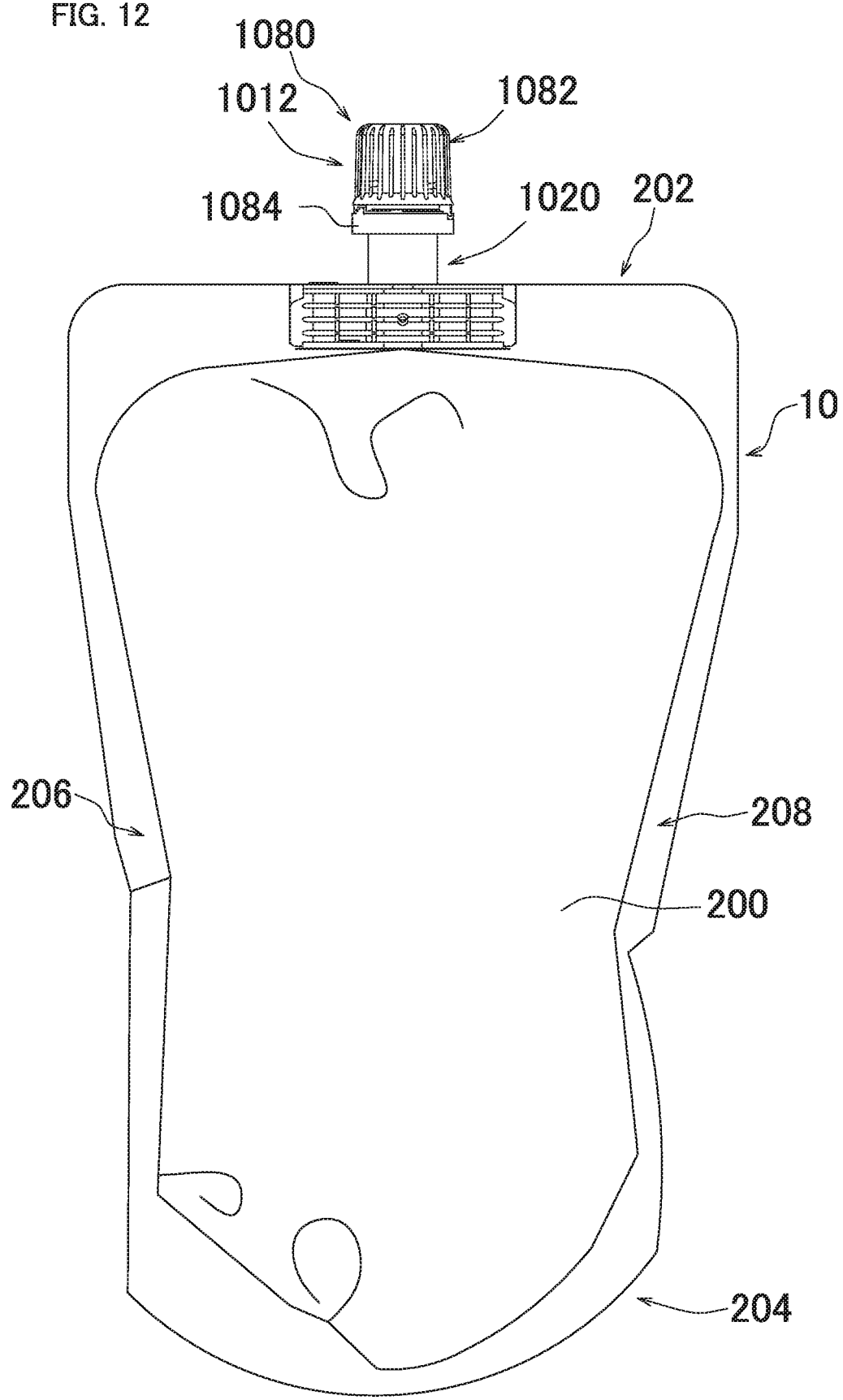
FIG. 12 is a front view depicting a spout-equipped container according to a second embodiment of this invention.
Figure 13:
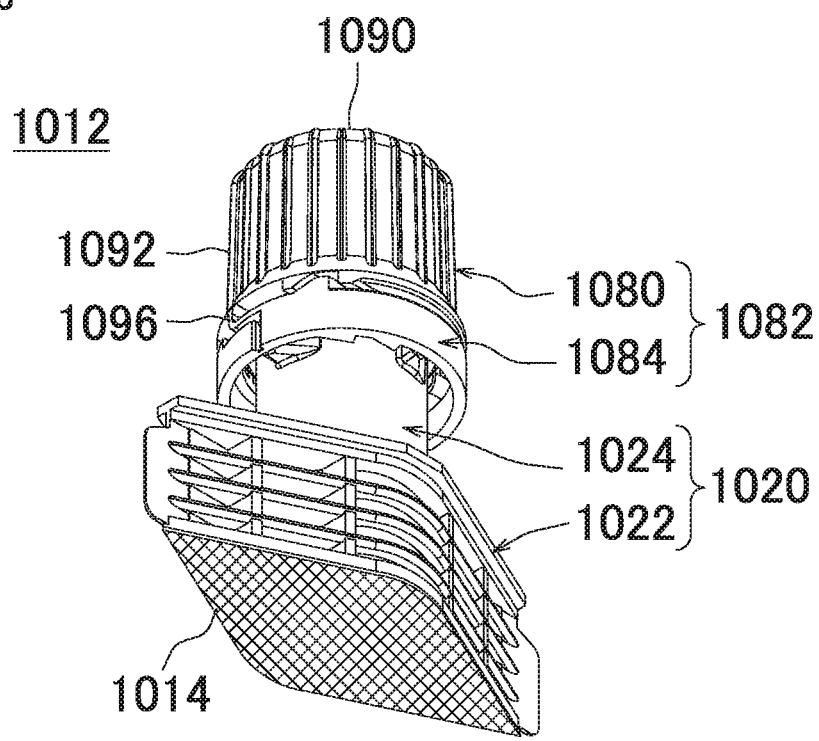
FIG. 13 is a perspective view depicting a spout included in the spout-equipped container according to the second embodiment of this invention, with its bottom surface viewable.

In the following, a spout-equipped container 10 according to a second embodiment of this invention is described with reference to FIG. 12 to FIG. 32. FIG. 12 is a front view depicting the spout-equipped container according to the second embodiment of this invention. FIG. 13 is a perspective view depicting a spout included in the spout-equipped container according to the second embodiment of this invention, with its bottom surface viewable.

The spout-equipped container 10 according to this embodiment includes a container 10 which accommodates hydrogen water and a spout base 1020 attached to the container 10, and further includes a heat sealed sheet 1014 which covers an inner opening 1030 which fronts an accommodating part 200 in the spout base 1020.

An aluminum region of the heat sealed sheet 14 and an aluminum region of an inner surface of the accommodating part 200 of the container 10 are in close contact with each other, and hydrogen in hydrogen water is less prone to get out of the container 10 and the spout base 20.

The spout-equipped container 10 according to this embodiment includes a spout 1012 for spouting hydrogen water accommodated in the container 10 to the outside. The spout 1012 includes the spout base 1020, an opening element 1050, and an activating body 1080. To the bottom surface of the spout base 1020, the heat sealed sheet 1014 is fixed. The opening element 1050 is configured to be inserted into a through hole 1026 formed in the spout base 1020 to move in a vertical direction (axial direction), and is formed so as to tear part of the heat sealed sheet 1014. The activating body 1080 is screwed to an outer opening 1028 of the through hole 1026 formed in the spout base 1020 to hermetically seal the container 10, and is also configured to be opened at the time of spouting and move the opening element 1050 in the vertical direction.

Figure 14:
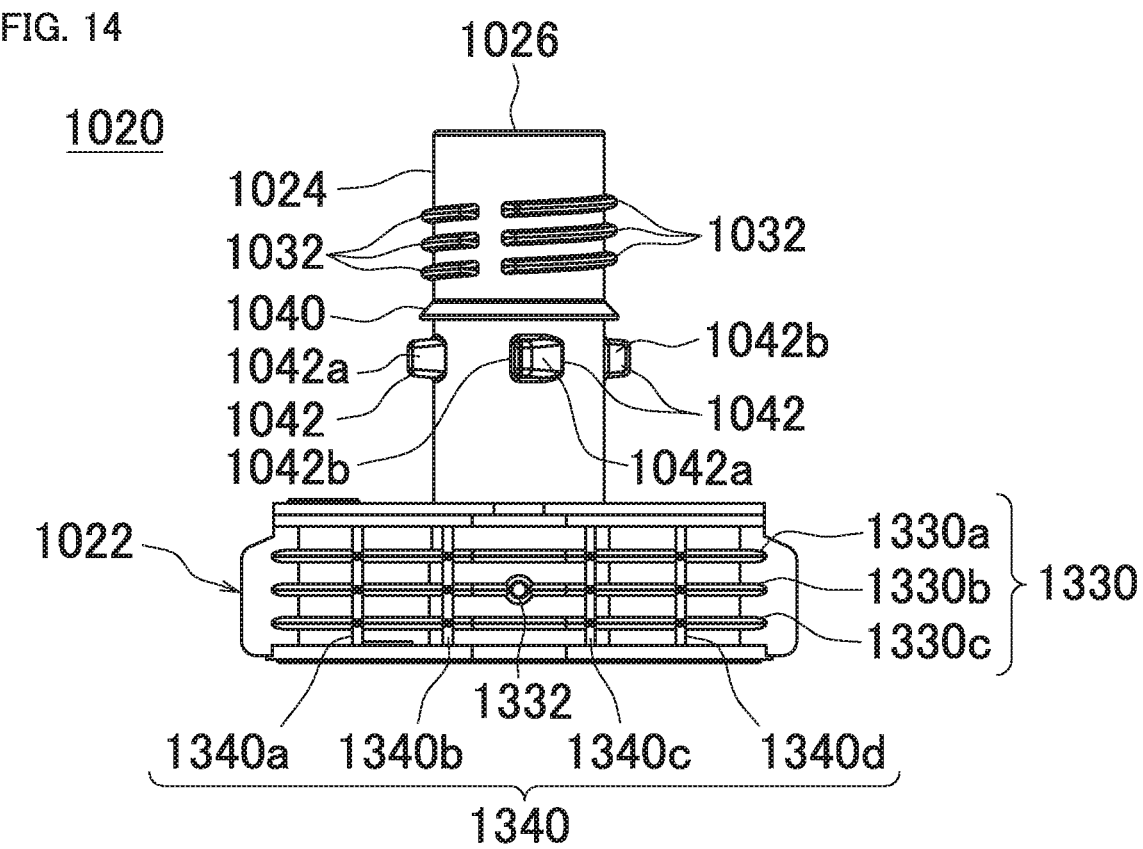
FIG. 14 is a front view depicting a spout base included in the spout-equipped container according to the second embodiment of this invention.
Figure 15A:
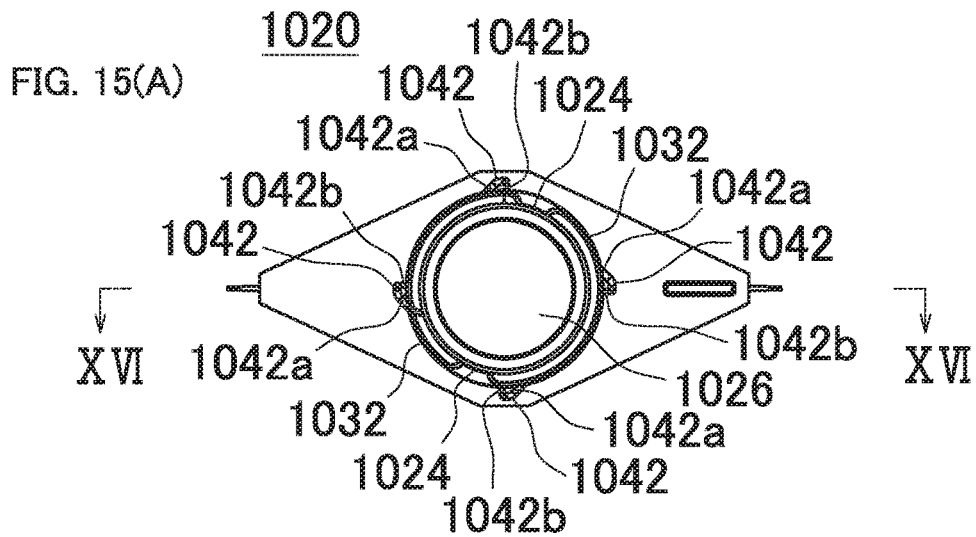
FIGS. 15A, 15B, and 15C depict diagrams depicting the spout base included in the spout-equipped container according to the second embodiment of this invention, FIG. 15A being a plan view, FIG. 15B being a side view, and FIG. 15C being a bottom view.
Figure 15B:
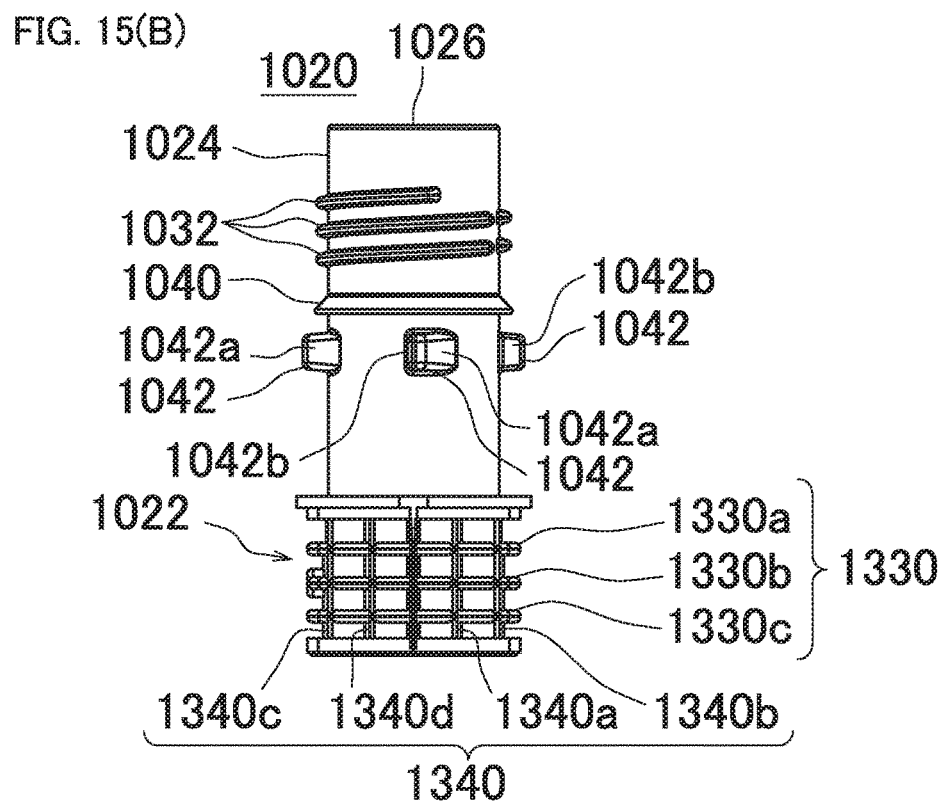
Figure 15C:
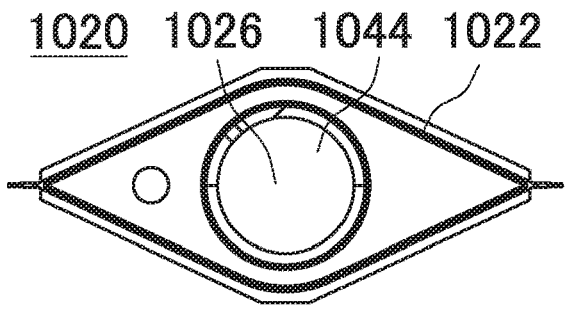
Figure 16:
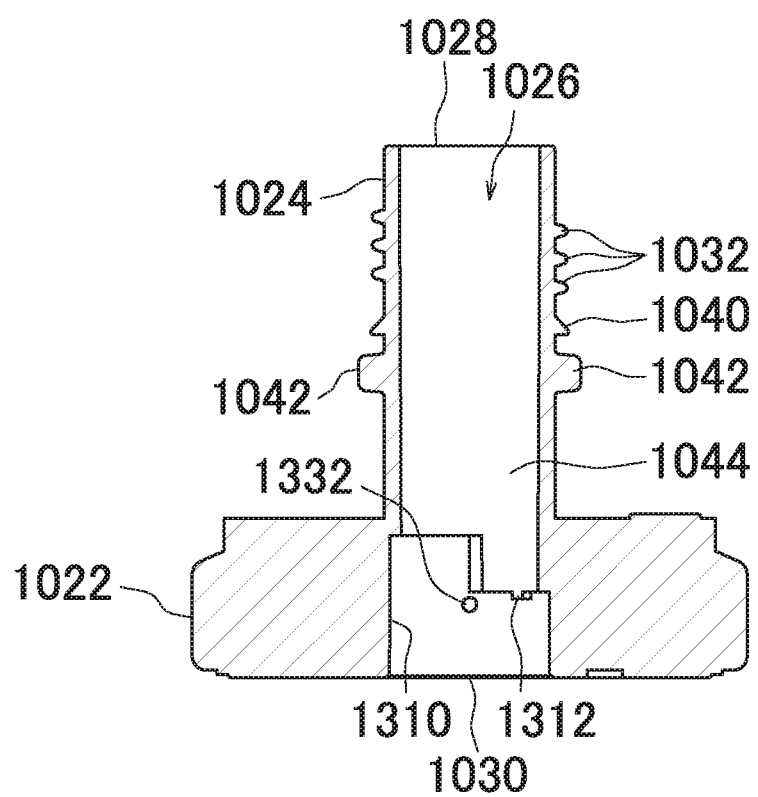
FIG. 16 is a sectional view depicting the spout base included in the spout-equipped container according to the second embodiment of this invention, along XVI-XVI of FIG. 15A.

The spout base included in the spout-equipped container 10 according to this embodiment is described based on FIG. 14 to FIG. 16. FIG. 14 is a front view depicting a spout base included in the spout-equipped container according to the second embodiment of this invention. FIG. 15 depicts diagrams depicting the spout base included in the spout-equipped container according to the second embodiment of this invention, (A) being a plan view, (B) being a side view, and (C) being a bottom view. FIG. 16 is a sectional view depicting the spout base included in the spout-equipped container according to the second embodiment of this invention, along XVI-XVI of FIG. 15(A).

The spout base 1020 has an attachment portion 1022 attached to the container 10 and a cylindrical portion 1024 provided to protrude upward at a substantially center portion of an upper surface of a top portion of the attachment portion 1022 and serving as a portion where the opening element 1050 is inserted into a suction opening when hydrogen water is spouted.

The attachment portion 1022 and the cylindrical portion 1024 are integrally molded of a material, for example, synthetic resin or the like. In the spout base 1020, the through hole 1026 penetrating through a substantially center thereof in a vertical direction and having a substantially circular shape in a planar view is formed. That is, the through hole 1026 penetrates from a bottom surface of the attachment portion 1022 over an upper surface of the cylindrical portion 1024.

The through hole 1026 has the inner opening 1030 formed in the bottom surface of the attachment portion 1022 and an outer opening 1028 formed in the upper surface of the cylindrical portion 1024.

The attachment portion 1022 is attached to the container 10 so as to be interposed between an end edge of a first container sheet 1210 and an end edge of a second container sheet 1220 configuring the container 10. The attachment portion 1022 has a bottom portion having a substantially diamond shape in a planar view, side portions standing from an end edge of the bottom portion, and a top portion with a shape approximately similar to the bottom portion.

On a side portion of the attachment portion 1022 on one side, three lateral rib portions 1330a, 1330b, and 1330c, and four longitudinal rib portions 1340a, 1340b, 1340c and 1340d are provided to protrude.

The three lateral rib portions 1330a, 1330b, and 1330c linearly extend in a left-and-right direction (lateral direction). Also, the three lateral rib portion 1330a, 1330b, and 1330c are parallel to each other, and are equidistantly provided in a vertical direction.

At a substantially center of the lateral rib portion 1330b, a test-purpose hole 1332 in a substantially circular shape in a planar view is formed toward the width direction so as to penetrate to the through hole 1026 described above.

The four longitudinal rib portions 1340a, 1340b, 1340c, and 1340d linearly extend in a vertical direction (longitudinal direction). The four longitudinal rib portions 1340a, 1340b, 1340c, and 1340d are parallel to each other, and are equidistantly provided in a left-and-right direction.

Note that since a side portion of the attachment portion 1022 on the other side has a structure similar to the side portion on the one side except that the test-purpose hole 1332 is not formed, similar description is not repeated herein.

The test-purpose hole 1332 after the assembly of the spout 1012 is thrust with a dedicated nozzle to inject air thereinto so that a change in atmospheric pressure is measured, thereby allowing checking whether an inlet 1058 (the inner opening 1030 of the through hole 1026 formed in the spout base 1020) of a spout through hole 1056 formed in the opening element 1050 by the heat sealed sheet 1014 is reliably hermetically sealed and whether an outlet 1060 (the outer opening 1028 of the through hole 1026) of the spout through hole 1056 is reliably hermetically sealed by the activating body 1080.

At a substantially center of the attachment portion 1022, as described above, the through hole 1026 in a substantially circular shape in a planar view is formed. The through hole 1026 formed in the attachment portion 1022 serves as a space for accommodating a piercer element 1052 of the opening element 1050. This space is referred to as opening-element accommodating part 1044. On an inner wall of the opening-element accommodating unit 1044 (that is, a lower portion of a side wall of the through hole 1026), a left female screw unit 1310 (second external threads) configuring a female unit of a screw (hereinafter referred to as a "left screw") proceeding when the screw is turned (rotated) by left rotation (counterclockwise) in a planar view is formed. A lower end of the left female screw unit 1310 (that is, a terminating portion of the left female screw unit 1310) is positioned slightly above the inner opening 1030 of the through hole 1026. And, near this terminating portion, a rotation stop male unit 1312 in a substantially quadrangular shape in a side view for stopping a rotational motion in a planar view (left rotation and right rotation in a planar view) of the opening element 1050 and stopping a screwing vertical motion of the opening element 1050 is provided to protrude downward (in a second direction). The rotation stop male unit 1312 is in a substantially quadrangular shape in a side view.

The cylindrical portion 1024 is in a substantially cylindrical shape having a diameter as a suction opening and a length capable of screwing and fitting the activating body 1080. On an outer surface of the cylindrical portion 1024, a right male screw unit 1032 (first internal threads), a protrusion 1040, and rotation stopping units 1042 are provided to protrude.

The right male screw unit 1032 is formed on an upper portion on the outer surface of the cylindrical portion 1024, and configures a male unit of a screw (hereinafter referred to as a "right screw") proceeding when the screw is turned (rotated) by right rotation (clockwise) in a planar view.

The protrusion 1040 is provided over an entire circumference of the outer surface of the cylindrical portion 1024 at a lower portion of the right male screw unit 1032. The protrusion 1040 has a shape with its dimension in a radial direction gradually increasing from an upper end toward a lower end. That is, the protrusion 1040 has a shape tilted from the upper end toward the lower end. Four rotation stopping units 1042 are provided equidistantly with regard to a circumferential direction at a lower portion of the protrusion 1040.

The rotation stopping units 1042 each has a guide surface 1042a and a tamper evident ring surface 1042b. When the cylindrical portion 1024 is viewed at right turn (clockwise) in a planar view, the guide surface 1042a is a surface which appears first, and the tamper evident ring surface 1042b is a surface which appears later. The guide surface 1042a is tilted so as to have a dimension in a radial direction increasing from an end edge appearing first toward an end edge appearing later when viewed at right turn (clockwise) in a planar view. On the other hand, the tamper evident ring surface 1042b is in a shape extending in a radial direction of the cylindrical portion 1042. That is, the rotation stopping units 1042 are each in a substantially right triangle shape in a planar view.

Figure 17:
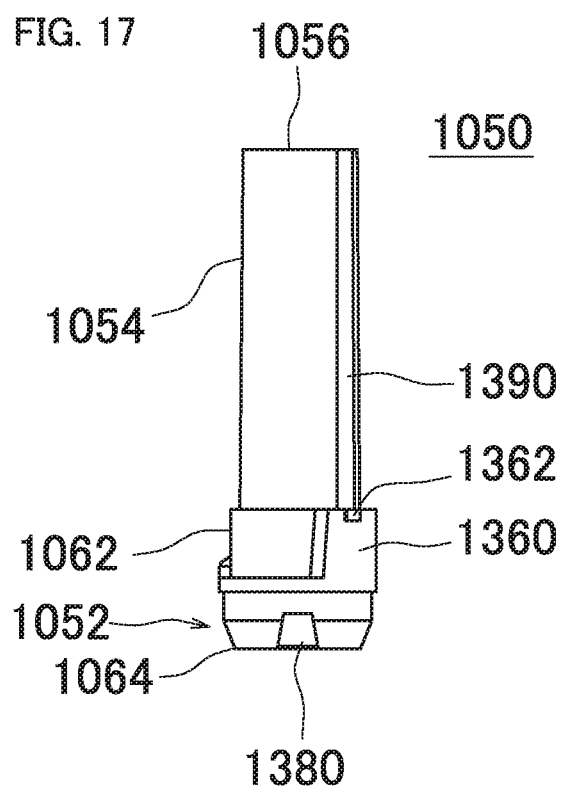
FIG. 17 is a front view depicting an opening element included in the spout-equipped container according to the second embodiment of this invention.
Figure 18A:
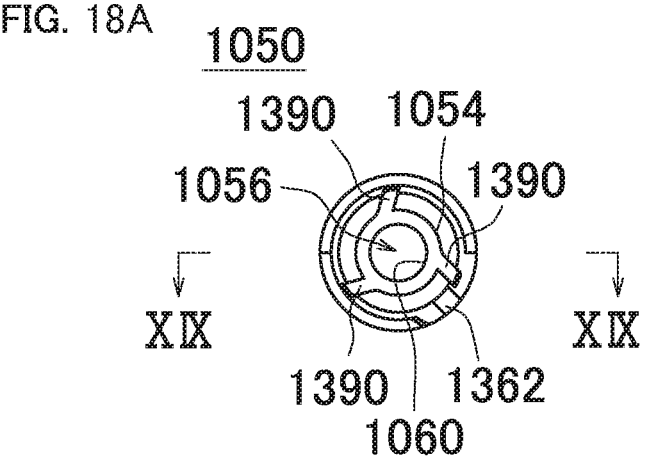
FIGS. 18A, 18B, and 18C depict diagrams depicting the opening element included in the spout-equipped container according to the second embodiment of this invention, FIG. 18A being a plan view, FIG. 18B being a side view, and FIG. 18C being a bottom view.
Figure 18B:
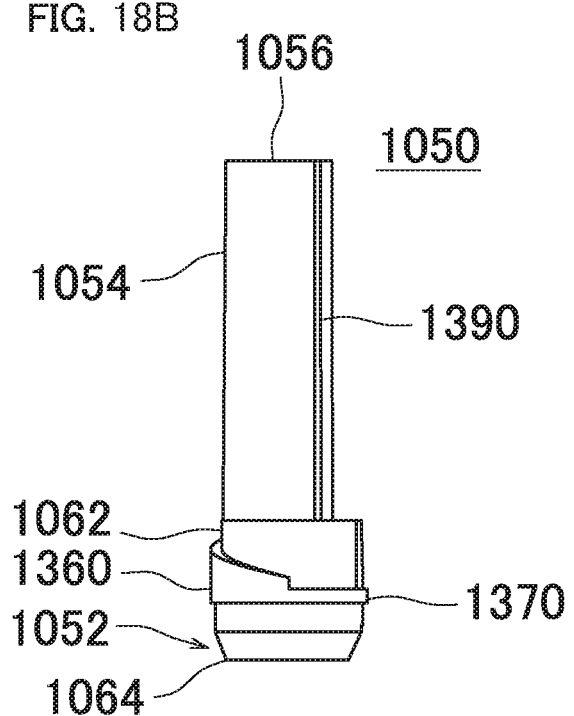
Figure 18C:
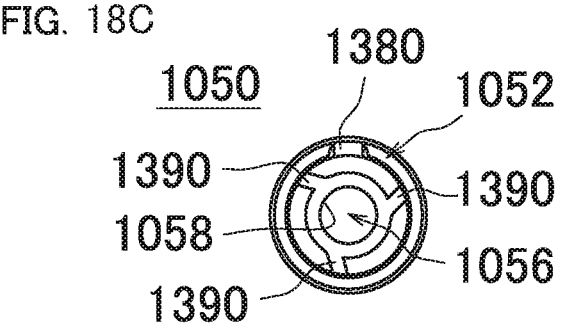
Figure 19:
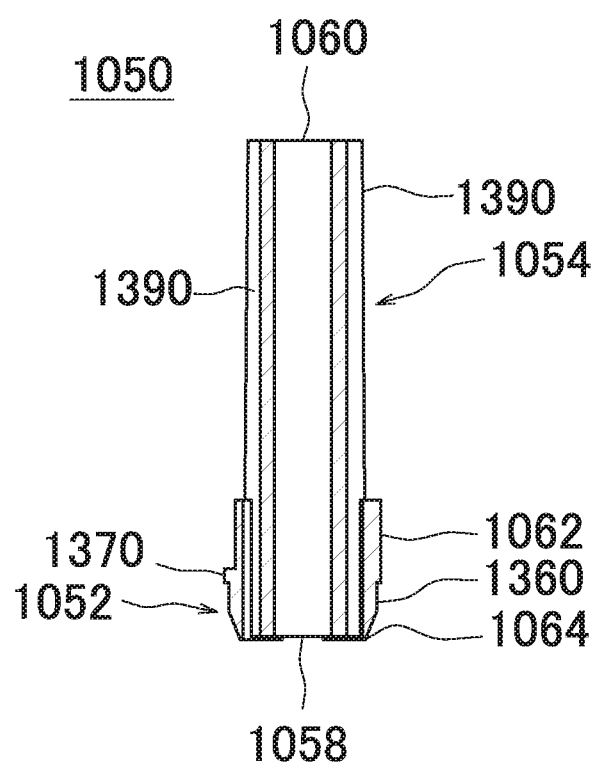
FIG. 19 is a sectional view depicting the opening element included in the spout-equipped container according to the second embodiment of this invention, along XIX-XIX of FIG. 18A.

The opening element included in the spout-equipped container 10 according to this embodiment is described based on FIG. 17 to FIG. 19. FIG. 17 is a front view depicting an opening element included in the spout-equipped container according to the second embodiment of this invention. FIG. 18 depicts diagrams depicting the opening element included in the spout-equipped container according to the second embodiment of this invention, (A) being a plan view, (B) being a side view, and (C) being a bottom view. FIG. 19 is a sectional view depicting the opening element included in the spout-equipped container according to the second embodiment of this invention, along XIX-XIX of FIG. 18 (A).

The opening element 1050 is formed so as to move downward inside the through hole 1026 of the spout base 1020 so as not to get out of the spout base 1020. The opening element 1050 has a piercer element 1052, and a passive shaft unit 1054 provided to protrude at a substantially center of an upper surface of a top portion of the piercer element 1052. The piercer element 1052 and the passive shaft unit 1054 are integrally molded of a material such as, for example, synthetic resin. The opening element 1050 has a dimension in the vertical direction (that is, the sum of dimensions in the vertical direction of the piercer element 1052 and the passive shaft unit 1054) slightly smaller than that of the spout base 1020. In the opening element 1050, a spout through hole 1056 in a substantially circular shape in a planar view is formed, which penetrates through a substantially center of the opening element 1050 over the vertical direction, that is, penetrates therethrough from a bottom surface of the piercer element 1052 over an upper surface of the passive shaft unit 1054. The spout through hole 1056 has an inlet 1058 formed on the bottom surface of the piercer element 1052 and the outlet 1060 formed on the upper surface of the passive shaft unit 1054.

The piercer element 1052 is in a substantially cylindrical shape. The piercer element 1052 has its outer diameter approximately equal to or slightly smaller than the inner diameter of the opening-element accommodating unit 1044 formed in the spout base 1020. Also, the piercer element 1052 has a dimension in the vertical direction approximately equal to or slightly smaller than that of the opening-element accommodating unit 1044 formed in the spout base 1020.

The piercer element 1052 is formed so as to have a dimension in the radial direction increasing upward from a lower end. The piercer element 1052 has a base unit 1062 formed from its upper end to a portion near a lower end, and a cutting edge unit 1064 formed at its lower end. On an outer surface of the base unit 1062, a step 1360 configuring a male unit (second male screw unit) of a left screw is formed. This step 1360 is screwed into the step 1310 configuring a left female screw unit (second external threads) formed on the inner surface of the spout base 1020 described above. Near a starting end of the step 1360, a rotation stop female unit 1362 is formed so as to be recessed in a substantially quadrangular shape in a side view. This rotation stop female unit 1362 operates in cooperation with the rotation stop male unit 1312 formed at the terminating portion of the step 1310 described above. Details of this cooperative mode will be described below. On a lower portion of the step 1360 in the base unit 1062, a flange portion 1370 is formed over the entire circumstance as a step having a dimension in a radial direction decreasing. The cutting edge unit 1064 is formed so as to have a dimension in the radial direction decreasing from its upper end toward its lower end. In the cutting edge unit 1064, a notch portion 1380 in a substantially quadrangular shape in a side view extending from its lower end to its upper end is formed. The notch portion 1380 is formed at a position shifted from the rotation stop female unit 1362 formed near the starting end of the step 1360 described above by approximately 300.degree. in a planar view. Note that the notch portion 1380 preferably has a length dimension of a lower bottom slightly larger than that of an upper bottom and is formed in a trapezoidal shape with interior angles at both ends of the upper bottom being equal to each other.

The passive shaft unit 1054 is in a substantially cylindrical shape having a dimension in the vertical direction slightly smaller than that of the cylindrical portion 1024 of the spout base 1020. On the outer surface of the passive shaft unit 1054, as passive portions extending from its upper end to lower end in the vertical direction, three wing portions 1390 are provided to protrude. The wing portions 1390 each have a similar shape, and are equidistantly formed in a circumferential direction of the passive shaft unit 1054. In the passive shaft unit 1054, a diameter of a circle drawn when apexes of the three wing portions 1390 are connected (that is, an outer diameter including the wing portions 1390 of the passive shaft unit 1054) is approximately equal to or slightly smaller than the inner diameter of the cylindrical portion 1024 of the spout base 1020. The wing portions 1390 have a structure for causing the opening element 1050 to rotate leftward in conjunction with left rotation (counterclockwise) of the activating body 1080. The wing portions 1390 are each formed so that, in a planar view, an angle formed by a direction in which a surface appearing first when viewed at left turn (counterclockwise) protrudes and a tangential direction of the outer surface of the passive shaft unit 1054 is smaller than an angle formed by a direction in which a surface appearing later when viewed at left turn protrudes and the tangential direction of the outer surface of the passive shaft unit 1054. That is, the wing portions 1390 are each tilted in a planar view and when viewed at left turn so as to retreat from its root (that is, a connecting portion with the outer surface of the passive shaft unit 1054) toward its tip. Note that the outer surface of the passive shaft unit 1054 is preferably formed so as to have a dimension in the radial direction slightly decreasing from its upper end toward its lower end.

Figure 20:
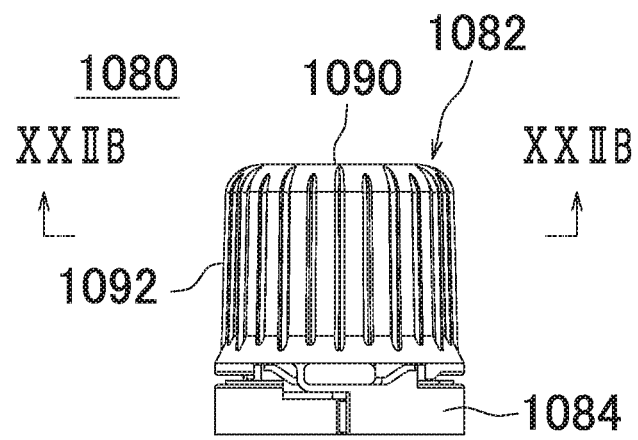
FIG. 20 is a front view depicting an activating body included in the spout-equipped container according to the second embodiment of this invention.
Figure 21A:
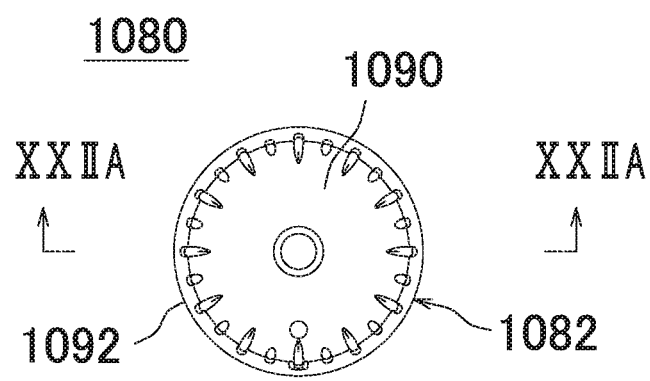
FIGS. 21A and 21B depicts diagrams depicting the activating body included in the spout-equipped container according to the second embodiment of this invention, FIG. 21A being a plan view and FIG. 21B being a bottom view.
Figure 21B:
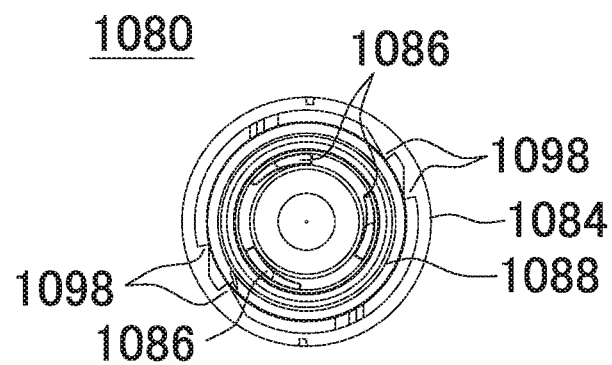
Figure 22A:
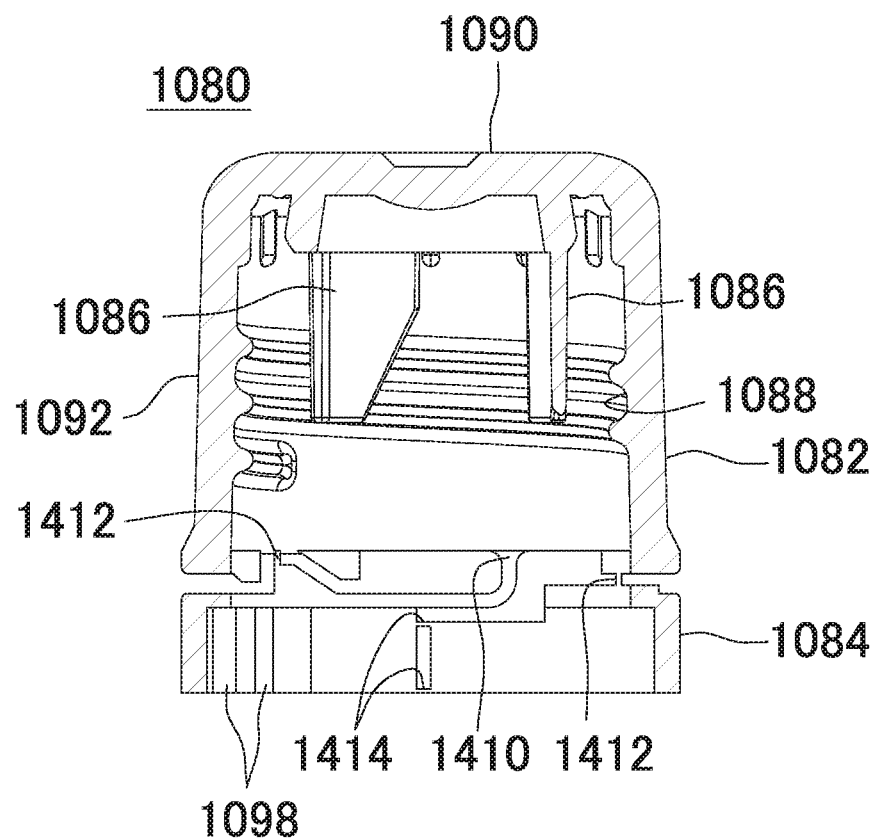
FIGS. 22A and 22B depict diagrams depicting the activating body included in the spout-equipped container according to the second embodiment of this invention, FIG. 22A being a sectional view along XXIIA-XXIIA of FIG. 21A and FIG. 22B being a sectional view along XXIIB-XXIIB of FIG. 20
Figure 22B:
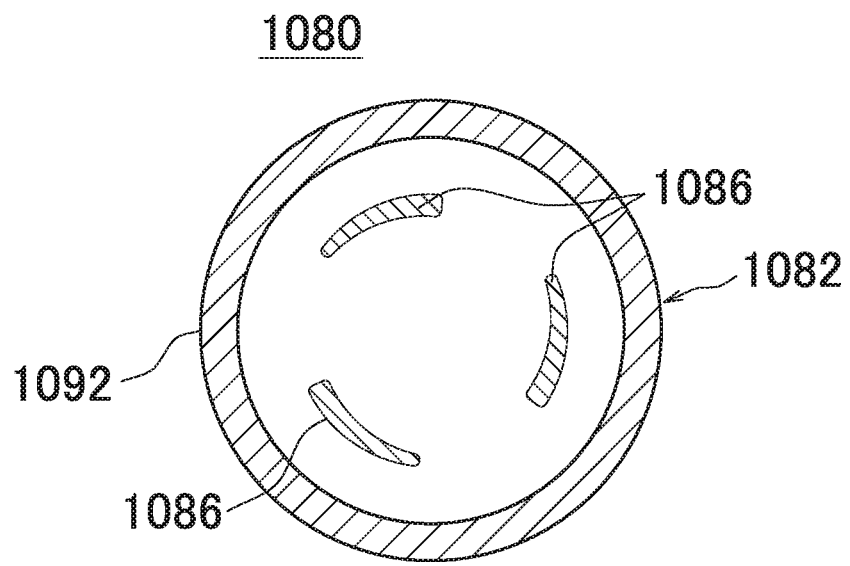
Figure 23:
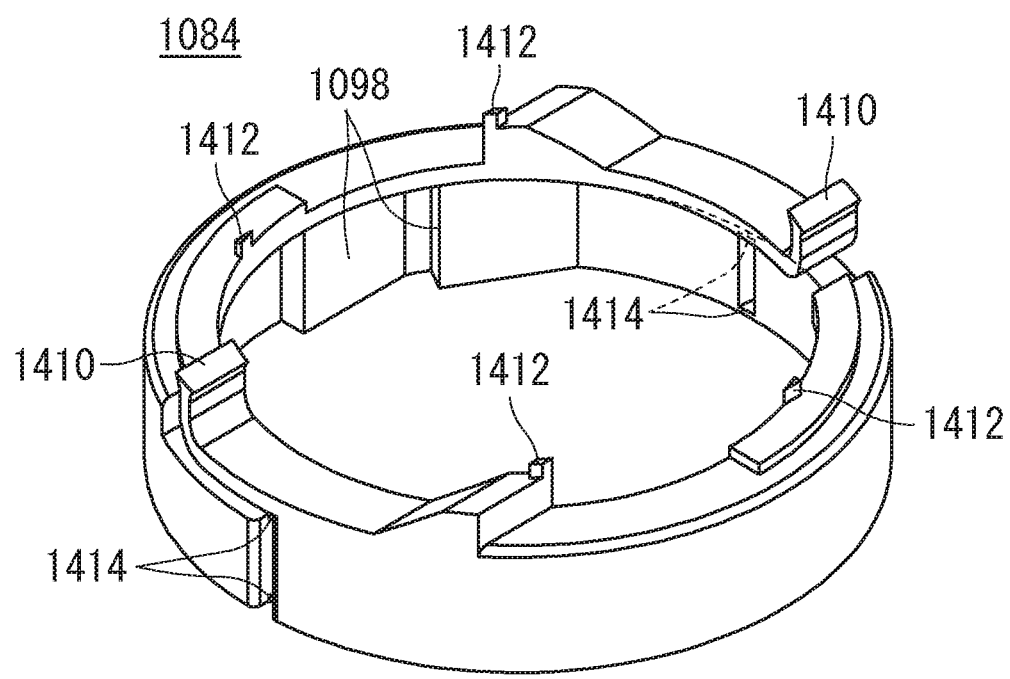
FIG. 23 is a perspective view depicting a tamper evidence included in the spout-equipped container according to the second embodiment of this invention.

The activating body included in the spout-equipped container 10 according to this embodiment is described based on FIG. 20 to FIG. 23. FIG. 20 is a front view depicting an activating body included in the spout-equipped container according to the second embodiment of this invention. FIG. 21 depicts diagrams depicting the activating body included in the spout-equipped container according to the second embodiment of this invention, (A) being a plan view and (B) being a bottom view. FIG. 22 depicts diagrams depicting the activating body included in the spout-equipped container according to the second embodiment of this invention, (A) being a sectional view along XXIIA-XXIIA of FIGS. 21(A) and (B) being a sectional view along XXIIB-XXIIB of FIG. 20). FIG. 23 is a perspective view depicting a tamper evidence included in the spout-equipped container according to the second embodiment of this invention.

The activating body 1080 is formed so as to be removably screwed into one end of the spout base 1020 in the axial direction and so as to move the opening element 1050 inside the through hole 1026 of the spout base 1020 downward.

The activating body 1080 includes a cap 1082 and a tamper evidence 1084 for clarifying that the cap 1082 in an initial state has been tampered.

The cap 1082 includes a top portion 1090 in a substantially circular shape in a planar view and a skirt 1092 as a side wall hanging down from an end edge of the top portion 1090. That is, the cap 1082 is in a substantially columnar shape with an opening in its bottom surface. The top portion 1090 and the skirt 1092 are integrally molded of synthetic resin. The cap 1082 has an inner diameter approximately equal to or slightly larger than the outer diameter of the cylindrical portion 1024 of the spout base 1020. Also, the cap 1082 has a dimension in the vertical direction approximately equal to the dimension of the spout base 1020 from an upper end to the protrusion 1040. On an inner surface of the top portion 1090, wing pressing units 1086 are disposed as three operating portions hanging down in the same direction as that of the skirt 1092. On an inner surface of the skirt 1092, a right female screw unit 1088 (first female screw unit) configuring a female unit of the right screw is formed. The three wing pressing units 1086 are each formed in a substantially arc shape in a planar view. Furthermore, the three wing pressing units 1086 have a similar shape. Still further, the three wing pressing units 1086 are disposed so as to draw one circle when connected to each other in a planar view. Still further, the three wing pressing units 1086 each preferably have a dimension of an end appearing later in a radial direction when viewed at left turn in a planar view slightly larger than that of an end appearing first. This right female screw unit 1088 is screwed into the right male screw unit 1032 formed on the outer surface of the spout base 1020 described above.

The tamper evidence 1084 is formed in an annular shape with its inner diameter and outer diameter approximately equal to those of the cap 1082. Also, the tamper evidence 1084 has a dimension in a height direction approximately equal to that of the rotation stopping units 1042 of the spout base 1020. The tamper evidence 1084 has two coupling units 1410 and four upper-surface preliminary coupling units 1412 provided to protrude on its upper surface, four side-surface preliminary coupling units 1414 provided to protrude on its outer surface of its side surface, and rotation stopping units 1098 provided to protrude on its inner surface of the side surface. In the activating body 1080, in an initial state at shipping (that is, in a state in which, with the heat sealed sheet 1014 fixed to the bottom surface of the spout 1012 formed by assembling the spout base 1020, the opening element 1050, and the activating body 1080, the spout 1012 is attached to the end edge of the container 10 having hydrogen water accommodated in the accommodating part 200 for hermetical sealing), the lower end of the cap 1082 and tips of the respective two coupling units 1410 and tips of the respective four upper-surface preliminary coupling units 1412 of the tamper evidence 1084 are coupled together. Also, in an initial state, the tamper evidence 1084 is coupled over the entire circumference by the four side-surface preliminary coupling units 1414. The two coupling units 1410 are in a substantially L shape in a side view. Also, coupling of the four upper-surface preliminary coupling units 1412 and the four side-surface preliminary coupling units 1414 is configured to be easily fractured. These rotation stopping units 1098 operate in cooperation with the rotation stopping units 1042 described above. Details of this cooperation mode will be described below.

Figure 24:
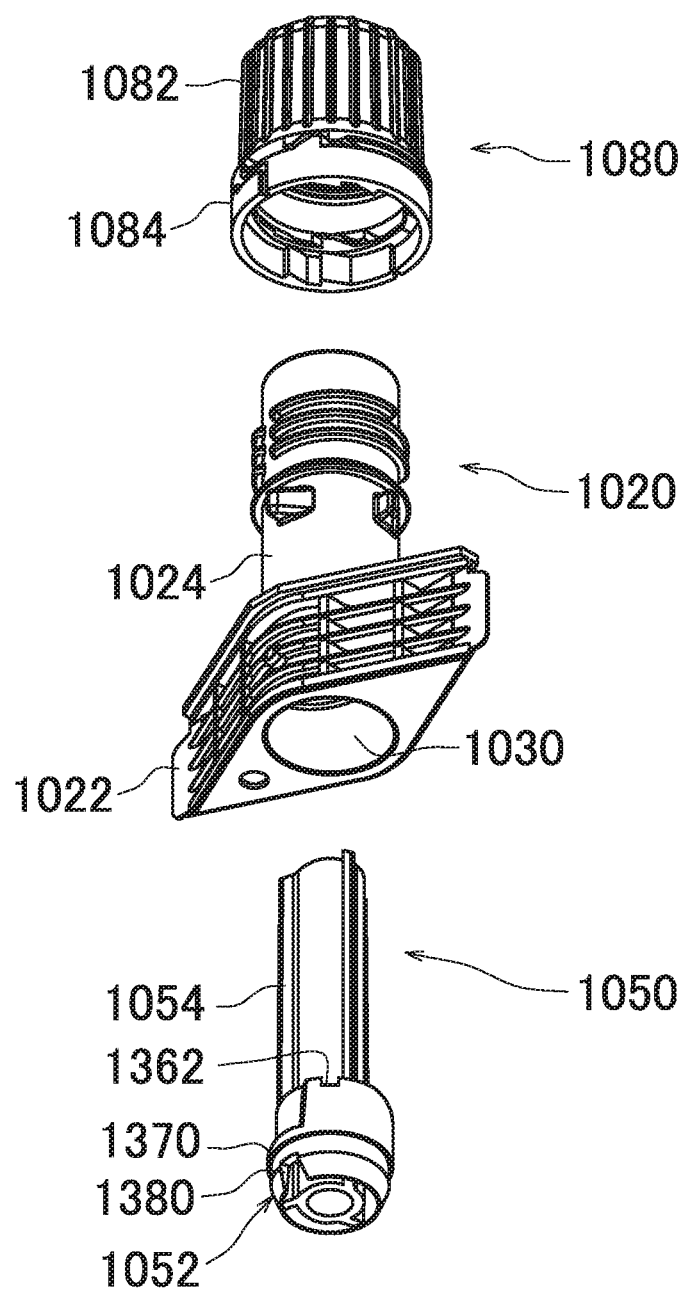
FIG. 24 is a perspective view of the spout base, the opening element, and the activating body included in the spout-equipped container according to the second embodiment of this invention when arranged in order of assembling and viewed from a bottom side.
Figure 25:
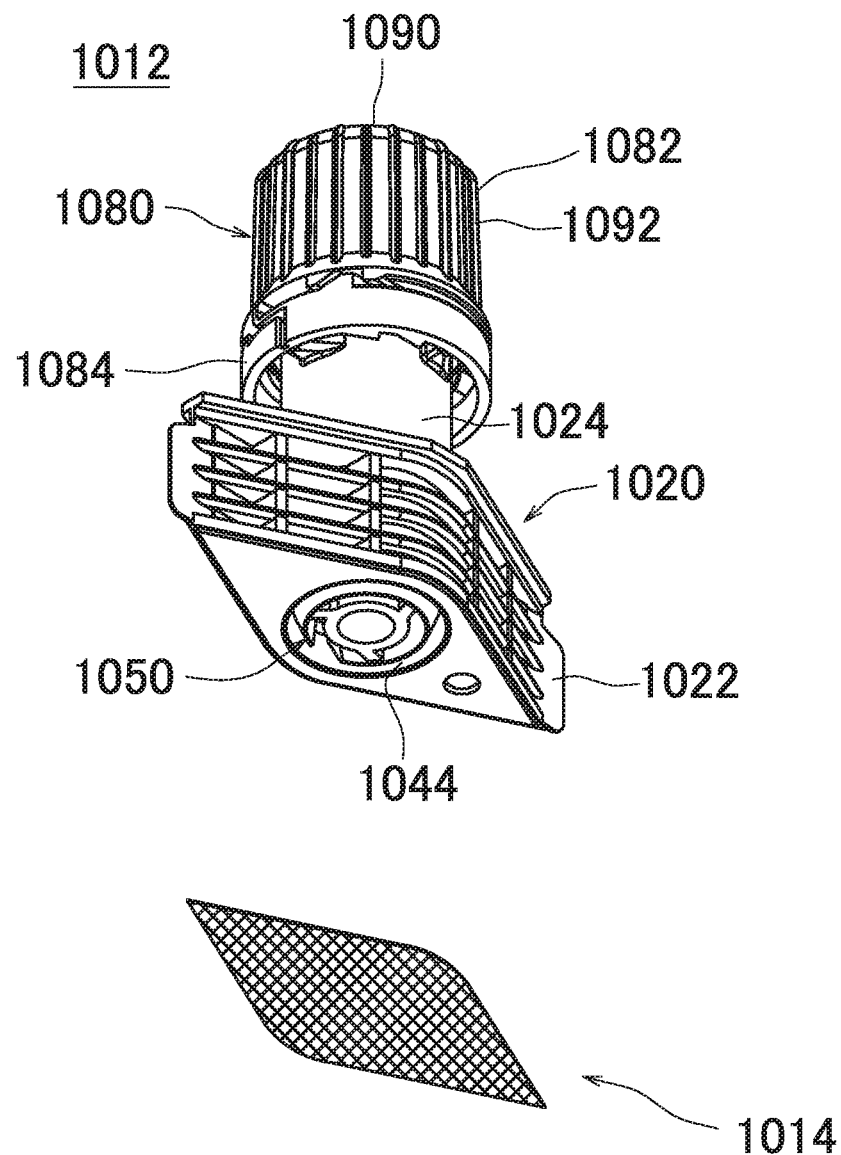
FIG. 25 is a perspective view when arranged in order in a direction of fixing a heat sealed sheet to the spout-equipped container according to the second embodiment of this invention and viewed from a bottom side.
Figure 26:
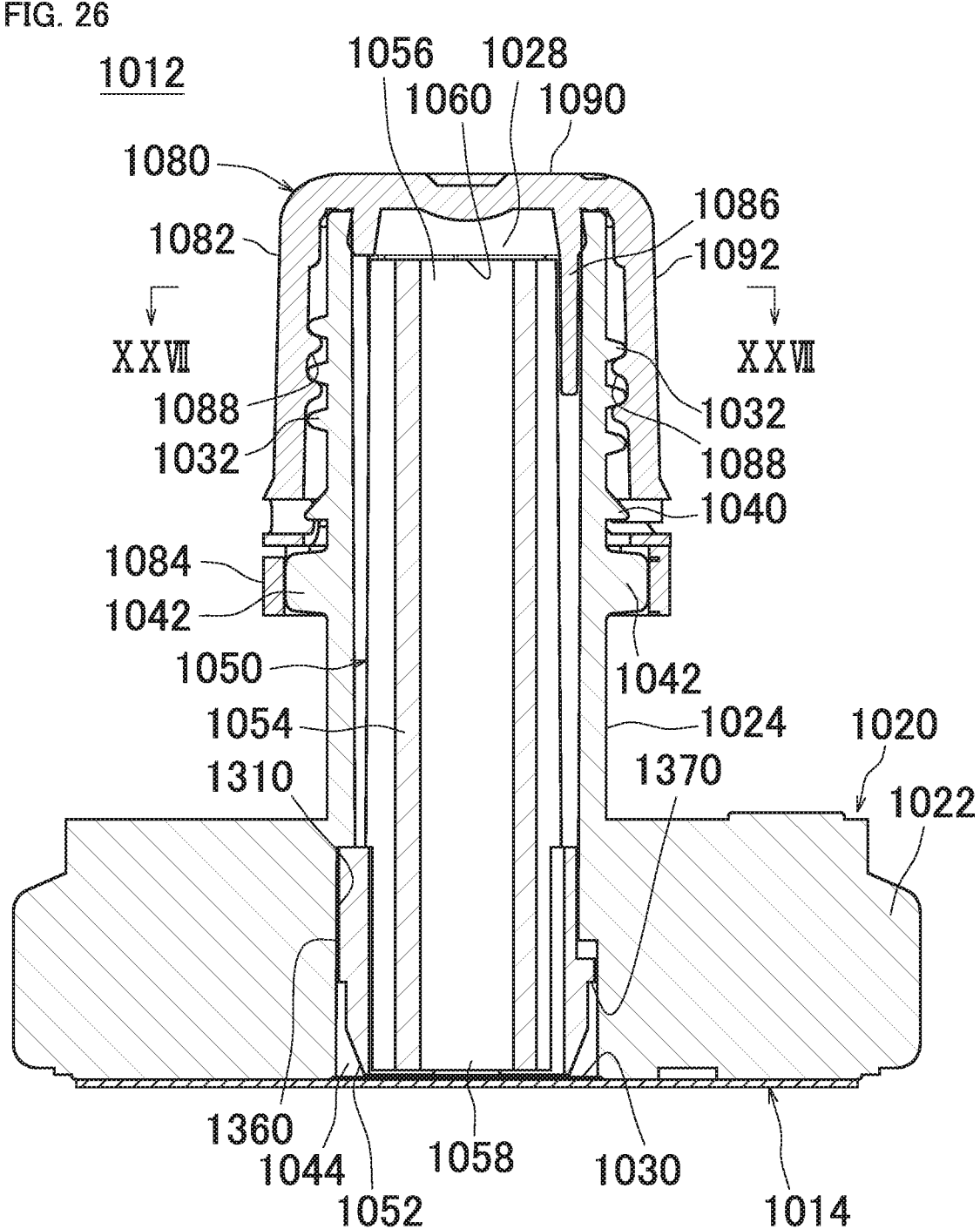
FIG. 26 is a sectional view depicting the spout included in the spout-equipped container according to the second embodiment of this invention along a height direction.

Subsequently, an example of procedure of assembling the spout 1012 is described based on FIG. 24 to FIG. 26. FIG. 24 is a perspective view of the spout base, the opening element, and the activating body included in the spout-equipped container according to the second embodiment of this invention when arranged in order of assembling and viewed from a bottom side. FIG. 25 is a perspective view when arranged in order in a direction of fixing a heat sealed sheet to the spout-equipped container according to the second embodiment of this invention and viewed from a bottom side. FIG. 26 is a sectional view depicting the spout included in the spout-equipped container according to the second embodiment of this invention along a height direction.

First, in a planar view, the activating body 1080 fits from an upper surface side of the spout base 1020 (upper surface side of the cylindrical portion 1024) so that the center of the activating body 1080 and the center of the cylindrical portion 1024 of the spout base 1020 are concentric with each other.

Then, the upper end of the right male screw unit 1032 (that is, the terminating portion of the right male screw unit 1032) formed on the outer surface of the upper portion (cylindrical portion 1024) of the spout base 1020 abuts on the lower end of the right female screw unit 1088 (that is, the starting end of the right female screw unit 1088) formed on the inner surface of the activating body 1080.

From here, by rotating the activating body 1080 rightward (clockwise) in a planar view, the right female screw unit 1088 and the right male screw unit 1032 are screwed. With this, the activating body 1080 proceeds downward of the spout base 1020.

When the right female screw unit 1088 and the right male screw unit 1032 are being screwed to cause the activating body 1080 to proceed downward, the rotation stopping units 1098 provided to protrude on the inner surface of the side wall of the tamper evidence 1084 abut on the guide surfaces 1042a of the rotation stopping units 1042 provided to protrude on the outer surface of the spout base 1020. Here, as described above, when the spout base 1020 is viewed at right turn (clockwise) in a planar view, the guide surface 1042a is tilted so as to have a dimension in a radial direction increasing from an end edge appearing first toward an end edge appearing later. With the rotation stopping units 1042 of the spout base 1020 having this shape, the rotation stopping units 1098 of the tamper evidence 1084 easily get over the guide surfaces 1042a of the rotation stopping units 1042 of the spout base 1020. Therefore, the tamper evidence 1084 (activating body 1080) can continuously rotate at right turn (clockwise).

The activating body 1080 is rotated rightward (clockwise) until the inner surface of the top portion 1090 of the activating body 1080 and the upper end of the spout base 1020 abut or approximately abut on each other, thereby proceeding downward. When the activating body 1080 is screwed till the end, the lower end of the cap 1082 is positioned near an upper portion of the protrusion 1040 of the spout base 1020, and the tamper evidence 1084 is positioned at a height approximately equal to the rotation stopping units 1042 of the spout base 1020. That is, the inner surface of the skirt 1092 of the cap 1082 faces the outer surface above the protrusion 1040 of the spout base 1020, and the inner surface of the tamper evidence 1084 faces the outer surface of the rotation stopping units 1042 of the spout base 1020. In this manner, the activating body 1080 is screwed into the upper portion of the spout base 1020.

Next, the opening element 1050 is inserted from an inner opening 1030 side of the through hole 1026 of the spout base 1020 (that is, a bottom surface side of the spout base 1020) so that the center of the opening-element accommodating unit 1044 of the spout base 1020 and the center of the opening element 1050 are concentric with each other in a planar view. Here, the opening element 1050 is inserted into the through hole 1026 from the upper end of the passive shaft unit 1054.

Here, the opening element 1050 is inserted into the through hole 1026 of the spout base 1020 so that the rotation stop male unit 1312 formed on the spout base 1020 is at a position shifted from the rotation stop female unit 1362 formed on the opening element 1050 by approximately 300.degree. in a planar view. Here, the rotation stop male unit 1312 formed on the spout base 1020 is at a position approximately equal to the notch portion 1380 formed in the opening element 1050.

When the opening element 1050 is inserted into the through hole 1050 of the spout base 1020 until a left-and-right-direction extending portion 1360a formed on the opening element 1050 abuts on the tip of the rotation stop male unit 1312 of the spout base 1020, the piercer element 1052 of the opening element 1050 is completely accommodated in the opening-element accommodating unit 1044 of the spout base 1020. Here, the upper surface of the piercer element 1052 and the upper wall of the opening-element accommodating unit 1044 in contact with or are positioned closely to each other, and the bottom surface of the piercer element 1052 (that is, the bottom surface of the opening element 1050) and the bottom surface of the opening-element accommodating unit 1044 (that is, the bottom surface of the spout base 1020) are at an approximately same height. Also, here, in the opening element 1050, its passive shaft unit 1054 extends inside the cylindrical portion 1024 of the spout base 1020 (that is, above the opening-element accommodating unit 1044 of the through hole 1026). Note that the center of the passive shaft unit 1054 of the opening element 1050 and the center of the cylindrical portion 1024 of the spout base 1020 are concentric with each other in a planar view. Furthermore, here, the surfaces appearing first of the three wing portions 1390 provided to protrude on the outer surface of the passive shaft unit 1054 of the opening element 1050 when viewed at left turn (counterclockwise) in a planar view face the ends appearing first of the three wing pressing units 1086 formed so as to extend downward from the top portion 1090 of the activating body 1080 when viewed at left turn (counterclockwise) in a planar view.

In the above-described manner, the activating body 1080 is screwed to the upper portion of the spout base 1020, and the opening element 1050 is inserted into the through hole 1026 of the spout base 1020, thereby assembling the spout 1012. Then, the heat sealed sheet 1014 is fixed to the bottom surface of the spout 1012 (that is, the bottom surface of the spout base 1020). Here, the heat sealed sheet 1014 is fixed so as to hermetically seal the inner opening 1030 of the through hole 1026. Note that the structure of the heat sealed sheet 1014 is similar to the embodiment described above, and therefore similar description is not repeated herein. Then, the spout 1012 with the heat sealed sheet 1014 fixed to its bottom surface is attached to the container 10. In thus obtained spout-equipped container 10, the accommodating part 200 of the container 10 and the through hole 1026 formed in the spout 1012 are shielded by the heat sealed sheet 1014. Therefore, it is possible to prevent hydrogen accommodated in the accommodating part 200 of the container 10 from leaking from the through hole 1026 of the attachment portion 1022 and the spout 1012.

Figure 27A:
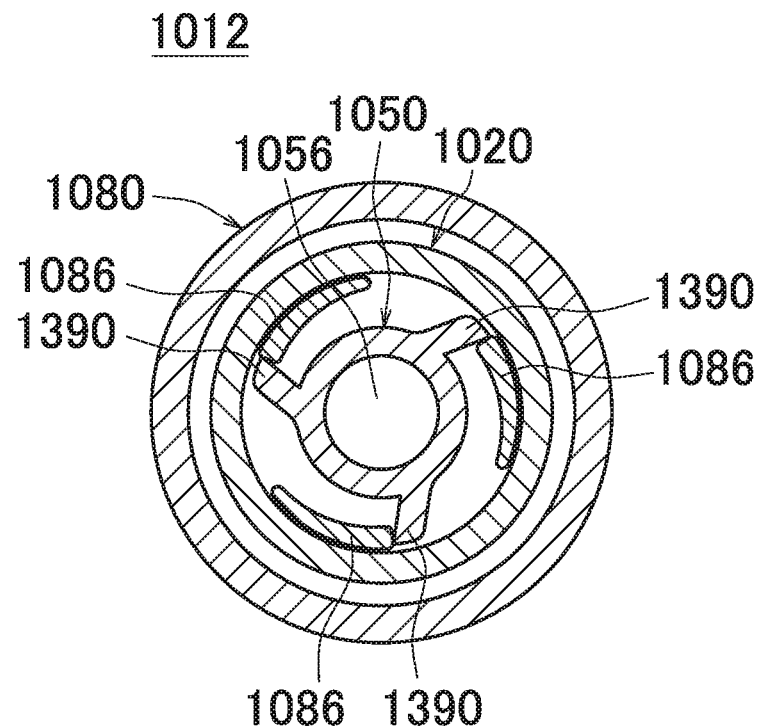
FIGS. 27A and 27B depict diagrams depicting the spout included in the spout-equipped container according to the second embodiment of this invention, FIG. 27A being an end face view along XXVII-XXVII of FIG. 26 and FIG. 27B being a schematic view depicting a relation between wing pressing units and wing portions when the activating body is rotated leftward.
Figure 27B:
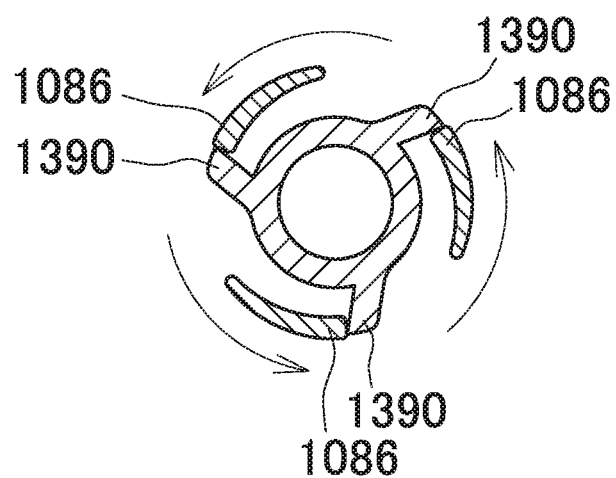
Figure 28A:
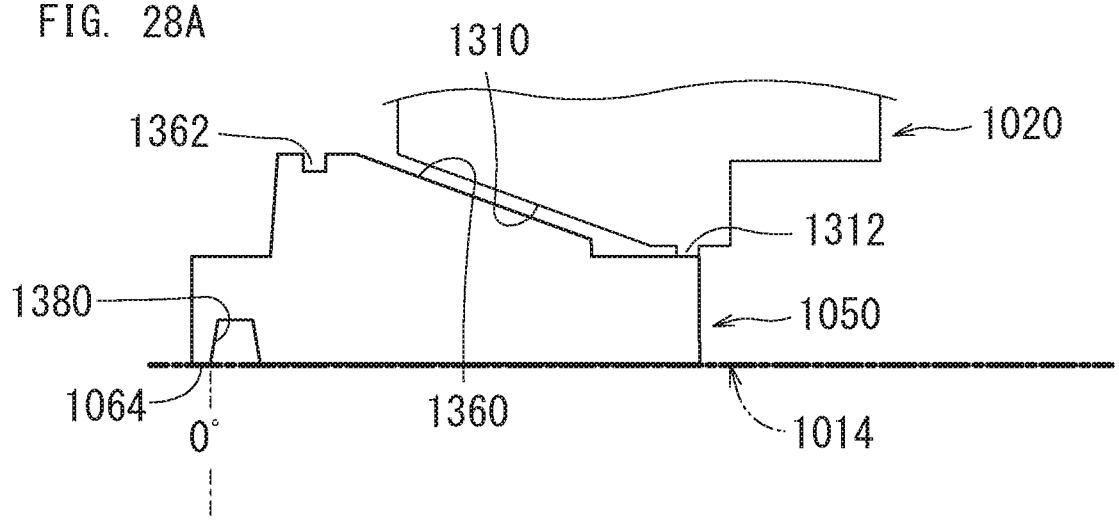
FIGS. 28A, 28B, and 28C depict schematic development views depicting a state in which a left female screw unit of the spout base and a left male screw unit of the opening element included in the spout-equipped container according to the second embodiment of this invention are screwed together, FIG. 28A being a diagram at a rotation angle of 0.degree., FIG. 28B being a diagram at a rotation angle of 150.degree., and FIG. 28C being a diagram at a rotation angle of 300.degree..
Figure 28B:
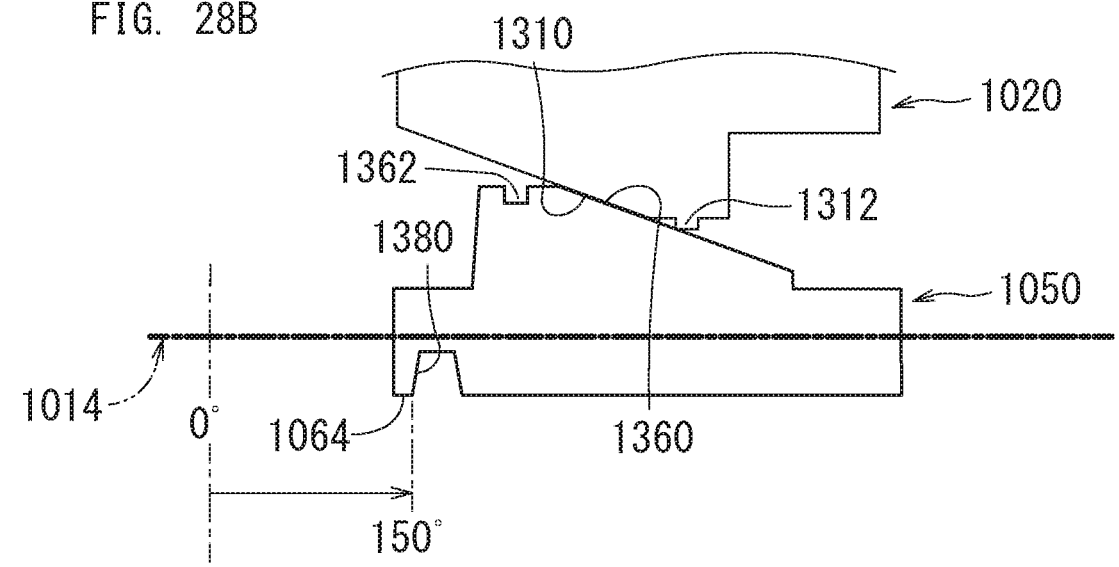
Figure 28C:
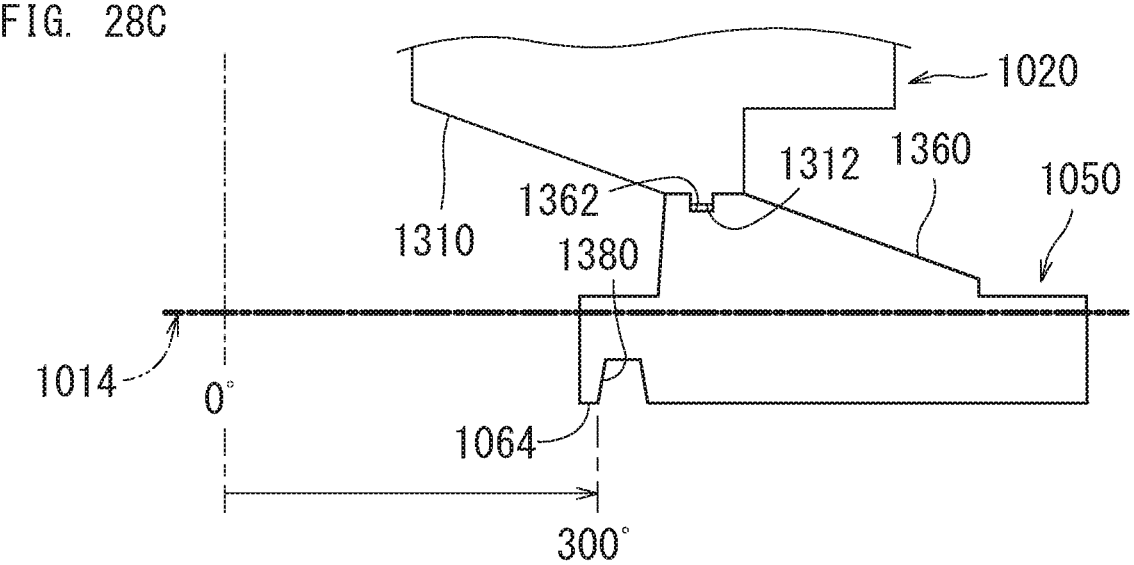
Figure 29A:
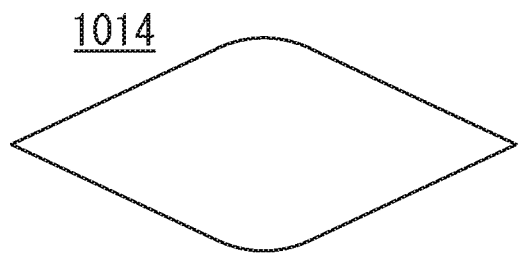
FIGS. 29A, 29B, and 29C depict schematic plan views depicting a state in which part of the heat sealed sheet included in the spout-equipped container according to the second embodiment of this invention is torn, FIG. 29A being a diagram at a rotation angle of 0.degree., FIG. 29B being a diagram at a rotation angle of 150.degree., and FIG. 29C being a diagram at a rotation angle of 300.degree..
Figure 29B:
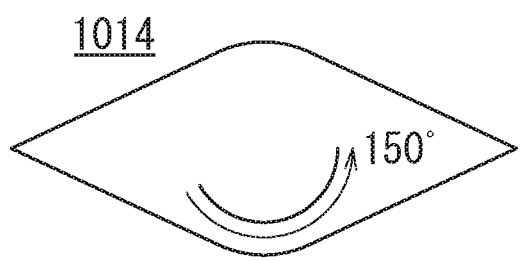
Figure 29C:
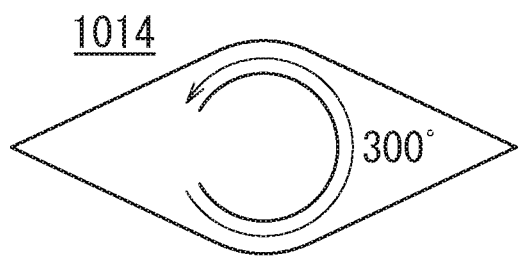
Figure 30:
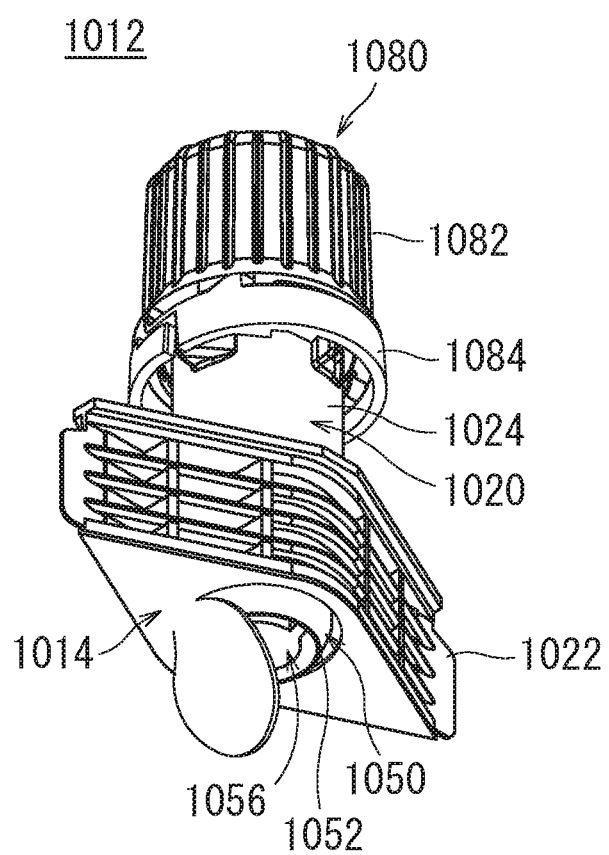
FIG. 30 is a perspective view of a state in which part of the heat sealed sheet included in the spout-equipped container according to the second embodiment of this invention is torn when viewed from a bottom side.
Figure 31:
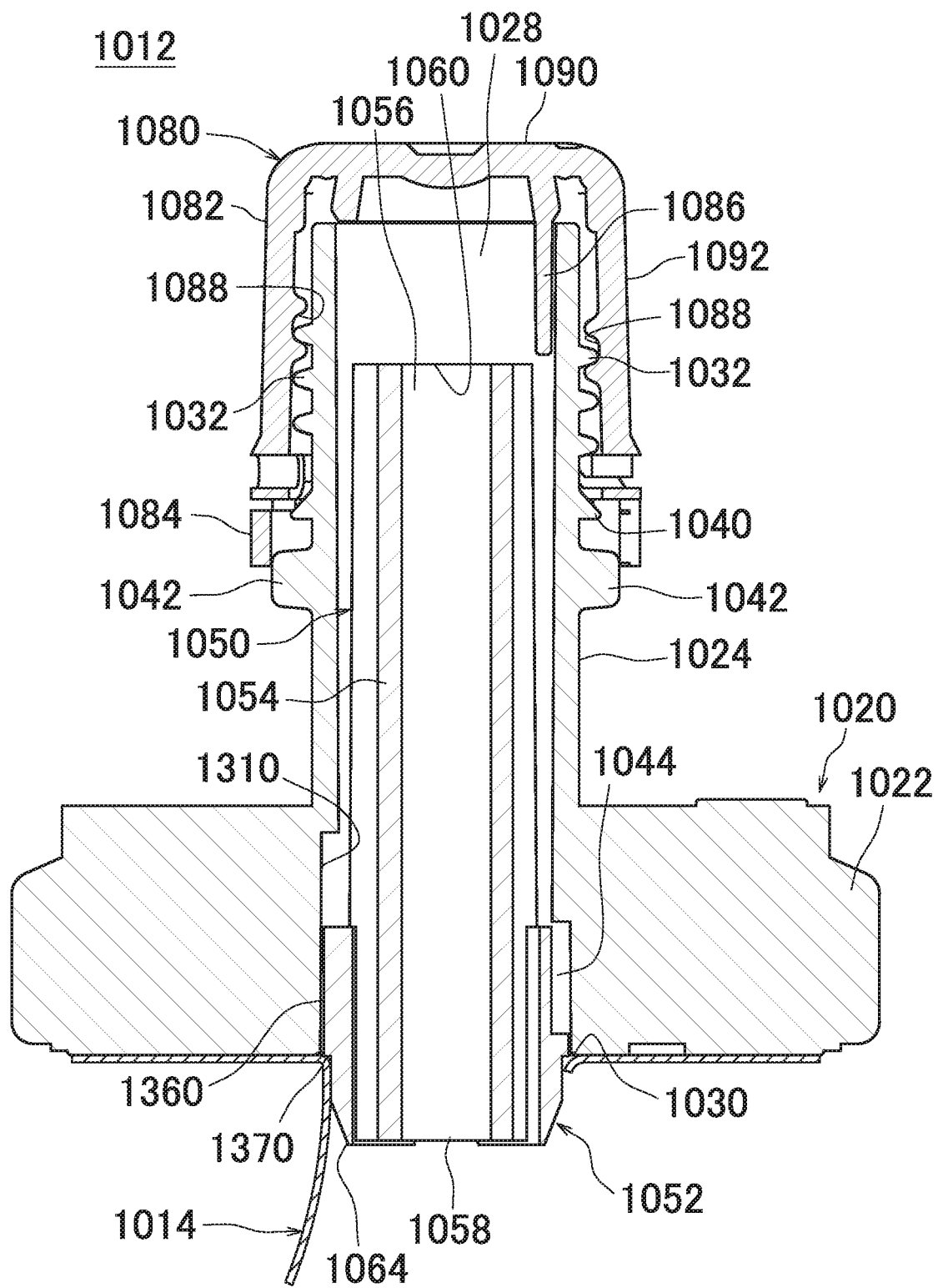
FIG. 31 is a vertical sectional view depicting a state in which part of the heat sealed sheet included in the spout-equipped container according to the second embodiment of this invention is torn.
Figure 32:
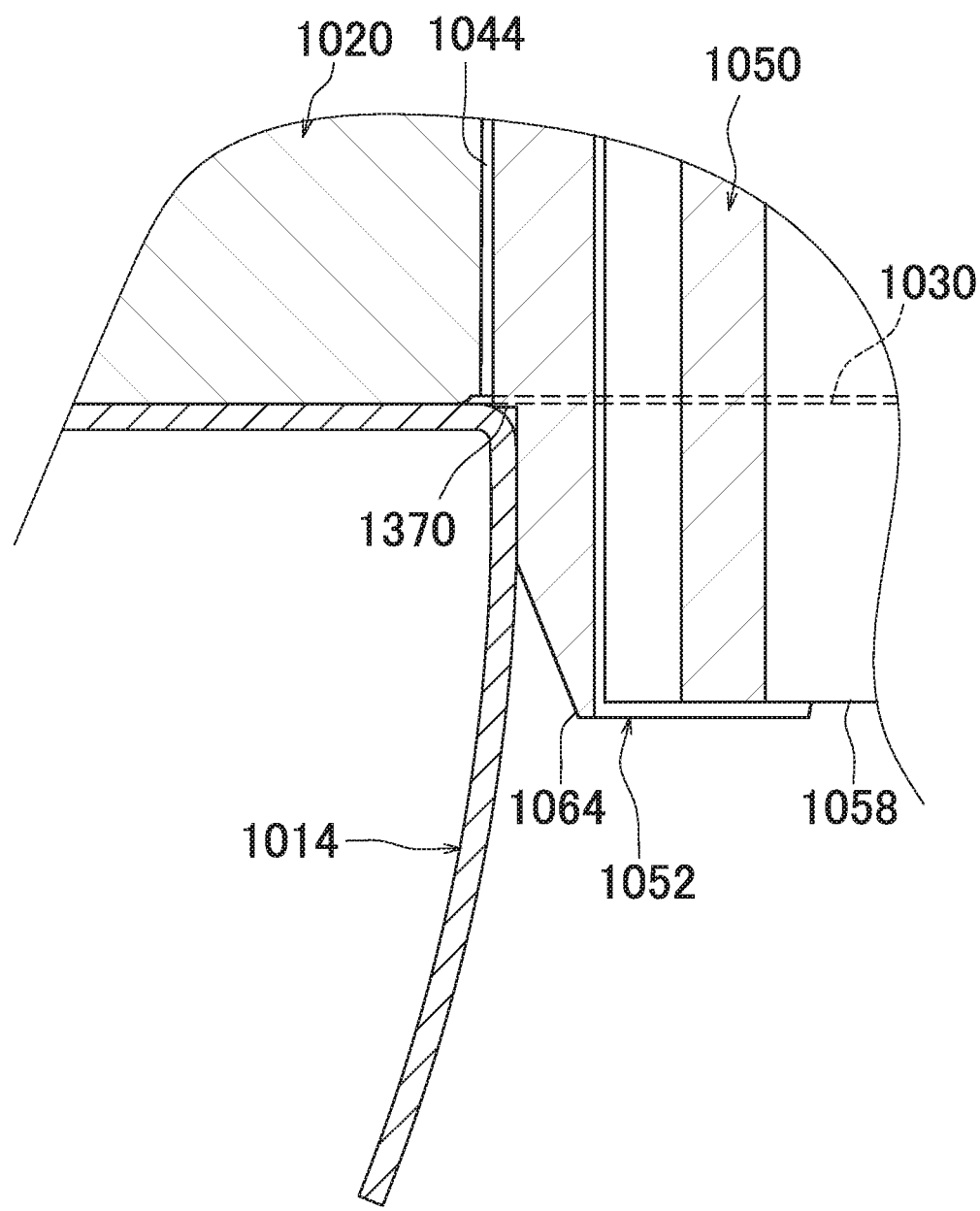
FIG. 32 is a sectional view of a portion near a flange portion of FIG. 19 depicting the spout base according to the second embodiment of this invention.

Subsequently, description is made to an example of a mode in which the accommodating part 200 of the container 10 and the through hole 1026 formed in the spout 1012 connect with each other by tearing part of the heat sealed sheet 1014 to allow hydrogen water to be drunk, based on FIG. 27 to FIG. 32. FIG. 27 depicts diagrams depicting the spout included in the spout-equipped container according to the second embodiment of this invention, (A) being an end face view along XXVII-XXVII of FIG. 26 and (B) being a schematic view depicting a relation between wing pressing units and wing portions when the activating body is rotated leftward. FIG. 28 depicts schematic development views depicting a state in which a left female screw unit of the spout base and a left male screw unit of the opening element included in the spout-equipped container according to the second embodiment of this invention are screwed together, (A) being a diagram at a rotation angle of 0.degree., (B) being a diagram at a rotation angle of 150.degree., and (C) being a diagram at a rotation angle of 300.degree.. FIG. 29 depicts schematic plan views depicting a state in which part of the heat sealed sheet included in the spout-equipped container according to the second embodiment of this invention is torn, (A) being a diagram at a rotation angle of 0.degree., (B) being a diagram at a rotation angle of 150.degree., and (C) being a diagram at a rotation angle of 300.degree.. FIG. 30 is a perspective view of a state in which part of the heat sealed sheet included in the spout-equipped container according to the second embodiment of this invention is torn when viewed from a bottom side. FIG. 31 is a vertical sectional view depicting a state in which part of the heat sealed sheet included in the spout-equipped container according to the second embodiment of this invention is torn. FIG. 32 is a sectional view of a portion near a flange portion of FIG. 19 depicting the spout base according to the second embodiment of this invention.

The activating body 1080 is rotated leftward (counterclockwise) in a planar view by holding its skirt 1092 (rotated in a communication rotating direction), and the activating body 1080 is moved upward (first direction). With this, coupling of the four upper-surface preliminary coupling units 1412 of the tamper evidence 1084 and the lower end of the cap 1082 is fractured. Also, simultaneously with this, the rotation stopping units 1098 provided to protrude on the inner surface of the side wall of the tamper evidence 1084 each abut on the tamper evident ring surface 1042b of the rotation stopping unit 1042 provided to protrude on the outer surface of the spout base 1020 to try to get over this. Here, since the inner diameter of the tamper evidence 1084 is spread by the rotation stopping units 1042 of the spout base 1020, the four side-surface preliminary coupling units 1414 preliminarily coupling the tamper evidence 1084 in the circumferential direction are also fractured. Note that the two coupling units 1410 in a substantially L shape in a planar view of the tamper evidence 1084 are warped in a direction in which the inner diameter of the tamper evidence 1084 is spread, and the state of coupling with the lower end of the cap 1082 is kept.

When the coupling of the upper-surface preliminary coupling units 1412 and the side-surface preliminary coupling units 1414 of the tamper evidence 1084 is fractured, it becomes clear that the hermetically-sealed cap 1082 has been tampered. With this, safety can be ensured. Furthermore, even if the coupling of the upper-surface preliminary coupling units 1412 and the side-surface preliminary coupling units 1414 is fractured, the tamper evidence 1084 keeps a state in which the coupling unit 1410 is coupled to the lower end of the cap 1082. That is, since the state is such that the cap 1082 and the tamper evidence 1084 are always coupled together by the coupling unit 1410, operability at the time of opening and closing the spout 1012 is favorable.

As described above, by rotating the activating body 1080 leftward (counterclockwise) in a planar view for movement upward (first direction), the coupling of the upper-surface preliminary coupling units 1412 and the side-surface preliminary coupling units 1414 is fractured. Simultaneously with this, an end appearing first at left turn (counterclockwise) in a planar view of each of the three wing pressing units 1086 formed so as to extend downward from the top portion 1090 of the activating body 1080 abuts on a surface appearing first at left turn (counterclockwise) of each of the three wing portions 1390 provided to protrude on the outer surface of the passive shaft unit 1054 of the opening element 1050, and presses the surface forward as sliding thereon. With this, the opening element 1050 inserted in the spout base 1020 is also rotated leftward (counterclockwise) in a planar view.

When the opening element 1050 is rotated leftward (counterclockwise) in a planar view, the step 1360 as the left male screw unit formed on the lower portion of the outer surface is guided and screwed by the step 1310 as the left female screw unit formed on the inner wall of the spout base 1020 to proceed downward (second direction). That is, the opening element 1050 moves in a downward direction (second direction) opposite to the upper direction (first direction) in which the activating body 1080 moves.

In an initial state, the opening element 1050 has a height of the bottom surface equal to the height of the bottom surface of the spout base 1020 (that is, the height of the inner opening 1030 of the through hole 1026). Form this initial state, when the opening element 1050 moves downward by being rotated leftward (counterclockwise) in a planar view, the piercer element 1052 formed at the lower end protrudes from the bottom surface of the spout base 1020. Here, the notch portion 1380 formed at the lower end of the piercer element 1052 tears the heat sealed sheet 1014 fixed to the bottom surface of the spout base 1020 so as to draw a circle as rotating.

An operation mode here at will be shown in FIG. 28 and FIG. 29.

When the opening element 1050 rotates leftward from the initial state at an angle of 300.degree., the opening element 1050 moves downward to cause the wing pressing units 1086 and the wing portions 1390 not to be in contact with each other, thereby stopping the rotation of the opening element 1050 and causing the rotation stop male unit 1312 formed near a start end of the step 1310 of the spout base 1020 to fit in the rotation stop female unit 1362 formed near a termination end of the step 1360. With this, the rotation of the opening element 1050 is regulated in a state of being rotated leftward (counterclockwise) at an angle of 300.degree. from the initial state, and cannot move also in the vertical direction.

In this manner, by rotating the opening element 1050 leftward (counterclockwise) by 300.degree., part of the heat sealed sheet 1014 is torn, and the accommodating part 200 of the container 10 and the spout through hole 1056 of the opening element 1050 (and the through hole 1026 of the spout base 1020) connect with each other. Note that the heat sealed sheet 1014 is torn only by 300.degree., as described above. That is, since the remaining 60.degree. portion of the heat sealed sheet 1014 is still linked to the other portion, the state is such that a circular chip droops with respect to the other portion of the heat sealed sheet 1014. Therefore, since no chip falls down to the accommodating part 200 of the container 10, it is possible to erroneously swallow a chip. Note that while the opening element 1050 is rotated leftward by 300.degree. in the above description, this is not restrictive, and with rotation at another angle smaller than a central angle of 360.degree., the state may be such that a portion obtained by tearing the heat sealed sheet 1014 and other portion may be linked together.

The piercer element 1052 is formed so as to have a dimension in the radial direction increasing upward from the lower end. Therefore, in the heat sealed sheet 1014, the dimension in the radial direction of the circularly-torn portion is spread by the outer surface of the piercer element 1052 as the opening element 1050 proceeds downward, and is gradually increased. Then, after the opening element 1050 is rotated leftward (counterclockwise) at an angle of 300.degree., the state is such that the bottom surface of the flange portion 1370 of the opening element 1050 is mounted on an outer edge of the circularly-torn portion on the upper surface (inner surface) of the heat sealed sheet 1014. Thereby, it is possible to prevent the opening element 1050 from falling down to the accommodating part 200 of the container 10.

As described above, by rotating the activating body 1080 leftward (counterclockwise) in a planar view, the activating body 1080 moves upward. With this, preliminary coupling of the tamper evidence 1084 is fractured, and it becomes clear that the hermetically-sealed cap 1082 has been tampered. Also, simultaneously with this, the opening element 1050 moves downward as rotating leftward (counterclockwise) in a planar view. With this, part of the heat sealed sheet 1014 is torn, and the accommodating part 200 of the container 10 and the through hole 1026 of the spout base 1020 (the spout through hole 1056 of the opening element 1050) connect with each other. Here, the state is such that the activating body 1080 is rotated leftward (counterclockwise) at a central angle of approximately 300.degree.. From here, by further rotating the activating body 1080 leftward (counterclockwise) in a planar view, the activating body 1080 is moved upward, the screwed state between the right female screw unit 1088 formed on the inner surface of the activating body 1080 and the right male screw unit 1032 formed on the outer surface of the spout base 1020 is released, and the activating body 1080 is removed from the spout base 1020. In this manner, the outlet 1060 of the spout through hole 1056 formed in the opening element 1050 (and the outer opening 1028 formed in the spout base 1020) are opened.

Note that by removing the activating body 1080 from the spout base 1020 and then attaching again, the outer opening 1028 of the through hole 1026 formed in the spout base 1020 (the outlet 1060 of the spout through hole 1056 formed in the passive shaft unit 1054) can be closed, and hydrogen water can be prevented from leaking outside from the accommodating part 200 of the container 10. When the activating body 1080 covers the upper end of the spout base 1020 and is screwed at right turn in a planar view in order to be attached to the spout base 1020, the lower ends of the three wing portions 1390 formed on the activating body 1080 abut on the upper ends of the wing pressing units 1086 of the passive shaft unit 1054 inserted in the through hole 1026.

Figure 33:
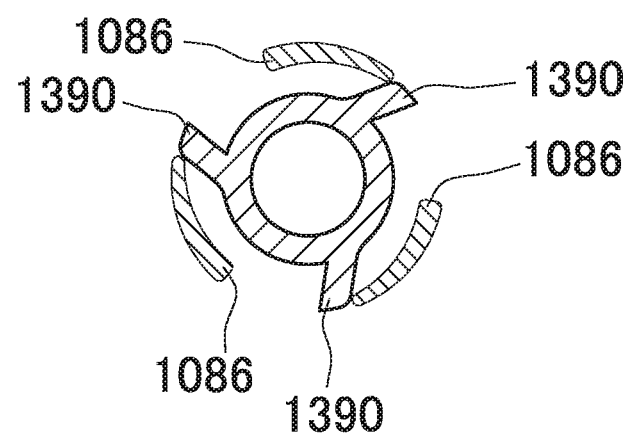
FIG. 33 depicts a schematic view depicting a relation between wing pressing units and wing portions when the activating body included in the spout-equipped container according to the second embodiment of this invention is removed from the spout base and then attached thereto again.

FIG. 33 depicts a schematic view depicting a relation between wing pressing units and wing portions when the activating body included in the spout-equipped container according to the second embodiment of this invention is removed from the spout base and then attached thereto again. As described above, the three wing portions 1390 formed on the activating body 1080 are each formed so that, in a planar view, the angle formed by the direction in which the surface appearing first when viewed at left turn (counterclockwise) protrudes and the tangential direction of the outer surface of the passive shaft unit 1054 is smaller than the angle formed by the direction in which the surface appearing later when viewed at left turn protrudes and the tangential direction of the outer surface of the passive shaft unit 1054. Also, as described above, the three wing pressing units 1086 formed on the activating body 1080 are each formed so that the dimension of the end appearing later in the radial direction is slightly larger than that of the end appearing first when viewed at left turn in a planar view. With the wing portions 1390 and the wing pressing units 1086 having these shapes, when they interfere with each other immediately before finishing attaching the activating body 1080, they can be deformed to escape forces.

In the spout-equipped container 10 according to this embodiment, as described above, only by rotating the activating body 1080 leftward (counterclockwise) in a planar view from the initial state for removal from the spout base 1020, it becomes clear that the hermetically-sealed cap 1082 has been tampered, and the accommodating part 200 of the container 10, the through hole 1026 of the spout base 1020 (the spout through hole 1056 of the opening element 1050) connect with one another to cause a state in which hydrogen water is drinkable. Therefore, since no particular procedure for tearing the heat sealed sheet 1014 is required, the spout-equipped container 10 with favorable operability can be provided.

Note that in the embodiment described above, description has been made to the case in which the first internal threads and the first female screw unit are right screws (right male screw unit 1032, right female screw unit 1088) and the second male screw unit and the second external threads are left screws (step 1360 as the left male screw unit, step 1310 as the left female screw unit). However, this is not meant to be restrictive, and the first internal threads and the first female screw unit may be left screws and the second male screw unit and the second external threads may be right screws.

(Spout-Equipped Container 10 According to Third Embodiment)

Figure 34:
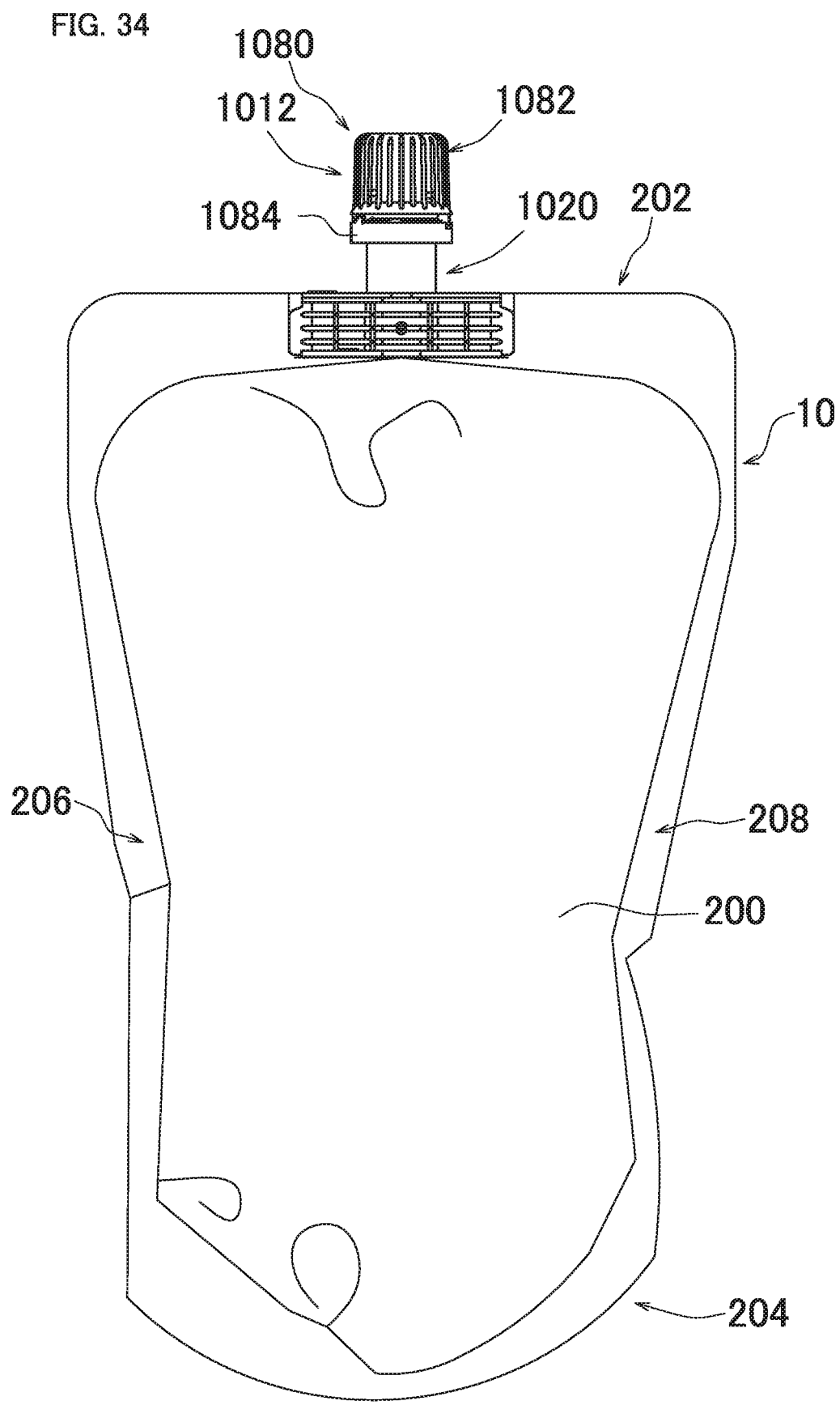
FIG. 34 is a front view depicting a spout-equipped container according to a third embodiment of this invention.
Figure 35:
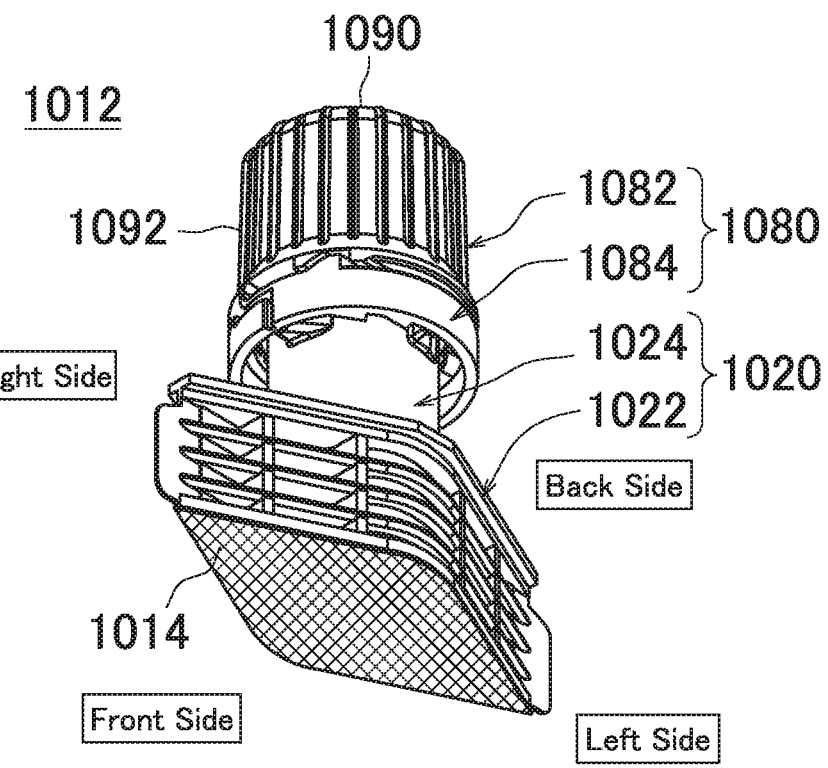
FIG. 35 is a perspective view depicting a spout included in the spout-equipped container according to the third embodiment of this invention, with its bottom surface viewable.

In the following, a spout-equipped container 10 according to a third embodiment of this invention is described with reference to FIG. 34 to FIG. 63. FIG. 34 is a front view depicting a spout-equipped container according to a third embodiment of this invention. FIG. 35 is a perspective view depicting a spout included in the spout-equipped container according to the third embodiment of this invention, with its bottom surface viewable.

The spout-equipped container 10 according to this embodiment includes a container 10 which accommodates hydrogen water and a spout base 1020 attached to the container 10, and further includes a heat sealed sheet 1014 which covers an inner opening 1030 which fronts an accommodating part 200 in the spout base 1020.

An aluminum sheet configuring the heat sealed sheet 1014 has a size approximately equal to the bottom surface of the spout base 1020.

An aluminum region of the heat sealed sheet 1014 and an aluminum region of an inner surface of the accommodating part 200 of the container 10 are in close contact with each other, and hydrogen in hydrogen water is less prone to get out of the container 10 and the spout base 1020.

The spout-equipped container 10 according to this embodiment includes a spout 1012 for spouting hydrogen water accommodated in the container 10 to the outside.

Note that the capacity of hydrogen water the spout-equipped container 10 can accommodate can be 150 ml, 300 ml, 500 ml, or the like, and is not particularly restrictive.

(Spout 1012)

The spout 1012 includes the spout base 1020, an opening element 1050, and an activating body 1080. To the bottom surface of the spout base 1020, the heat sealed sheet 1014 is fixed. The opening element 1050 is configured to be inserted into a through hole 1026 formed in the spout base 1020 to move in a vertical direction (axial direction), and is formed so as to tear part of the heat sealed sheet 1014.

The activating body 1080 is screwed to an outer opening 1028 of the through hole 1026 formed in the spout base 1020 to hermetically seal the container 10, and is also configured to be opened at the time of spouting and move the opening element 1050 in a direction of the heat sealed sheet 1014.

(Spout Base 1020)

Figure 36:
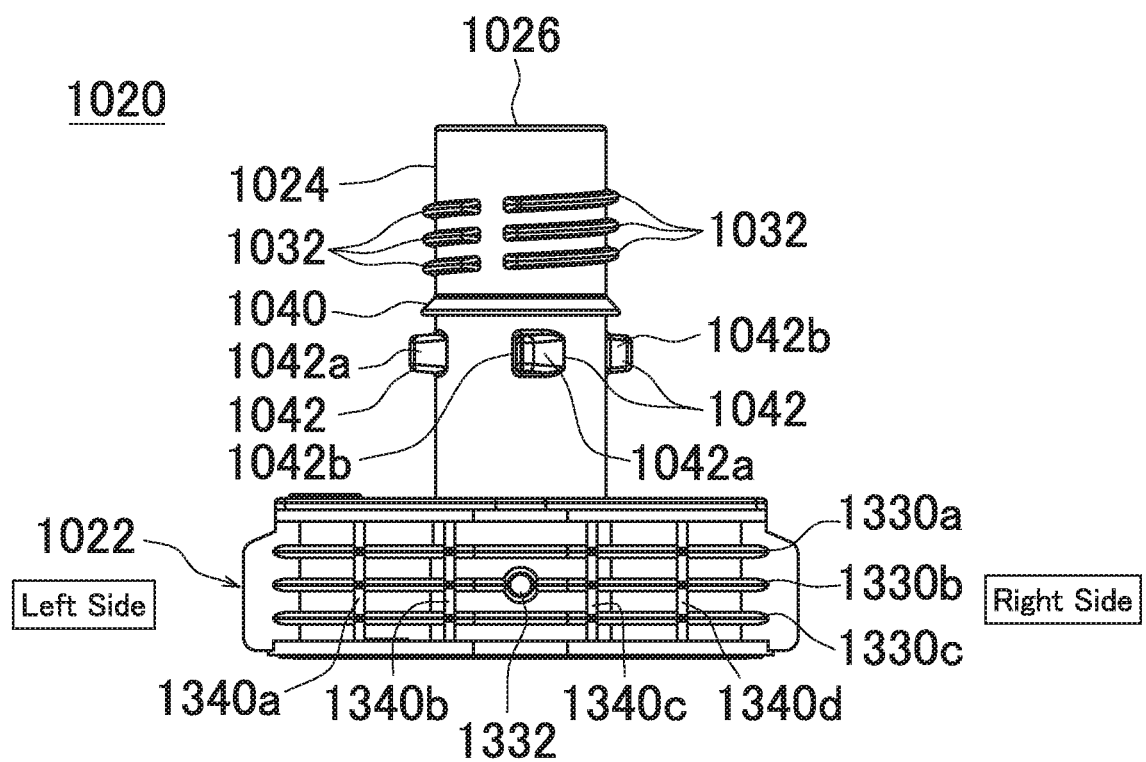
FIG. 36 is a front view depicting a spout base included in the spout-equipped container according to the third embodiment of this invention.
Figure 37A:
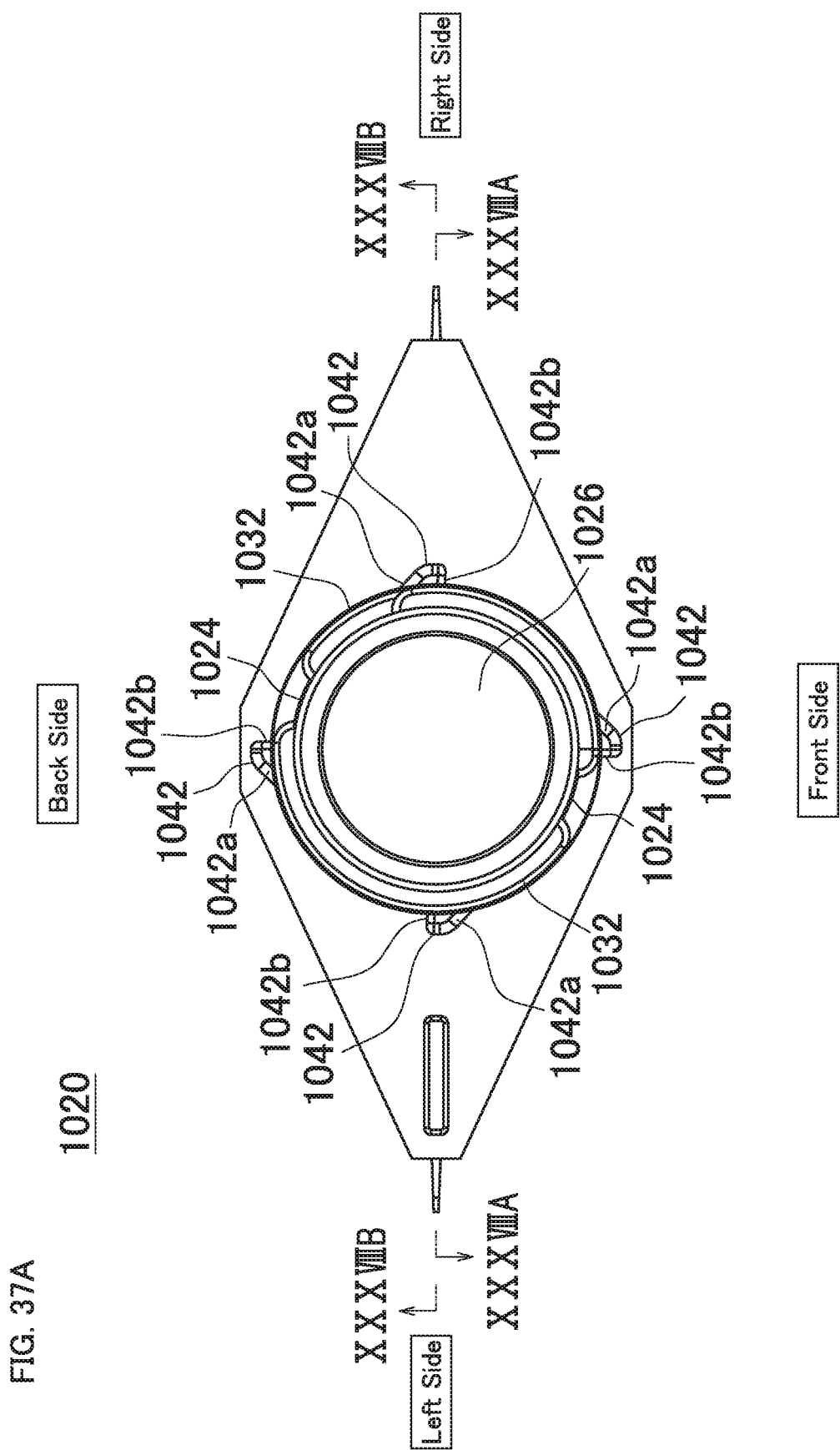
FIG. 37A is a plan view depicting the spout base included in the spout-equipped container according to the third embodiment of this invention.
Figure 37B:
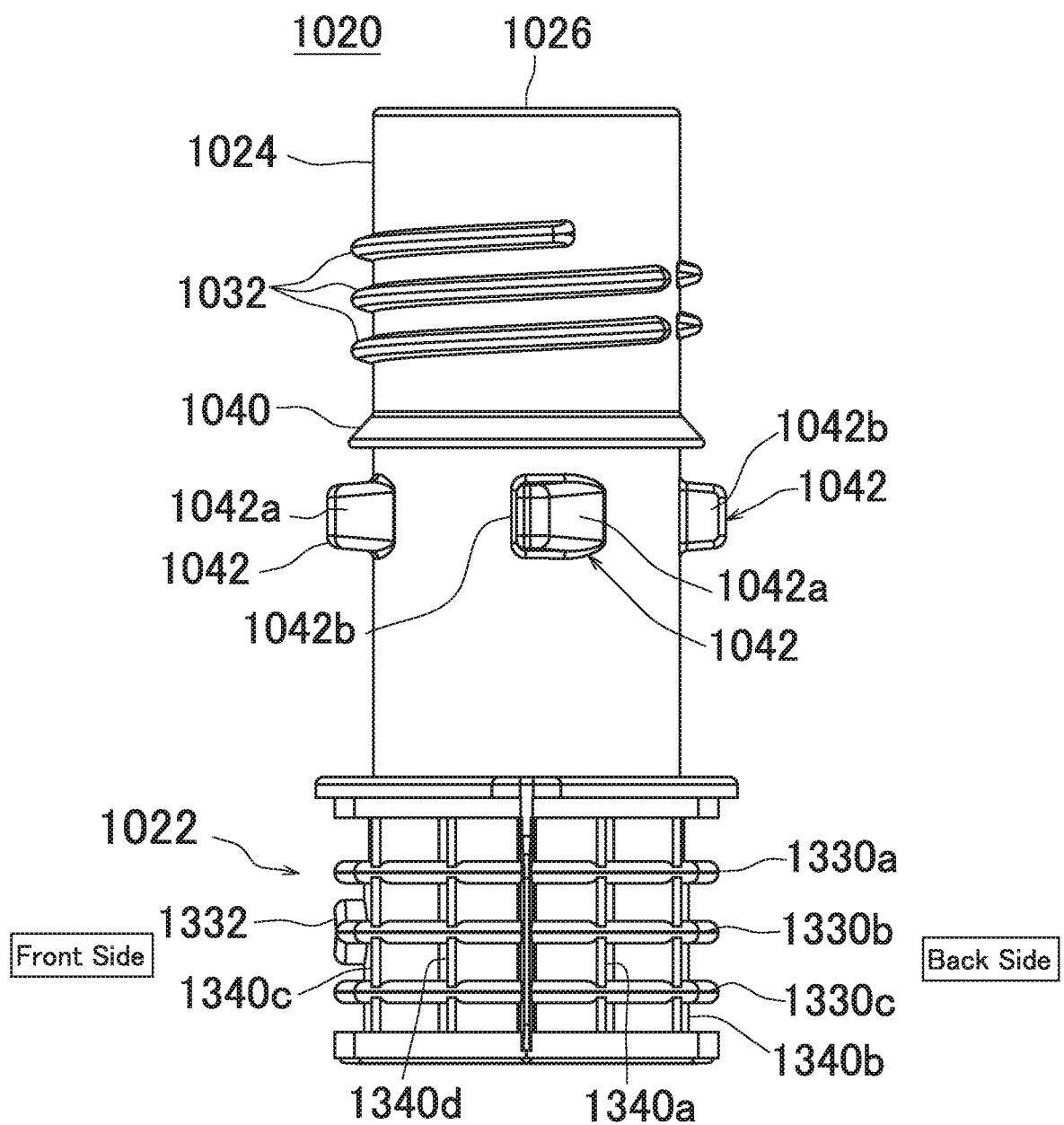
FIG. 37B is a side view depicting the spout base included in the spout-equipped container according to the third embodiment of this invention.
Figure 38A:
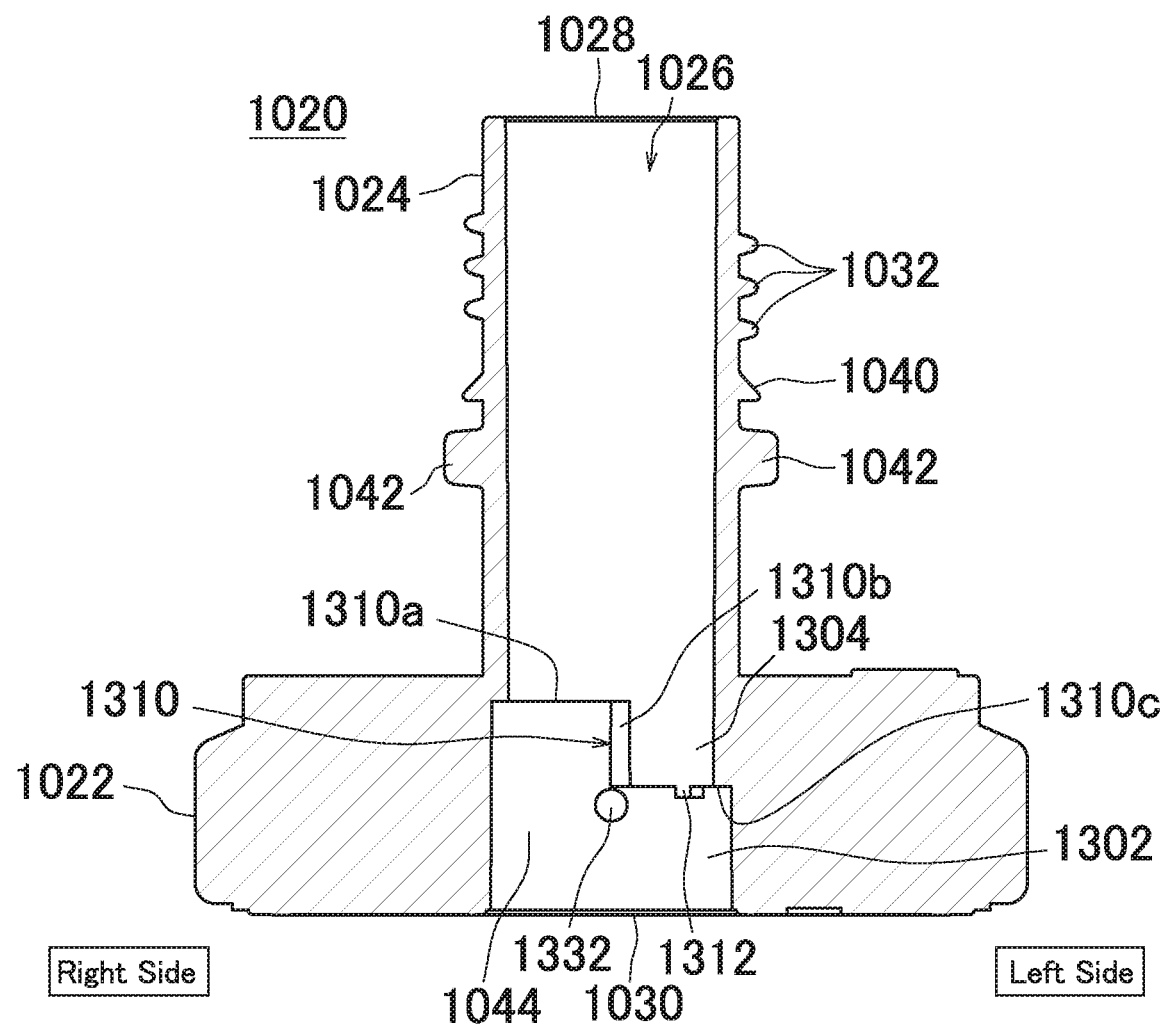
FIG. 38A is a sectional view of the spout base included in the spout-equipped container according to the third embodiment of this invention, along XXXVIIIA-XXXVIIIA shown in FIG. 37A.
Figure 38B:
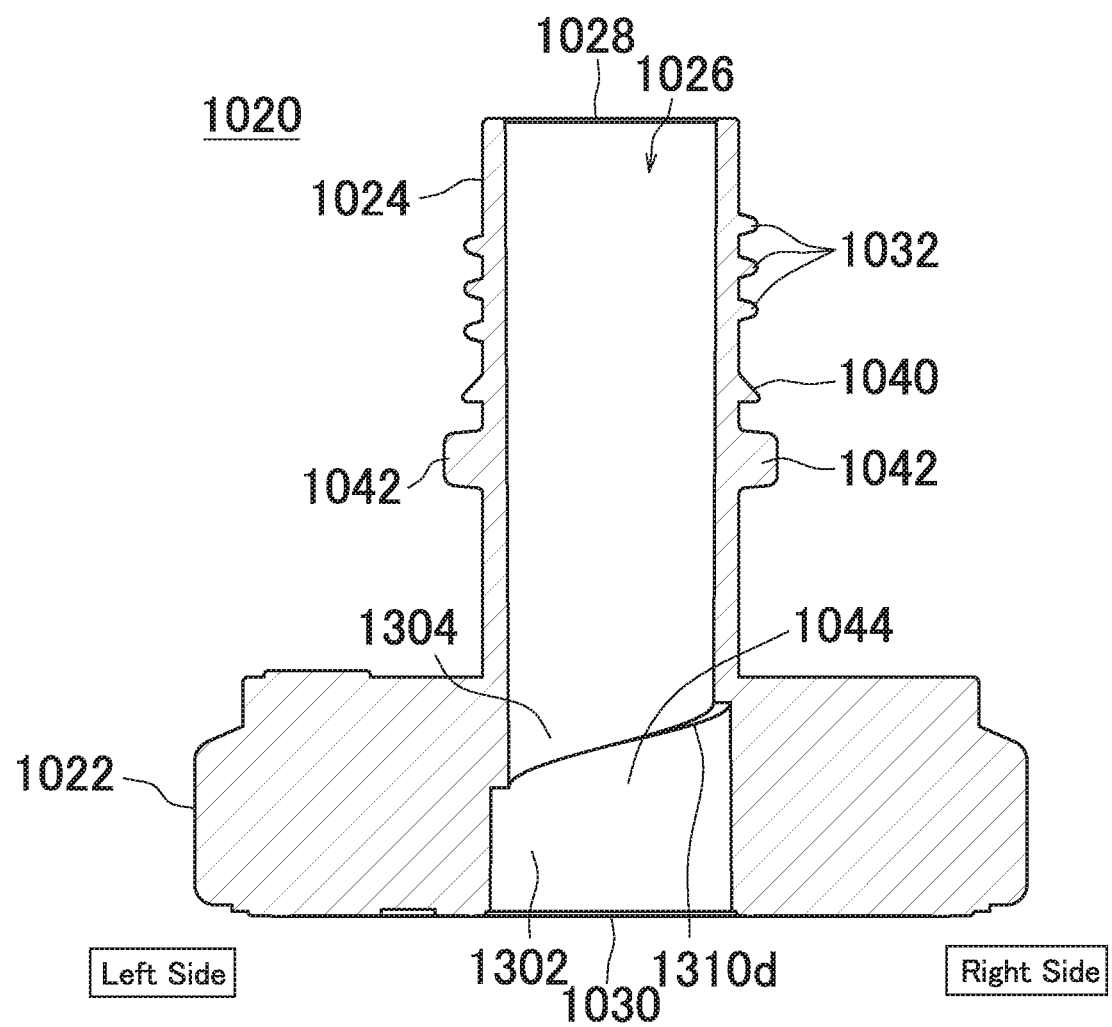
FIG. 38B is a sectional view of the spout base included in the spout-equipped container according to the third embodiment of this invention, along XXXVIIIB-XXXVIIIB shown in FIG. 37A.
Figure 39:
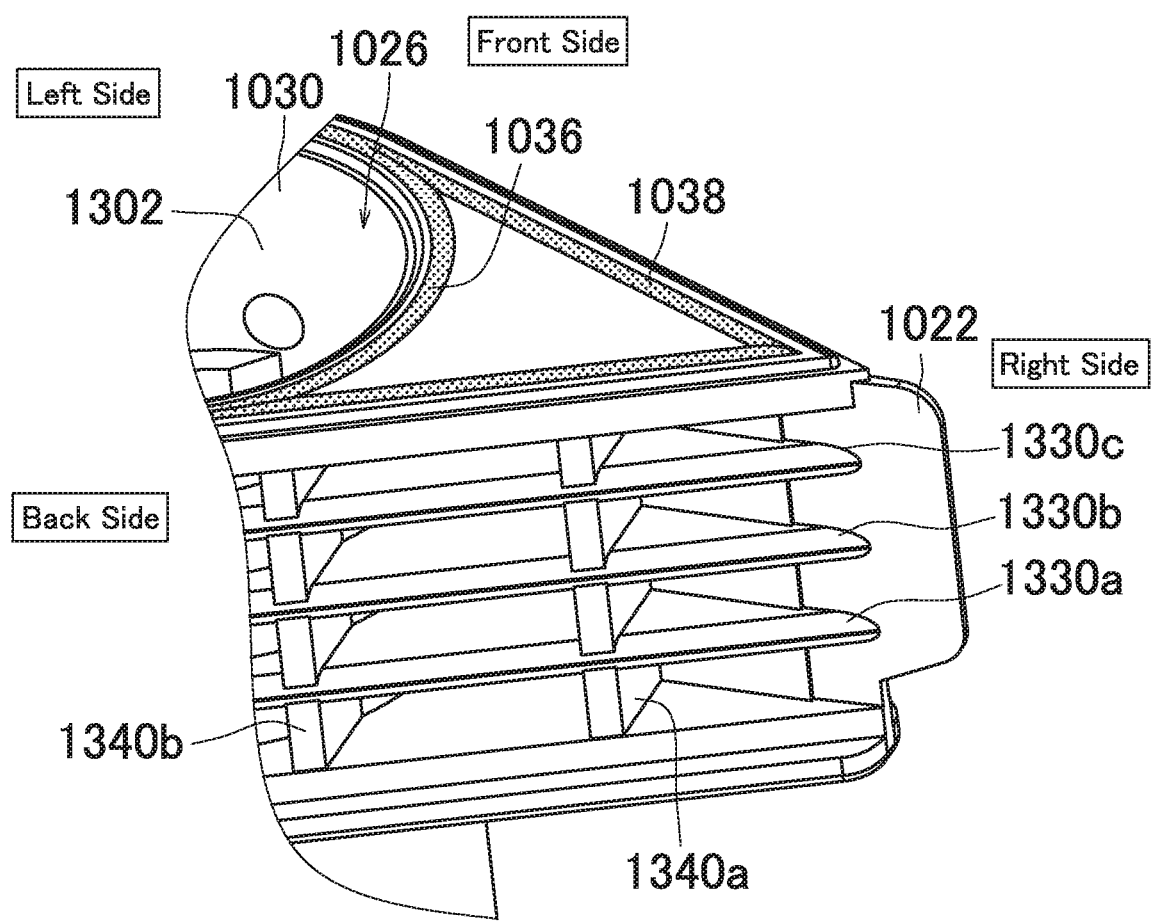
FIG. 39 is a perspective partially-enlarged view clearly depicting a first sealing ridge and a second sealing ridge, with the bottom surface of the spout base included in the spout-equipped container according to the third embodiment of this invention viewable.
Figure 40:
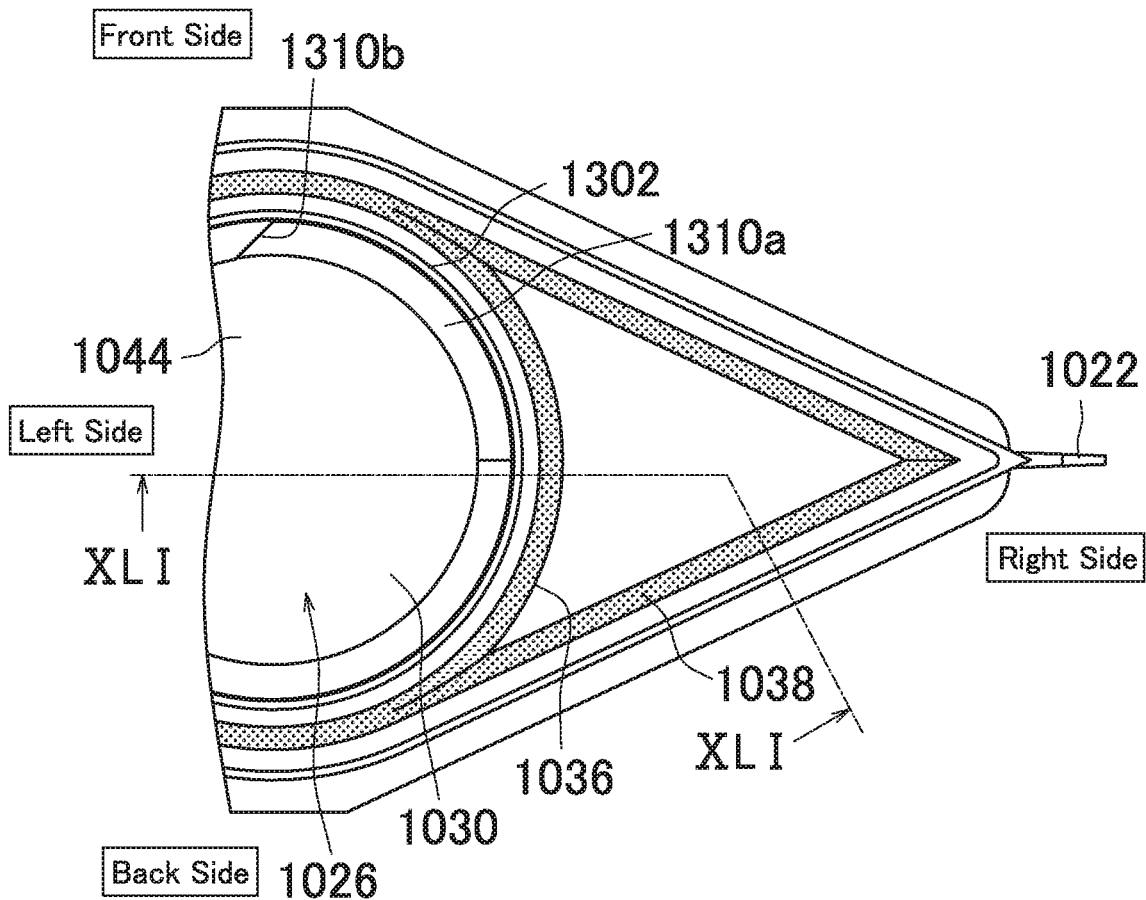
FIG. 40 is a bottom view of the spout base included in the spout-equipped container according to the third embodiment of this invention, and is a partially-enlarged view clearly depicting the first sealing ridge and the second sealing ridge.
Figure 41:
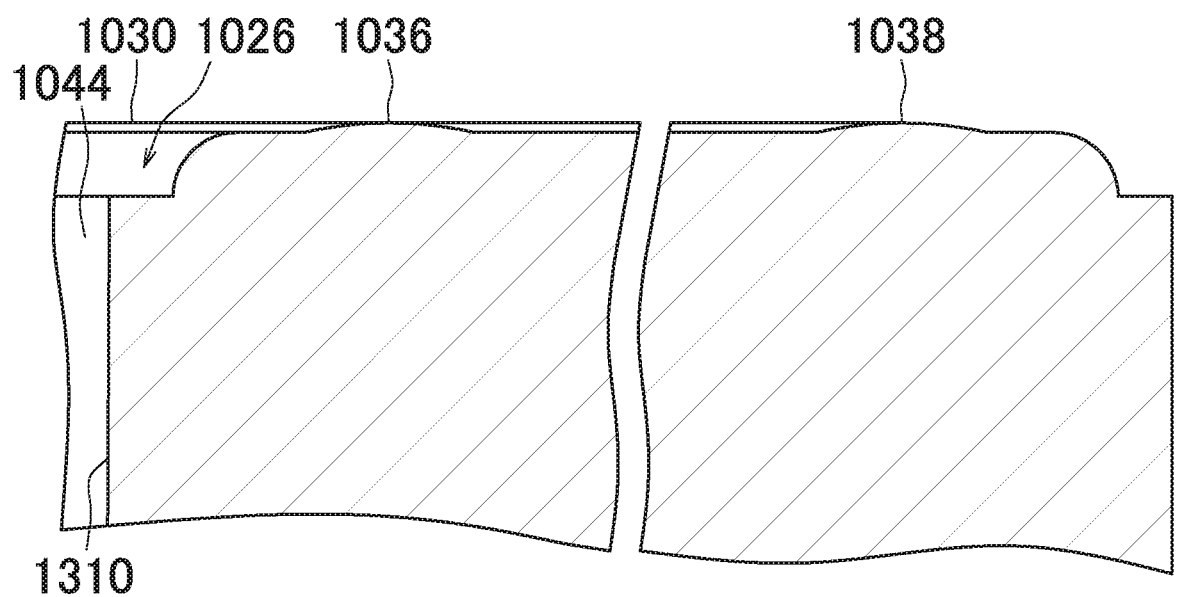
FIG. 41 is a sectional view along a height direction of the spout base included in the spout-equipped container according to the third embodiment of this invention, and is an enlarged view of the first sealing ridge and its vicinity.

The spout base included in the spout-equipped container 10 according to this embodiment is described based on FIG. 36 to FIG. 41. FIG. 36 is a front view depicting a spout base included in the spout-equipped container according to the third embodiment of this invention. FIG. 37A is a plan view depicting the spout base included in the spout-equipped container according to the third embodiment of this invention. FIG. 37B is a side view depicting the spout base included in the spout-equipped container according to the third embodiment of this invention. FIG. 37C is a bottom view depicting the spout base included in the spout-equipped container according to the third embodiment of this invention. FIG. 37D is a bottom view depicting a state in which the spout base and an opening element included in the spout-equipped container according to the third embodiment of this invention are assembled. FIG. 38A is a sectional view of the spout base included in the spout-equipped container according to the third embodiment of this invention, along XXXVIIIA-XXXVIIIA shown in FIG. 37A. FIG. 38B is a sectional view of the spout base included in the spout-equipped container according to the third embodiment of this invention, along XXXVIIIB-XXXVIIIB shown in FIG. 37A. FIG. 39 is a perspective partially-enlarged view clearly depicting a first sealing ridge and a second sealing ridge, with the bottom surface of the spout base included in the spout-equipped container according to the third embodiment of this invention viewable. FIG. 40 is a bottom view of the spout base included in the spout-equipped container according to the third embodiment of this invention, and is a partially-enlarged view clearly depicting the first sealing ridge and the second sealing ridge. FIG. 41 is a sectional view along a height direction of the spout base included in the spout-equipped container according to the third embodiment of this invention, and is an enlarged view of the first sealing ridge and its vicinity.

The spout base 1020 has an attachment portion 1022 attached to the container 10 and a cylindrical portion 1024 provided to protrude upward at a substantially center portion of an upper surface of a top portion of the attachment portion 1022 and serving as a portion where the opening element 1050 is inserted into a suction opening when hydrogen water is spouted.

The attachment portion 1022 and the cylindrical portion 1024 are integrally molded of a material, for example, synthetic resin or the like. In the spout base 1020, the through hole 1026 penetrating through a substantially center thereof in a vertical direction and having a substantially circular shape in a planar view is formed. That is, the through hole 1026 penetrates from a bottom surface of the attachment portion 1022 over an upper surface of the cylindrical portion 1024.

The through hole 1026 has the inner opening 1030 formed in the bottom surface of the attachment portion 1022 and an outer opening 1028 formed in the upper surface of the cylindrical portion 1024.

The attachment portion 1022 is attached to the container 10 so as to be interposed between an end edge of a first container sheet 1210 and an end edge of a second container sheet 1220 configuring the container 10. The attachment portion 1022 has a bottom portion having a substantially diamond shape in a planar view, side portions standing from an end edge of the bottom portion, and a top portion with a shape approximately similar to the bottom portion.

On a side portion of the attachment portion 1022 on one side, three lateral rib portions 1330a, 1330b, and 1330c, and four longitudinal rib portions 1340a, 1340b 1340c, and 1340d are provided to protrude.

The three lateral rib portions 1330a, 1330b, and 1330c linearly extend in a left-and-right direction (lateral direction). Also, the three lateral rib portion 1330a, 1330b, and 1330c are parallel to each other, and are equidistantly provided in a vertical direction.

At a substantially center of the lateral rib portion 1330b, a test-purpose hole 1332 in a substantially circular shape in a planar view is formed toward the width direction so as to penetrate to the through hole 1026 described above.

The four longitudinal rib portions 1340a, 1340b, 1340c, and 1340d linearly extend in a vertical direction (longitudinal direction). The four longitudinal rib portions 1340a, 1340b, 1340c, and 1340d are parallel to each other, and are equidistantly provided in a left-and-right direction.

Note that since a side portion of the attachment portion 1022 on the other side has a structure similar to the side portion on the one side except that the test-purpose hole 1332 is not formed, similar description is not repeated herein.

The test-purpose hole 1332 is provided to check a hermetically-sealing state of the spout-equipped container after the spout 1012 is assembled. The test-purpose hole 1332 is formed so that a dedicated nozzle is thrust into the test-purpose hole 1332 to inject air to measure a change in atmospheric pressure inside the spout base 1020.

With this, it can be checked whether an inlet 1058 (the inner opening 1030 of the through hole 1026 formed in the spout base 1020) of a spout through hole 1056 formed in the opening element 1050 by the heat sealed sheet 1014 is reliably hermetically sealed and whether an outlet 1060 (the outer opening 1028 of the through hole 1026) of the spout through hole 1056 is reliably hermetically sealed by the activating body 1080.

At a substantially center of the attachment portion 1022, the through hole 1026 in a substantially circular shape in a planar view is formed. The through hole 1026 formed in the attachment portion 1022 has an opening-element accommodating unit 1044 serving as a space for accommodating a piercer element 1052 of the opening element 1050. The opening-element accommodating unit 1044 has a diameter and height approximately equal to or slightly larger than the diameter and height of the piercer element 1052 of the opening element 1050. On an inner wall of the opening-element accommodating unit 1044 (that is, a lower portion of a side wall of the through hole 1026), a guide tilted surface 1310d formed as a helical tilted surface is formed. A lower end of the guide tilted surface 1310d (that is, a terminating portion of the guide tilted surface 1310d) is positioned slightly above the inner opening 1030 of the through hole 1026.

And, near this terminating portion, a rotation stop male unit 1312 in a substantially quadrangular shape in a side view is provided to protrude downward (in a second direction). The rotation stop male unit 1312 configures a rotation regulating and engaging unit of the spout base, and is formed to stop rotational motion (left rotation and right rotation in a planar view) of the opening element 1050 in a planar view and stop vertical motion of the opening element 1050 as rotating. The rotation stop male unit 1312 is in a substantially quadrangular shape in a side view.

On the bottom surface of the attachment portion 1022 of the spout base 1020 according to this embodiment, in order to securely fix the heat sealed sheet 1014, a first sealing ridge 1036 and a second sealing ridge 1038 are provided. In FIG. 39 and FIG. 40, the first sealing ridge 1036 and the second sealing ridge 1038 are illustrated in a stippling manner. As shown in a sectional view of FIG. 41, the first sealing ridge 1036 is a downward-spreading semicircular-cross-sectional low hill-like protrusion. Also, the second sealing ridge 1038 is a protrusion having a similar shape to the first sealing ridge 1036.

The first sealing ridge 1036 is provided along an outer edge of the through hole 1026 and is in a substantially circular strip-like shape in a bottom view. Note that the first sealing ridge 1036 is formed at a predetermined distance from the outer edge of the through hole 1026.

The second sealing ridge 1038 is in a linear strip-like shape provided so as to protrude along an outer edge of a bottom surface of the spout base 1014, and is in a substantially diamond shape in a bottom view. Note that the second sealing ridge 1038 is formed at a predetermined distance from the outer edge of the bottom surface of the spout base 1014.

A front end part of the second sealing ridge 1038 tangentially overlaps with a front end part of the first sealing ridge 1036. A shape in a bottom view of the above overlapping part of the second sealing ridge 1038 is similar to the shape in the bottom view of the first sealing ridge 1036. That is, a shape in the bottom view of the front end part of the second sealing ridge 1038 is curved frontward. Note that the same applies to a rear end part of the first sealing ridge 1036 and a rear end part of the second sealing ridge 1038.

The cylindrical portion 1024 is in a substantially cylindrical shape having a diameter as a suction opening and a length capable of screwing and fitting the activating body 1080. On an outer surface of the cylindrical portion 1024, a right male screw unit 1032 (first internal threads), a protrusion 1040, and rotation stopping units 1042 are provided to protrude.

The right male screw unit 1032 is formed on an upper portion on the outer surface of the cylindrical portion 1024, and configures a male unit of a screw (hereinafter referred to as a "right screw") proceeding when the screw is turned (rotated) by right rotation (clockwise) in a planar view.

The protrusion 1040 is provided over an entire circumference of the outer surface of the cylindrical portion 1024 at a lower portion of the right male screw unit 1032. The protrusion 1040 has a shape with its dimension in a radial direction gradually increasing from an upper end toward a lower end. That is, the protrusion 1040 has a shape tilted from the upper end toward the lower end. Four rotation stopping units 1042 are provided equidistantly with regard to a circumferential direction at a lower portion of the protrusion 1040.

The rotation stopping units 1042 each has a guide surface 1042a and a tamper evident ring surface 1042b. When the cylindrical portion 1024 is viewed at right turn (clockwise)

in a planar view, the guide surface 1042a is a surface which appears first, and the tamper evident ring surface 1042b is a surface which appears later. The guide surface 1042a is tilted so as to have a dimension in a radial direction increasing from an end edge appearing first toward an end edge appearing later when viewed at right turn (clockwise) in a planar view. On the other hand, the tamper evident ring surface 1042b is in a shape extending in a radial direction of the cylindrical portion 1042. That is, the rotation stopping units 1042 are each in a substantially right triangle shape in a planar view.

(Opening Element 1050)

Figure 42:
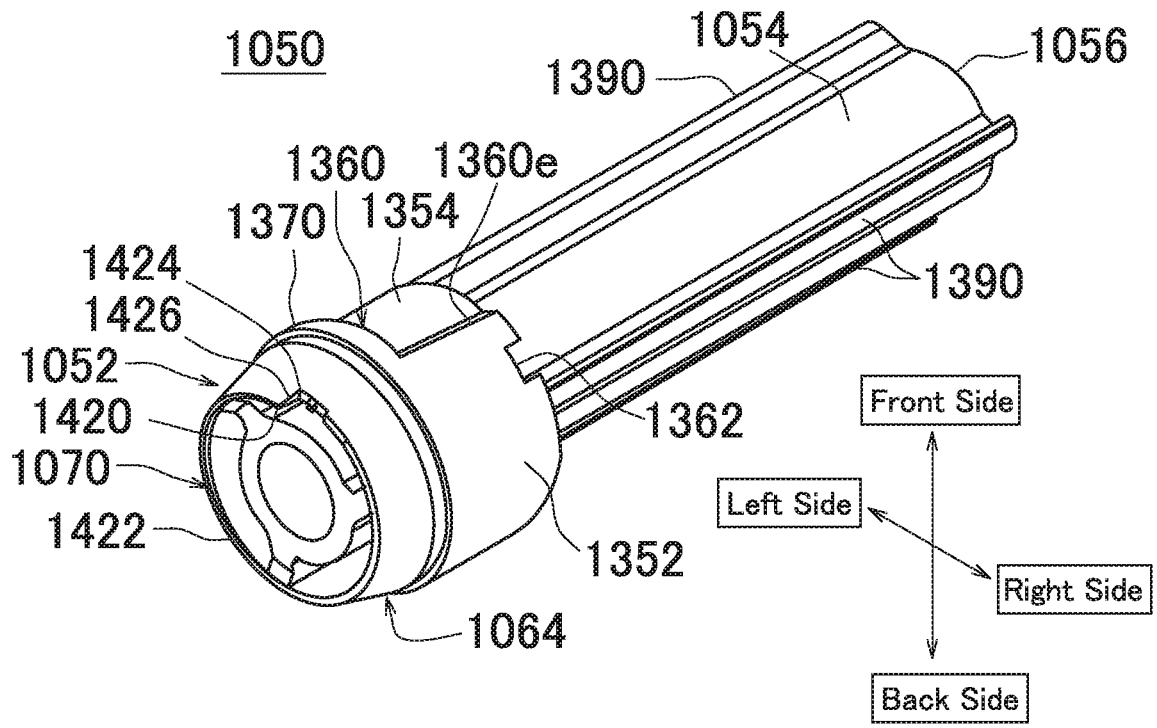
FIG. 42 is a perspective view depicting the opening element included in the spout-equipped container according to the third embodiment of this invention, with its bottom surface viewable.
Figure 43:
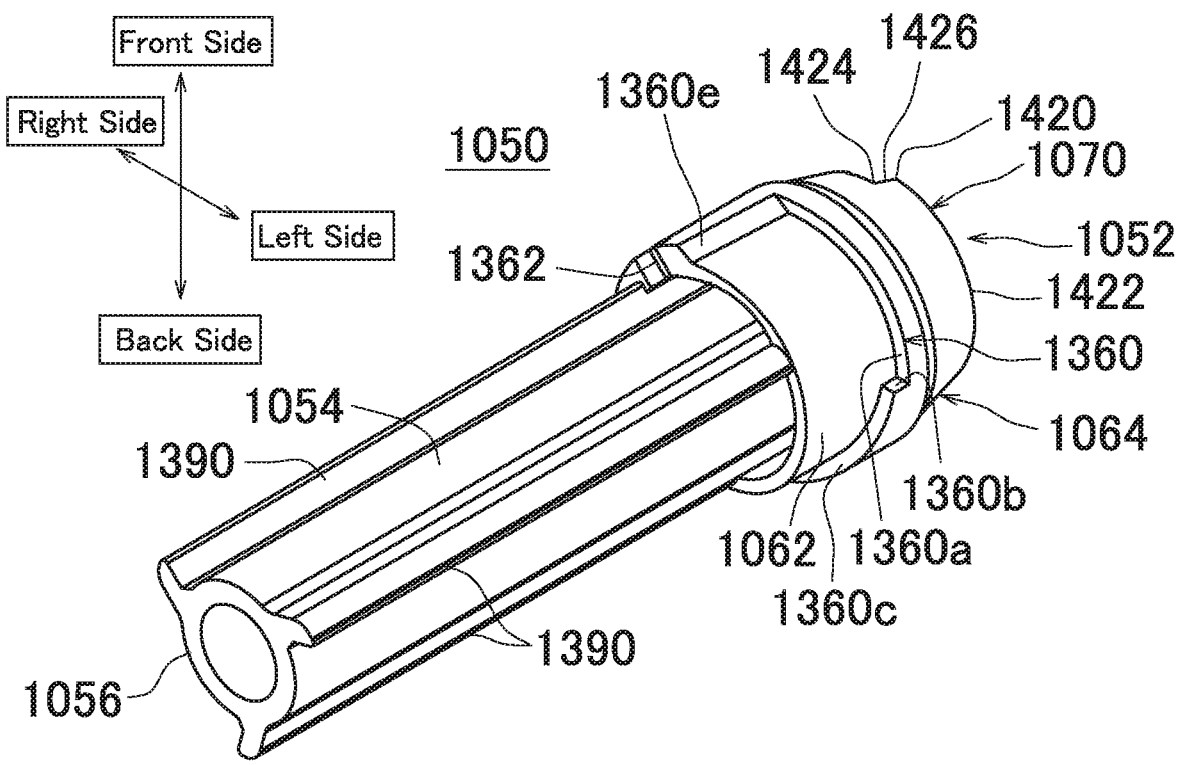
FIG. 43 is a perspective view depicting the opening element included in the spout-equipped container according to the third embodiment of this invention, with its top surface viewable.
Figure 44:
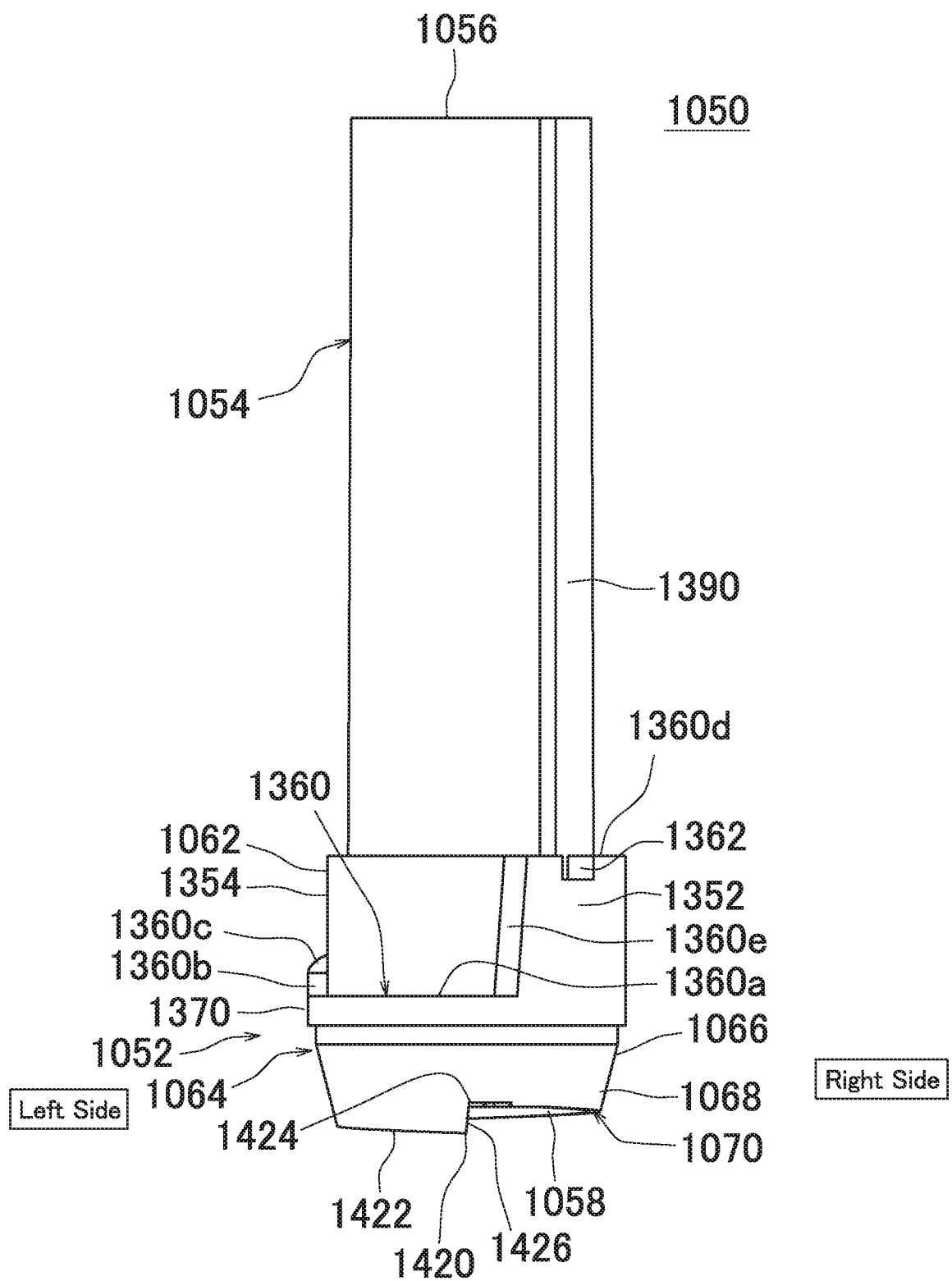
FIG. 44 is a front view depicting the opening element included in the spout-equipped container according to the third embodiment of this invention.
Figure 45A:
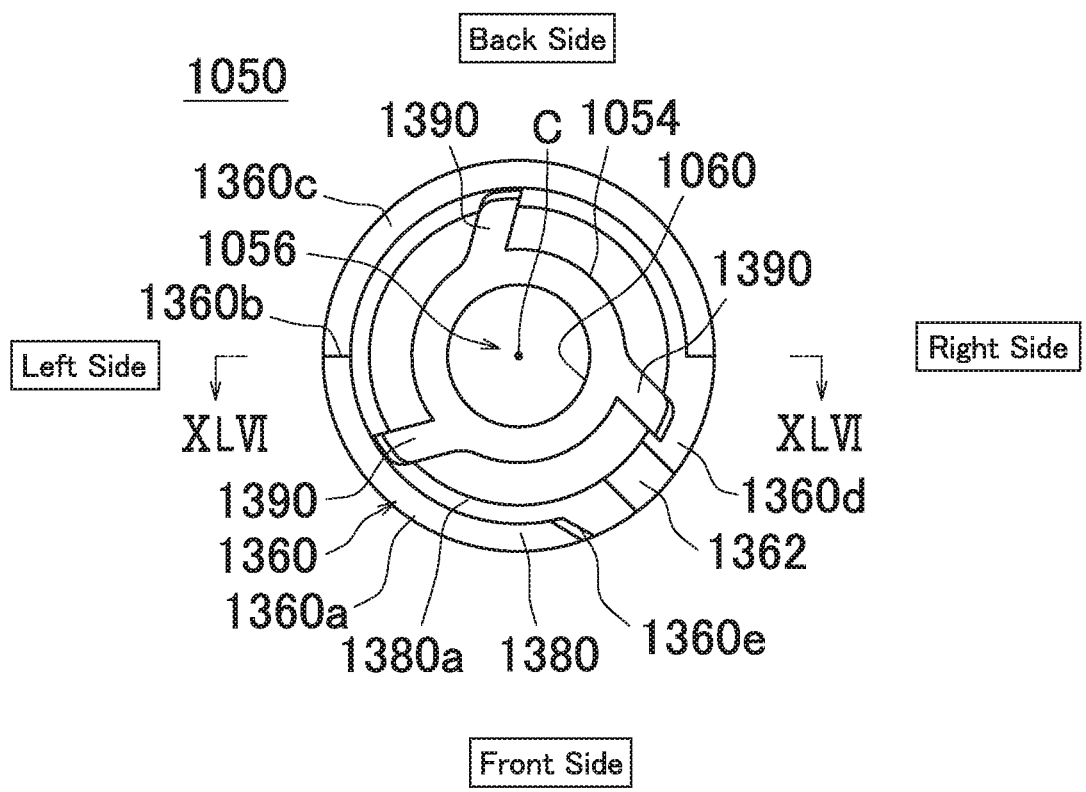
FIG. 45A is a plan view depicting the opening element included in the spout-equipped container according to the third embodiment of this invention.
Figure 45B:
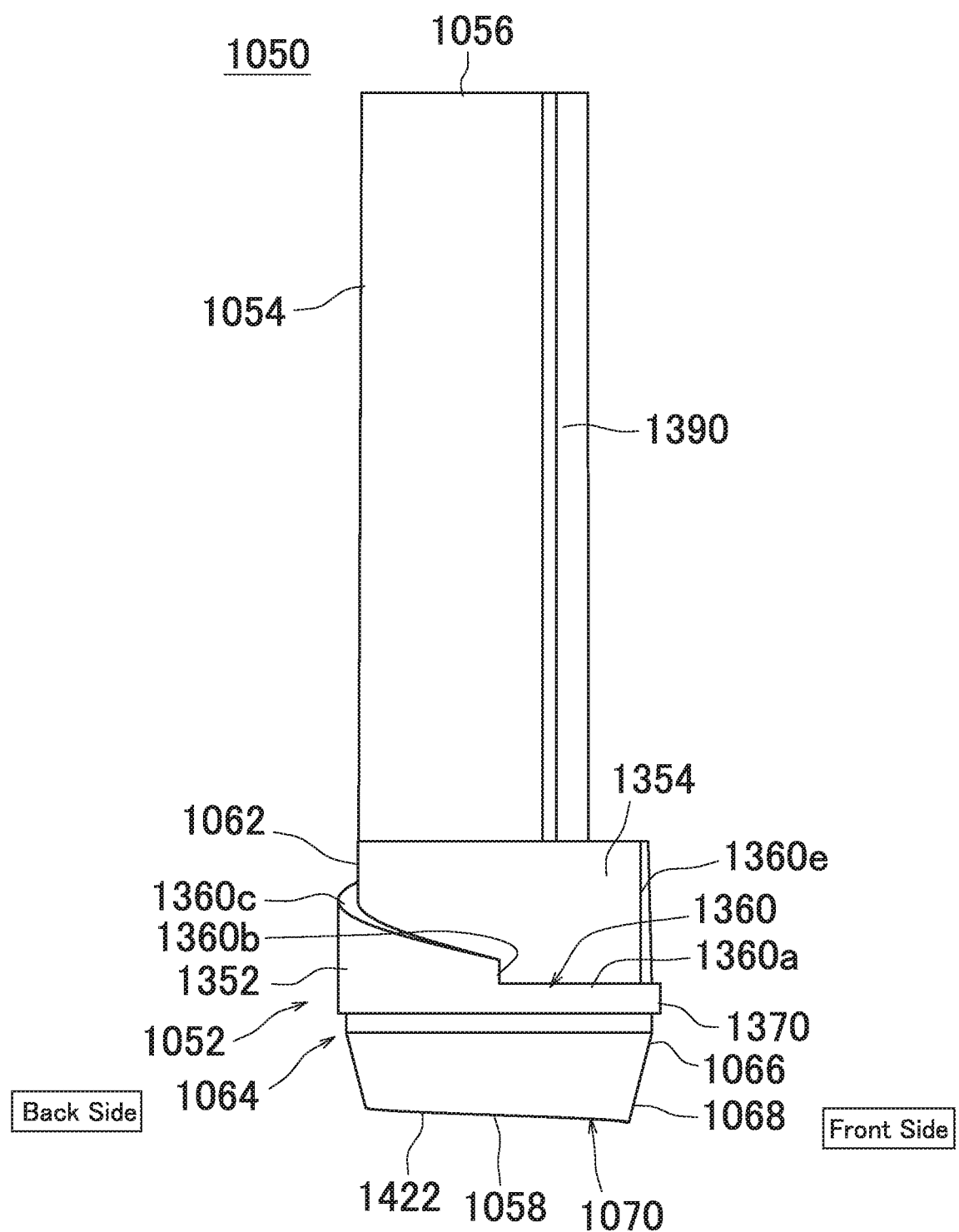
FIG. 45B is a side view depicting the opening element included in the spout-equipped container according to the third embodiment of this invention.
Figure 45C:
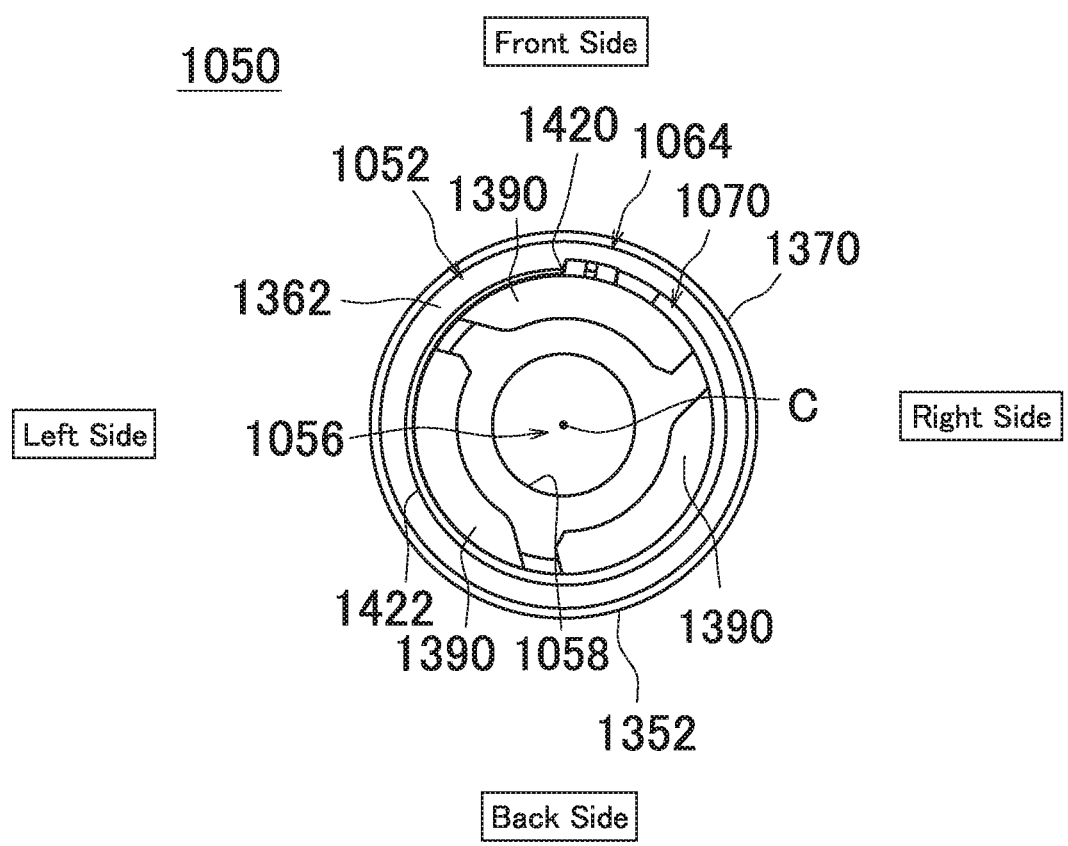
FIG. 45C is a bottom view depicting the opening element included in the spout-equipped container according to the third embodiment of this invention.
Figure 46:
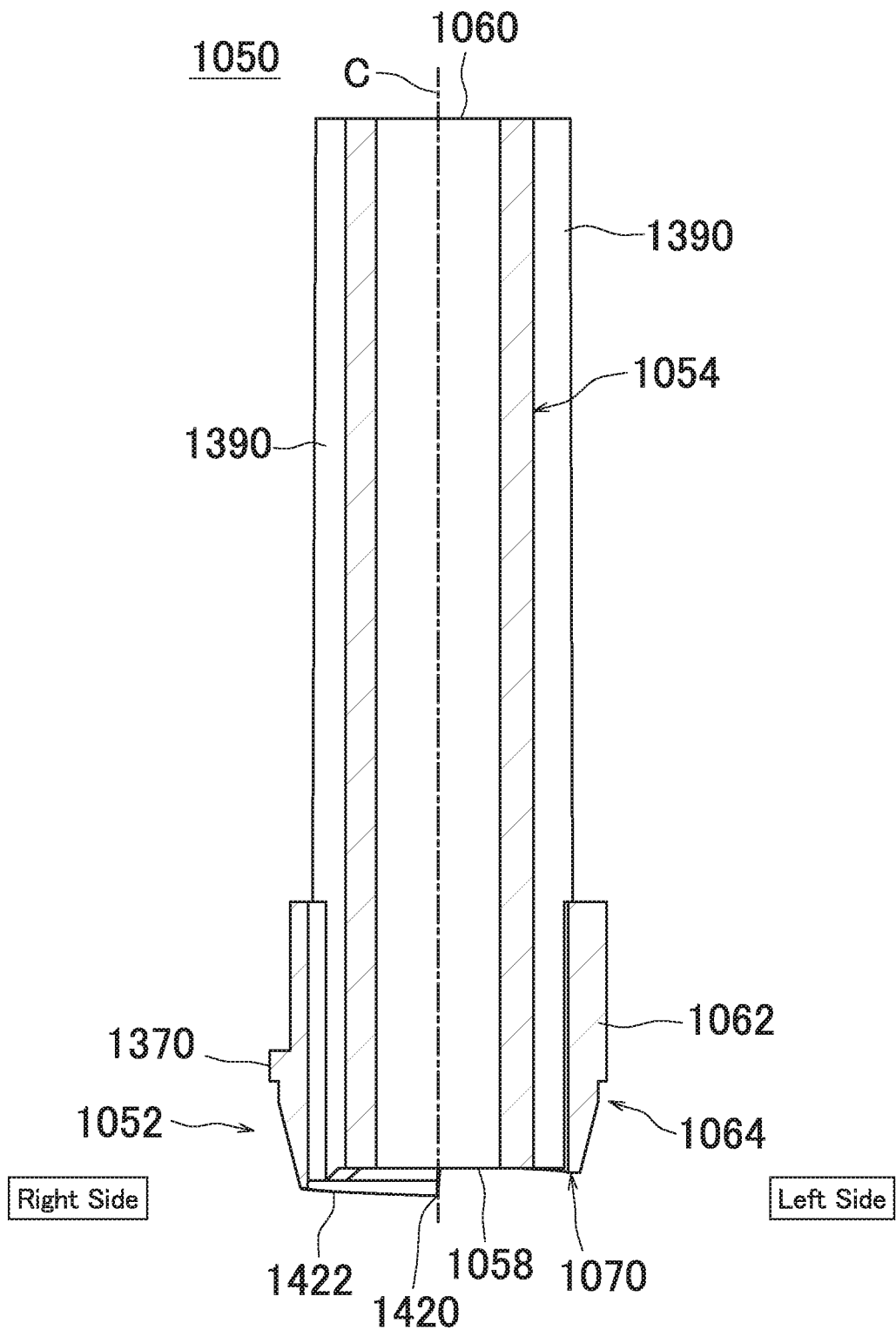
FIG. 46 is a sectional view depicting the opening element included in the spout-equipped container according to the third embodiment of this invention, along XLVI-XLVI of FIG. 45A.

The opening element included in the spout-equipped container 10 according to this embodiment is described based on FIG. 42 to FIG. 46. FIG. 42 is a perspective view depicting the opening element included in the spout-equipped container according to the third embodiment of this invention, with its bottom surface viewable. FIG. 43 is a perspective view depicting the opening element included in the spout-equipped container according to the third embodiment of this invention, with its top surface viewable. FIG. 44 is a front view depicting the opening element included in the spout-equipped container according to the third embodiment of this invention. FIG. 45A is a plan view depicting the opening element included in the spout-equipped container according to the third embodiment of this invention. FIG. 45B is a side view depicting the opening element included in the spout-equipped container according to the third embodiment of this invention. FIG. 45C is a bottom view depicting the opening element included in the spout-equipped container according to the third embodiment of this invention. FIG. 46 is a sectional view depicting the opening element included in the spout-equipped container according to the third embodiment of this invention, along XLVI-XLVI of FIG. 45A.

The opening element 1050 is formed so as to move downward inside the through hole 1026 of the spout base 1020 so as not to get out of the spout base 1020. The opening element 1050 has a passive shaft unit 1054 extending in an axial direction and a piercer element 1052 formed so as to cover an outer wall of a lower end of the passive shaft unit 1054. The piercer element 1052 and the passive shaft unit 1054 are integrally molded of a material such as, for example, synthetic resin. The opening element 1050 has a dimension in the vertical direction (dimension of the passive shaft unit 1054 in the vertical direction) slightly smaller than that of the spout base 1020. In the opening element 1050, a spout through hole 1056 in a substantially circular shape in a planar view is formed, which penetrates through a substantially center of the opening element 1050 over the vertical direction, that is, penetrates therethrough from a bottom surface of the piercer element 1052 over an upper surface of the passive shaft unit 1054. The spout through hole 1056 has an inlet 1058 formed on the bottom surface of the piercer element 1052 and the outlet 1060 formed on the upper surface of the passive shaft unit 1054.

The piercer element 1052 has its outer diameter approximately equal to or slight smaller than the inner diameter of the opening-element accommodating unit 1044 formed in the spout base 1020. Also, the piercer element 1052 has a dimension in the vertical direction approximately equal to or slightly smaller than that of the opening-element accommodating unit 1044 formed in the spout base 1020. The piercer element 1052 has a base unit 1062 from its upper end to a portion near a lower end and a cutting edge unit 1064 at its lower end. On an outer surface of the base unit 1062, a guided tilted surface 1360c configuring a male unit of a left screw is formed. This guided tilted surface 1360c has a helical tilted surface corresponding to the guide tilted surface 1310d configuring the left female screw unit formed on the inner surface of the spout base 1020 described above.

The guided tilted surface 1360c of the opening element 1050 is an upward path ascending as heading leftward from an initial state, and the guide tilted surface 1310d of the spout base 1020 is a downward path ascending as heading leftward from initial state (see FIG. 44 and FIG. 45).

The guided tilted surface 1360c of the opening element 1050 is positioned below the guide tilted surface 1310d of the spout base 1020, and a lower region of the guided tilted surface 1360c is positioned near the rotation stop male unit 1312 of the spout base 1020. The guided tilted surface 1360c of the opening element 1050 faces the guide tilted surface 1310d of the spout base 1020.

With the opening element 1050 being rotated in a connection rotating direction (left rotation in a planar view), the guided tilted surface 1360c makes contact with the guide tilted surface 1310d of the spout base 1020 to be guided downward (second direction). Near a starting end of the guided tilted surface 1360c, a rotation stop female unit 1362 (rotation regulating and engaging unit of the opening element) is formed so as to be recessed in a substantially quadrangular shape in a side view. This rotation stop female unit 1362 operates in cooperation with the rotation stop male unit 1312 formed at the terminating portion of the guide tilted surface 1310d described above. Details of this cooperative mode will be described below. On a lower portion of the guided tilted surface 1360c in the base unit 1062, a flange portion 1370 is formed over the entire circumference as a step having a dimension in a radial direction decreasing so as to be recessed in the radial direction.

The cutting edge unit 1064 has a cutting-edge root portion 1066 in a substantially cylindrical shape extending from its upper end (a connecting portion to the base unit 1062) along an axial direction and a cutting-edge bottom portion 1068 having a dimension in the radial direction gradually decreasing from a lower end of the cutting-edge root portion 1066.

The cutting-edge bottom portion 1068 has a blade tip portion 1070 in its bottom surface.

The blade tip portion 1070 is in a substantially annular shape having a substantially perfect circle shape in a bottom view.

The blade tip portion 1070 of the cutting edge unit 1064 according to this embodiment is gently tilted gradually upward, that is, toward the passive shaft unit 1054, from a tearing portion 1420 that is a starting point of left rotation in a direction of the left rotation in a planar view (counterclockwise). And, the blade tip portion 1070 includes the tearing portion 1420 that is the starting point of the left rotation in the planar view described above, a blade tilted portion 1422 continuous from the tearing portion 1420, and a blade terminating portion 1424 that is an end point of the left rotation in the planar view of the blade tilted portion 1422.

The tearing portion 1420 is positioned at the lowest part of the blade tip portion 1070, the blade tilted portion 1422 is gently tilted gradually upward from the position of the tearing portion 1420 in the direction of the left rotation in the planar view described above, and the blade terminating portion 1424 is positioned at the highest part.

Between the tearing portion 1420 and the terminating portion 1424, a blade vertical extending portion 1426 is formed.

The blade vertical extending portion 1426 is in a vertical shape extending substantially vertically so as to connect the tearing portion 1420 and the terminating portion 1424 with each other.

The tearing portion 1420 is formed at a position shifted from the rotation stop female unit 1362 formed near the starting end of the guided tilted surface 1360c described above by a central angle of approximately 300.degree. in a planar view.

The passive shaft unit 1054 is in a substantially cylindrical shape having a dimension in the vertical direction slightly smaller than that of the cylindrical portion 1024 of the spout base 1020. On the outer surface of the passive shaft unit 1054, as passive portions extending from its upper end to lower end in the vertical direction, three wing portions 1390 are provided to protrude. The wing portions 1390 each have a similar shape, and are equidistantly formed in a circumferential direction of the passive shaft unit 1054. In the passive shaft unit 1054, a diameter of a circle drawn when apexes of the three wing portions 1390 are connected (that is, an outer diameter including the wing portions 1390 of the passive shaft unit 1054) is approximately equal to or slightly smaller than the inner diameter of the cylindrical portion 1024 of the spout base 1020. The wing portions 1390 have a structure for causing the opening element 1050 to rotate leftward in conjunction with left rotation (counterclockwise) of the activating body 1080. The wing portions 1390 are each formed so that, in a planar view, an angle formed by a direction in which a surface appearing first when viewed at left turn (counterclockwise) protrudes and a tangential direction of the outer surface of the passive shaft unit 1054 is smaller than an angle formed by a direction in which a surface appearing later when viewed at left turn protrudes and the tangential direction of the outer surface of the passive shaft unit 1054. That is, the wing portions 1390 are each tilted in a planar view and when viewed at left turn so as to retreat from its root (that is, a connecting portion with the outer surface of the passive shaft unit 1054) toward its tip. Note that the outer surface of the passive shaft unit 1054 is preferably formed so as to have a dimension in the radial direction slightly decreasing from its upper end toward its lower end.

(Activating Body 1080)

Figure 47:
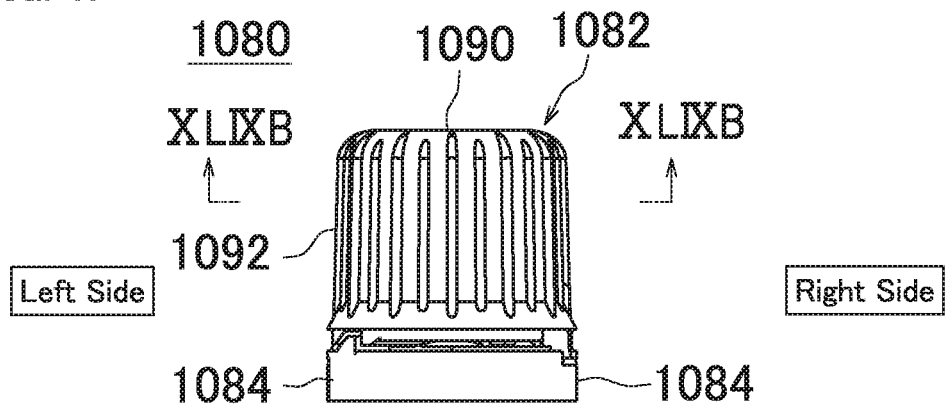
FIG. 47 is a front view depicting an activating body included in the spout-equipped container according to the third embodiment of this invention.
Figure 48A:
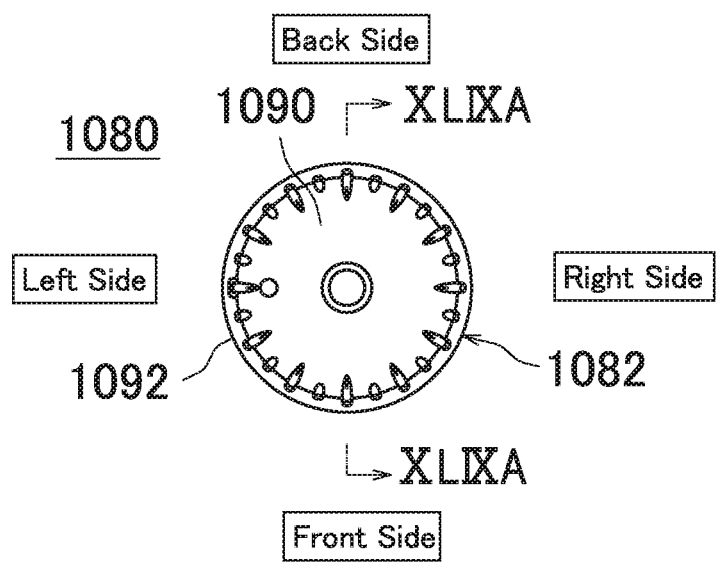
FIGS. 48A and 48B depict diagrams depicting the activating body included in the spout-equipped container according to the third embodiment of this invention, FIG. 48A being a plan view, and FIG. 48B being a bottom view.
Figure 48B:
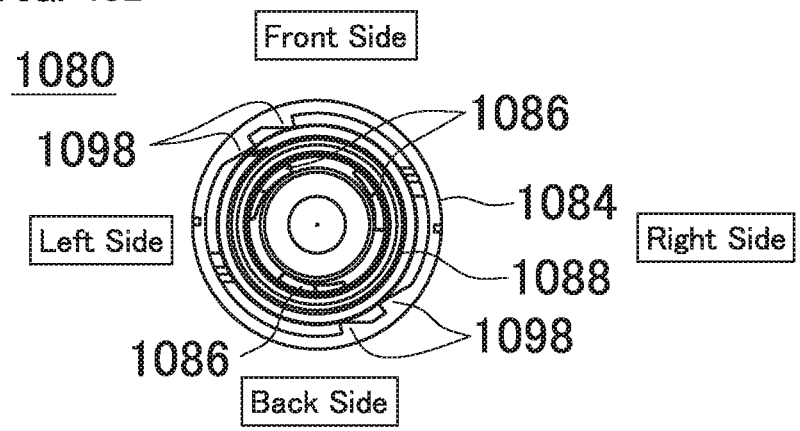
Figure 49A:
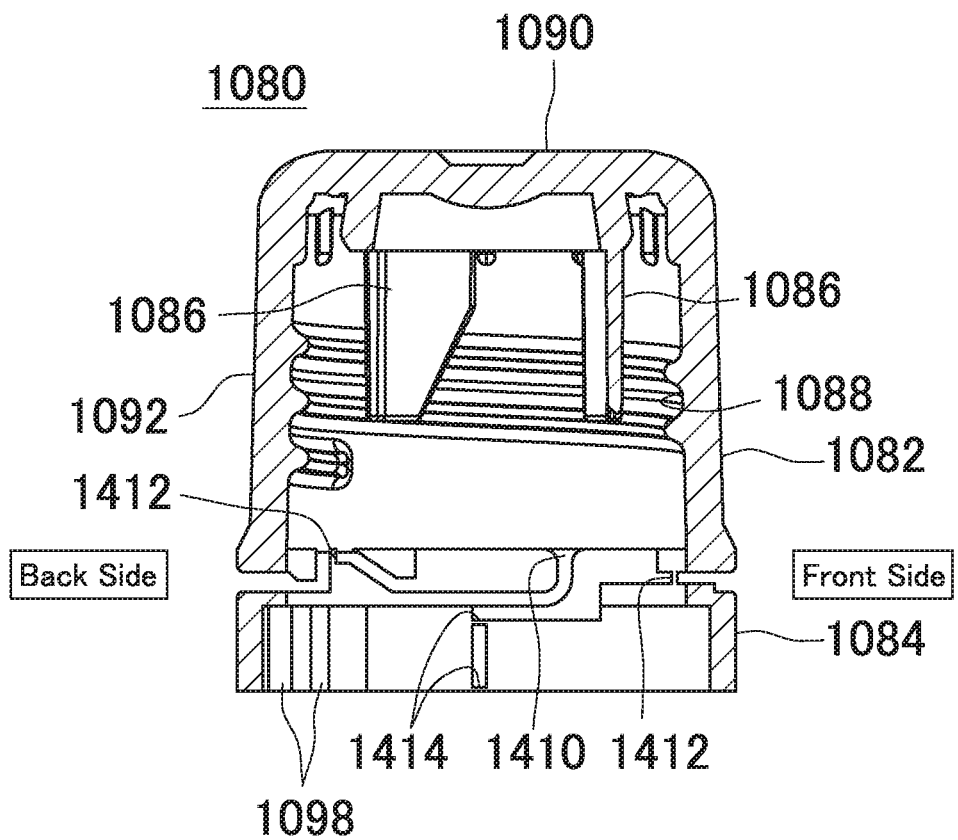
FIGS. 49A and 49B depict diagrams depicting the activating body included in the spout-equipped container according to the third embodiment of this invention, FIG. 49A being a sectional view along XLIXA-XLIXA of FIG. 48A, and FIG. 49B being a sectional view along XLIXB-XLIXB of FIG. 47.
Figure 49B:
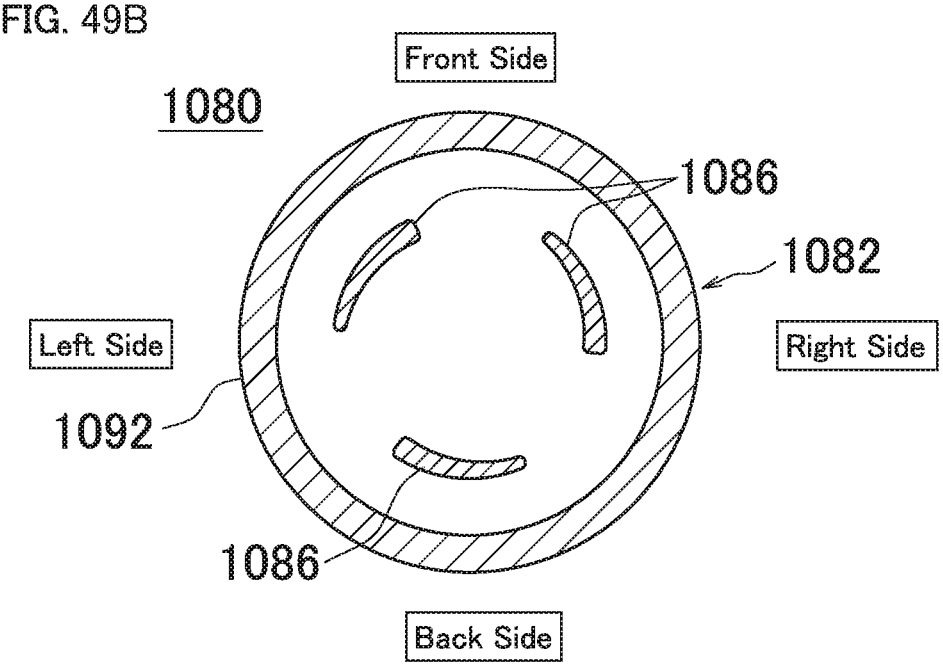
Figure 50:
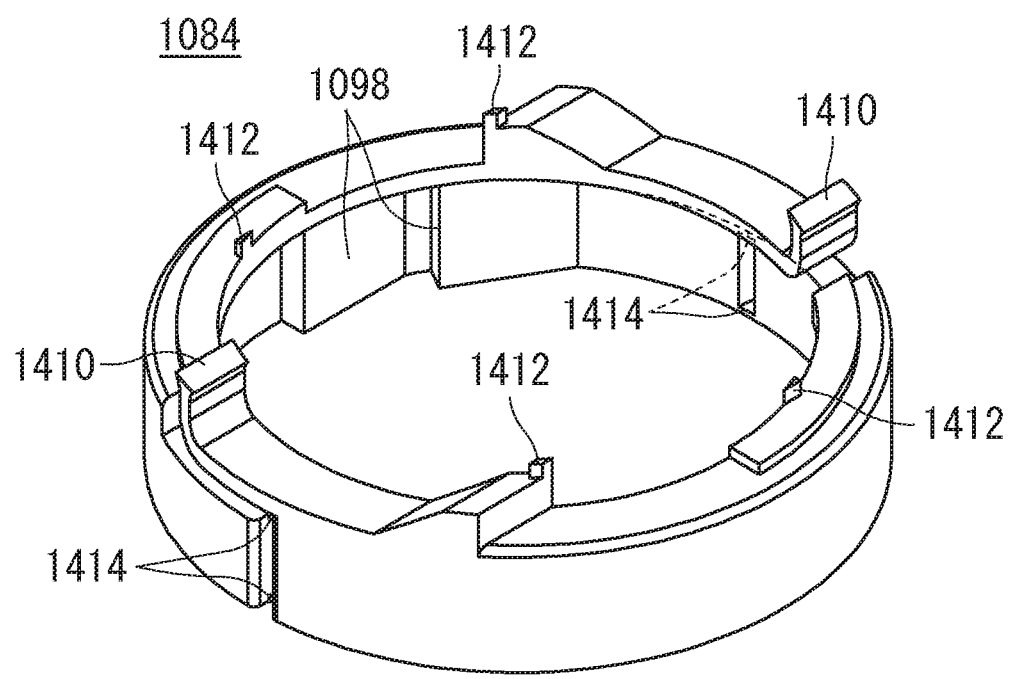
FIG. 50 is a perspective view depicting a tamper evidence of the activating body included in the spout-equipped container according to the third embodiment of this invention.

The activating body included in the spout-equipped container 10 according to this embodiment is described based on FIG. 47 to FIG. 50. FIG. 47 is a front view depicting an activating body included in the spout-equipped container according to the third embodiment of this invention. FIG. 48 depicts diagrams depicting the activating body included in the spout-equipped container according to the third embodiment of this invention, (A) being a plan view, and (B) being a bottom view. FIG. 49 depicts diagrams depicting the activating body included in the spout-equipped container according to the third embodiment of this invention, (A) being a sectional view along XLIXA-XLIXA of FIG. 48(A), and (B) being a sectional view along XLIXB-XLIXB of FIG. 47. FIG. 50 is a perspective view depicting a tamper evidence of the activating body included in the spout-equipped container according to the third embodiment of this invention.

The activating body 1080 is formed so as to be removably screwed into one end of the spout base 1020 in the axial direction and so as to move the opening element 1050 inside the through hole 1026 of the spout base 1020 downward. The activating body 1080 includes a cap 1082 and a tamper evidence 1084 for clarifying that the cap 1082 in initial state has been tampered.

The cap 1082 includes a top portion 1090 in a substantially circular shape in a planar view and a skirt 1092 as a side wall hanging down from an end edge of the top portion 1090. That is, the cap 1082 is in a substantially columnar shape with an opening in its bottom surface. The top portion 1090 and the skirt 1092 are integrally molded of synthetic resin. The cap 1082 has an inner diameter approximately equal to or slightly larger than the outer diameter of the cylindrical portion 1024 of the spout base 1020. Also, the cap 1082 has a dimension in the vertical direction approximately equal to the dimension of the spout base 1020 from an upper end to the protrusion 1040. On an inner surface of the top portion 1090, wing pressing units 1086 are disposed as three operating portions hanging down in the same direction as that of the skirt 1092. On an inner surface of the skirt 1092, a right female screw unit 1088 (first female screw unit) configuring a female unit of the right screw is formed. The three wing pressing units 1086 are each formed in a substantially arc shape in a planar view. Furthermore, the three wing pressing units 1086 have a similar shape. Still further, the three wing pressing units 1086 are disposed so as to draw one circle when connected to each other in a planar view. Still further, the three wing pressing units 1086 each preferably have a dimension of an end appearing later in a radial direction when viewed at left turn in a planar view slightly larger than that of an end appearing first. This right female screw unit 1088 is screwed into the right male screw unit 1032 formed on the outer surface of the spout base 1020 described above.

The tamper evidence 1084 is formed in an annular shape with its inner diameter and outer diameter approximately equal to those of the cap 1082. Also, the tamper evidence 1084 has a dimension in a height direction approximately equal to that of the rotation stopping units 1042 of the spout base 1020. The tamper evidence 1084 has two coupling units 1410 and four upper-surface preliminary coupling units 1412 provided to protrude on its upper surface, four side-surface preliminary coupling units 1414 provided to protrude on its outer surface of its side surface, and rotation stopping units 1098 provided to protrude on its inner surface of the side surface. In the activating body 1080, in initial state at shipping (that is, in a state in which, with the heat sealed sheet 1014 fixed to the bottom surface of the spout 1012 formed by assembling the spout base 1020, the opening element 1050, and the activating body 1080, the spout 1012 is attached to the end edge of the container 10 having hydrogen water accommodated in the accommodating part 200 for hermetical sealing), the lower end of the cap 1082 and tips of the respective two coupling units 1410 and tips of the respective four upper-surface preliminary coupling units 1412 of the tamper evidence 1084 are coupled together. Also, in initial state, the tamper evidence 1084 is coupled over the entire circumference by the four side-surface preliminary coupling units 1414. The two coupling units 1410 are in a substantially L shape in a side view. Also, coupling of the four upper-surface preliminary coupling units 1412 and the four side-surface preliminary coupling units 1414 is configured to be easily fractured. These rotation stopping units 1098 operate in cooperation with the rotation stopping units 1042 described above. Details of this cooperation mode will be described below.

(Procedure of Assembling Spout 1012)

Figure 52:
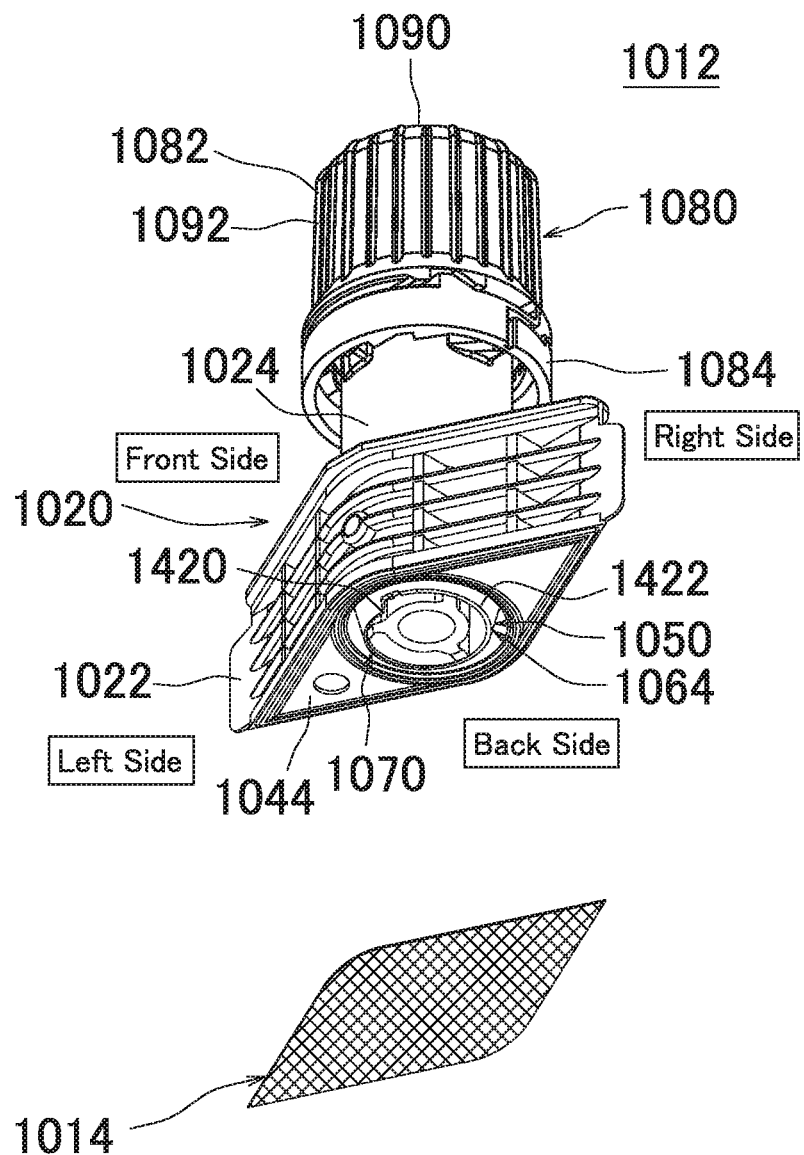
FIG. 52 is a perspective view when arranged in order in a direction of fixing a heat sealed sheet to the spout-equipped container according to the third embodiment of this invention and viewed from a bottom side.
Figure 53:
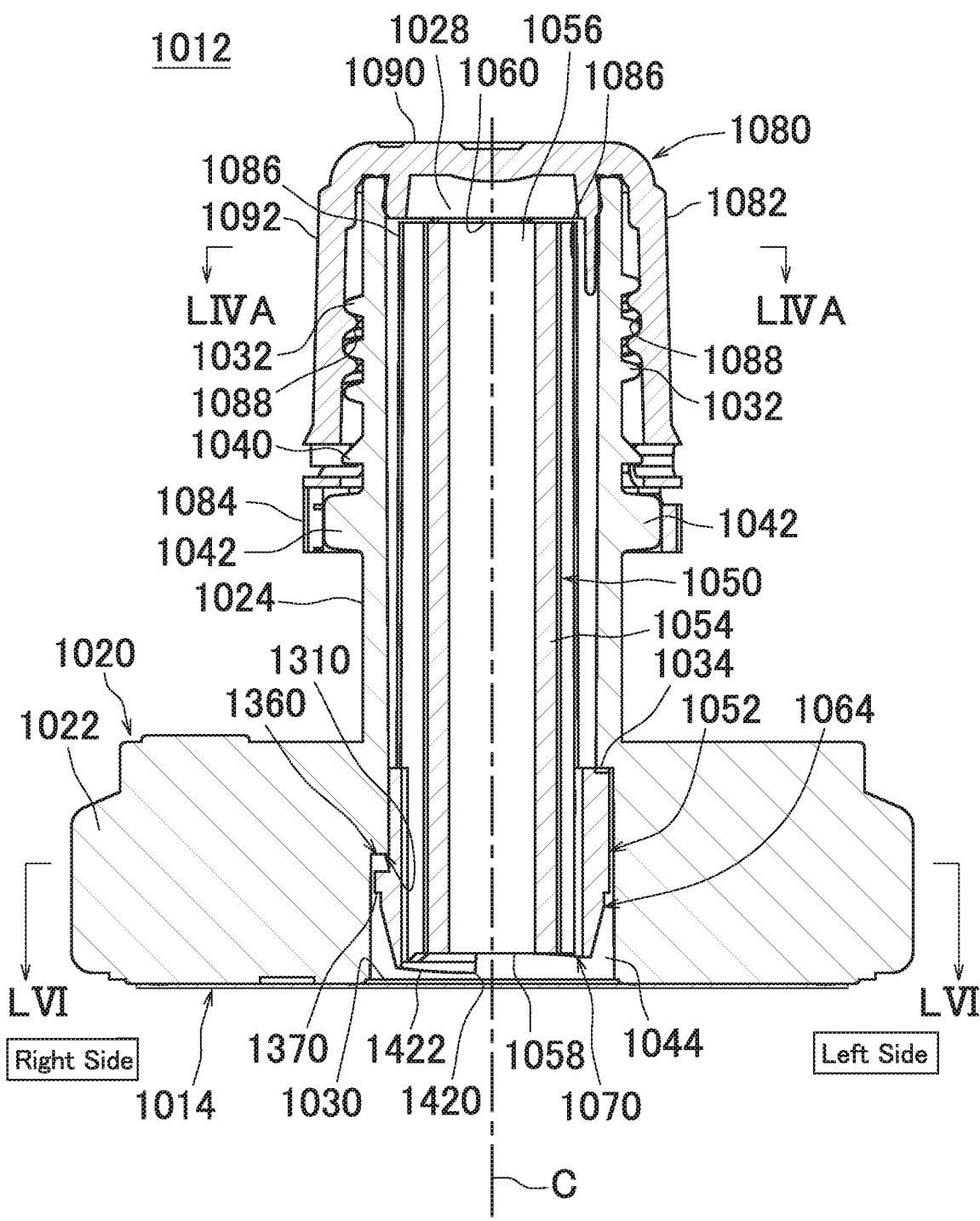
FIG. 53 is a sectional view depicting the spout included in the spout-equipped container according to the third embodiment of this invention along a height direction.

Subsequently, an example of procedure of assembling the spout 1012 is described based on FIG. 51 to FIG. 53.

Figure 51:
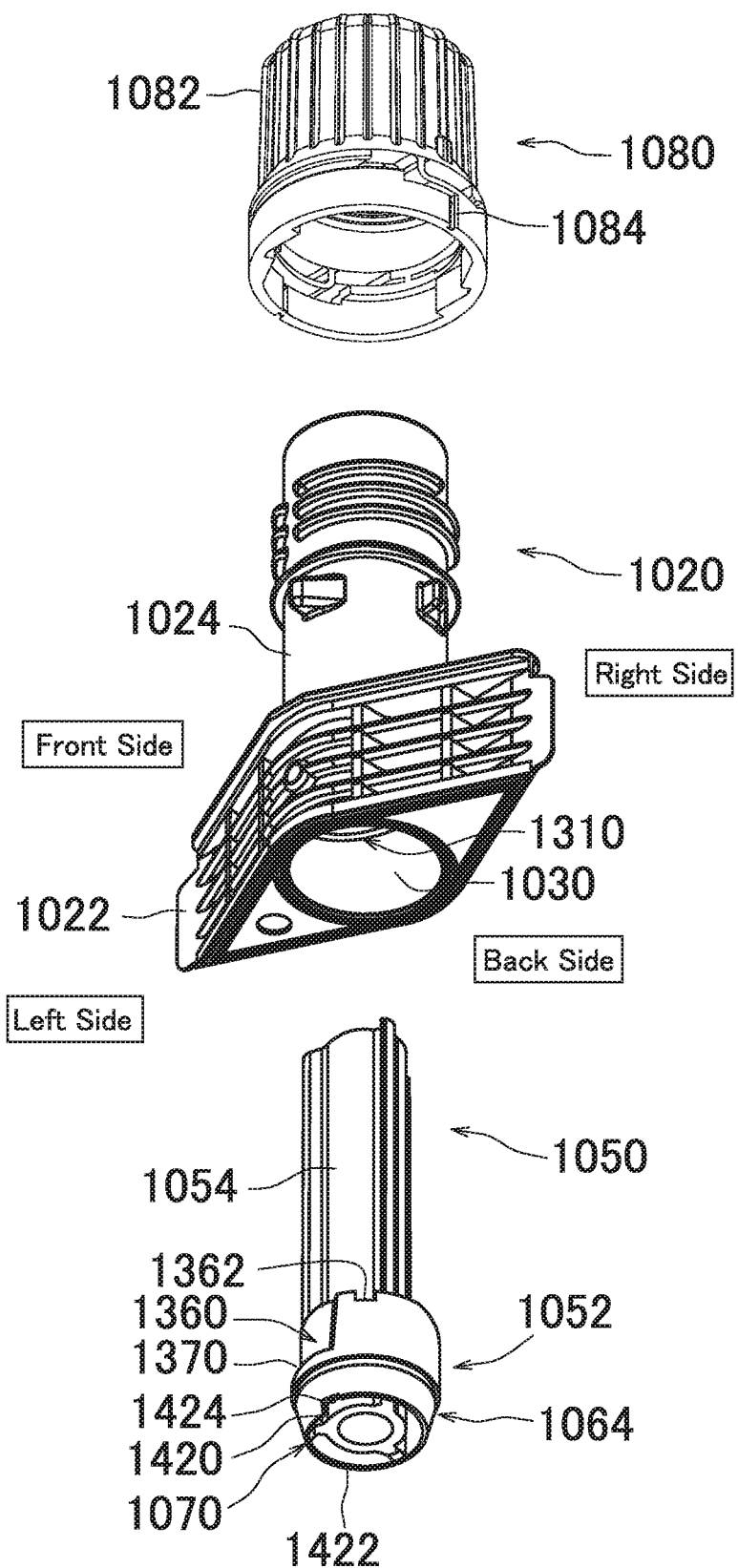
FIG. 51 is a perspective view of the spout base, the opening element, and the activating body included in the spout-equipped container according to the third embodiment of this invention when arranged in order of assembling and viewed from a bottom side.

FIG. 51 is a perspective view of the spout base, the opening element, and the activating body included in the spout-equipped container according to the third embodiment of this invention when arranged in order of assembling and viewed from a bottom side. FIG. 52 is a perspective view when arranged in order in a direction of fixing a heat sealed sheet to the spout-equipped container according to the third embodiment of this invention and viewed from a bottom side. FIG. 53 is a sectional view depicting the spout included in the spout-equipped container according to the third embodiment of this invention along a height direction.

First, in a planar view, the activating body 1080 fits from an upper surface side of the spout base 1020 (upper surface side of the cylindrical portion 1024) so that the center of the activating body 1080 and the center of the cylindrical portion 1024 of the spout base 1020 are concentric with each other.

Then, the upper end of the right male screw unit 1032 (that is, the terminating portion of the right male screw unit 1032) formed on the outer surface of the upper portion (cylindrical portion 1024) of the spout base 1020 abuts on the lower end of the right female screw unit 1088 (that is, the starting end of the right female screw unit 1088) formed on the inner surface of the activating body 1080.

From here, by rotating the activating body 1080 rightward (clockwise) in a planar view, the right female screw unit 1088 and the right male screw unit 1032 are screwed. With this, the activating body 1080 proceeds downward of the spout base 1020.

When the right female screw unit 1088 and the right male screw unit 1032 are being screwed to cause the activating body 1080 to proceed downward, the rotation stopping units 1098 provided to protrude on the inner surface of the side wall of the tamper evidence 1084 abut on the guide surfaces 1042a of the rotation stopping units 1042 provided to protrude on the outer surface of the spout base 1020. Here, as described above, when the spout base 1020 is viewed at right turn (clockwise) in a planar view, the guide surface 1042a is tilted so as to have a dimension in a radial direction increasing from an end edge appearing first toward an end edge appearing later. With the rotation stopping units 1042 of the spout base 1020 having this shape, the rotation stopping units 1098 of the tamper evidence 1084 easily get over the guide surfaces 1042a of the rotation stopping units 1042 of the spout base 1020. Therefore, the tamper evidence 1084 (activating body 1080) can continuously rotate at right turn (clockwise).

The activating body 1080 is rotated rightward (clockwise) until the inner surface of the top portion 1090 of the activating body 1080 and the upper end of the spout base 1020 abut or approximately abut on each other, thereby proceeding downward. When the activating body 1080 is screwed till the end, the lower end of the cap 1082 is positioned near an upper portion of the protrusion 1040 of the spout base 1020, and the tamper evidence 1084 is positioned at a height approximately equal to the rotation stopping units 1042 of the spout base 1020. That is, the inner surface of the skirt 1092 of the cap 1082 faces the outer surface above the protrusion 1040 of the spout base 1020, and the inner surface of the tamper evidence 1084 faces the outer surface of the rotation stopping units 1042 of the spout base 1020. In this manner, the activating body 1080 is screwed into the upper portion of the spout base 1020.

Next, the opening element 1050 is inserted from an inner opening 1030 side of the through hole 1026 of the spout base 1020 (that is, a bottom surface side of the spout base 1020) so that the center of the opening-element accommodating unit 1044 of the spout base 1020 and the center of the opening element 1050 are concentric with each other in a planar view. Here, the opening element 1050 is inserted into the through hole 1026 from the upper end of the passive shaft unit 1054.

Here, the opening element 1050 is inserted into the through hole 1026 of the spout base 1020 so that the rotation stop male unit 1312 formed on the spout base 1020 is at a position shifted from the rotation stop female unit 1362 formed on the opening element 1050 by a central angle of approximately 300. degree. in a planar view.

When the opening element 1050 is inserted into the through hole 1026 of the spout base 1020 until a left-and-right-direction extending portion 1360a formed on the opening element 1050 abuts on the tip of the rotation stop male unit 1312 of the spout base 1020, the piercer element 1052 of the opening element 1050 is completely accommodated in the opening-element accommodating unit 1044 of the spout base 1020. Here, the upper surface of the piercer element 1052 and the upper wall of the opening-element accommodating unit 1044 in contact with or are positioned closely to each other, and the bottom surface of the piercer element 1052 and the bottom surface of the opening-element accommodating unit 1044 are at an approximately same height. That is, the bottom surface of the opening element 1050 and the bottom surface of the spout base 1020 are at an approximately same height. Also, here, in the opening element 1050, its passive shaft unit 1054 extends inside the cylindrical portion 1024 of the spout base 1020. That is, in the opening element 1050, its passive shaft unit 1054 extends above the opening-element accommodating unit 1044 of the through hole 1026. Note that the center of the passive shaft unit 1054 of the opening element 1050 and the center of the cylindrical portion 1024 of the spout base 1020 are concentric with each other in a planar view. Furthermore, here, the surfaces appearing first of the three wing portions 1390 provided to protrude on the outer surface of the passive shaft unit 1054 of the opening element 1050 when viewed at left turn (counterclockwise) in a planar view face the ends appearing first of the three wing pressing units 1086 formed so as to extend downward from the top portion 1090 of the activating body 1080 when viewed at left turn (counterclockwise) in a planar view (See FIG. 54).

In the above-described manner, the activating body 1080 is screwed to the upper portion of the spout base 1020, and the opening element 1050 is inserted into the through hole 1026 of the spout base 1020, thereby assembling the spout 1012.

Then, to the bottom surface of the spout 1012 (that is, the bottom surface of the spout base 1020), the heat sealed sheet 1014 is fixed so as to hermetically seal the inner opening 1030 of the through hole 1026. The heat sealed sheet 1014 is fixed to the bottom surface of the spout base 1020, for example, by thermal welding using a heat plate.

Here, the heat sealed sheet 1014 is fixed to the first sealing ridge 1036 and the second sealing ridge 1038 provided on the bottom surface of the spout base 1020.

Thereby, the heat sealed sheet 1014 can be fixed to the bottom surface of the spout base 1020 without being affected by unintended slight asperities that might be formed on the bottom surface of the spout base 1020. Therefore, the heat sealed sheet 1014 can be securely fixed to the bottom surface of the spout base 1020.

Note that, as described above, the first sealing ridge 1036 is provided at a predetermined distance from the outer edge of the through hole 1026. Thereby, for example, the heat sealed sheet 1014 can be prevented from deforming and getting into the through hole 1026 during the thermal welding. Therefore, without being blocked by the heat sealed sheet 1014, the opening element 1050 can be properly inserted into the through hole 1026 of the spout base 1020, and can be moved smoothly downward.

Similarly, since the second sealing ridge 1038 is provided at a predetermined distance from the outer edge of the bottom surface of the spout base 1020, such an event as turning up of the heat sealed sheet 1014 from the bottom surface to the side surface of the spout base 1020 can be suppressed.

Note that the structure of the heat sealed sheet 1014 is similar to the embodiment described above, and therefore similar description is not repeated herein. Then, the spout 1012 with the heat sealed sheet 1014 fixed to its bottom surface is attached to the container 10. Also this attachment is similar to the embodiment described above, similar description is not repeated herein. In thus obtained spout-equipped container 10, the accommodating part 200 of the container 10 and the through hole 1026 formed in the spout 1012 are shielded by the heat sealed sheet 1014. Therefore, it is possible to prevent hydrogen accommodated in the accommodating part 200 of the container 10 from leaking from the through hole 1026 of the attachment portion 1022 and the spout 1012. As depicted in FIG. 53, the cap 1082, the spout base 1020, and the opening element 1050 thus assembled as described above have a center axis C extending in the axial direction in common. That is, the cap 1082, the through hole 1026 of the spout base 1020, and the opening element 1050 are concentric with each other and each in a substantially cylindrical shape.

The initial state of the spout 1012 assembled as described above (a position relation among the spout base 1020, the opening element 1050, the activating body 1080, and the heat sealed sheet 1014 immediately after assembling) is as follows.

The cylindrical portion 1024 in a substantially cylindrical shape and the through hole 1026 of the spout base 1020, the passive shaft unit 1054 in a substantially cylindrical shape and the piercer element 1052 of the opening element 1050, and the top portion 1090 and the skirt 1092 in a substantially cylindrical shape of the activating body 1080 are disposed so that the center axis C is concentric.

The activating body 1080 screwed into the upper end (one end) of the spout base 1020 has an inner surface of the top portion 1090 in contact with the upper end of the cylindrical portion 1024 of the spout base 1020.

The activating body 1080 screwed into the upper end (one end) of the spout base 1020 is screwed into the upper end (one end) of the spout base 1020, with an inner surface of the skirt 1092 along the outer surface of the cylindrical portion 1024 of the spout base 1020 and the right female screw unit 1088 formed at the upper end of the cylindrical portion 1024 of the spout base 1020 or the inner surface of the skirt 1092 screwed into the right male screw unit 1032 formed on the outer surface of the cylindrical portion 1024 of the spout base 1020.

Furthermore, the tamper evidence 1084 in a substantially annular shape formed at the lower end of the activating body 1080 is at the same position as the rotation stopping units 1098 formed on the lower portion of the protrusion 1040 on the outer surface of the cylindrical portion 1024 of the spout base 1020 in an axial direction. Then, the inner surface of the tamper evidence 1084 and the outer surface of the rotation stopping units 1098 face each other.

The opening element 1050 inserted into the through hole 1026 of the spout base 1020 extends in an axial direction from a portion near the upper end to the lower end of the through hole 1026 of the spout base 1020.

The upper end of the opening element 1050 (that is, upper end of the passive shaft unit 1054) is positioned slightly below the upper end of the spout base 1020 (that is, the upper end of the cylindrical portion 1024).

On the other hand, the lower end of the opening element 1050 (that is, the lower end of the piercer element 1052) and the lower end of the spout base 1020 (that is, the bottom surface of the attachment portion 1022) are positioned at an approximately same height.

The upper end of the piercer element 1052 (that is, the upper end face protruding from the outer surface of the passive shaft unit 1054 in a radial direction) makes contact with a lower surface of the step portion 1034 formed on the inner wall of the through hole 1026 of the spout base 1020.

The lower end of the opening element 1050 (that is, the lower end of the piercer element 1052) makes contact with a substantially center of an upper surface (a surface on a side fixed to the bottom surface of the spout base 1020) of the heat sealed sheet 1014 fixed to the bottom surface of the spout base 1020.

The wing pressing units 1086 hanging down from the top portion 1090 of the activating body 1080 each have an end positioned on a tip side when viewed at left turn (counter-clockwise) making contact with a tip side in a radial direction of the surface appearing later of the wing portion 1390 of the opening element 1050 when viewed at left turn (counterclockwise) in a planar view.

Also, the wing portions 1390 provided to protrude from the outer surface of the passive shaft unit 1054 each have a tip side in a radial direction of the surface appearing later when viewed at left turn (counterclockwise) making contact with an end positioned on a tip side when viewed at left turn (counterclockwise) of the wing pressing unit 1086 hanging down from the top portion 1090 of the activating body 1080 in a planar view.

The rotation stop male unit 1312 formed on the inner wall of the spout base 1020 and the rotation stop female unit 1362 formed on the outer wall of the opening element 1050 are separated from each other by a rotation angle of 300.degree. in a circumferential direction when viewed at left turn (counterclockwise) in a planar view.

The guided tilted surface 1360c of the opening element 1050 is an upward path ascending as heading leftward from an initial state, and the guide tilted surface 1310d of the spout base 1020 is a downward path ascending as heading leftward from the initial state (See FIG. 44 and FIG. 45).

The guided tilted surface 1360c of the opening element 1050 is positioned below the guide tilted surface 1310d of the spout base 1020, and a lower region of the guided tilted surface 1360c is positioned near the rotation stop male unit 1312 of the spout base 1020. The guided tilted surface 1360c of the opening element 1050 faces the guide tilted surface 1310d of the spout base 1020.

The rotation stop female unit 1362 of the opening element 1050 is disposed at a height position substantially equal to an upper region of the guide tilted surface 1310d of the spout base 1020 and slightly separated leftward.

The opening element 1050 in the initial state has the left-and-right direction extending portion 1360a of the step 1360 positioned on a front side in the bottom view, and has the vertical-direction extending portion 1360e positioned substantially on the front side in the bottom view, and has a standing portion 1360b positioned on a left side in the bottom view.

The opening element 1050 in the initial state has the rotation stop female unit 1362 positioned on a right side in the bottom view.

The opening element 1050 in the initial state has the tearing portion 1420 of the piercer element 1052 positioned on the front side in the bottom view.

(Procedure for Tearing Part of Heat Sealed Sheet 1014)

Figure 54A:
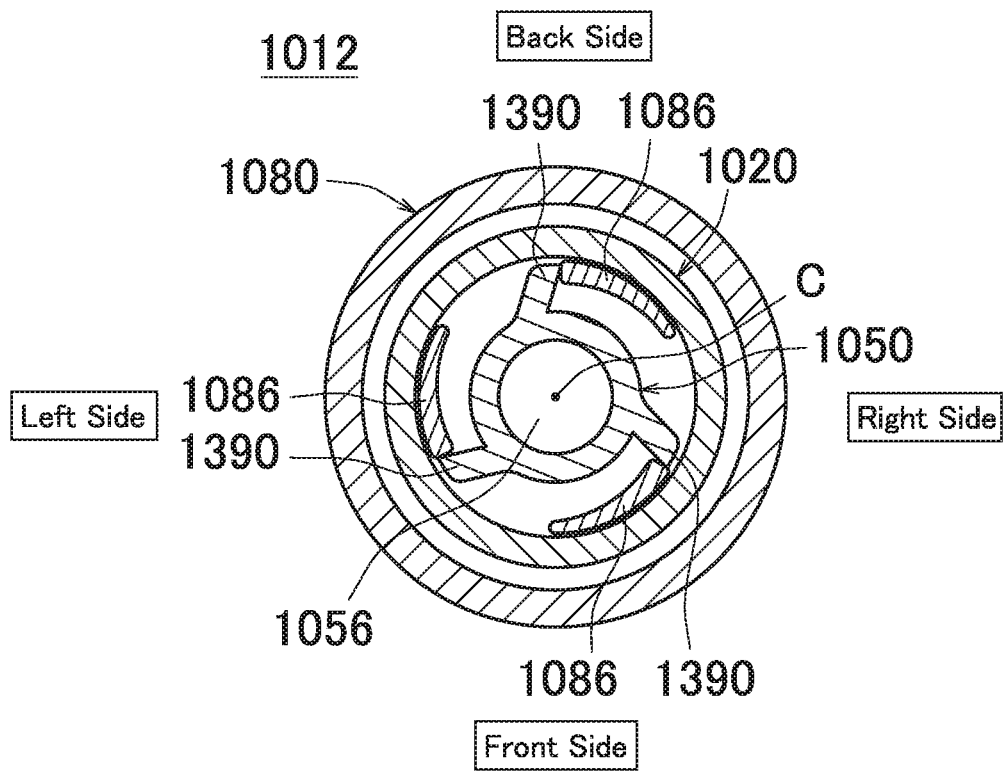
FIGS. 54A and 54B depict diagrams depicting the spout included in the spout-equipped container according to the third embodiment of this invention, FIG. 54A being an end face view along LIVA-LIVA of FIG. 53, and FIG. 54B being a schematic view depicting a relation between wing pressing units and wing portions when the activating body is rotated leftward.
Figure 54B:
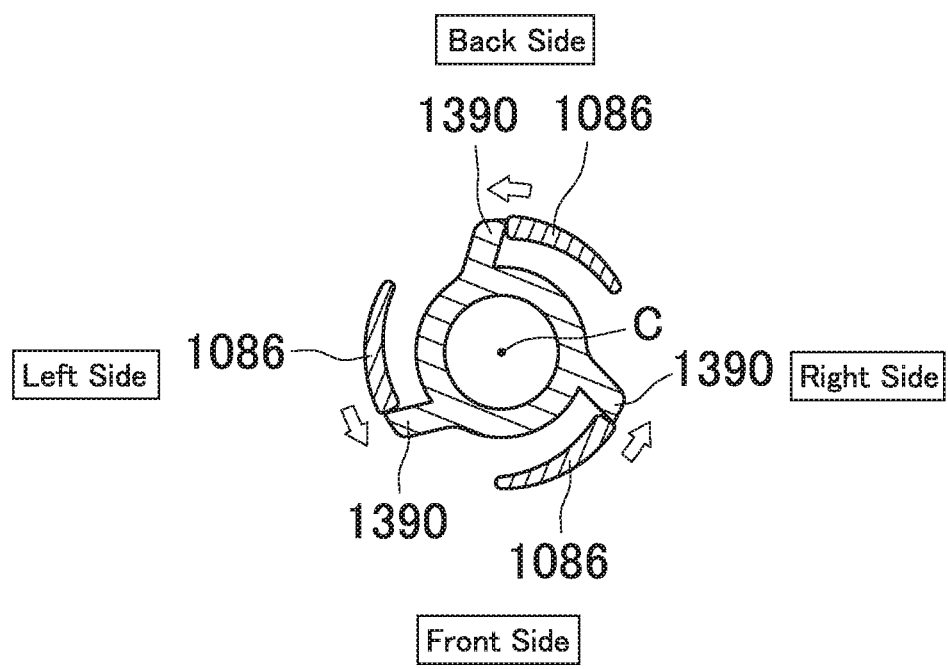
Figure 56A:
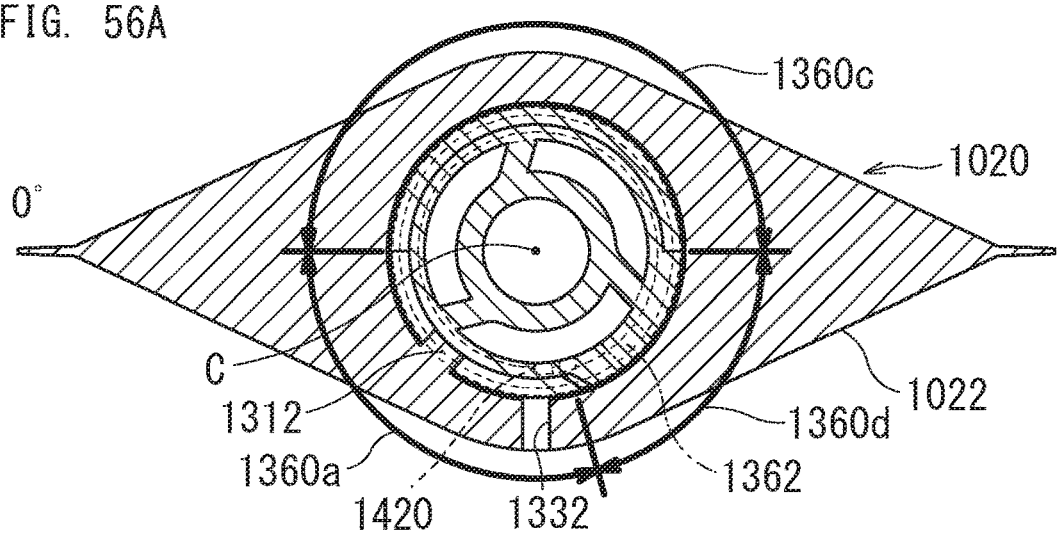
FIGS. 56A, 56B, and 56C depict sectional views along a width direction at the height of a rotation stop male unit 1312 of the spout base included in the spout-equipped container according to the third embodiment of this invention (a sectional view along LVI-LVI of FIG. 53), FIG. 56A being a diagram with a rotation angle of 0.degree. of the opening element, FIG. 56B being a diagram with a rotation angle of 150.degree. of the opening element, and FIG. 56C being a diagram with a rotation angle of 300.degree. of the opening element.
Figure 56B:
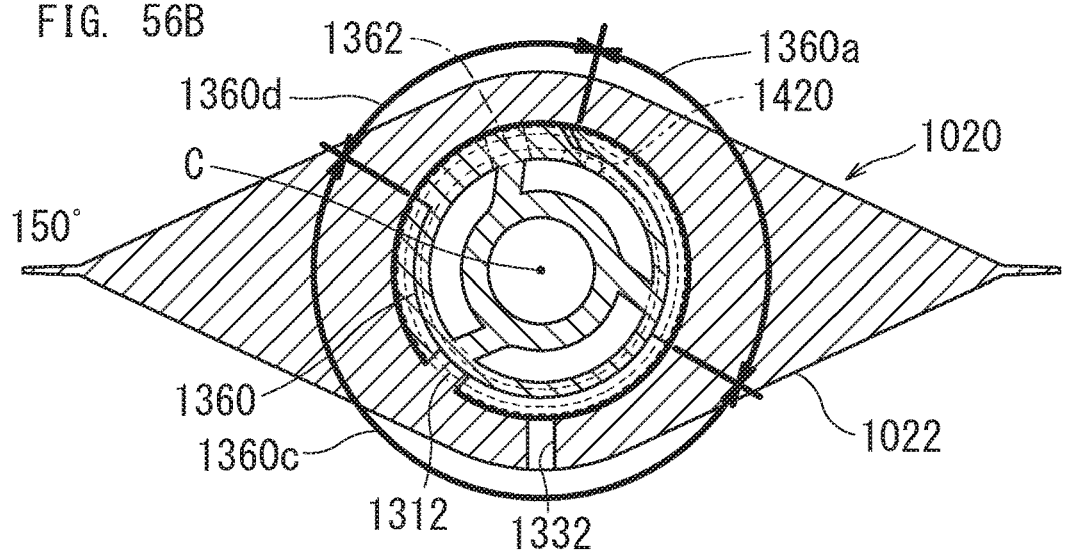
Figure 56C:
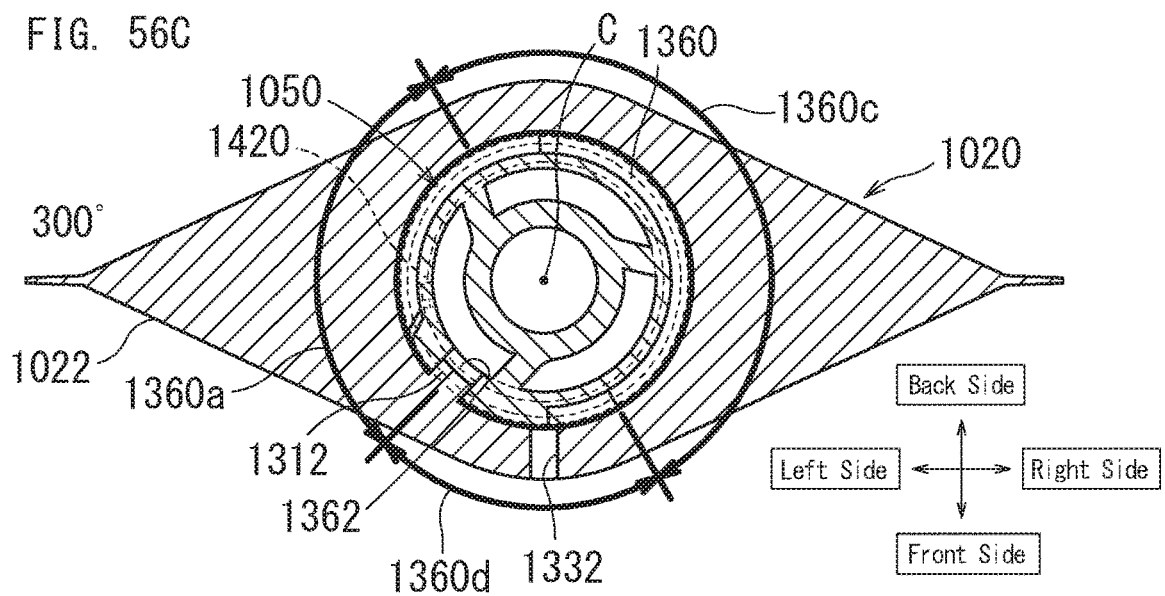
Figure 58:
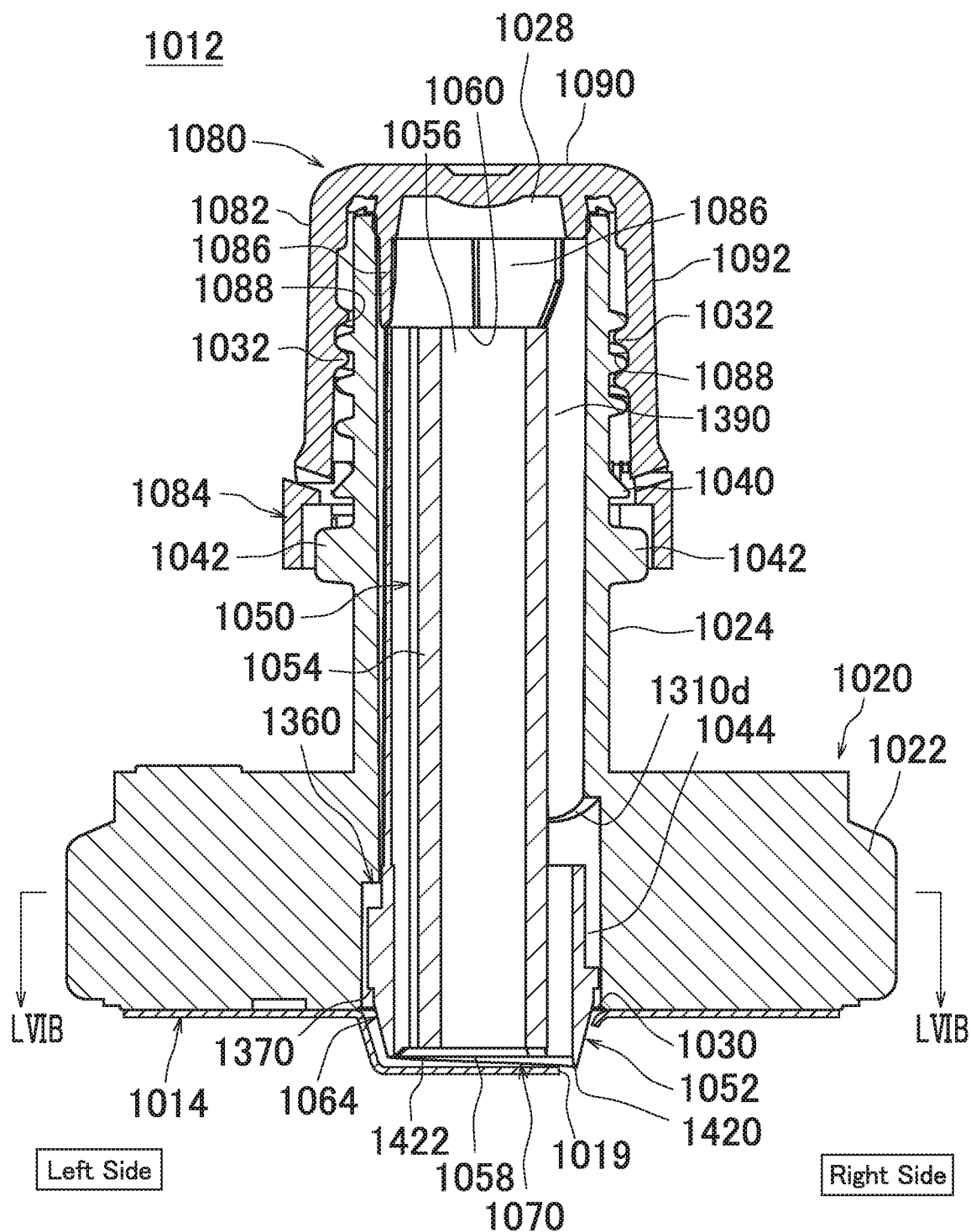
FIG. 58 is a diagram depicting a state in which part of the heat sealed sheet included in the spout-equipped container according to the third embodiment of this invention is torn, and is a sectional view along a height direction with a rotation angle of 150.degree. of the opening element.
Figure 59:
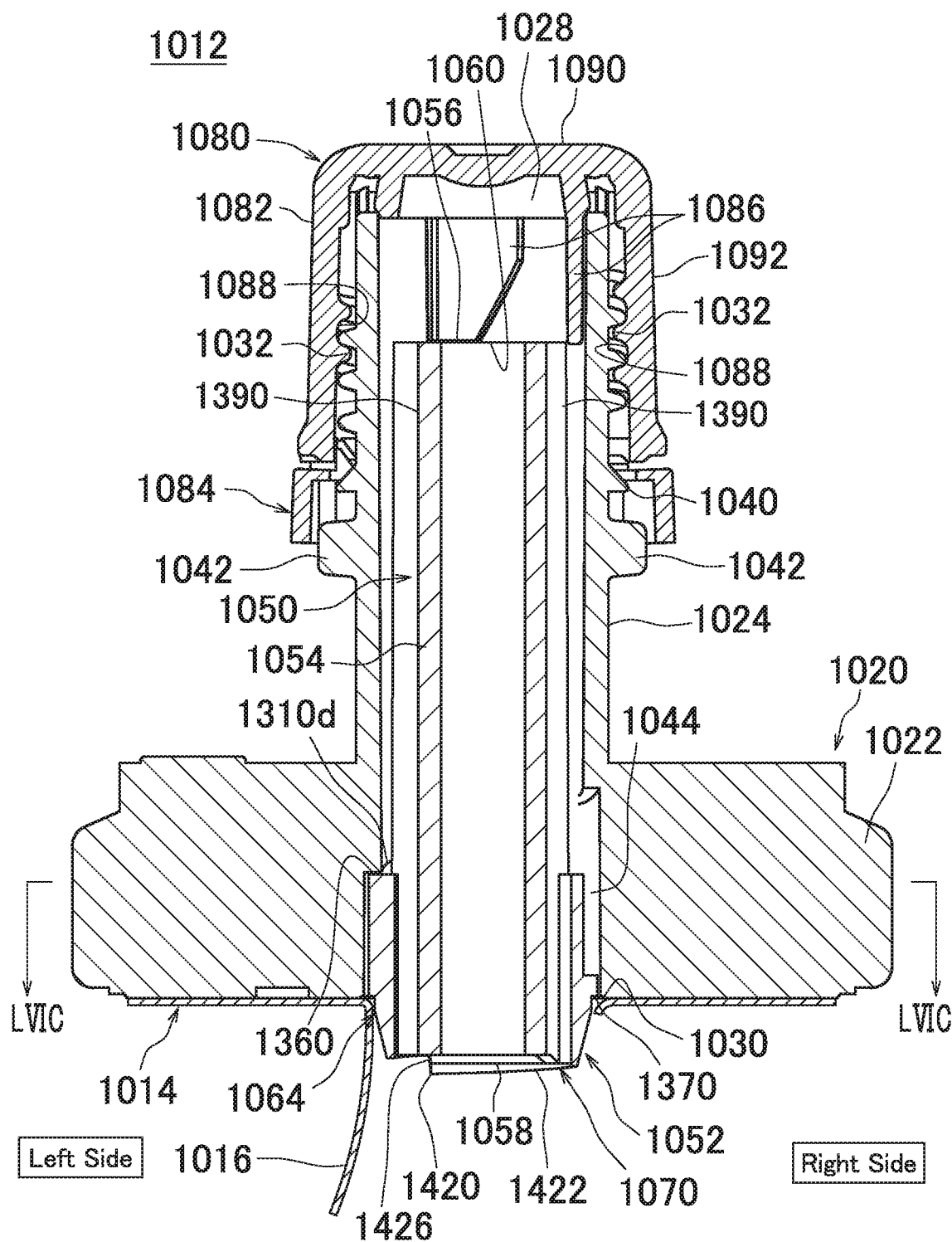
FIG. 59 is a diagram depicting a state in which part of the heat sealed sheet included in the spout-equipped container according to the third embodiment of this invention is torn, and is a sectional view along a height direction with a rotation angle of 300.degree. of the opening element.

Subsequently, description is made to an example of a mode in which the accommodating part 200 of the container 10 and the through hole 1026 formed in the spout 1012 connect with each other by tearing part of the heat sealed sheet 1014 to allow hydrogen water to be drunk, based on FIG. 54 to FIG. 61. FIG. 54 depicts diagrams depicting the spout included in the spout-equipped container according to the third embodiment of this invention, (A) being an end face view along LIVA-LIVA of FIG. 53, and (B) being a schematic view depicting a relation between wing pressing units and wing portions when the activating body is rotated leftward. FIG. 55 depicts schematic development views depicting a state in which a left female screw unit of the spout base and a left male screw unit of the opening element included in the spout-equipped container according to the third embodiment of this invention are screwed together, (A) being a diagram with a rotation angle of 0.degree. of the opening element, (B) being a diagram with a rotation angle of 150.degree. of the opening element, and (C) being a diagram with a rotation angle of 300.degree. of the opening element. FIG. 56 depicts sectional views along a width direction at the height of a rotation stop male unit 1312 of the spout base included in the spout-equipped container according to the third embodiment of this invention (a sectional view along LVI-LVI of FIG. 53), (A) being a diagram with a rotation angle of 0.degree. of the opening element, (B) being a diagram with a rotation angle of 150.degree. of the opening element, and (C) being a diagram with a rotation angle of 300.degree. of the opening element. FIG. 57 depicts schematic plan views depicting a state in which part of the heat sealed sheet included in the spout-equipped container according to the third embodiment of this invention is torn, (A) being a diagram with a rotation angle of 0.degree. of the opening element, (B) being a diagram with a rotation angle of 150.degree. of the opening element, and (C) being a diagram with a rotation angle of 300.degree. of the opening element. FIG. 58 is a diagram depicting a state in which part of the heat sealed sheet included in the spout-equipped container according to the third embodiment of this invention is torn, and is a sectional view along a height direction with a rotation angle of 150.degree. of the opening element. FIG. 59 is a diagram depicting a state in which part of the heat sealed sheet included in the spout-equipped container according to the third embodiment of this invention is torn, and is a sectional view along a height direction with a rotation angle of 300.degree. of the opening element.

Figure 60:
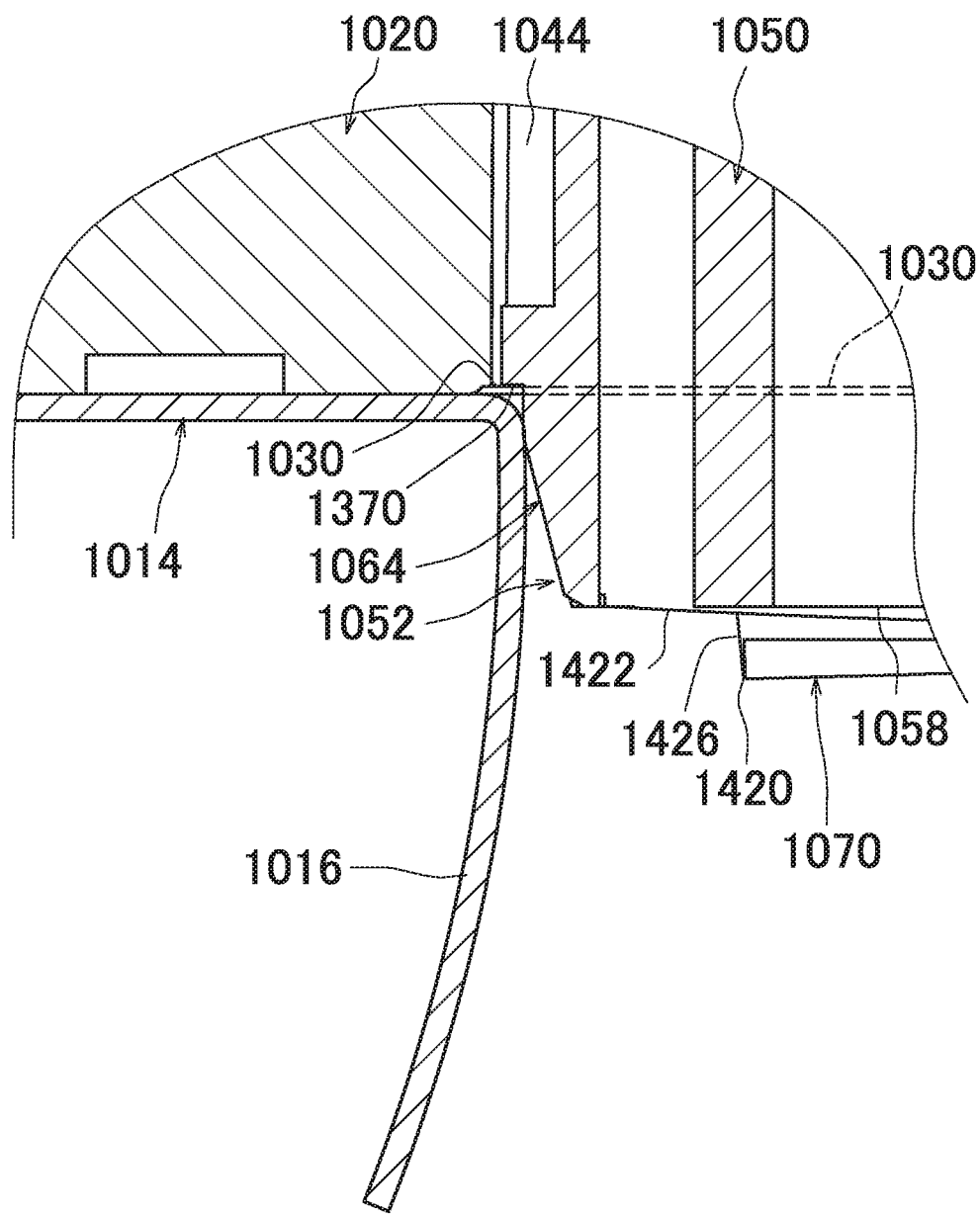
FIG. 60 is a sectional view of a portion near a flange portion of FIG. 59 depicting the spout base according to the third embodiment of this invention.
Figure 61:
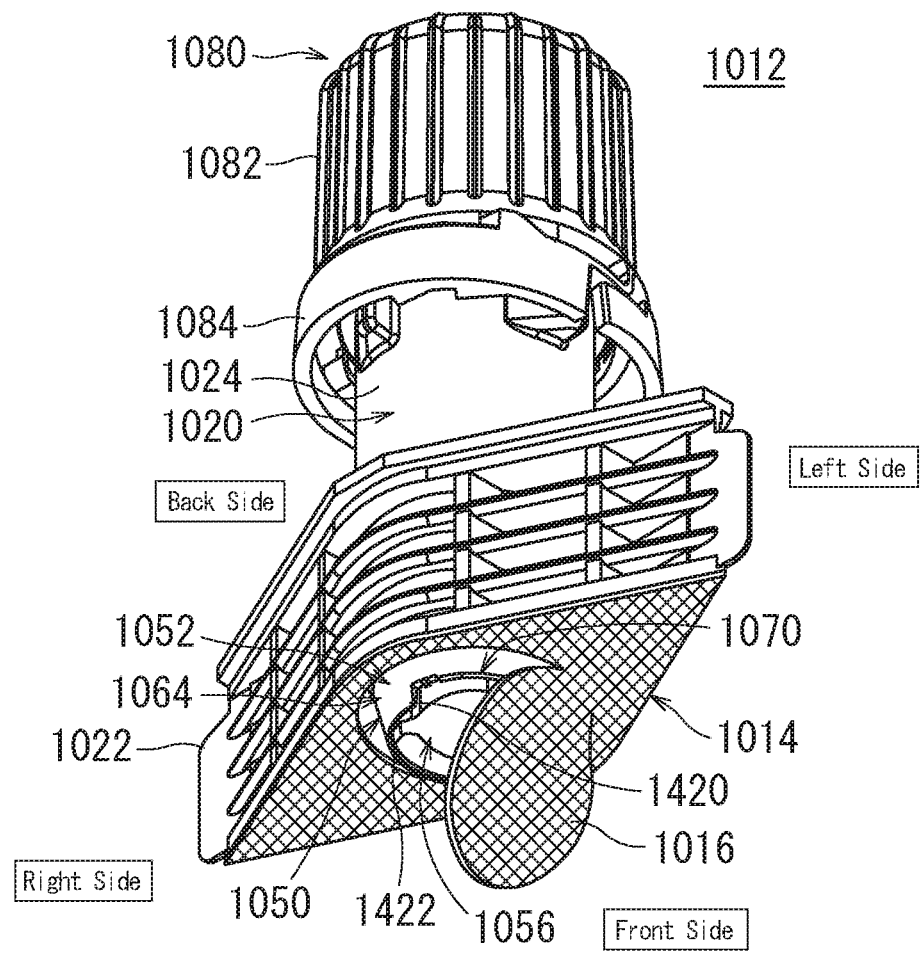
FIG. 61 is a perspective view of a state in which part of the heat sealed sheet included in the spout-equipped container according to the third embodiment of this invention is torn when viewed from a bottom side.

FIG. 60 is a sectional view of a portion near a flange portion of FIG. 59 depicting the spout base according to the third embodiment of this invention. FIG. 61 is a perspective view of a state in which part of the heat sealed sheet included in the spout-equipped container according to the third embodiment of this invention is torn when viewed from a bottom side.

The activating body 1080 is rotated leftward (counterclockwise) in a planar view by holding its skirt 1092 (rotated in a communication rotating direction), and the activating body 1080 is moved upward (first direction). With this, coupling of the four upper-surface preliminary coupling units 1412 of the tamper evidence 1084 and the lower end of the cap 1082 is fractured. Also, simultaneously with this, the rotation stopping units 1098 provided to protrude on the inner surface of the side wall of the tamper evidence 1084 each abut on the tamper evident ring surface 1042*b* of the rotation stopping unit 1042 provided to protrude on the outer surface of the spout base 1020 to try to get over this. Here, since the inner diameter of the tamper evidence 1084 is spread by the rotation stopping units 1042 of the spout base 1020, the four side-surface preliminary coupling units 1414 preliminarily coupling the tamper evidence 1084 in the circumferential direction are also fractured. Note that the two coupling units 1410 in a substantially L shape in a planar view of the tamper evidence 1084 are warped in a direction in which the inner diameter of the tamper evidence 1084 is spread, and the state of coupling with the lower end of the cap 1082 is kept.

When the coupling of the upper-surface preliminary coupling units 1412 and the side-surface preliminary coupling units 1414 of the tamper evidence 1084 is fractured, it becomes clear that the hermetically-sealed cap 1082 has been tampered. With this, safety can be ensured. Furthermore, even if the coupling of the upper-surface preliminary coupling units 1412 and the side-surface preliminary coupling units 1414 is fractured, the tamper evidence 1084 keeps a state in which the coupling unit 1410 is coupled to the lower end of the cap 1082. That is, since the state is such that the cap 1082 and the tamper evidence 1084 are always coupled together by the coupling unit 1410, operability at the time of opening and closing the spout 1012 is favorable.

As described above, by rotating the activating body 1080 leftward (counterclockwise) in a planar view for movement upward (first direction), the coupling of the upper-surface preliminary coupling units 1412 and the side-surface preliminary coupling units 1414 is fractured. Simultaneously with this, an end appearing first at left turn (counterclockwise) in a planar view of each of the three wing pressing units 1086 formed so as to extend downward from the top portion 1090 of the activating body 1080 abuts on a surface appearing first at left turn (counterclockwise) of each of the three wing portions 1390 provided to protrude on the outer surface of the passive shaft unit 1054 of the opening element 1050, and presses the surface forward as sliding thereon. With this, the opening element 1050 inserted in the spout base 1020 is also rotated leftward (counterclockwise) in a planar view.

When the opening element 1050 is rotated leftward (counterclockwise) in a planar view, the guided tilted surface 1360*c* formed on the lower portion of the outer surface is guided and guided by the guide tilted surface 1310*d* formed on the inner wall of the spout base 1020 to proceed downward (second direction). That is, the opening element 1050 moves in a downward direction (second direction) opposite to the upper direction (first direction) in which the activating body 1080 moves.

In initial state, the opening element 1050 has a height of the bottom surface equal to or approximately equal to the height of the bottom surface of the spout base 1020 (that is, the height of the inner opening 1030 of the through hole 1026). Form this initial state, when the opening element 1050 moves downward by being rotated leftward (counterclockwise) in a planar view, the piercer element 1052 formed at the lower end protrudes as rotating from the bottom surface of the spout base 1020. Here, the tearing portion 1420 formed at the lower end of the piercer element 1052 tears the heat sealed sheet 1014 fixed to the bottom surface of the spout base 1020 so as to draw a circle as rotating. That is, as depicted in FIG. 57(B) (a diagram of a state in which the opening element 1050 is rotated leftward at a central angle of 150.degree.), the tearing portion 1420 tears the heat sealed sheet 1014 so as to draw an arc from a tearing staring end portion 1017.

By rotating leftward (counterclockwise) at a central angle of 300.degree., in a planar view, the opening element 1050 tears the heat sealed sheet 1014 from the tearing starting end portion 1017 to a tearing terminating portion 1018 so as to draw an arc, as depicted in FIG. 57(C). In this manner, a drooping portion 1016 having a tearing end edge 1019 in an arc shape at a central angle of 300.degree. is formed. When the opening element 1050 rotates leftward from the initial state at a central angle of 300.degree., the opening element 1050 moves downward to cause the wing pressing units 1086 and the wing portions 1390 not to be in contact with each other, thereby stopping the rotation of the opening element 1050 and causing the rotation stop male unit 1312 formed near a start end of the guide tilted surface 1310d of the spout base 1020 to fit in the rotation stop female unit 1362 formed near a termination end of the guided tilted surface 1360c. With this, the rotation of the opening element 1050 is regulated in a state of being rotated leftward (counterclockwise) at a central angle of 300.degree. from the initial state, and cannot move also in the vertical direction.

With the cap 1082 nipped by hand and rotated leftward (counterclockwise) in a planar view, the activating body 1080 moves upward (first direction, that is, a direction away from the heat sealed sheet 1014) along the outer wall of the spout base 1020. Then, when rotating leftward (counterclockwise) at a rotation angle of 300.degree. by taking the center axis C as the center, the activating body 1080 moves upward by 5/6 winding (winding at a central angle of 300.degree.) from the lower end of the right female screw unit 1088 formed on the inner surface of the skirt 1092.

The opening element 1050 is pressed by the wing portions 1390 by the rotation of the activating body 1080 to rotate leftward (counterclockwise) in a planar view by taking the center axis C as the center, thereby moving downward (second direction, that is, a side of the heat sealed sheet 1014) inside the through hole 1026 of the spout base 1020. Then, when the opening element 1050 is rotated leftward (counterclockwise) at a rotation angle of 300.degree. from the initial state by taking the center axis C as the center, the guided tilted surface 1360c of the opening element 1050 slides on the guide tilted surface 1310d of the spout base 1020 to move downward by a distance from its lower end (that is, the lower end of the piercer element 1052) to the flange portion 1370. That is, when the opening element 1050 rotates leftward (counterclockwise) at a rotation angle of 300.degree. by taking the center axis C as the center from the initial state, a portion from its lower end to the flange portion 1370 protrudes from the heat sealed sheet 1014.

Here, the lower end face of the flange portion 1370 is in a state of being mounted on the upper surface of the warped heat sealed sheet 1014.

Also, the lower end of the wing pressing units 1086 hanging down from the top portion 1090 of the activating body 1080 and the upper end of the opening element 1050 (that is, the upper end of the passive shaft unit 1054) are at an approximately same position in an axial direction.

Then, the rotation stop male unit 1312 formed on the inner wall of the spout base 1020 and the rotation stop female unit 1362 formed on the outer wall of the opening element 1050 are engaged with each other.

The activating body 1080 and the opening element 1050 each move along the axial direction while rotating leftward (counterclockwise) in a planar view. Therefore, the cylindrical portion 1024 of the spout base 1020, the opening element 1050, and the activating body 1080 are each in a substantially cylindrical shape concentric with the center axis C even in a state in which the activating body 1080 and the opening element 1050 are rotated leftward (counterclockwise) at a rotation angle of 300.degree..

The cylindrical portion 1024 of the spout base 1020, the opening element 1050, and the activating body 1080 are each in a substantially cylindrical shape concentric with the center axis C. Therefore, the cylindrical portion 1024 of the spout base 1020, the opening element 1050, and the activating body 1080 are each in a substantially perfect circle shape concentric with the center axis C (center point) in a planar view.

In the spout 1012, the center axis C linearly extends along the axial direction at the center of the cylindrical portion 1024 and the through hole 1026 in a planar view of the cylindrical portion 1024 and the through hole 1026 and at the center of the spout 1012 and the through hole 1026 in the width direction in a front view of the cylindrical portion 1024 and the through hole 1026.

Also in the spout 1012, the center axis C serves as a center point, in a planar view, of the cylindrical portion 1024 of the spout base 1020, the opening element 1050, and the activating body 1080 each in a substantially perfect circle shape in a planar view.

Since the activating body 1080 is in a substantially cylindrical shape, when the top portion 1090 and the skirt 1092 are in a planar view, these are in a substantially perfect circle shape. And, with the outer surface of the activating body 1080 held and the activating body 1080 rotated leftward (counterclockwise) in a planar view by taking the center axis C extending along the axial direction at the center of the top portion 1090 and the skirt 1092 and the center in the width direction of the skirt 1092 as a virtual rotation axis, the activating body 1080 moves upward (first direction) along the axial direction.

Since the opening element 1050 is in a substantially cylindrical shape, when the passive shaft unit 1054 and the piercer element 1052 are in a planar view, these are in a substantially perfect circle shape. And, in the opening element 1050, the wing portions 1390 are pressed to the wing pressing units 1086 of the activating body 1080, and the opening element 1050 is rotated leftward (counterclockwise) in a planar view by taking the center axis C extending along the center of the piercer element 1052 and the passive shaft unit 1054 and the center in the width direction toward the piercer element 1052 and the passive shaft unit 1054 as a virtual rotation axis. With this, the opening element 1050 moves downward (second direction) along the axial direction.

When the activating body 1080 is rotated leftward (counterclockwise) in a planar view from the initial state by taking the center axis C as a virtual rotation axis, the wing pressing units 1086 of the activating body 1080 press the wing portions 1390 of the opening element 1050 forward, and the opening element 1050 is also rotated leftward (counterclockwise) in a planar view from the initial state by taking the center axis C as a virtual rotation axis.

When opening element 1050 is rotated leftward (counterclockwise) at a rotation angle of 300.degree. in a planar view from the initial state by taking the center axis C as a virtual rotation axis, the rotation stop male unit 1312 of the spout base 1020 engages with the rotation stop female unit 1362, and left rotation (and right rotation) by taking the center axis C as a virtual rotation axis is stopped.

The base unit 1062 of the piercer element 1052 of the opening element 1050 has a large-diameter portion 1352 having a dimension in a radial direction equal to that of the flange portion 1370 and extending above the flange portion 1370, a small-diameter portion 1354 having a dimension in a radial direction slightly smaller than that of the flange portion 1370, and a step 1360 formed on a connecting portion between the large-diameter portion 1352 and the small-diameter portion 1354.

The step 1360 has a left-and-right-direction extending portion 1360a extending in parallel with the flange portion 1370 (that is, along a circumferential direction in a left-and-right direction in a side view) near the flange portion 1370, a standing portion 1360b slightly standing upward from one end of the left-and-right direction extending portion 1360a, a guided tilted surface 1360c tilted upper-leftward in a side view from an upper end of the standing portion 1360b and extending along the circumferential direction in the left-and-right direction in a side view to reach an upper end of the base unit 1062, and a vertical-direction extending portion 1360e tilted slightly upper-rightward from the other end of the left-and-right-direction extending portion 1360a and extending upward to reach the upper end of the base unit 1062.

An upper end of the guided tilted surface 1360c and an upper end of the vertical-direction extending portion 1360e are separated from each other in the circumferential direction. That is, part of the upper end of the base unit 1062 is configured of the upper end of the large-diameter portion 1352. One end of the upper end of the large-diameter portion 1352 in the circumferential direction is the upper end of the guided tilted surface 1360c, and the other end thereof is the upper end of the vertical-direction extending portion 1360e. The rotation stop female unit 1362 is a recess in a substantially quadrangular shape in a side view formed at a substantially center portion of the upper end of the large-diameter portion 1352 in the circumferential direction configuring part of the upper end of the base unit 1062.

The rotation stop female unit 1362 is formed near a right side (in a planar view) of the left-and-right-direction extending portion 1360a.

The tearing portion 1420 is formed below the left-and-right-direction extending portion 1360a and near a left side (in a planar view) of the rotation stop female unit 1362.

The opening-element accommodating unit 1044 configuring a lower portion of the through hole 1026 of the spout base 1020 has an opening-element accommodating large-diameter portion 1302 having a dimension in a radial direction corresponding to the large-diameter portion of the opening element 1050 described above, an opening-element accommodating small-diameter portion 1304 having a dimension in the radial direction corresponding to the small-diameter portion of the opening element 1050 described above, and a step 1310 formed on a connecting portion between the opening-element accommodating large-diameter portion 1302 and the opening-element accommodating small-diameter portion 1304.

The opening-element accommodating large-diameter portion 1302 extends above the inner opening 1030, and the opening-element accommodating small-diameter portion 1304 extends above the opening-element accommodating large-diameter portion 1302.

That is, the opening-element accommodating large-diameter portion 1302 has a side wall positioned on an outer diameter side of the through hole 1026 rather than a side wall of the opening-element accommodating small-diameter portion 1304.

The step has a left-and-right-direction extending portion 1310a extending in the left-and-right direction in a side view along the circumferential direction of the wall surface of the through hole 1026, a vertical-direction extending portion 1310b extending downward from one end (left end) of the left-and-right-direction extending portion 1310a in the circumferential direction along the wall surface of the through hole 1026, a lower end portion 1310c extending leftward in a side view from a lower end of the vertical-direction direction extending portion 1310b along the circumferential direction of the wall surface of the through hole 1026, and the guide tilted surface 1310d tilted upper-leftward in a side view from a left end of the lower end portion 1310c and extending in the circumferential direction of the wall surface of the through hole 1026.

The rotation stop male unit 1312 is a projection in a quadrangular shape in a side view formed at a substantially center portion of the lower end of the step 1310 in the circumferential direction. The rotation stop male unit 1312 is a projection provided to protrude downward at the lower end portion 1310c configuring the step 1310.

In an initial state, the rotation stop male unit 1312 formed in the through hole 1026 of the spout base 1020 makes contact with or approximately makes contact with the left-and-right extending portion 1360a of the step 1360 formed on the piercer element 1052 of the opening element 1050. Then, when the opening element 1050 is rotated leftward (counterclockwise) in a planar view, the rotation stop male unit 1312 of the spout base 1020 rotates relatively to the opening element 1050, and proceeds via the left-and-right-direction extending portion 1360a of the step 1360 formed on the piercer element 1052 of the opening element 1050, the standing portion 1360b, the guide tilted surface 1360c, and the upper end portion 1360d to engage with the rotation stop female unit 1362.

By being rotated leftward (counterclockwise) in a planar view from the initial state, the opening element 1050 moves downward (second direction). Here, the opening element 1050 rotates rightward (clockwise) when viewed from a bottom surface side.

That is, when the initial state of the spout 1012 is viewed from the bottom, the rotation stop female unit 1362 of the opening element 1050 is at a position retreated by a central angle of 300.degree. (an opposite position to the left-and-right-direction extending portion 1310a of the step 1310 formed in the connecting portion of the opening-element accommodating large-diameter portion 1302 and the opening-element accommodating small-diameter portion 1304) by taking the center axis C as the center when viewed at right turn from the rotation stop male unit 1312 of the spout base 1020), from there, by being rotated rightward at a central angle of 300.degree. in a bottom view (rotated leftward in a planar view at a central angle of 300.degree. by taking the center axis C as the center) by taking the center axis C as the center, the rotation stop female unit 1362 proceeds via the guide tilted surface 1310d and the lower end portion 1310c configuring the step 1310 formed on the opening-element accommodating unit 1044 to engage with the rotation stop male unit 1312.

As described above, by rotating the opening element 1050 leftward (counterclockwise) at a central angle of 300.degree., part of the heat sealed sheet 1014 is torn, and the accommodating part 200 of the container 10 and the spout through hole 1056 of the opening element 1050 (the through hole 1026 of the spout base 1020) connect with each other. Note that the heat sealed sheet 1014 is torn by the tearing portion 1420 as described above only at a central angle of 300.degree.. That is, since the remaining 60.degree. portion of the heat sealed sheet 1014 is still linked to the other portion, the state is such that the arc-shaped drooping portion 1016 droops with respect to the other portion of the heat sealed sheet 1014. Therefore, no chip occurs due to tearing of the heat sealed sheet 1014. As a result, since no chip falls down to the accommodating part 200 of the container 10, it is possible to erroneously swallow a chip. Note that while the opening element 1050 is rotated leftward at a central angle of 300.degree. in the above description, this is not restrictive, and with rotation at another angle smaller than a central angle of 360.degree., the state may be such that a portion obtained by tearing the heat sealed sheet 1014 and other portion may be linked together.

The piercer element 1052 is formed so as to have a dimension in the radial direction increasing upward from the lower end. Therefore, in the heat sealed sheet 1014, the dimension in the radial direction of the circularly-torn portion is spread by the outer surface of the piercer element 1052 as the opening element 1050 proceeds downward, and is gradually increased. Then, after the opening element 1050 is rotated leftward (counterclockwise) at a central angle of 300.degree., the state is such that the bottom surface of the flange portion 1370 of the opening element 1050 is mounted on an outer edge of the circularly-torn portion on the upper surface (inner surface) of the heat sealed sheet 1014. The heat sealed sheet 1014 has sufficient tension. Therefore, when torn by the piercer element 1052, the drooping portion 1016 droops from the other portion, but the other portion except the drooping portion 1016 (in particular, a portion near the tearing end edge 1019) keeps a so-called strained state. In the opening element 1050, since the flange portion 1370 abuts on the other portion except this drooping portion 1016 of the heat sealed sheet 1014, it is possible to prevent falling-down to the accommodating part 200 of the container 10 after part of the heat sealed sheet 1014 is torn.

Further, the blade tip portion 1070 of the opening element 1050 according to this embodiment is gently tilted gradually upward from the tearing portion 1420 in the direction of left rotation in the planar view (counterclockwise), as described above. Thereby, the opening element 1050 starts to rotate from the initial state and tears the heat sealed sheet 1014 with the cutting edge unit 1064, and can keep tearing the heat sealed sheet 1014 smoothly without getting stuck with the heat sealed sheet 1014 as it further moves downward while rotating leftward (counterclockwise).

As described above, by rotating the activating body 1080 leftward (counterclockwise) in a planar view, the activating body 1080 moves upward. With this, preliminary coupling of the tamper evidence 1084 is fractured, and it becomes clear that the hermetically-sealed cap 1082 has been tampered. Also, simultaneously with this, the opening element 1050 moves downward as rotating leftward (counterclockwise) in a planar view. With this, part of the heat sealed sheet 1014 is torn, and the accommodating part 200 of the container 10 and the through hole 1026 of the spout base 1020 (the spout through hole 1056 of the opening element 1050) connect with each other. Here, the state is such that the activating body 1080 is rotated leftward (counterclockwise) at a central angle of approximately 300.degree.. From here, by further rotating the activating body 1080 leftward (counterclockwise) in a planar view, the activating body 1080 is moved upward, the screwed state between the right female screw unit 1088 formed on the inner surface of the activating body 1080 and the right male screw unit 1032 formed on the outer surface of the spout base 1020 is released, and the activating body 1080 is removed from the spout base 1020. In this manner, the outlet 1060 of the spout through hole 1056 formed in the opening element 1050 and the outer opening 1028 formed in the spout base 1020 are opened.

(Regarding Mode when Activating Body 1080 is Attached Again to Spout Base 1020)

Note that by removing the activating body 1080 from the spout base 1020 and then attaching again, the outer opening 1028 of the through hole 1026 formed in the spout base 1020 (the outlet 1060 of the spout through hole 1056 formed in the passive shaft unit 1054) can be closed, and hydrogen water can be prevented from leaking outside from the accommodating part 200 of the container 10. When the activating body 1080 covers the upper end of the spout base 1020 and is screwed at right turn in a planar view in order to be attached to the spout base 1020, the lower ends of the three wing portions 1390 formed on the activating body 1080 are about to abut on the upper ends of the wing pressing units 1086 of the passive shaft unit 1054 inserted in the through hole 1026.

FIG. 62 depicts diagrams when the activating body included in the spout-equipped container according to the third embodiment of this invention is removed from the spout base and then attached thereto again, (A) being a schematic view depicting a relation between the wing pressing units and the wing portions and (B) being a sectional view along the height direction. Here, the lower end (tip portion) of the wing pressing unit 1086 is formed smaller in width dimension than its upper end (root portion). Therefore, when the activating body 1080 is removed from the initial state and attached again, the wing pressing unit 1086 is less prone to be in contact with the wing portion 1390 of the opening element 1050. Note that, as described above, the three wing portions 1390 formed on the activating body 1080 are each formed so that, in a planar view, the angle formed by the direction in which the surface appearing first when viewed at left turn (counterclockwise) protrudes and the tangential direction of the outer surface of the passive shaft unit 1054 is smaller than the angle formed by the direction in which the surface appearing later when viewed at left turn protrudes and the tangential direction of the outer surface of the passive shaft unit 1054. Also, as described above, the three wing pressing units 1086 formed on the activating body 1080 are each formed so that the dimension of the end appearing later in the radial direction is slightly larger than that of the end appearing first when viewed at left turn in a planar view. With the wing portions 1390 and the wing pressing units 1086 having these shapes, even if they interfere with each other immediately before finishing to attach the activating body 1080, they can be deformed to escape forces.

Effects

In the spout-equipped container 10 according to this embodiment, as described above, only by rotating the activating body 1080 leftward (counterclockwise) in a planar view from the initial state for removal from the spout base 1020, it becomes clear that the hermetically-sealed cap 1082 has been tampered, and the accommodating part 200 of the container 10, the through hole 1026 of the spout base 1020, and the spout through hole 1056 of the opening element 1050 connect with one another to cause a state in which hydrogen water is drinkable. Therefore, since no particular procedure for tearing the heat sealed sheet 1014 is required, the spout-equipped container 10 with favorable operability can be provided.

Examples

Figure 9A:
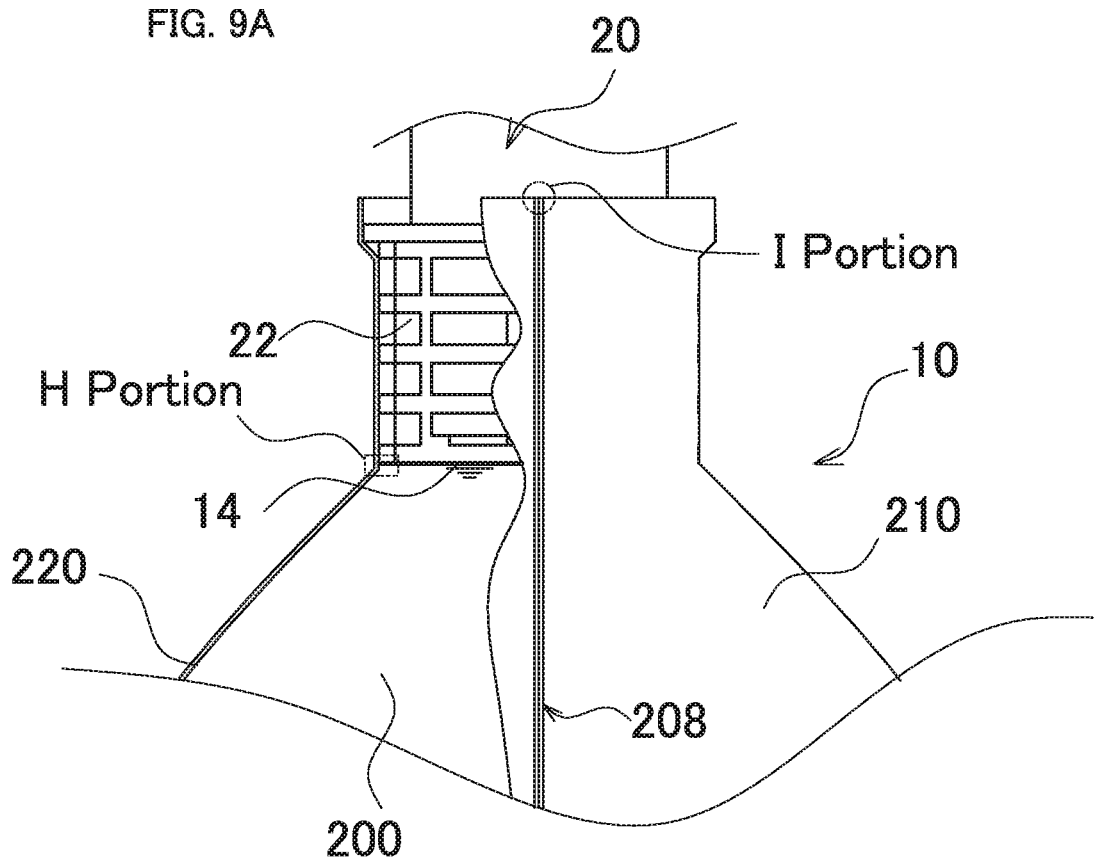
FIGS. 9A, 9B, and 9C depict enlarged sectional views after the spout is attached to the container according to the first embodiment of the present invention, FIG. 9A being an illustrative side view, FIG. 9B being an illustrative enlarged sectional view of an H portion of FIG. 9A, and FIG. 9C being an illustrative enlarged sectional view of an I portion of FIG. 9A.
Figure 9B:
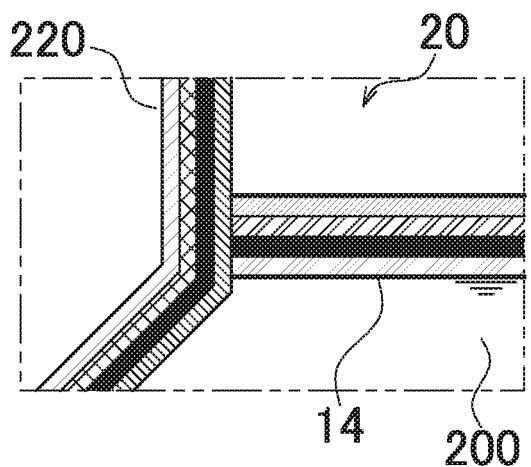
Figure 9C:
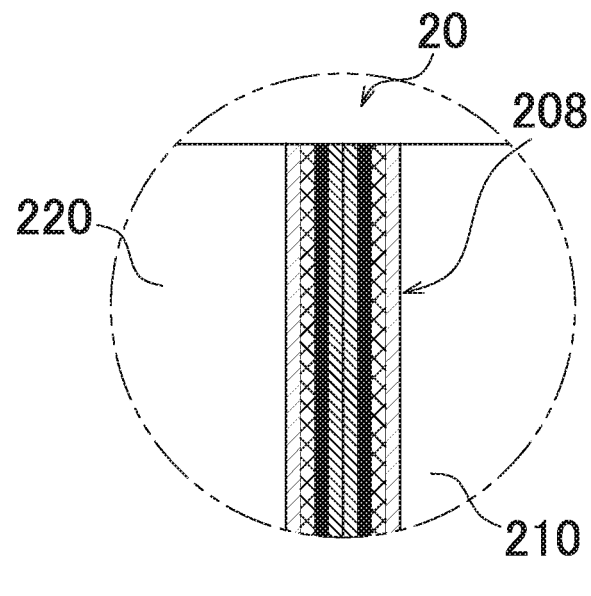

An example according to the present invention embodiment is described. FIG. 9 depicts enlarged sectional views after the spout is welded to the container according to the first embodiment of the present invention. The spout-equipped container is a suction-opening-equipped standing pouch having the spout 12 attached to the container 10.

As for the container 10, the first container sheet 210 in a substantially rectangular shape in a planar view and the second container sheet 220 in a substantially rectangular shape in a planar view are welded to a bottom sheet in a ship shape at their peripheral edges, and also welded with the left side portion 206 orthogonal to the bottom portion 204. To the resultant subject, the spout 12 is attached between the upper side edge 216 of the first container sheet 210 and the upper side edge 226 of the second container sheet 220 as upper edges on a suction opening side opposite to the bottom portion 204, with upper edges welded, for preparation.

Next, as for the container 10, hydrogen water (substance obtained by mixing hydrogen into water) is poured into the accommodating part 200 between the right side edge 214 of the first container sheet 210 and the right side edge 224 of the second container sheet 220 that are orthogonal to the bottom portion 204, that is, between a space obtained by separation of the first container sheet 210 and the second container sheet 220, and then the right side edge 214 of the first container sheet 210 and the right side edge 224 of the second container sheet 220 are welded together, to enclose hydrogen water in the accommodating part 200.

The first container sheet 210 and the second container sheet 220 have the same layer structure, that is, a four-layer structure, with the outside first layer made of polyethylene terephthalate (PET), the second layer inside thereof made of nylon (NY), the third layer inside thereof made of an aluminum foil (AL), and the fourth layer inside thereof made of linear low-density polyethylene (LLDPE).

The linear low-density polyethylene (LLDPE) of the fourth layer on the innermost side makes contact with hydrogen water in the accommodating part 200.

The heat sealed sheet 14 (thickness equal to or larger than 0.0006 mm and equal to or smaller than 0.2 mm) is thermally welded to the spout base 20 of the spout 12 on a first layer side, and the first layer of the heat sealed sheet 14, the first container sheet 210, and the second container sheet 220 are welded to be in close contact with one another.

The spout 12 is molded of polyethylene.

The heat sealed sheet 14 adhered to the spout base 20 of the spout 12 has a four-layer structure, with the first layer closest to the spout base 20 side made of polyethylene terephthalate (PET), the second layer thereabove made of low-density polyethylene (PE), the third layer thereabove made of an aluminum foil (AL), and the fourth layer thereabove made of linear low-density polyethylene (PE).

In the heat sealed sheet 14, the first layer forms a thermal welding layer configuring an adhesive-agent layer, the second layer is an intermediate layer to protect the aluminum foil of the third layer, the third layer is a layer with barrier property such as preventing hydrogen of hydrogen water or the like from getting out of the container 10 through the spout 12, and the fourth layer is a layer for retaining so that a portion rounded by a cut region at the time of tearing the heat sealed sheet 14 is prevented from being cut off from the heat sealed sheet 14 and falling down.

The heat sealed sheet 14 is in close contact with the fourth layer of the first container sheet 210 and the fourth layer of the second container sheet 220 of the container 10.

The fourth layer on the lowermost side makes contact with hydrogen water in the accommodating part 200.

The container has a size of 210 mm in height, 120 mm in width, and 40 mm in thickness of the bottom portion. The aluminum sheet configuring the heat sealed sheet 14 has a size approximately equal to the bottom surface of the spout base 1020. Hydrogen water accommodated in the container 10 is 300 ml.

In this container 10, as depicted in Table 1, hydrogen water did not get out thereof for a long period of time, while hydrogen condensation decreases in a comparative example without an aluminum sheet being pasted.

This spout-equipped container has accommodated therein liquid contents of foods and so forth such as hydrogen water, juice, fruit juice, soup, stew, jelly, and coffee, and a user can take out the contents from the spout.

In particular, even if the contents are prone to oxidation such as juice and fruit juice, by adding hydrogen and the contents become resistant to oxidation due to reducing action of hydrogen.

Figure 63A:
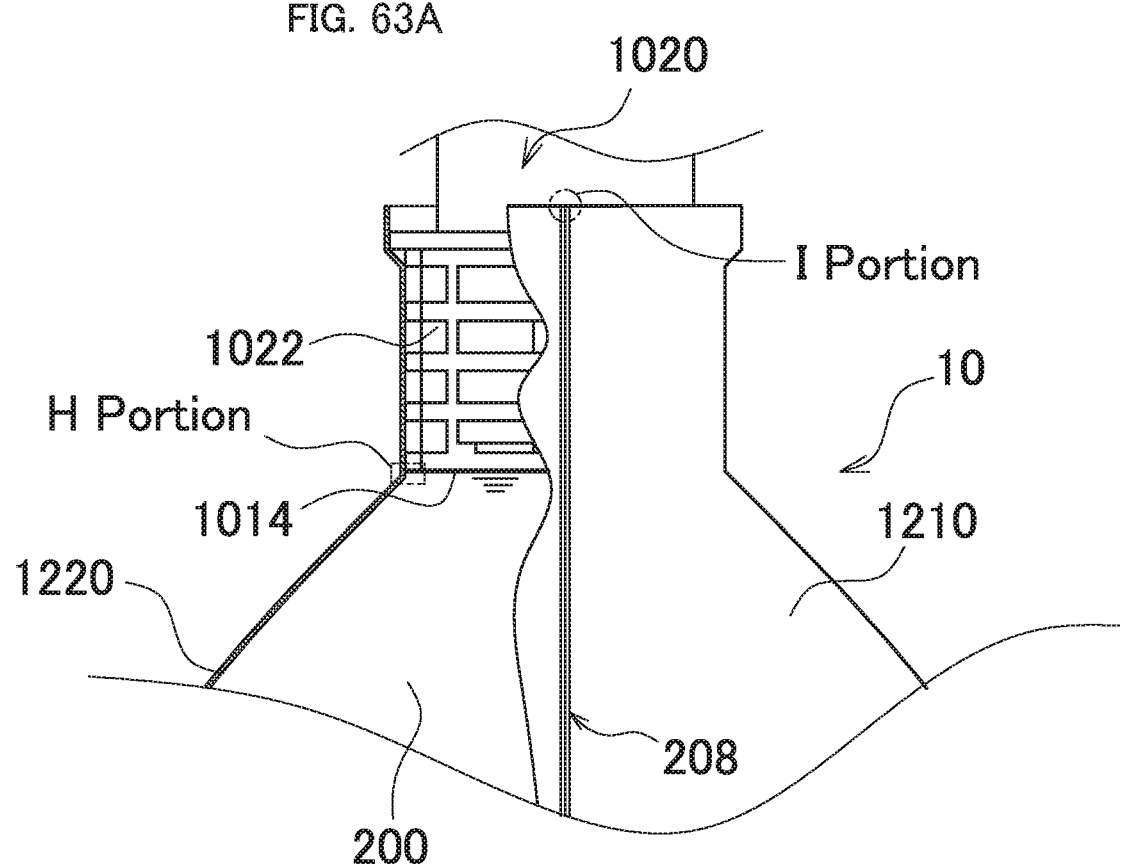
FIGS. 63A, 63B, and 63C are enlarged sectional views after the spout is attached to a container according to the third embodiment of this invention.
Figure 63B:
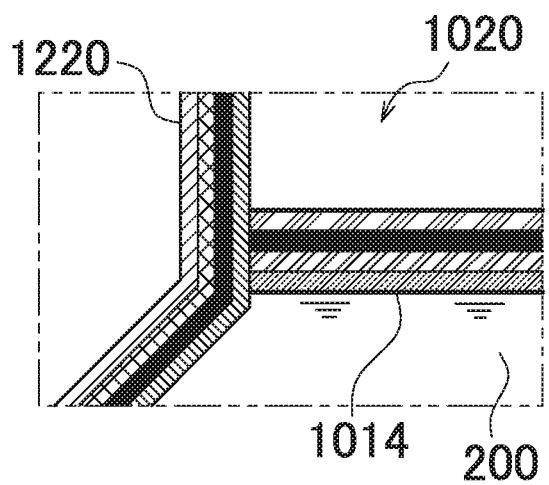
Figure 63C:
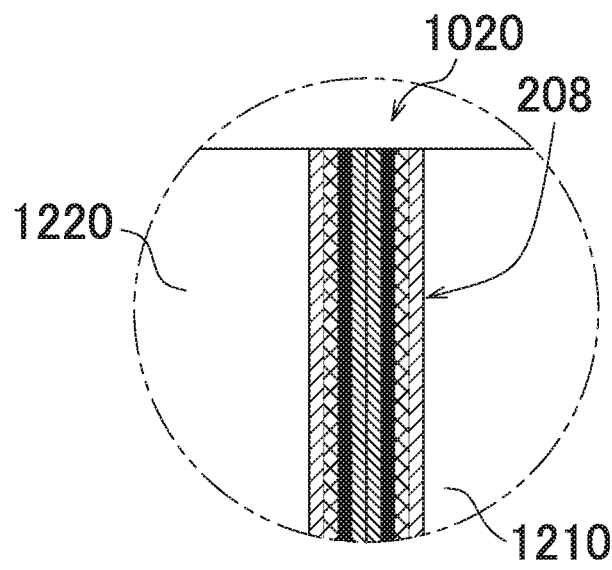

An example according to the second and third embodiment is described. FIG. 63 is an enlarged sectional view after the spout is attached to the container according to the second embodiment of this invention.

The spout-equipped container is a suction-opening-equipped standing pouch having the spout 1012 attached to the container 10.

As for the container 10, the first container sheet 210 in a substantially rectangular shape in a planar view and the second container sheet 220 in a substantially rectangular shape in a planar view are welded to a bottom sheet in a ship shape at their peripheral edges, and also welded with the left side portion 206 orthogonal to the bottom portion 204. To the resultant subject, the spout 1012 is attached between the upper side edge 216 of the first container sheet 210 and the upper side edge 226 of the second container sheet 220 as upper edges on a suction opening side opposite to the bottom portion 204, with upper edges welded, for preparation.

Next, as for the container 10, hydrogen water (substance obtained by mixing hydrogen into water) is poured into the accommodating part 200 between the right side edge 214 of the first container sheet 210 and the right side edge 224 of the second container sheet 220 that are orthogonal to the bottom portion 204, that is, between a space obtained by separation of the first container sheet 210 and the second container sheet 220, and then the right side edge 214 of the first container sheet 210 and the right side edge 224 of the second container sheet 220 are welded together, to enclose hydrogen water in the accommodating part 200.

The first container sheet 210 and the second container sheet 220 have the same layer structure, that is, a four-layer structure, with the outside first layer made of polyethylene terephthalate (PET), the second layer inside thereof made of an aluminum foil (AL), the third layer inside thereof made of nylon (NY) and the fourth layer inside thereof made of linear low-density polyethylene (LLDPE).

The heat sealed sheet 1014 (thickness equal to or larger than 0.0006 mm and equal to or smaller than 0.2 mm) adhered to the spout base 1020 of the spout 1012 has a four-layer structure, with the first layer on the most spout base 1020 side made of low-density polyethylene (PE), the second layer thereabove made of an aluminum foil (AL), the third layer thereabove made of low-density polyethylene (PE), and the fourth layer thereabove made of polyethylene terephthalate (PET).

The heat sealed sheet 1014 is thermally welded to the spout base 1020 of the spout 1012 on a first layer side, and the first layer of the heat sealed sheet 1014, the first container sheet 210, and the second container sheet 220 are welded to be in close contact with one another.

The spout 1012 is molded of polyethylene.

In the heat sealed sheet 1014, the first layer forms a thermal welding layer configuring an adhesive-agent layer, the second layer is a layer with barrier property such as preventing hydrogen of hydrogen water or the like from getting out of the container 10 through the spout 1012, and the third layer and the fourth layers are layers for retaining so that a portion rounded by a cut region at the time of tearing the heat sealed sheet 1014 is prevented from being cut off from the heat sealed sheet 1014 and falling down.

The heat sealed sheet 1014 is in close contact with the fourth layer of the first container sheet 210 and the fourth layer of the second container sheet 220 of the container 10.

The fourth layer on the lowermost side makes contact with hydrogen water in the accommodating part 200.

The container has a size of 210 mm in height, 120 mm in width, and 40 mm in thickness of the bottom portion. The aluminum sheet configuring the heat sealed sheet 14 has a size approximately equal to the bottom surface of the spout base 1020. Hydrogen water accommodated in the container 10 is 300 ml.

(Spout-Equipped Container 10 According to Forth Embodiment)

Figure 64:
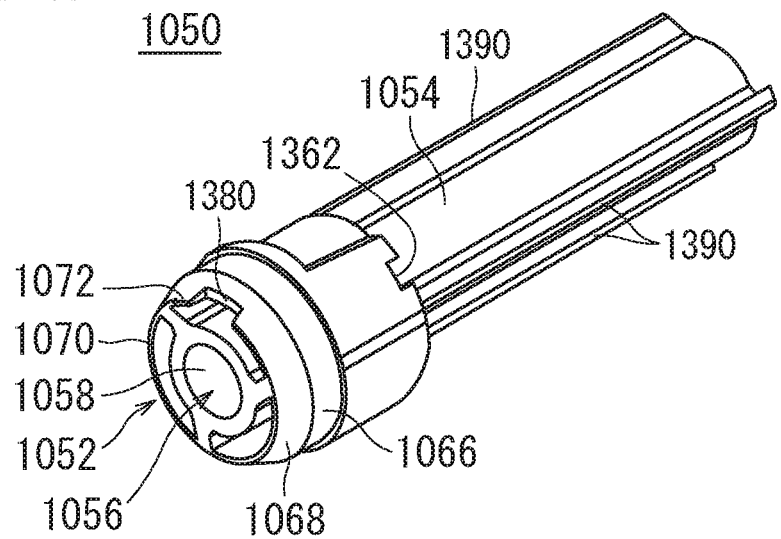
FIG. 64 is a perspective view depicting an opening element included in a spout-equipped container according to a fourth embodiment of this invention.
Figure 65:
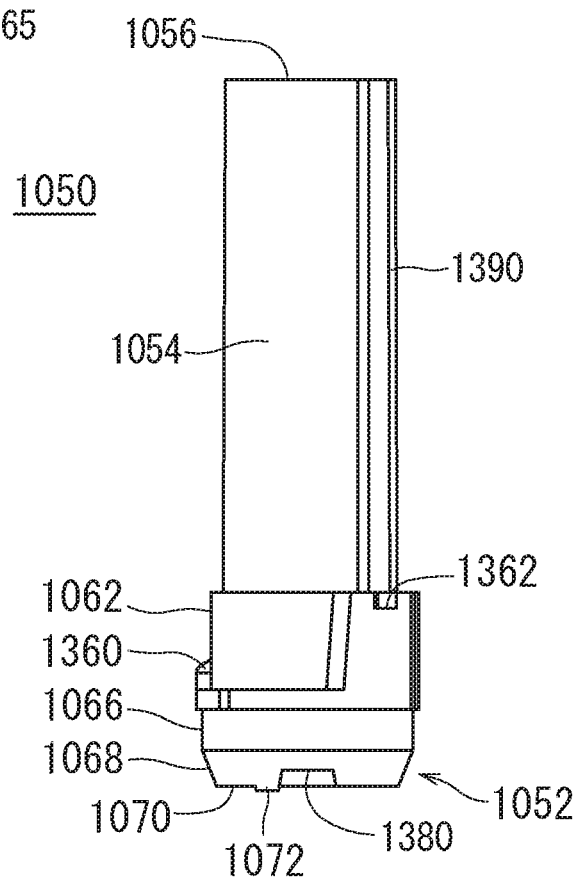
FIG. 65 is a front view depicting the opening element included in the spout-equipped container according to the fourth embodiment of this invention.
Figure 66A:
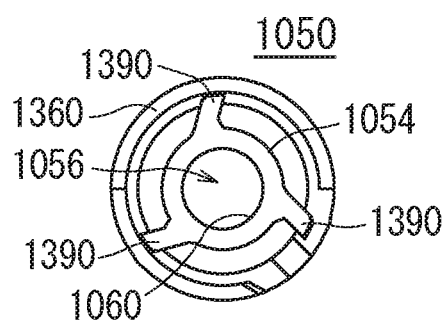
FIGS. 66A, 66B, and 66C depict diagrams depicting the opening element included in the spout-equipped container according to the fourth embodiment of this invention, FIG. 66A being a plan view, FIG. 66B being a side view, and FIG. 66C being a bottom view.
Figure 66B:
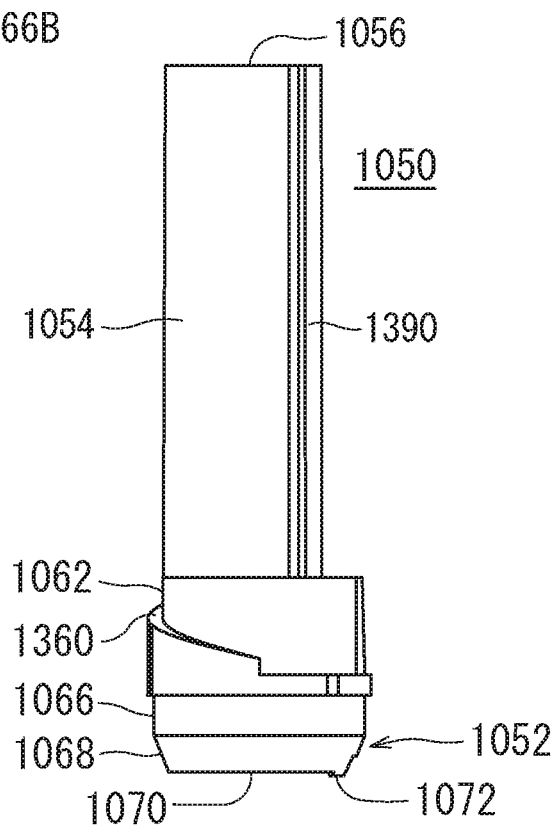
Figure 66C:
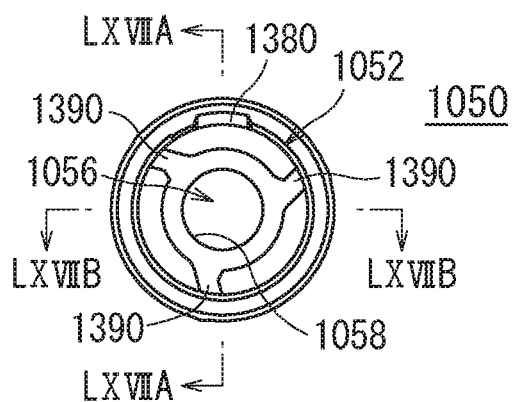
Figure 67A:
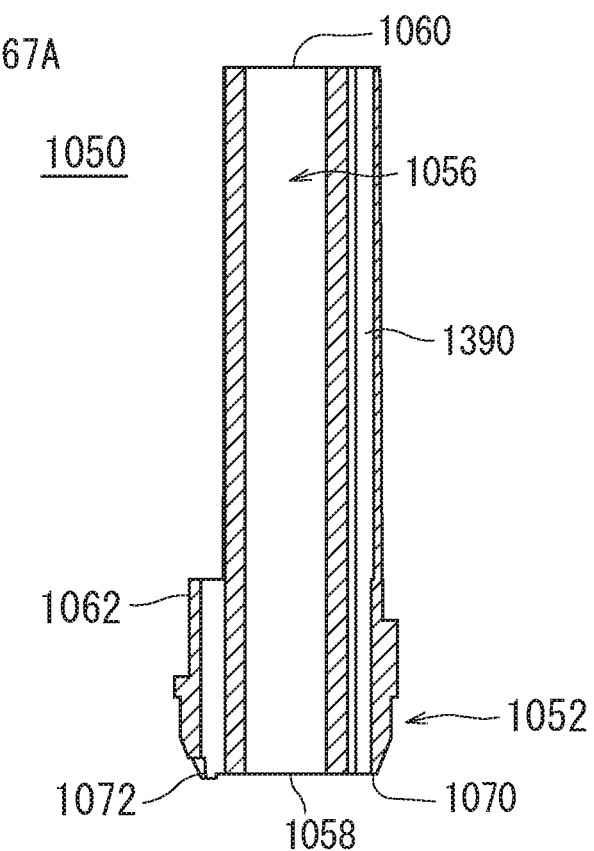
FIGS. 67A and 67B depict diagrams depicting the opening element included in the spout-equipped container according to the fourth embodiment of this invention, FIG. 67A being a sectional view along LXVIIA-LXVIIA of FIG. 66C and FIG. 67B being a sectional view along LXVIIB-LXVIIB of FIG. 66C.
Figure 67B:
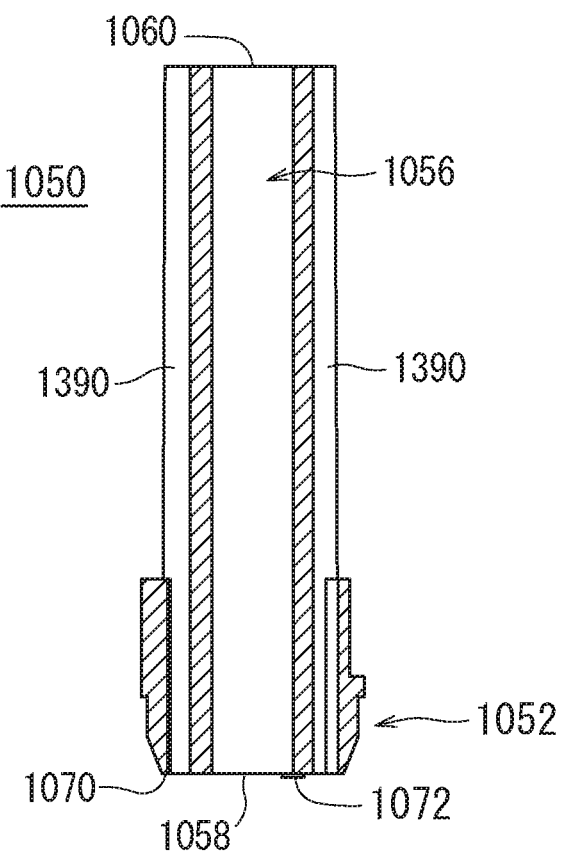

Next, a spout-equipped container according to a third embodiment of this invention is described based on FIG. 64 to FIG. 67. Note that the spout-equipped container according to the forth embodiment of this invention has a structure similar to that of the spout-equipped container according to the second embodiment described above except the piercer element of the opening element (that is, the container 10, the spout base 1020, the cap 1082, and the heat sealed sheet 1014, and a portion above the piercer element 1052 of the opening element 1050 are identical to those of the second embodiment described above). Therefore, identical portions are provided with the same reference character, and similar description is not repeated. FIG. 64 is a perspective view depicting an opening element included in a spout-equipped container according to a fourth embodiment of this invention. FIG. 65 is a front view depicting the opening element included in the spout-equipped container according to the fourth embodiment of this invention. FIG. 66 depicts diagrams depicting the opening element included in the spout-equipped container according to the fourth embodiment of this invention, (A) being a plan view, (B) being a side view, and (C) being a bottom view. FIG. 67 depicts diagrams depicting the opening element included in the spout-equipped container according to the fourth embodiment of this invention, (A) being a sectional view along LXVIIA-LXVIIA of FIG. 66(C) and (B) being a sectional view along LXVIIB-LXVIIB of FIG. 66(C).

The piercer element 1052 according to this embodiment has a blade protruding portion 1072 (a sharp cutting edge at a head portion in a connection rotating direction to cut into the heat sealed sheet) in a substantially quadrangular shape in a side view provided to protrude downward from a position adjacent to the notch portion 1380 of the blade tip portion 1070 at a lower end of the piercer element 1052. A right end side of the blade protruding portion 1072 is formed so as to linearly extend in the vertical direction continuously with a left end side of the notch portion 1380. A lower end side of the blade protruding portion 1072 is parallel with the blade tip portion 1070 in a side view. As with the piercer element 1052 according to the second embodiment described above, with the opening element 1050 moving while rotating downward (a side of the heat sealed sheet 1014), the heat sealed sheet 1014 is torn by a corner portion formed of the right end side and the lower end side of the blade protruding portion 1072. In the piercer element 1052 according to this embodiment, with this blade protruding portion 1072, sharpness becomes more favorable. Therefore, in the spout-equipped container 10 according to this embodiment, the heat sealed sheet 1014 can be easily torn, and the drooping portion 1016 of the heat sealed sheet 1014 becomes less prone to fall down to the accommodating part 200 of the container 10.

(Spout-Equipped Container 10 According to Fifth Embodiment)

Figure 68:
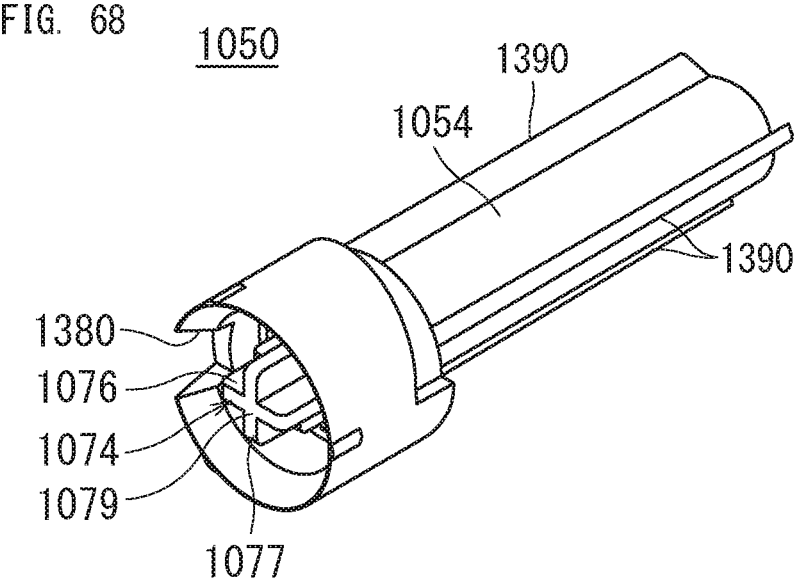
FIG. 68 is a perspective view depicting an opening element included in a spout-equipped container according to a fifth embodiment of this invention.
Figure 69:
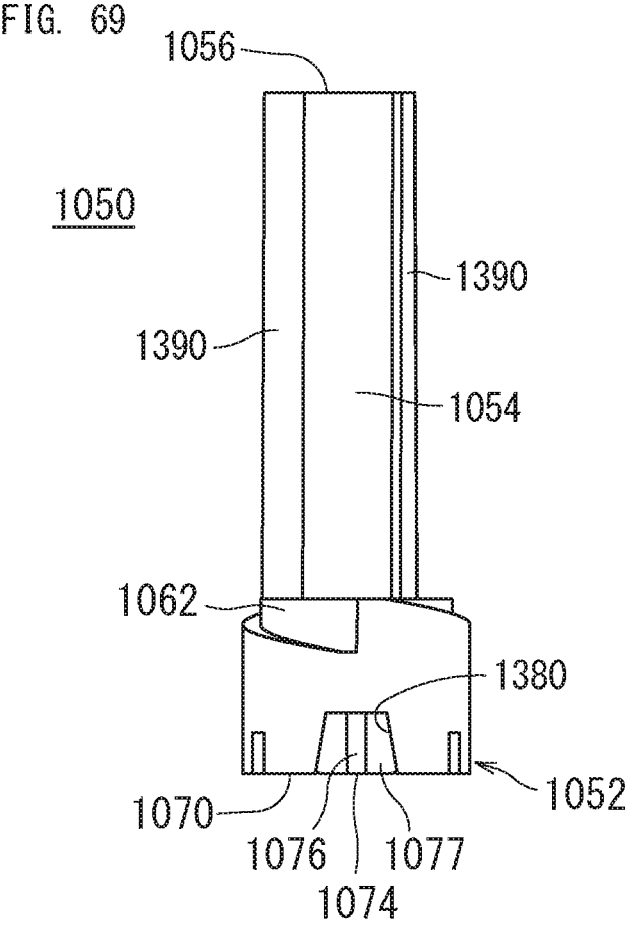
FIG. 69 is a front view depicting the opening element included in the spout-equipped container according to the fifth embodiment of this invention.
Figure 70A:
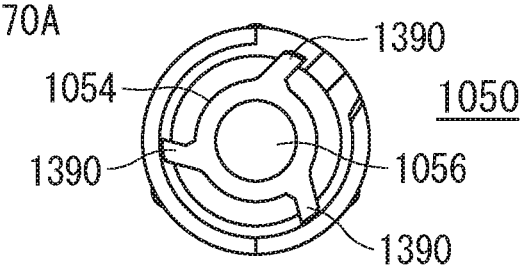
FIGS. 70A, 70B, and 70C depict diagrams depicting the opening element included in the spout-equipped container according to the fifth embodiment of this invention, FIG. 70A being a plan view, FIG. 70B being a sectional view along LXXB-LXXB of FIG. 70C, and FIG. 70C being a bottom view.
Figure 70B:
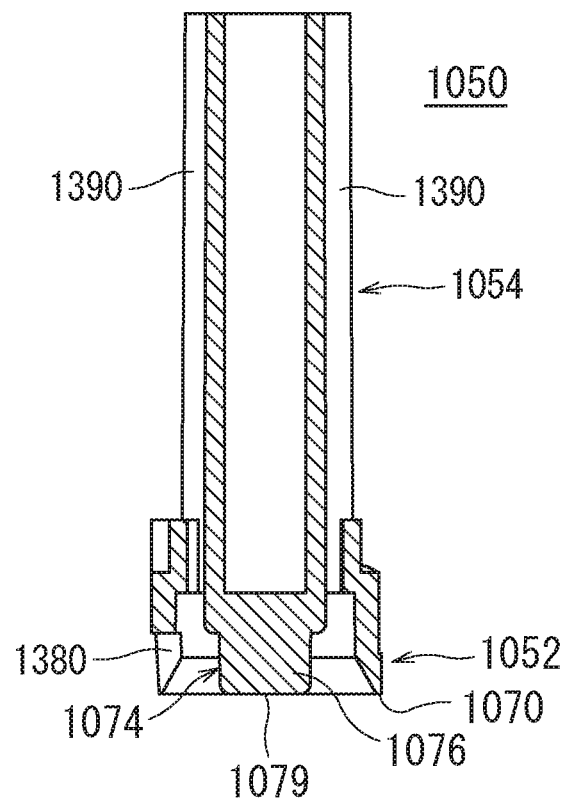
Figure 70C:
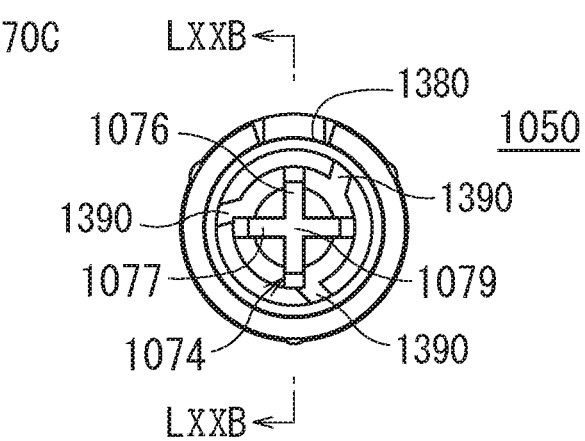
Figure 71:
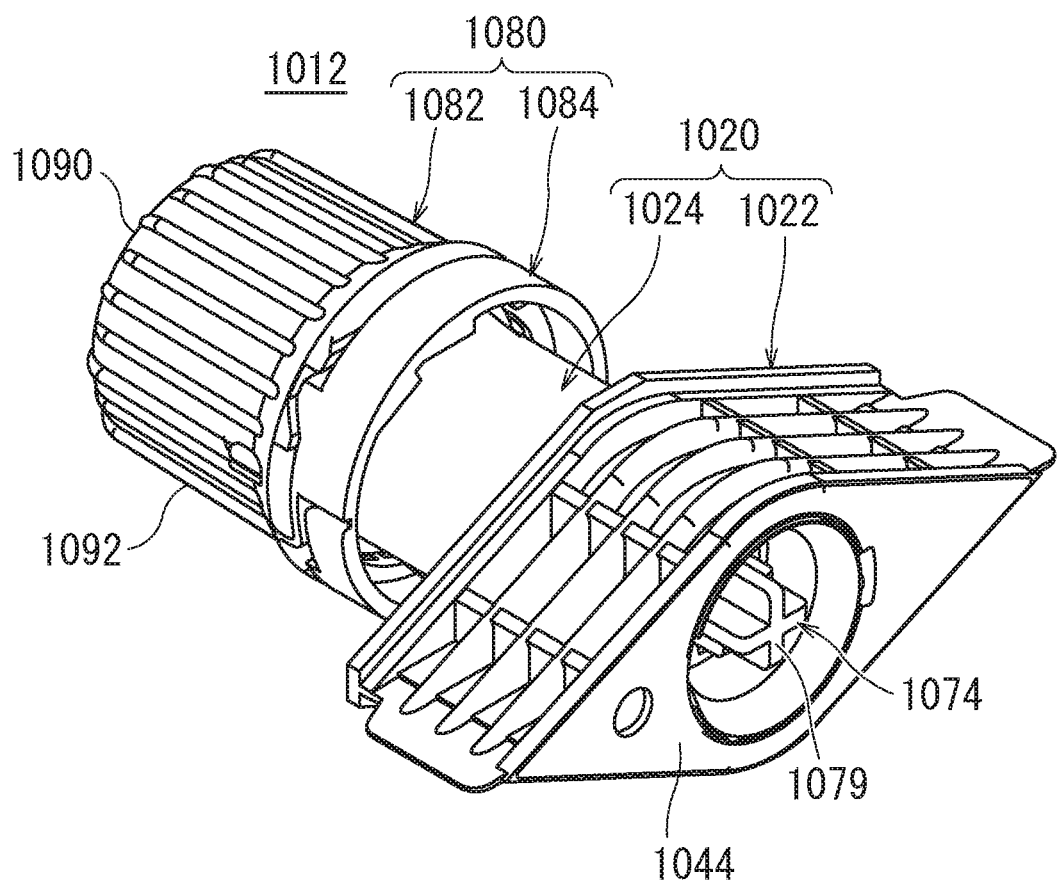
FIG. 71 is a perspective view of a spout included in the spout-equipped container according to the fifth embodiment of this invention, with its bottom surface viewable.

Next, a spout-equipped container 10 according to a fifth embodiment of this invention is described with reference to FIG. 68 to FIG. 71. Note that the spout-equipped container according to this embodiment has a structure similar to the spout-equipped container according to the second and third embodiments described above, except an opening element (that is, the container 10, the spout base 1020, the cap 1082, and the heat sealed sheet 1014 are identical to those of the second and third embodiments described above). Therefore, identical portions are provided with a same reference character, and similar description is not repeated herein. FIG. 68 is a perspective view depicting an opening element included in a spout-equipped container according to a fifth embodiment of this invention. FIG. 69 is a front view depicting the opening element included in the spout-equipped container according to the fifth embodiment of this invention. FIG. 70 depicts diagrams depicting the opening body opening element included in the spout-equipped container according to the fifth embodiment of this invention, (A) being a plan view, (B) being a sectional view along LXXB-LXXB of (C), and (C) being a bottom view. FIG. 71 is a perspective view of a spout included in the spout-equipped container according to the fifth embodiment of this invention, with its bottom surface viewable.

The passive shaft unit 1054 of the opening element 1050 according to the second and third embodiments described above has an approximately same shape along the axial direction from its upper end to lower end. That is, at any position in the axial direction, the passive shaft unit 1054 according to the second and third embodiments described above has an approximately same cross-section shape along a plane orthogonal to the axial direction (a plane extending in parallel with the bottom surface of the spout base 1020). On the other hand, in the passive shaft unit 1054 according to this embodiment, the shape of a lower end is different from the shape of other portion. Specifically, in the passive shaft unit 1054 according to this embodiment, a portion from its upper end to a portion around a substantially center portion of the piercer element 1052 in the axial direction has the same shape as the passive shaft unit 1054 according to the second and third embodiments described above, a portion from the portion around the substantially center portion of the piercer element 1052 in the axial direction to a lower end is a heat sealed sheet abutment support unit 1074 formed so as to be in a substantial cross in a bottom view. The heat sealed sheet abutment support unit 1074 has a first plate-shaped portion 1076 in a flat plate shape extending along the axial direction and a second plate-shaped portion 1077 in a flat plate shape extending along the axial direction and orthogonal to the first plate-shaped portion 1076 in a bottom view. The first plate-shaped portion 1076 and the second plate-shaped portion 1077 have the same shape. The first plate-shaped portion 1076 and the second plate-shaped portion 1077 cross at their substantially center portions in a bottom view, and are integrally formed at their crossing portion. And, a lower end of the heat sealed sheet abutment support unit 1074 (that is, lower end faces of the first plate-shaped portion 1076 and the second plate-shaped portion 1077) abuts on the upper surface of the heat sealed sheet 1014 in an initial state.

In the spout container 10 according to this embodiment, by providing the heat sealed sheet abutment support unit 1074 as described above, the heat sealed sheet 1014 can be supported from its upper surface in an initial state. Therefore, it is possible to prevent the heat sealed sheet 1014 from being inadvertently broken. Also, with the heat sealed sheet abutment support unit 1074 having a substantially cross shape in a bottom view, a sufficiently large space is formed on the periphery of the heat sealed sheet abutment support unit 1074 (such as the periphery of a portion where the first plate-shaped portion 1076 and the second plate-shaped portion 1077 cross). With this, penetration in the axial direction including the spout through hole 1056 of the opening element 1050 can be ensured, and therefore the heat sealed sheet abutment support unit 1074 is not an obstruction when hydrogen water is spouted from the accommodating part 200 of the container 10.

(Spout-Equipped Container 10 According to Sixth Embodiment)

Figure 72:
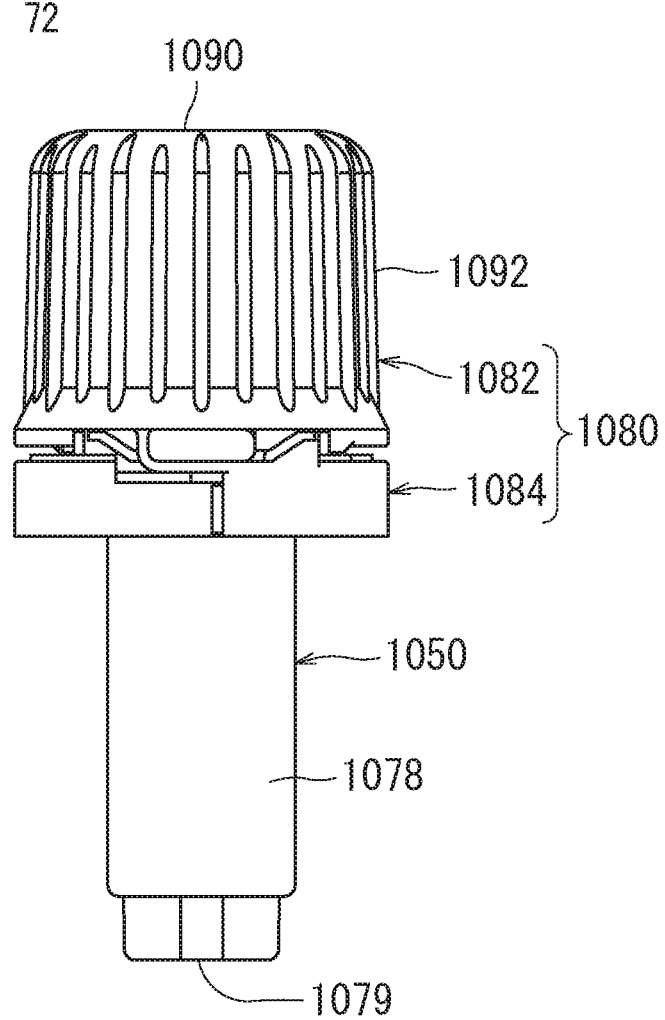
FIG. 72 is a front view depicting an activating body and an opening element included in a spout-equipped container according to a sixth embodiment of this invention.
Figure 73:
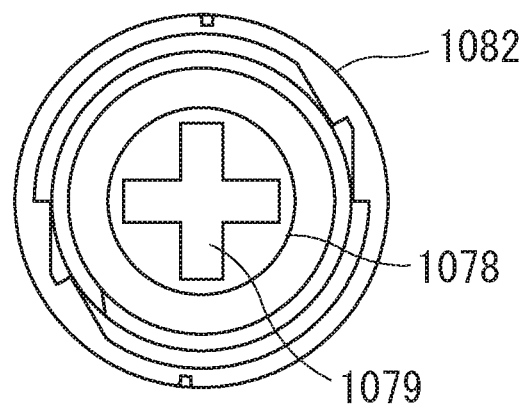
FIG. 73 is a bottom view depicting the activating body and the opening element included in the spout-equipped container according to the sixth embodiment of this invention.
Figure 74A:
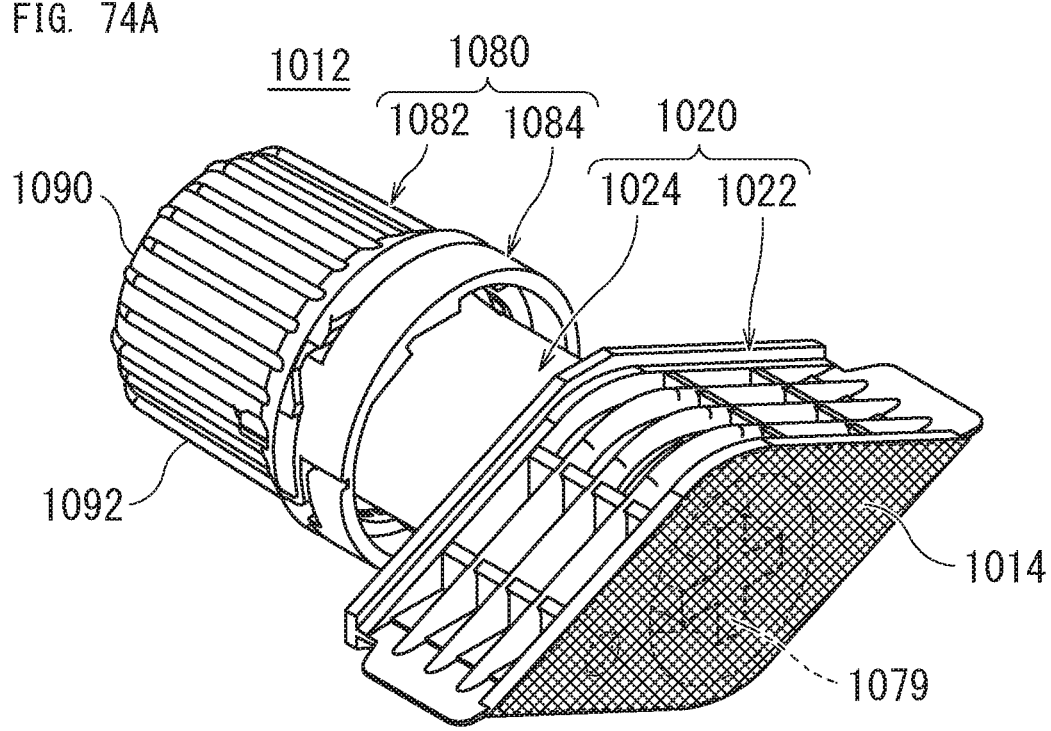
FIGS. 74A and 74B depict diagrams depicting a state before the activating body of a spout included in the spout-equipped container according to the sixth embodiment of this invention is moved upward, FIG. 74A being a perspective view of a state in which a bottom surface is viewable and FIG. 74B being a sectional view along an axial direction.
Figure 74B:
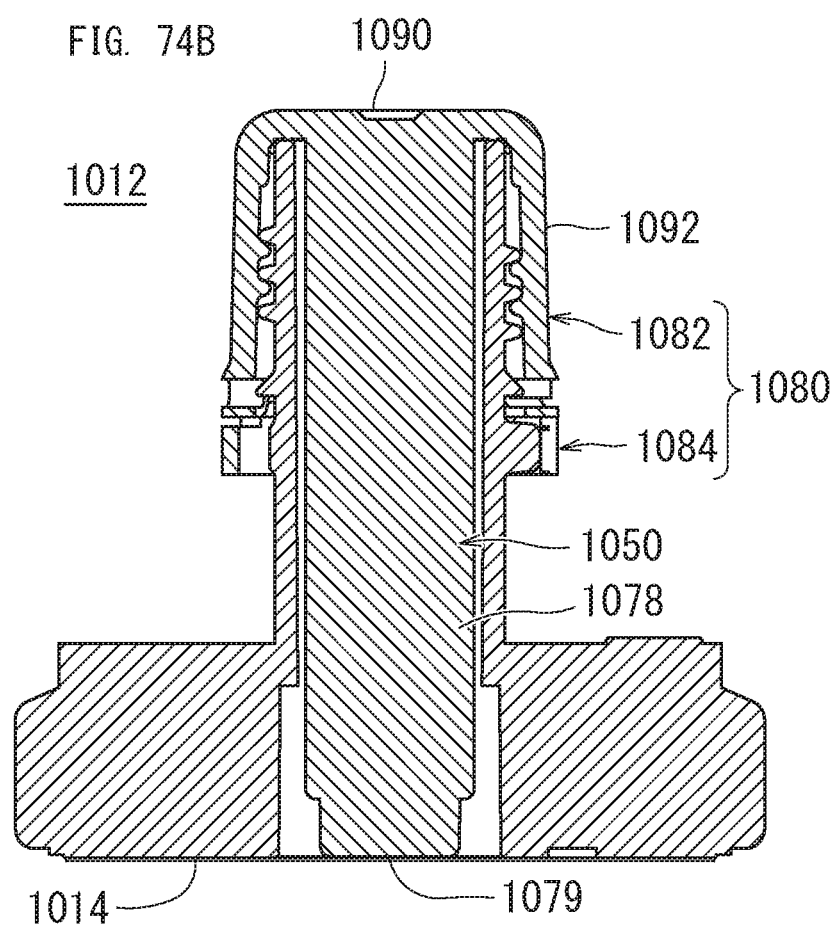
Figure 75A:
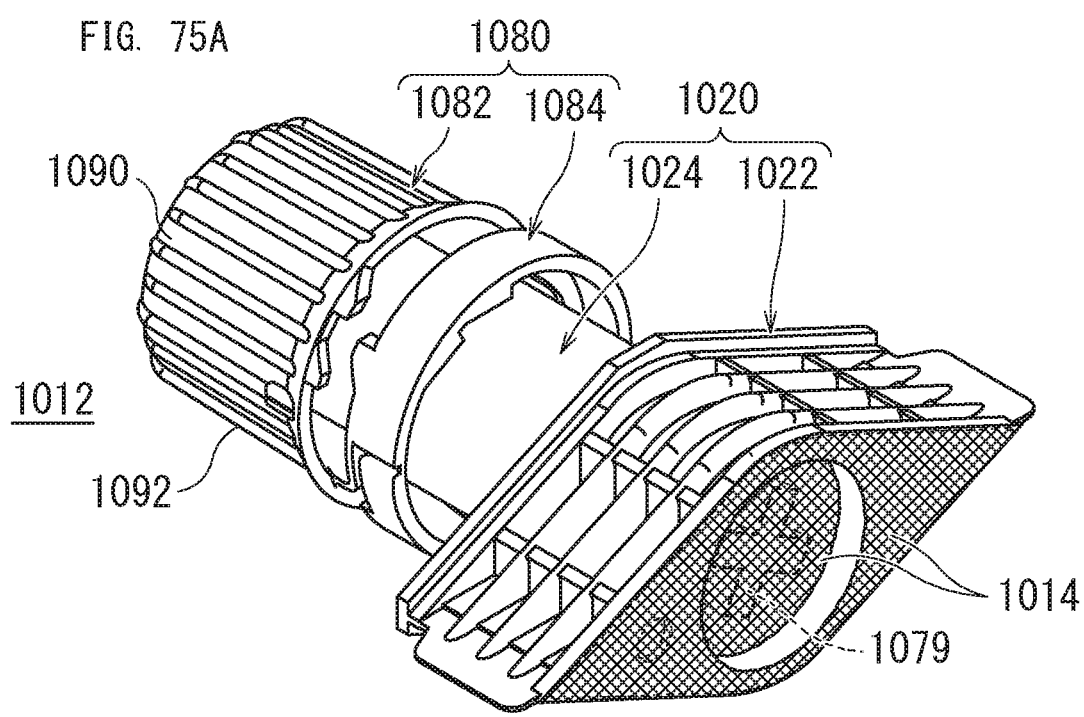
FIGS. 75A and 75B depict diagrams depicting a state after the activating body of the spout included in the spout-equipped container according to the sixth embodiment of this invention is moved upward, FIG. 75A being a perspective view of a state in which the bottom surface is viewable and FIG. 75B being a sectional view along the axial direction.
Figure 75B:
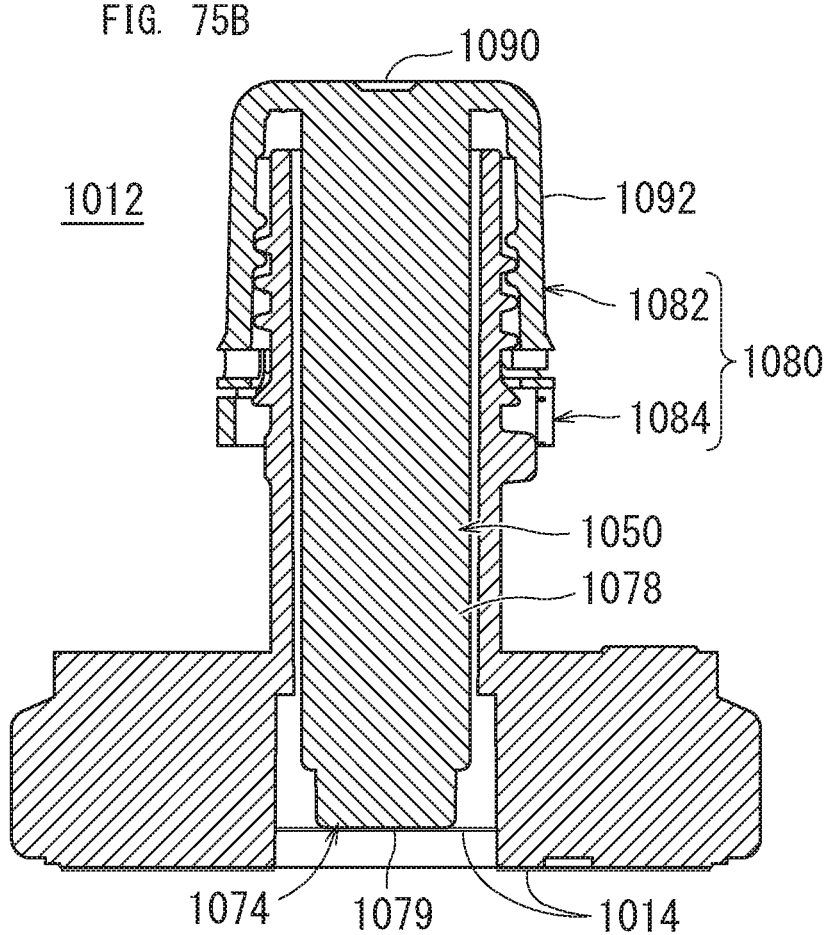
Figure 76:
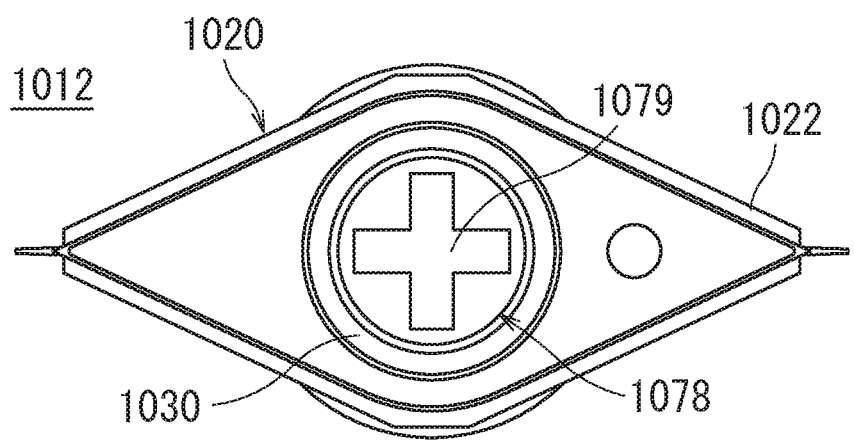
FIG. 76 is a bottom view depicting the spout included in the spout-equipped container according to the sixth embodiment of this invention.

Next, a spout-equipped container 10 according to a sixth embodiment of this invention is described with reference to FIG. 72 to FIG. 76. FIG. 72 is a front view depicting an activating body and an opening element included in a spout-equipped container according to a sixth embodiment of this invention. FIG. 73 is a bottom view depicting the activating body and the opening element included in the spout-equipped container according to the sixth embodiment of this invention. FIG. 74 depicts diagrams depicting a state before the activating body of a spout included in the spout-equipped container according to the sixth embodiment of this invention is moved upward, (A) being a perspective view of a state in which a bottom surface is viewable and (B) being a sectional view along an axial direction. FIG. 75 depicts diagrams depicting a state after the activating body of the spout included in the spout-equipped container according to the sixth embodiment of this invention is moved upward, (A) being a perspective view of a state in which the bottom surface is viewable and (B) being a sectional view along the axial direction. FIG. 76 is a bottom view depicting the spout included in the spout-equipped container according to the sixth embodiment of this invention.

In the spout-equipped container 10 according to this embodiment, the activating body 1080 and the opening element 1050 are integrally formed. Specifically, an inner surface (bottom surface) of the top portion 1090 of the activating body 1080 and an upper end (one end in the axial direction) of the opening element 1050 are integrally formed. And, a lower end (the other end in the axial direction) of the opening element 1050 is fixed to the upper surface of the heat sealed sheet 1014 in an initial state. Note that an opening-element main shaft unit 1078 in a substantially columnar shape is formed in a portion nearby from the upper end to the lower end of the opening element 1050, and a heat sealed sheet fixing portion 1079 in a substantially cross shape in a bottom view is formed at the lower end of the opening element 1050. That is, the upper surface of the heat sealed sheet 1014 is fixed to a lower end face of the heat sealed sheet fixing portion 1079.

In the spout container 10 according to this embodiment, with the activating body 1080 being rotated in a connection rotating direction and the activating body 1080 and the opening element 1050 moving upward (first direction) so as to be removed from the spout base 1020, part of the heat sealed sheet 1014 with its upper surface fixed to the activating body 1080 is screwed out, thereby making the accommodating part 200 of the container 10 and the through hole 1026 of the spout base 1020 connect with each other.

The spout 1012 according to the second and third embodiments described above has the structure for rotating the opening element 1050 (the guide tilted surface 1310*d* of the spout base 1020, the wing pressing units 1086 of the activating body 1080, and the guided tilted surface 1360*c* and the wing portions 1390 of the opening element 1050). Furthermore, the activating body 1080 according to the embodiment described above has the spout through hole 1056 penetrating in the axial direction. On the other hand, the spout 1012 according to this embodiment does not have (is not required to have) these structures, and therefore has a simple structure and can be easily formed.

Figure 77A:
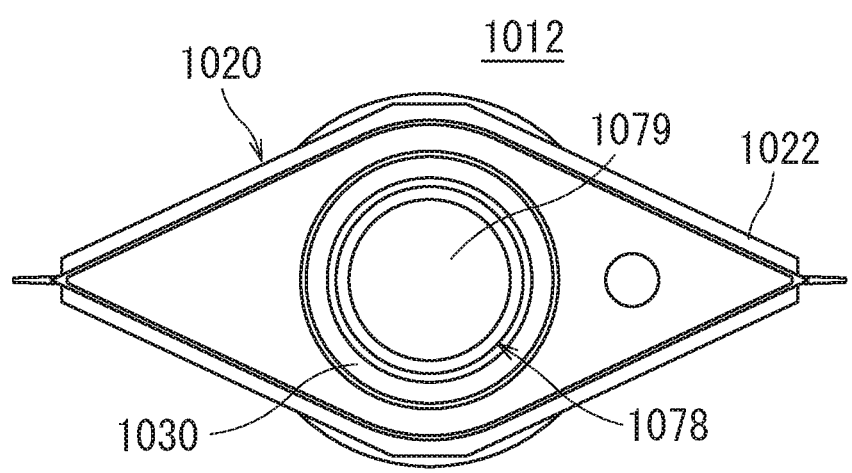
FIGS. 77A and 77B depict bottom views depicting modification examples of the spout included in the spout-equipped container according to the sixth embodiment of this invention, FIG. 77A being a bottom view depicting a modification example of the spout-equipped container including a heat sealed sheet fixing portion having a substantially circular shape in the bottom view and FIG. 77B being a bottom view depicting a modification example of the spout-equipped container including a heat sealed sheet fixing portion having a substantially quadrangular shape in the bottom view.
Figure 77B:
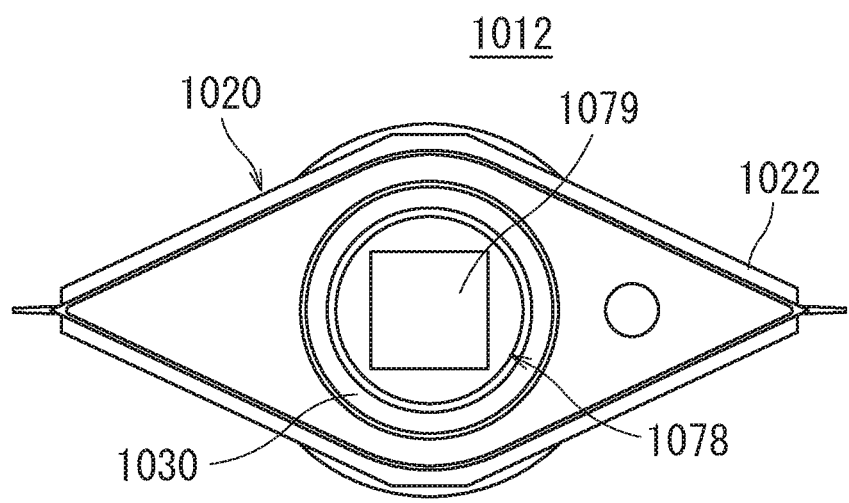
Figure 78:
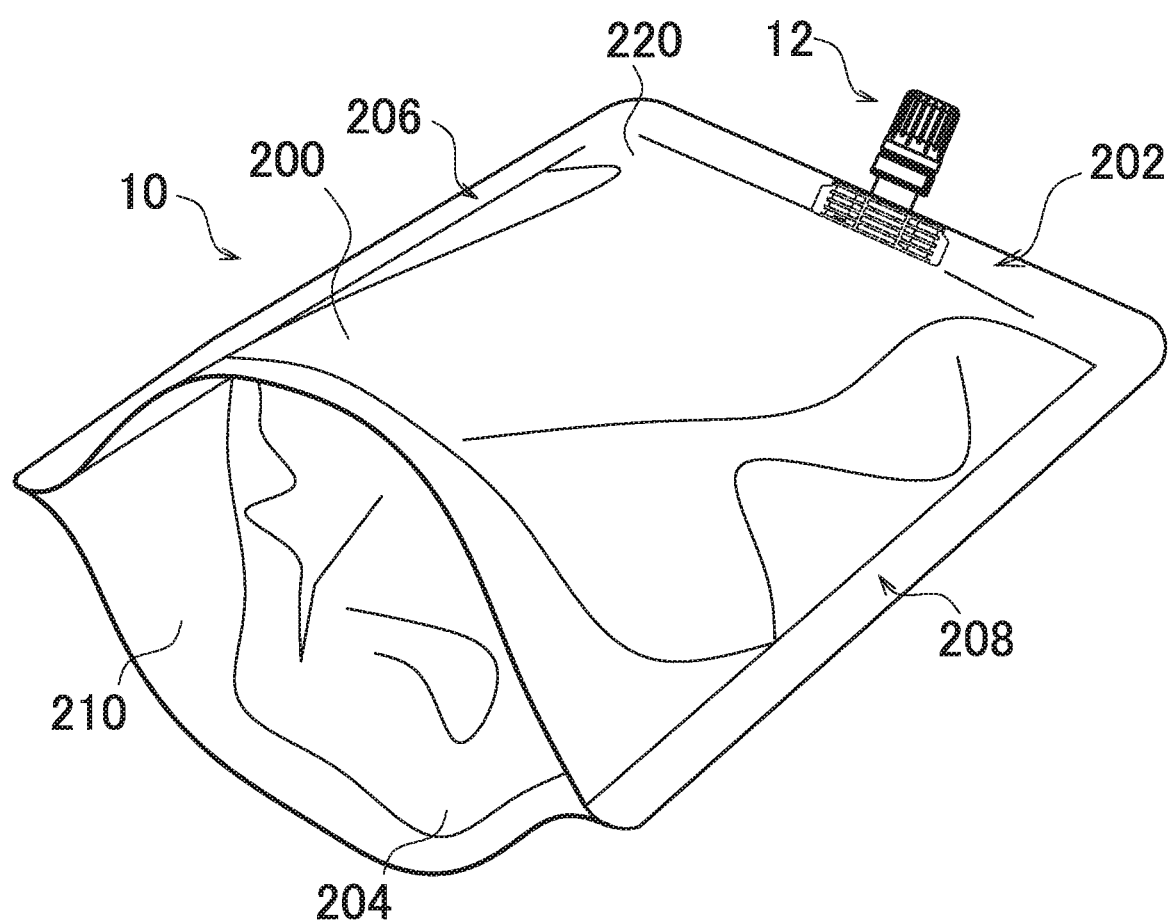
FIG. 78 is an illustrative perspective view of the spout-equipped container according to the present invention.
Figure 79:
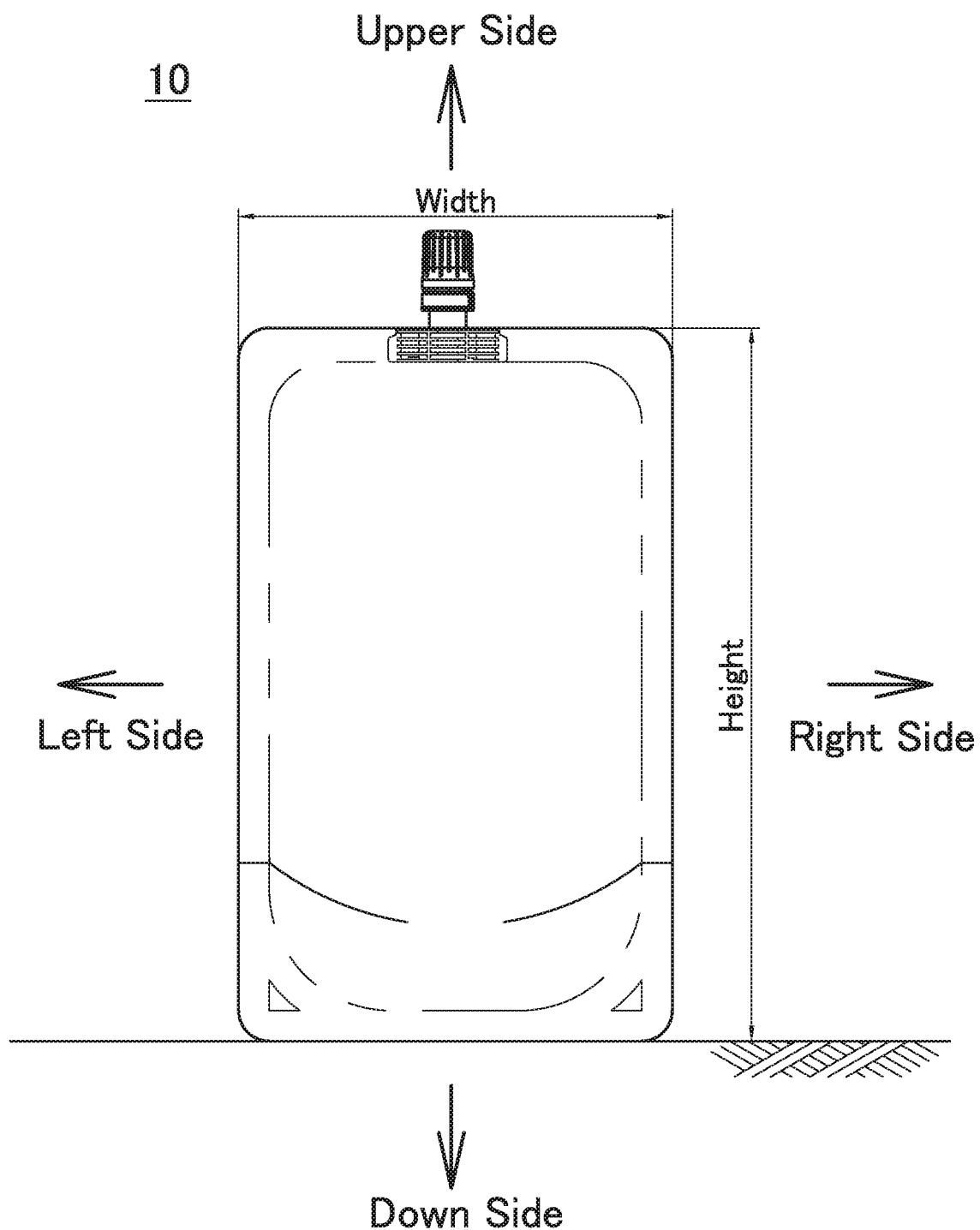
FIG. 79 is a descriptive diagram of the spout-equipped container according to the present invention.

FIG. 77 depicts bottom views depicting modification examples of the spout included in the spout-equipped container according to the sixth embodiment of this invention, (A) being a bottom view depicting a modification example of the spout-equipped container including a heat sealed sheet fixing portion having a substantially circular shape in the bottom view and (B) being a bottom view depicting a modification example of the spout-equipped container including a heat sealed sheet fixing portion having a substantially quadrangular shape in the bottom view. The heat sealed sheet fixing portion 1079 of the opening element 1050 included in the spout container 10 according to the sixth embodiment described above is not restricted to have a substantial cross in a bottom view. That is, the heat sealed sheet fixing portion 1079 may be in a substantially circular shape in a bottom view as depicted in FIG. 77(A), or the heat sealed sheet fixing portion 1079 may be in a substantially quadrangular shape in a bottom view as depicted in FIG. 77(B). Thus-shaped heat sealed sheet fixing portion 1079 has a larger area to be fixed to the heat sealed sheet 1014, and therefore the heat sealed sheet 1014 can be neatly cut.

Note that in the embodiments described above, description has been made to the case in which the male screw unit and the female screw unit (the right male screw unit 1032 and the right female screw unit 1088) are right screw and the guide tilted surface and the guided tilted surface (the guide tilted surface 1310*d* and the guided tilted surface 1360*c*) are sinistral. However, this is not meant to be restrictive, and the male screw unit and the female screw unit may be left screws and the guide tilted surface and the guided tilted surface may be dextral.

Note that in the embodiments described above, description has been made to the case in which the rotation regulating and engaging unit of the spout base 1020 is a male unit (the rotation stop male unit 1312) and the rotation regulating and engaging unit of the opening element 1050 is a female unit (the rotation stop female unit 1362). However, this is not meant to be restrictive, and the rotation regulating and engaging unit of the spout base 1020 may be the rotation stop male unit 1312 as a female unit and the rotation regulating and engaging unit of the opening element 1050 may be the rotation stop female unit 1362 as a male unit.

REFERENCE SIGNS LIST

10 container
200 accommodating part
202 spout unit
204 bottom portion
206 left side portion
208 right side portion 210 first container sheet
212 left side edge
214 right side edge
216 upper side edge
220 second container sheet
222 left side edge
224 right side edge
226 upper side edge
230 bottom sheet
12 spout
14 heat sealed sheet
20 spout base
22 attachment portion
24 cylindrical portion
26 through hole
28 outer opening
30 inner opening
32 male screw unit
34 step portion
36 activating-body stopping unit
38 rotation stop unit insertion hole
40 protrusion
42a guide surface
42b tamper evident ring surface
42 rotation stopping unit
44 opening-element accommodating unit
102 movement regulating unit
50 opening element
52 piercer element
54 sliding shaft unit
56 spout through hole
58 inlet
60 outlet
62 base unit
64 cutting edge unit
66 inflow port
68 rotation stop unit
70 first cutting-edge unit
72 second cutting-edge unit
80 activating body
82 cap
84 tamper evident ring
86 pressing unit
88 female screw unit
90 top portion
92 skirt
94 hook unit
96 coupling unit
98 rotation stopping unit
100 movement gap portion
1012 spout
1014 heat sealed sheet
1016 drooping portion
1017 tearing starting end portion
1018 tearing terminating portion
1019 tearing end edge
1020 spout base
1022 attachment portion
1024 cylindrical portion
1026 through hole
1028 outer opening
1030 inner opening
1032 right male screw unit
1034 step portion
1036 first sealing ridge
1038 second sealing ridge
1040 protrusion
1042 rotation stopping unit
1042a guide surface
1042b tamper evident ring surface
1044 opening-element accommodating unit
1050 opening element
1052 piercer element
1054 passive shaft unit
1056 spout through hole
1058 inlet
1060 outlet
1062 base unit
1064 cutting edge unit
1066 cutting-edge root portion
1068 cutting-edge bottom portion
1070 blade tip portion
1072 blade protruding portion
1074 heat sealed sheet abutment support unit
1076 first plate-shaped portion
1077 second plate-shaped portion
1078 opening-element main shaft unit
1079 heat sealed sheet fixing portion
1080 activating body
1082 cap
1084 tamper evidence
1086 wing pressing unit
1088 right female screw unit
1090 top portion
1092 skirt
1098 rotation stopping unit
1302 opening-element accommodating large-diameter portion
1304 opening-element accommodating small-diameter portion
1310 step
1310a left-and-right-direction extending portion
1310b vertical-direction extending portion
1310c lower end portion
1310d guide tilted surface
1312 rotation stop male unit
1330 lateral rib portion
1332 test-purpose hole
1340 longitudinal rib portion
1352 large-diameter portion
1354 small-diameter portion
1360 step
1360a left-and-right-direction extending portion
1360b standing portion
1360c guided tilted surface
1360d upper end portion
1360e vertical-direction extending portion
1362 rotation stop female unit
1370 flange portion
1380 notch portion
1390 wing portion
1410 coupling unit
1412 upper-surface preliminary coupling unit
1414 side-surface preliminary coupling unit
1420 tearing portion
1422 blade tilted portion
1424 blade terminating portion
1426 blade vertical extending portion
C center axis

The invention claimed is:
1. A spout-equipped container, comprising
a container having an accommodating part for accommodating hydrogen water;

an opening element having a piercer element and a cylindrical sliding shaft unit, the opening element having a spout through hole penetrating therethrough, a spout base having an attachment portion that is attached to the container and a cylindrical portion serving as a portion where the opening element is inserted; and a heat sealed sheet covering an inner opening which faces the accommodating part in the attachment portion of the spout base, wherein the accommodating part includes an aluminum region, the heat sealed sheet includes an aluminum region, the attachment portion and the cylindrical portion of the spout base have a through hole penetrating therethrough, the through hole penetrating from a bottom surface of the attachment portion over an upper surface of the cylindrical portion, the opening element is movably disposed in the through hole of the cylindrical portion, the piercer element is formed so as to be prevented from moving to a side of the cylindrical portion by contacting a step portion or an engaging portion provided on the through hole of the attachment portion, the heat sealed sheet is fixed on protrusions provided for the heat sealed sheet to be securely fixed in a bottom surface which faces the accommodating part of the spout base, the opening element is screwed while rotating inside the through hole of the spout base, and moves to a direction approaching the heat sealed sheet, the piercer element projecting from a bottom surface side of the through hole formed in the spout base while rotating, with the piercer element projecting from the bottom surface side of the through hole formed in the spout base while rotating, a part of the heat sealed sheet is torn so that the accommodating part of the container and the through hole of the spout base are formed to be connected to each other, the heat sealed sheet has a size approximately equal to a size of the bottom surface of the spout base, the heat sealed sheet hermetically seals the inner opening which faces the accommodating part, and is securely fixed to the bottom surface of the attachment portion of the spout base, and the aluminum region of the heat sealed sheet and the aluminum region of an inner surface of the accommodating part of the container are in close contact with each other, so that hydrogen contained in the hydrogen water is less prone to get out of the container and the spout base.

2. The spout-equipped container according to claim 1, further comprising an activating body which moves the opening element, wherein the opening element is accommodated in a cylinder of the spout base, the heat sealed sheet covers the inner opening which faces the accommodating part of the container in the spout base, the bottom surface of the attachment portion of the spout base includes sealing ridges provided along a periphery of the inner opening which faces the accommodating part, the opening element is formed so as not to get out of the spout base, formed so as to move toward the heat sealed sheet, and formed with the spout through hole at the center thereof, the activating body is attached to an outer opening side of the spout base and formed so as to move the opening element positioned on a heat sealed sheet side toward the heat sealed sheet, the heat sealed sheet is made of a material including aluminum, and is formed so as to be at least partially torn by the opening element so that the accommodating part of the container and an outer opening of the spout base connect with outside via the spout through hole of the opening element, the heat sealed sheet being formed such that an accommodated substance in the accommodating part of the container is poured outside from the outer opening, and the heat sealed sheet is fixed to the sealing ridges provided along the periphery of the inner opening.

3. The spout-equipped container according to claim 1, wherein the spout base includes the cylindrical portion having the through hole connecting with outside, the attachment portion interposed between an end edge of a first container sheet and an end edge of a second container sheet configuring the container, and an external thread for screwably attaching an activating body which moves an opening element movably disposed in the through hole of the cylindrical portion, and the attachment portion provided to the cylindrical portion on an accommodating part side of the container has an inlet connecting with the spout through hole of the opening element, the activating body has a cap and a tamper evident ring, and is formed so as to form a movement gap portion by separating and removing the tamper evident ring from the cap and press the opening element in order for the cap to move the opening element toward the heat sealed sheet, the opening element has, on a heat sealed sheet side, the piercer element for tearing the heat sealed sheet, the heat sealed sheet is formed to be pasted on a container accommodating part side surface of the attachment portion so as to cover an opening of the attachment portion, make close contact with the accommodating part of the container, and be torn by the opening element to make the through hole of the spout base and the accommodating part of the container connect with each other, the opening element has the cylindrical sliding shaft unit and the piercer element for tearing the heat sealed sheet, the piercer element is continuously connected to the sliding shaft unit so as to protrude in a flange shape at an end of the sliding shaft unit, the piercer element is formed to be in contact with a step portion or an engaging portion provided on a periphery of the through hole of the spout base to prevent the opening element from moving to a cylindrical portion side, the activating body is formed so that a pressing unit for pressing the opening element is provided inside the cap to protrude, an internal thread is provided inside the cap, the tamper evident ring is coupled by a coupling unit intermittently provided at a lower end of the cap, the movement gap portion is formed by rotating the cap and/or rotating the tamper evident ring in a circumferential direction to remove the tamper evident ring from the cap, and the cap is moved toward the movement gap portion formed in a circumferential direction of the cylindrical portion of the spout base to cause the pressing unit to press the opening element.

4. A spout-equipped container, comprising:

a container having an accommodating part for accommodating hydrogen water; and a spout facing the accommodating part and being attached to an end edge of the container, wherein the spout includes
- a spout base having an attachment portion that is attached to the container and a cylindrical portion serving as a portion where an opening element is inserted, in which a through hole is formed in an axial direction of the spout,
- an activating body to be screwed in one end of the spout base in the axial direction,
- the opening element inserted in the through hole of the spout base, and having a spout through hole penetrating therethrough, and
- a heat sealed sheet which covers an inner opening which faces the accommodating part in the attachment portion of the spout base, the container includes the accommodating part including an aluminum region, the through hole of the spout base, the activating body, and the opening element are each formed in a substantially cylindrical shape and made concentric with each other in a planar view, the heat sealed sheet includes an aluminum region, and is configured to seal the accommodating part of the container by being fixed to a bottom surface which is located at the other end of the spout base so as to shield the accommodating part of the container and the through hole of the spout base, the spout base including
- a first external thread formed on an outer surface near the one end of the spout base in the axial direction and configuring a male unit of a screw for the activating unit to move in a first direction away from the heat sealed sheet on the axial direction by being loosened by being rotated in a connection rotating direction along a circumferential direction for making the accommodating part of the container and the through hole of the spout base connect with each other, and
- a second internal thread formed in an inner wall of the through hole at the other end of the spout base in the axial direction and configuring a female unit of a screw for the opening element to move in a second direction approaching the heat sealed sheet in the axial direction by being screwed by being rotated in the connection rotating direction, the activating body is formed so as to be removably screwed on the one end in the axial direction of the spout base and so as to move the opening element in the second direction inside the through hole of the spout base, the activating body including
- a top portion and a skirt hanging down from an end edge of the top portion to form a side wall, and
- an operating part hanging down in a direction parallel to a direction of the skirt to be provided to project on an inner surface of the top portion,
- a first internal thread configures a female unit of a screw screwed with the first external thread and is formed on an inner surface of the skirt, the opening element is formed so as to move in the second direction inside the through hole of the spout base within the spout base, the opening element including
- a piercer element formed at the other end of the spout base in the axial direction, and
- a passive shaft unit to protrude so as to extend in the axial direction substantially at a center of a top portion of the piercer element, the spout through hole is provided in the piercer element and the passive shaft to connect in the axial direction to penetrate therethrough, a base unit of the piercer element has a large-diameter portion extending in the axial direction, a small-diameter portion, and the second internal thread which is a step formed on a connecting portion of the large-diameter portion and the small-diameter portion, the step having a guided tilted surface extending to a lateral direction along a circumferential direction of the base unit, on an outer surface of the passive shaft unit, a passive unit is provided to protrude, the passive unit being rotated by being pressed by the operating part when the activating body is rotated in the connection rotating direction, and an opening-element accommodating unit configuring a lower portion of the through hole of the spout base has an opening-element accommodating large-diameter portion, an opening-element accommodating small-diameter portion, and a step formed therein, wherein the opening-element accommodating a large-diameter portion has a dimension in the radial direction corresponding to the large-diameter portion of the opening element, the opening-element accommodating small-diameter portion has a dimension in the radial direction corresponding to the small-diameter portion of the opening element, the step is formed on a connecting portion of the opening-element accommodating large-diameter portion and the opening-element accommodating small-diameter portion, the activating body is rotated in the connection rotating direction, thereby causing the operating part of the activating body to press the passive unit of the opening element in the connection rotating direction to proceed, and the activating body is loosened to be removed from the spout base and moves in the first direction, with the operating part pressing the passive unit in the connection rotating direction to proceed, the opening element is rotated in the connection rotating direction, by being rotated in the connection rotating direction, the opening element is screwed while rotating inside the through hole of the spout base to move in the second direction, and the piercer element projects from a bottom surface side of the through hole formed in the spout base while rotating, with the piercer element projecting from the bottom surface side of the through hole formed in the spout base while rotating, part of the heat sealed sheet is torn so that the accommodating part of the container and the through hole of the spout base are configured to connect with each other, the heat sealed sheet has a size approximately equal to a size of the bottom surface of the spout base, the heat sealed sheet hermetically seals the inner opening which faces the accommodating part, and is securely fixed to the bottom surface of the attachment portion of the spout base, and the aluminum region of the heat sealed sheet and the aluminum region of an inner surface of the accommodating part of the container are in close contact with each other, so that hydrogen contained in the hydrogen water is less prone to get out of the container and the spout base.

5. The spout-equipped container according to claim 4, wherein the first external thread and the first internal thread are right-handed screws formed to be loosened by being rotated in the connection rotating direction, and the second external thread and the second internal thread are left-handed screws formed to as to be screwed by being rotated in the connection rotating direction.

6. The spout-equipped container according to claim 4, wherein in an initial state, the activating body is screwed on the spout base such that the inner surface of the top portion of the activating body is in contact with or substantially in contact with an upper end of the spout base, and the opening element is inserted in the though hole of the spout base such that the other end in the axial direction thereof is positioned at a height equal to the other end of the spout base, the activating body is rotated from the initial state by an angle less than 360° in the connection rotating direction, thereby causing the opening element to move in the second direction while rotating by an angle less than 360° inside the through hole of the spout base, causing the piercer element to project from the other end in the axial direction of the through hole while rotating by an angle less than 360°, and with the piercer element projecting from the other end in the axial direction of the through hole while rotating by an angle less than 360°, a part of heat sealed sheet is torn so as to remain linked to another part thereof, so that the accommodating part of the container and the through hole of the spout base connect with each other.

7. The spout-equipped container according to claim 4, wherein the spout base includes the cylindrical portion having the through hole connecting with outside, the attachment portion interposed between an end edge of a first container sheet and an end edge of a second container sheet configuring the container, and an external thread for screwably attaching an activating body which moves an opening element movably disposed in the through hole of the cylindrical portion, the attachment portion provided to the cylindrical portion on an accommodating part side of the container has an inlet connecting with the spout through hole of the opening element, the activating body has a cap and a tamper evident ring, and is formed so as to form a movement gap portion by separating and removing the tamper evident ring from the cap and press the opening element in order for the cap to move the opening element toward the heat sealed sheet, the opening element has, on a heat sealed sheet side, the piercer element for tearing the heat sealed sheet, the heat sealed sheet is formed to be pasted on a container accommodating part side surface of the attachment portion so as to cover an opening of the attachment portion, make close contact with the accommodating part of the container, and be torn by the opening element to make the through hole of the spout base and the accommodating part of the container connect with each other, the opening element has the cylindrical sliding shaft unit and the piercer element for tearing the heat sealed sheet, the piercer element is continuously connected to the sliding shaft unit so as to protrude in a flange shape at an end of the sliding shaft unit, the piercer element is formed to be in contact with a step portion or an engaging portion provided on a periphery of the through hole of the spout base to prevent the opening element from moving to a cylindrical portion side, the activating body is formed so that a pressing unit for pressing the opening element is provided inside the cap to protrude, an internal thread is provided inside the cap, the tamper evident ring is coupled by a coupling unit intermittently provided at a lower end of the cap, the movement gap portion is formed by rotating the cap and/or rotating the tamper evident ring in a circumferential direction to remove the tamper evident ring from the cap, and the cap is moved toward the movement gap portion formed in a circumferential direction of the cylindrical portion of the spout base to cause the pressing unit to press the opening element.

8. A method of manufacturing a spout-equipped container, wherein a method of attaching the spout according to claim 4 to the spout unit of the container including an accommodating part comprises when the spout, including the spout base having the attachment portion that is attached to the container and the cylindrical portion serving as a portion where an opening element is inserted, the opening element accommodated in the cylinder of the cylindrical portion of the spout base, and an activating body which moves the opening element into the cylinder of the cylindrical portion are manufactured, inserting the shaft unit of the opening element in the through hole of the cylindrical portion of the spout base from an inner opening side of the through hole formed in the attachment portion of the spout base, the piercer element of the opening element being contacted with a step portion or an engaging portion provided on the through hole of the attachment portion with the opening element prevented from getting outside by being prevented from moving to the cylindrical portion of the spout base, with the piercer element prevented from getting outside from the bottom surface of the attachment portion of the spout base, adhering the heat sealed sheet which covers the inner opening which faces an accommodating part in the attachment portion of the spout base to a sealing ridge provided along an outer edge of the through hole of the spout base to fix the heat sealed sheet securely while hermetically sealing the inner opening in a region which faces the accommodating part of the container of the spout base to form the spout, and welding a first container sheet and a second container sheet configuring the container on a periphery of the attachment portion of the spout.

9. A method of manufacturing a spout-equipped container, wherein a method of attaching the spout according to claim 1 to the spout unit of the container includes an accommodating part, the method of manufacturing comprising when the spout, including the spout base having an attachment portion that is attached to the container and the cylindrical portion serving as a portion where an opening element is inserted, the opening element accommodated in the cylinder of the cylindrical portion of the spout base, and an activating body which moves the opening element into the cylinder of the cylindrical portion are manufactured, inserting the shaft unit of the opening element in the through hole of the cylindrical portion of the spout base from an inner opening side of the through hole formed in the attachment portion of the spout base, the piercer element of the opening element being contacted with a step portion or an engaging portion provided on the through hole of the attachment portion with the opening element prevented from getting outside by being prevented from moving to the cylindrical portion of the spout base, with the piercer element prevented from getting outside from the bottom surface of the attachment portion of the spout base, adhering the heat sealed sheet which covers the inner opening which faces an accommodating part in the attachment portion of the spout base to a sealing ridge provided along an outer edge of the through hole of the spout base to fix the heat sealed sheet securely while hermetically sealing the inner opening in a region which faces the accommodating part of the container of the spout base to form the spout, and welding a first container sheet and a second container sheet configuring the container on a periphery of the attachment portion of the spout.

10. A spout-equipped container, comprising
a container having an accommodating part for accommodating hydrogen water;
a spout facing the accommodating part and being attached to an end edge of the container, wherein
the spout includes
a spout base having an attachment portion that is attached to the container and a cylindrical portion serving as a portion where an opening element is inserted,
the opening element accommodated in the cylinder of the spout base,
an activating body which moves the opening element, and
a heat sealed sheet which covers an inner opening which faces the accommodating part of the container in the attachment portion of the spout base;
the accommodating part includes an aluminum region,
the heat sealed sheet includes an aluminum region,
the spout base has the attachment portion attached to the container and the cylindrical portion provided to protrude upward at the attachment portion,
the opening element has a piercer element which tears the heat sealed sheet and a passive shaft unit provided to an upper portion of the piercer element to protrude,
the piercer element and the passive shaft unit continuously provided to the upper portion of the piercer element are in a columnar and/or pole shape,
the piercer element and the passive shaft unit have a spout through hole provided to penetrate therethrough,
the spout through hole has an outlet facing an outer opening of the spout base and an inlet facing the accommodating part of the container,
the passive shaft unit is formed so as to slidably fit in a through hole of the cylindrical portion of the spout base and be pressed by the activating body to move downward,
on the outer surface of the passive shaft unit, wing portions are provided to protrude as passive portions extending from an upper end of the passive shaft unit to a lower end of the passive shaft unit in a vertical direction,
in the passive shaft unit, an outer diameter including the wing portions is approximately equal to or slightly smaller than the inner diameter of the cylindrical portion of the spout base,
on an inner surface of the top portion of the activating body, wing pressing units are disposed as operating portions hanging down in the same direction as that of a skirt,
with rotating the activating body for movement in a first direction, an end of wing pressing units abuts on a surface of the wing portions provided to protrude on the outer surface of the passive shaft unit of the opening element, and rotates to press forward as sliding on the surface,
the opening element proceeds to a second direction and moves in a downward direction by rotating the opening element, so that the piercer element protrudes from a bottom surface of the spout base, and a notch portion formed at the lower end of the piercer element is formed to tear the heat sealed sheet fixed to the bottom surface of the spout base so as to draw a circle as rotating, and
the heat sealed sheet has a size approximately equal to a size of the bottom surface of the spout base, wherein
the heat sealed sheet hermetically seals the inner opening which faces the accommodating part, and is securely fixed to the bottom surface of the attachment portion of the spout base, and
the aluminum region of the heat sealed sheet and the aluminum region of an inner surface of the accommodating part of the container are in close contact with each other, so that hydrogen contained in the hydrogen water is less prone to get out of the container and the spout base.

11. The spout-equipped container according to claim 10, wherein
the spout base includes
the cylindrical portion having the through hole connecting with outside,
the attachment portion interposed between an end edge of a first container sheet and an end edge of a second container sheet configuring the container, and
an external thread for screwably attaching an activating body which moves an opening element movably disposed in the through hole of the cylindrical portion,
the attachment portion provided to the cylindrical portion on an accommodating part side of the container has an inlet connecting with the spout through hole of the opening element,
the activating body has a cap and a tamper evident ring, and is formed so as to form a movement gap portion by separating and removing the tamper evident ring from the cap and press the opening element in order for the cap to move the opening element toward the heat sealed sheet, the opening element has, on a heat sealed sheet side, the piercer element for tearing the heat sealed sheet, the heat sealed sheet is formed to be pasted on a container accommodating part side surface of the attachment portion so as to cover an opening of the attachment portion, make close contact with the accommodating part of the container, and be torn by the opening element to make the through hole of the spout base and the accommodating part of the container connect with each other, the opening element has the cylindrical sliding shaft unit and the piercer element for tearing the heat sealed sheet, the piercer element is continuously connected to the sliding shaft unit so as to protrude in a flange shape at an end of the sliding shaft unit, the piercer element is formed to be in contact with a step portion or an engaging portion provided on a periphery of the through hole of the spout base to prevent the opening element from moving to a cylindrical portion side, the activating body is formed so that a pressing unit for pressing the opening element is provided inside the cap to protrude, an internal thread is provided inside the cap, the tamper evident ring is coupled by a coupling unit intermittently provided at a lower end of the cap, the movement gap portion is formed by rotating the cap and/or rotating the tamper evident ring in a circumferential direction to remove the tamper evident ring from the cap, and the cap is moved toward the movement gap portion formed in a circumferential direction of the cylindrical portion of the spout base to cause the pressing unit to press the opening element.

12. A method of manufacturing a spout-equipped container, wherein a method of attaching the spout according to claim 10 to the spout unit of the container including an accommodating part comprises when the spout, including the spout base having an attachment portion that is attached to the container and the cylindrical portion serving as a portion where an opening element is inserted, the opening element accommodated in the cylinder of the cylindrical portion of the spout base, and an activating body which moves the opening element into the cylinder of the cylindrical portion are manufactured, inserting the shaft unit of the opening element in the through hole of the cylindrical portion of the spout base from an inner opening side of the through hole formed in the attachment portion of the spout base, the piercer element of the opening element being contacted with a step portion or an engaging portion provided on the through hole of the attachment portion with the opening element prevented from getting outside by being prevented from moving to the cylindrical portion of the spout base, with the piercer element prevented from getting outside from the bottom surface of the attachment portion of the spout base, adhering the heat sealed sheet which covers the inner opening which faces an accommodating part in the attachment portion of the spout base to a sealing ridge provided along an outer edge of the through hole of the spout base to fix the heat sealed sheet securely while hermetically sealing the inner opening in a region which faces the accommodating part of the container of the spout base to form the spout, and welding a first container sheet and a second container sheet configuring the container on a periphery of the attachment portion of the spout.

13. A spout-equipped container, comprising a container having an accommodating part for accommodating hydrogen water;

a spout facing the accommodating part and being attached to an end edge of the container, wherein the spout includes
  a spout base having an attachment portion that is attached to the container and a cylindrical portion serving as a portion where an opening element is inserted, in which a through hole is formed in an axial direction of a spout,
  an activating body to be screwed in one end of the spout base in the axial direction,
  the opening element inserted in the through hole of the spout base, and having a spout through hole penetrating therethrough, and
  a heat sealed sheet which covers an inner opening which faces the accommodating part in the attachment portion of the spout base;

the accommodating part includes an aluminum region, the through hole of the spout base, the activating body, and the opening element are each formed in a substantially cylindrical shape and made concentric with each other in a planar view, and the heat sealed sheet includes an aluminum region, and is configured to seal the accommodating part of the container by being fixed to a bottom surface which faces on the accommodating part at the other end of the spout base so as to shield the accommodating part of the container and the through hole of the spout base;

the spout base has the through hole formed in a circular shape in a planar view at a center of the attachment portion of the spout base, the through hole being configured to have a space for accommodating a piercer element of the opening element, and a step being formed on an inner wall thereof;

the opening element
  is formed so as to move in a side of the heat sealed sheet inside the through hole of the spout base not to get out of the spout base,
  includes the piercer element and a passive shaft unit, the piercer element being formed at a lower end of the passive shaft unit in the axial direction, and the passive shaft unit being provided to protrude at a center of a top portion of the piercer element so as to extend in the axial direction, and
  is provided with the spout through hole in the piercer element and the passive shaft to connect in the axial direction to penetrate therethrough;

the piercer element has a base unit formed from an upper end to a portion near the lower end of the passive shaft unit, and a cutting edge unit formed at the lower end, the base unit having a step an outer surface of the base unit, and the step being screwed into the step formed on an inner surface of the attachment portion of the spout base;

the opening element rotates inside the through hole of the spout base by being rotated in the connection rotating direction, the step formed on the piercer element is guided by the step formed on the inner wall of the through hole in the attachment portion of the spout base to move to a side of the heat sealed sheet, the piercer element protrudes from a bottom surface side of the through hole formed in the spout base while rotating, and with the piercer element projecting from the bottom surface side of the through hole formed in the spout base while rotating, part of the heat sealed sheet is torn, so that the accommodating part of the container and the through hole of the spout base are configured to connect with each other;

the heat sealed sheet has a size approximately equal to a size of the bottom surface of the spout base, wherein
the heat sealed sheet hermetically seals the inner opening which faces the accommodating part, and is securely fixed to the bottom surface of the attachment portion of the spout base, and an aluminum region of the heat sealed sheet and an aluminum region of an inner surface of the accommodating part of the container are in close contact with each other, so that hydrogen contained in the hydrogen water is less prone to get out of the container and the spout base.

14. The spout-equipped container according to claim 13, wherein the spout base includes
the cylindrical portion having the through hole connecting with outside, the attachment portion interposed between an end edge of a first container sheet and an end edge of a second container sheet configuring the container, and an external thread for screwably attaching the activating body which moves an opening element movably disposed in the through hole of the cylindrical portion, the attachment portion provided to the cylindrical portion on an accommodating part side of the container has an inlet connecting with the spout through hole of the opening element, the activating body has a cap and a tamper evident ring, and is formed so as to form a movement gap portion by separating and removing the tamper evident ring from the cap and press the opening element in order for the cap to move the opening element toward the heat sealed sheet, the opening element has, on a heat sealed sheet side, the piercer element for tearing the heat sealed sheet, the heat sealed sheet is formed to be pasted on a container accommodating part side surface of the attachment portion so as to cover an opening of the attachment portion, make close contact with the accommodating part of the container, and be torn by the opening element to make the through hole of the spout base and the accommodating part of the container connect with each other, the opening element has the cylindrical sliding shaft unit and the piercer element for tearing the heat sealed sheet, the piercer element is continuously connected to the sliding shaft unit so as to protrude in a flange shape at an end of the sliding shaft unit, the piercer element is formed to be in contact with a step portion or an engaging portion provided on a periphery of the through hole of the spout base to prevent the opening element from moving to a cylindrical portion side, the activating body is formed so that a pressing unit for pressing the opening element is provided inside the cap to protrude, an internal thread is provided inside the cap, the tamper evident ring is coupled by a coupling unit intermittently provided at a lower end of the cap, the movement gap portion is formed by rotating the cap and/or rotating the tamper evident ring in a circumferential direction to remove the tamper evident ring from the cap, and the cap is moved toward the movement gap portion formed in a circumferential direction of the cylindrical portion of the spout base to cause the pressing unit to press the opening element.

15. A method of manufacturing a spout-equipped container, wherein a method of attaching the spout according to claim 13 to the spout unit of the container provided with an accommodating part comprises when the spout, including the spout base having the attachment portion that is attached to the container and the cylindrical portion serving as a portion where an opening element is inserted, the opening element accommodated in the cylinder of the cylindrical portion of the spout base, and an activating body which moves the opening element into the cylinder of the cylindrical portion are manufactured, inserting the shaft unit of the opening element in the through hole of the cylindrical portion of the spout base from an inner opening side of the through hole formed in the attachment portion of the spout base, the piercer element of the opening element being contacted with a step portion or an engaging portion provided on the through hole of the attachment portion with the opening element prevented from getting outside by being prevented from moving to the cylindrical portion of the spout base, with the piercer element prevented from getting outside from the bottom surface of the attachment portion of the spout base, adhering the heat sealed sheet which covers the inner opening which faces an accommodating part in the attachment portion of the spout base to a sealing ridge provided along an outer edge of the through hole of the spout base to fix the heat sealed sheet securely while hermetically sealing the inner opening in a region which faces the accommodating part of the container of the spout base to form the spout, and welding a first container sheet and a second container sheet configuring the container on the periphery of the attachment portion of the spout.

* * * * *